United States Patent
Vermeulen et al.

(10) Patent No.: US 10,788,639 B2
(45) Date of Patent: Sep. 29, 2020

(54) TELECOMMUNICATIONS DISTRIBUTION ELEMENTS

(71) Applicant: COMMSCOPE CONNECTIVITY BELGIUM BVBA, Kessel-Lo (BE)

(72) Inventors: Pieter Vermeulen, Westerlo (BE); Johan Geens, Bunsbeek (BE); Peter Claes, Berlaar (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 16/811,850

(22) Filed: Mar. 6, 2020

(65) Prior Publication Data

US 2020/0209498 A1 Jul. 2, 2020

Related U.S. Application Data

(62) Division of application No. 16/062,060, filed as application No. PCT/EP2016/081564 on Dec. 16, 2016, now Pat. No. 10,606,007.

(60) Provisional application No. 62/268,292, filed on Dec. 16, 2015, provisional application No. 62/343,473, filed on May 31, 2016.

(51) Int. Cl.
*G02B 6/44* (2006.01)

(52) U.S. Cl.
CPC ......... *G02B 6/4446* (2013.01); *G02B 6/4452* (2013.01); *G02B 6/4453* (2013.01); *G02B 6/4455* (2013.01)

(58) Field of Classification Search
None
See application file for complete search history.

(56) References Cited

U.S. PATENT DOCUMENTS

| 5,339,379 | A | 8/1994 | Kutsch et al. |
| 6,009,224 | A | 12/1999 | Allen |
| 6,363,576 | B1 | 4/2002 | Hsu et al. |
| 7,079,744 | B2 | 7/2006 | Douglas et al. |

(Continued)

FOREIGN PATENT DOCUMENTS

| CN | 1133640 A | 10/1996 |
| CN | 1319194 A | 10/2001 |

(Continued)

OTHER PUBLICATIONS

International Search Report and Written Opinion of the International Searching Authority for International Patent Application No. PCT/EP2016/081564 dated May 29, 2017, 16 pages.

*Primary Examiner* — Chad H Smith
(74) *Attorney, Agent, or Firm* — Merchant & Gould P.C.

(57) ABSTRACT

A hinge structure (2202) for pivotally mounting a first telecommunications element (2256) to a second telecommunications element (2224/2210) includes a hinge pin (2203) provided on the first element (2256) and a hinge pin receiver (2204) provided on the second element (2224/2210). The hinge pin (2203) defines a notch (2206) separating the pin (2203) into two pin halves (2205). The hinge pin receiver (2204) defines two sets of opposing surfaces (2214), the two sets (2214) separated by a divider (2212), the divider (2212) configured to be accommodated by the notch (2206) when the hinge pin (2203) is inserted into the hinge pin receiver (2204), wherein each opposing surface set (2214) defines a slot (2213) for receiving each pin half (2205).

6 Claims, 122 Drawing Sheets

FIG.121

(56) References Cited

U.S. PATENT DOCUMENTS

| | | |
|---|---|---|
| 7,120,348 B2 | 10/2006 | Trebesch et al. |
| 8,731,361 B2 | 5/2014 | Anderson et al. |
| 2002/0181922 A1 | 12/2002 | Xin et al. |
| 2003/0202765 A1 | 10/2003 | Franklin et al. |
| 2004/0136676 A1 | 7/2004 | Mertesdorf |
| 2004/0258384 A1 | 12/2004 | Trebesch et al. |
| 2008/0205843 A1 | 8/2008 | Castonguay et al. |
| 2008/0235907 A1 | 10/2008 | Wayman et al. |
| 2010/0061693 A1 | 3/2010 | Bran de Leon et al. |
| 2010/0207498 A1 | 8/2010 | Womack et al. |
| 2010/0310225 A1 | 12/2010 | Anderson et al. |
| 2015/0300064 A1 | 10/2015 | Edavana et al. |
| 2015/0370027 A1* | 12/2015 | Geens et al. .......... H04Q 1/023 385/135 |
| 2017/0299834 A1 | 10/2017 | Geens et al. |

FOREIGN PATENT DOCUMENTS

| | | |
|---|---|---|
| CN | 1448746 A | 10/2003 |
| CN | 201335897 Y | 10/2009 |
| CN | 102483500 A | 5/2012 |
| DE | 92 17 305 U1 | 3/1993 |
| FR | 2 793 564 A1 | 11/2000 |
| WO | 2004/110122 A2 | 12/2004 |
| WO | 2014/091371 A1 | 6/2014 |
| WO | 2014/118227 A1 | 8/2014 |
| WO | 2014/173930 A1 | 10/2014 |

\* cited by examiner

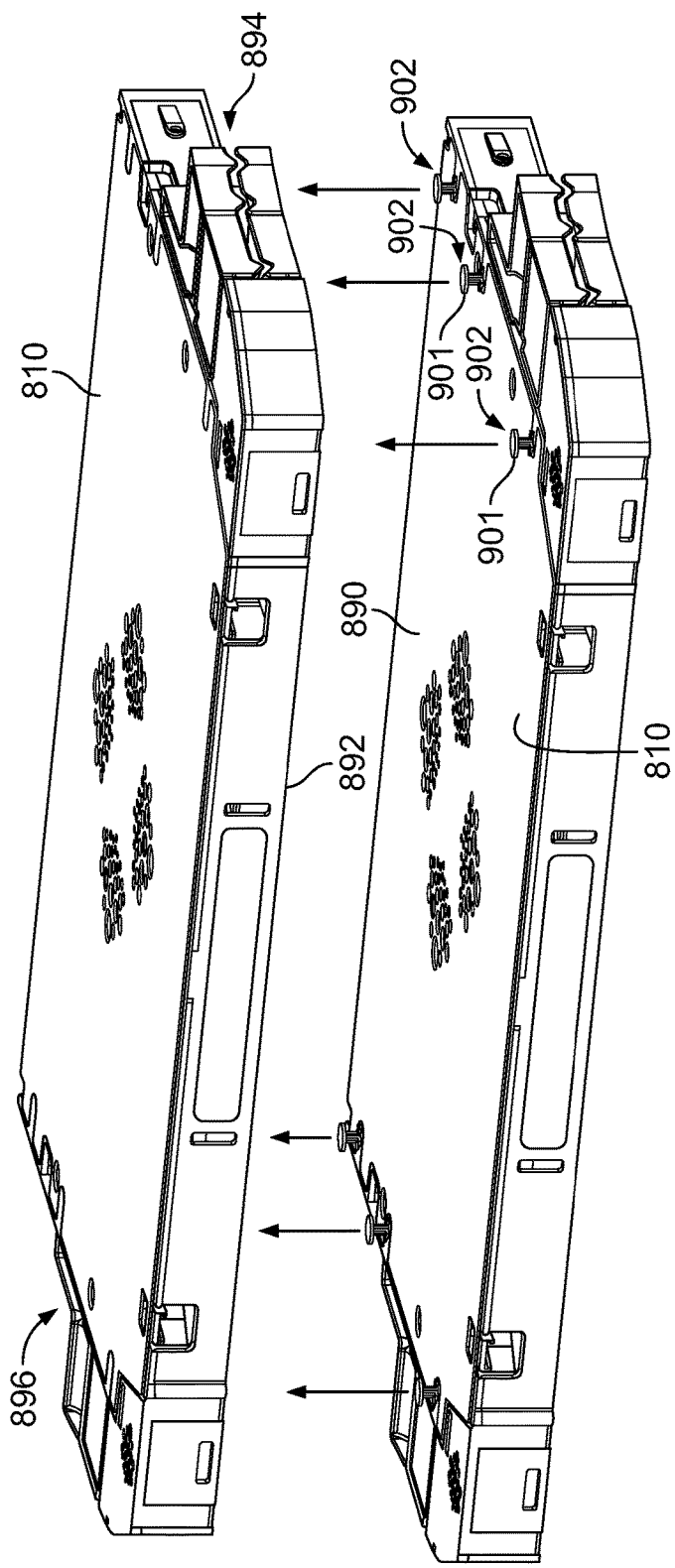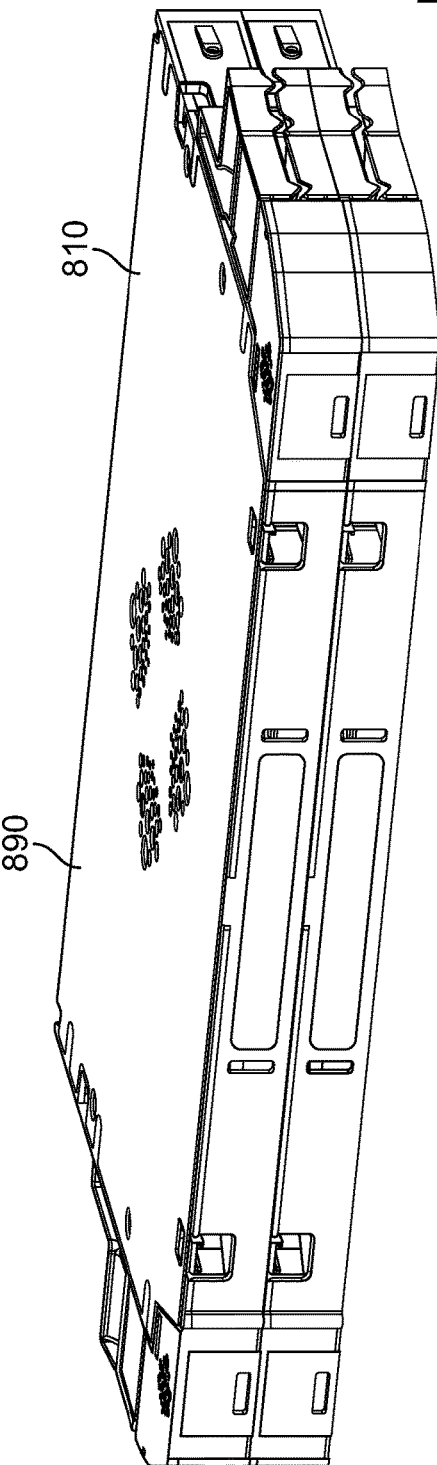
FIG. 62
FIG. 63

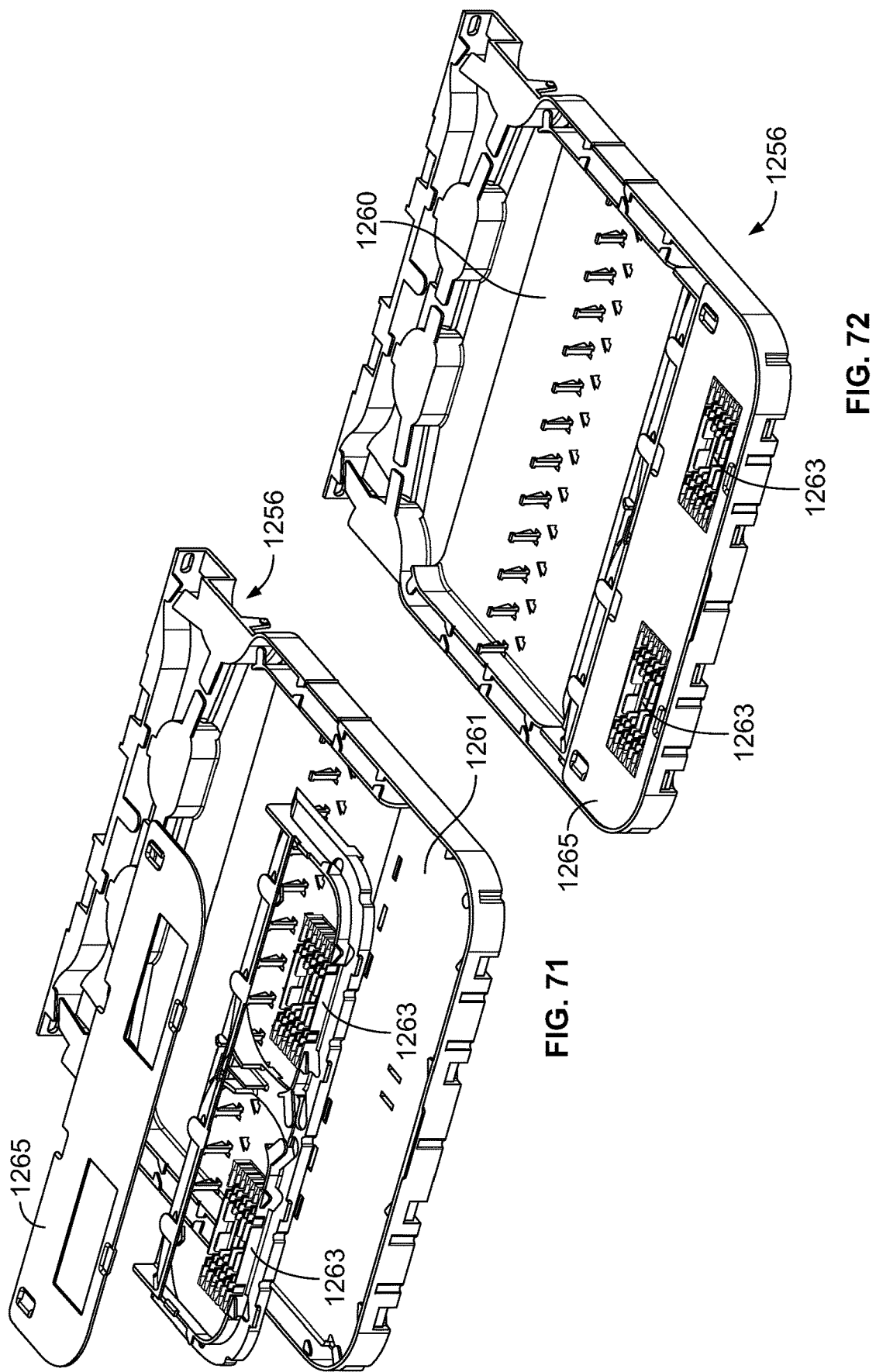

TELECOMMUNICATIONS DISTRIBUTION ELEMENTS

CROSS-REFERENCE TO RELATED APPLICATIONS

This application is a Divisional of U.S. patent application Ser. No. 16/062,060, filed on Jun. 13, 2018, which is a National Stage Application of PCT/EP2016/081564, filed on Dec. 16, 2016, which claims the benefit of U.S. Patent Application Ser. No. 62/268,292, filed on Dec. 16, 2015, and claims the benefit of U.S. Patent Application Ser. No. 62/343,473, filed on May 31, 2016, the disclosures of which are incorporated herein by reference in their entireties. To the extent appropriate, a claim of priority is made to each of the above disclosed applications.

FIELD OF THE INVENTION

The present invention relates to telecommunications distribution systems, e.g., optical fiber distribution systems, which may include a rack and elements which populate the rack, wherein such fiber optic elements can include fiber terminations, patching, fiber splitters, and fiber splices. More specifically, the present invention relates to a mounting system for fixedly stacking two or more such telecommunications distribution elements along a vertical column or stack.

BACKGROUND OF THE INVENTION

Optical fiber distribution systems may include fiber terminations and other equipment which is typically rack mounted. Various concerns exist for the optical fiber distribution systems, including density, ease of use and mounting, and cable management. There is a continuing need for improvements in the telecommunications distribution area, especially optical fiber distribution area.

SUMMARY OF THE INVENTION

One implementation of a system in accordance with the examples of the disclosure includes a building block element mountable to a rack or other structure. The element includes a chassis, and a movable tray. The tray is movably mounted to chassis with a slide mechanism that allows the tray to slide relative to the chassis, wherein the tray may house equipment for fiber terminations, patching, splitting, and splicing.

The elements can be stacked in a column with each tray slidable in a horizontal direction. In the case of a column of elements, a selected tray is pulled outward to access the desired tray.

In an example embodiment of a fiber optic distribution element, one side of each element can be for patch cables, and the opposite side can be for cable termination of an incoming cable, such as a distribution cable or a feeder cable. The elements can be configured as desired and form building blocks for an optical fiber distribution system (ODF). When the elements are mounted in a column in a rack, the cables can be placed in vertical cable guides to enter and exit the selected element. An example rack may be front accessible. However, the elements shown and described can be used in other racks, frames, cabinets or boxes including in arrangements where rear access is desirable or useful.

According to an aspect of the disclosure, the disclosure is directed to a mounting system for fixedly stacking two or more such telecommunications elements along a vertical column or stack, wherein the stacked elements can then be mounted on further fixtures such as racks, frames, cabinets or boxes.

According to another aspect, the present disclosure relates to a mounting system for locking two pieces of telecommunications equipment so as to prevent relative sliding between the two pieces of telecommunications equipment and relative separation between the two pieces of telecommunications equipment that is in a direction generally perpendicular to the direction of the relative sliding. The mounting system includes a first locking feature in the form of a stud defining a stem portion and a flange portion having a larger profile than the stem portion, a second locking feature in the form of a slot defining a receiver portion and a retention portion, wherein the receiver portion is sized to accommodate the flange portion of the stud and the retention portion is sized to accommodate the stem portion but not the flange portion of the stud, and a third locking feature configured to prevent relative sliding between the two pieces of telecommunications equipment once the stem portion of the stud has been slid through the retention portion of the slot and the flange portion is out of alignment with the receiver portion of the slot. According to one example embodiment, the third locking feature may be provided in the form of a removable, snap-fit structure. According to another example embodiment, the third locking feature may be provided in the form of a cantilever arm that is an integral part of the telecommunications equipment, the cantilever arm having a portion that abuts the stud for preventing sliding movement of the stud.

According to another aspect, the disclosure is directed to a telecommunications distribution element that includes a mounting system that allows the distribution element to be fixedly stacked along a vertical column or stack with another similarly configured element.

According to another aspect, the disclosure is directed to an optical fiber distribution element comprising a top surface, a bottom surface, an interior region defined between the top surface and the bottom surface, the interior region including fiber optic connection locations, a first locking feature in the form of a stud extending from the top surface, the stud defining a stem portion and a flange portion having a larger profile than the stem portion, and a second locking feature in the form of a slot at the bottom surface, the slot defining a receiver portion and a retention portion, wherein the receiver portion is sized to accommodate the flange portion of the stud and the retention portion is sized to accommodate the stem portion but not the flange portion of the stud.

According to another aspect of the disclosure, the disclosure is directed to a method of stacking two or more distribution elements along a vertical column.

According to another aspect, the disclosure is directed to a method of locking two pieces of telecommunications equipment so as to prevent relative sliding between the two pieces of telecommunications equipment and relative separation between the two pieces of telecommunications equipment that is in a direction generally perpendicular to the direction of the relative sliding. The method includes aligning a flange portion of a stud of a first piece of telecommunications equipment with a receiver portion of a slot of a second piece of telecommunications equipment, passing the flange portion of the stud through the receiver portion of the slot, sliding a stem portion of the stud through a retention portion of the slot to bring the flange portion out of alignment with the receiver portion of the slot, and providing a lock that prevents relative sliding between the first and second pieces of telecommunications equipment so as to prevent sliding of the stem portion of the stud through the retention portion of the slot.

According to another aspect, the disclosure is directed to a mounting mechanism for mounting a telecommunications chassis to a telecommunications fixture, the mounting mechanism comprising a mounting bracket defining a rear portion configured for mounting to the telecommunications fixture and a front portion configured to slidably receive the telecommunications chassis, the front portion including a latch opening; a locking spring configured to be mounted to the telecommunications chassis, the locking spring defining a portion configured to flex laterally to snap in to the latch opening; a release handle configured to be slidably mounted to the telecommunications chassis, the release handle defining a deflection tab for moving the locking spring out of the latch opening of the mounting bracket when the release handle is slid along a rearward to forward direction with respect to the telecommunications chassis; a cover configured to be mounted to the telecommunications chassis, the cover defining a deflection ramp configured to interact with the deflection tab of the release handle for moving the deflection tab laterally to contact the locking spring when the release handle is slid with respect to the telecommunications chassis; and an anti-theft structure configured to be provided on the telecommunications chassis after slidable mounting of the mounting mechanism on the telecommunications chassis, wherein the anti-theft structure is configured to limit sliding of the release handle along the rearward to forward direction.

According to another aspect, the disclosure is directed to a method of limiting removal of a telecommunications chassis from a telecommunications fixture after the telecommunications chassis has been mounted to the telecommunications fixture via a mounting mechanism that comprises a mounting bracket defining a rear portion configured for mounting to the telecommunications fixture and a front portion configured to slidably receive the telecommunications chassis, the front portion including a latch opening, a locking spring configured to be mounted to the telecommunications chassis, the locking spring defining a portion configured to flex laterally to snap in to the latch opening, a release handle configured to be slidably mounted to the telecommunications chassis, the release handle defining a deflection tab for moving the locking spring out of the latch opening of the mounting bracket when the release handle is slid along a rearward to forward direction with respect to the telecommunications chassis, and a cover configured to be mounted to the telecommunications chassis, the cover defining a deflection ramp configured to interact with the deflection tab of the release handle for moving the deflection tab laterally to contact the locking spring when the release handle is slid with respect to the telecommunications chassis, the method comprising providing an anti-theft structure on the telecommunications chassis that is configured to prevent sliding of the release handle along the rearward to forward direction.

According to another aspect, the disclosure is directed to an optical fiber distribution element comprising a chassis defining an interior; a movable tray slidably movable from within the chassis to a position at least partially outside the chassis; a slide mechanism which connects the movable tray to the chassis; wherein the slide mechanism includes a radius limiter which moves with synchronized movement relative to the chassis and the tray during slidable movement of the tray; wherein each tray includes at least one hingedly mounted frame member which hinges about an axis perpendicular to the direction of movement of the movable tray; wherein each frame member defines an array of adapters defining a line which is generally parallel to the direction of travel of the movable tray; wherein a cable entering and exiting the movable tray follows an S-shaped pathway; and a latch for latching the movable tray to the chassis in a closed position.

According to another aspect, the disclosure is directed to an optical fiber distribution element comprising a chassis defining an interior; a movable tray slidably movable from within the chassis to a position at least partially outside the chassis; a slide mechanism which connects the movable tray to the chassis; wherein the slide mechanism includes a radius limiter which moves with synchronized movement relative to the chassis and the tray during slidable movement of the tray; wherein each tray includes at least one hingedly mounted frame member which hinges about an axis perpendicular to the direction of movement of the movable tray; wherein each frame member defines an array of adapters defining a line which is generally parallel to the direction of travel of the movable tray; wherein a cable entering and exiting the movable tray follows an S-shaped pathway; and a fixed cable manager mounted to the chassis configured to guide cables to and from other optical fiber distribution elements with bend-radius protection.

According to yet another aspect, the disclosure is directed to an optical fiber distribution element comprising a chassis defining an interior; a movable tray slidably movable from within the chassis to a position at least partially outside the chassis; a slide mechanism which connects the movable tray to the chassis; wherein the slide mechanism includes a radius limiter which moves with synchronized movement relative to the chassis and the tray during slidable movement of the tray; wherein each tray includes at least one hingedly mounted frame member which hinges about an axis perpendicular to the direction of movement of the movable tray; wherein each frame member defines an array of adapters defining a line which is generally parallel to the direction of travel of the movable tray; wherein a cable entering and exiting the movable tray follows an S-shaped pathway; and a fiber optic splitter mounted to an exterior of the chassis, wherein the inputs and/or the outputs of the fiber optic splitter are generally aligned with an entrance of the radius limiter.

According to yet another aspect, the disclosure is directed to a hinge structure for pivotally mounting a first telecommunications element to a second telecommunications element, the hinge structure comprising a hinge pin provided on the first element, a hinge pin receiver provided on the second element, wherein the hinge pin defines a notch separating the pin into two pin halves, wherein the hinge pin receiver defines two sets of opposing surfaces, the two sets separated by a divider, the divider configured to be accommodated by the notch when the hinge pin is inserted into the hinge pin receiver, wherein each opposing surface set defines a slot for receiving each pin half.

According to another aspect, the disclosure is directed to an optical fiber distribution element comprising a chassis defining an interior, a movable tray portion slidably movable from within the chassis to a position at least partially outside the chassis, a slide mechanism which connects the movable tray portion to the chassis, the slide mechanism including a radius limiter portion which moves with synchronized movement relative to the chassis and the tray portion during slidable movement of the tray portion, wherein a cable entering and/or exiting the movable tray portion follows an S-shaped pathway. A pivotable snap-fit cover provided on the tray portion is movable between an open position and a closed position for closing at least a portion of the S-shaped pathway to retain the cable therein. The element further comprises a mechanism for preventing slidable closure of the tray portion with respect to the chassis when the pivotable snap-fit cover is in the open position, wherein the mechanism is configured to allow slidable closure of the tray portion with respect to the chassis via abutment of the cover with the radius limiter portion to disengage the radius limiter portion from the tray portion to allow movement of the tray portion with respect to the chassis.

BRIEF DESCRIPTION OF THE FIGURES

FIGS. 62-63 illustrate the steps for stacking two telecommunications distribution elements in a vertical stack or column using another embodiment of a mounting system according to the present disclosure;

FIGS. 68-79 illustrate various embodiments of hingedly-mountable frame members that may be used within the trays of the element of FIGS. 62-67;

DETAILED DESCRIPTION

Figure 1:
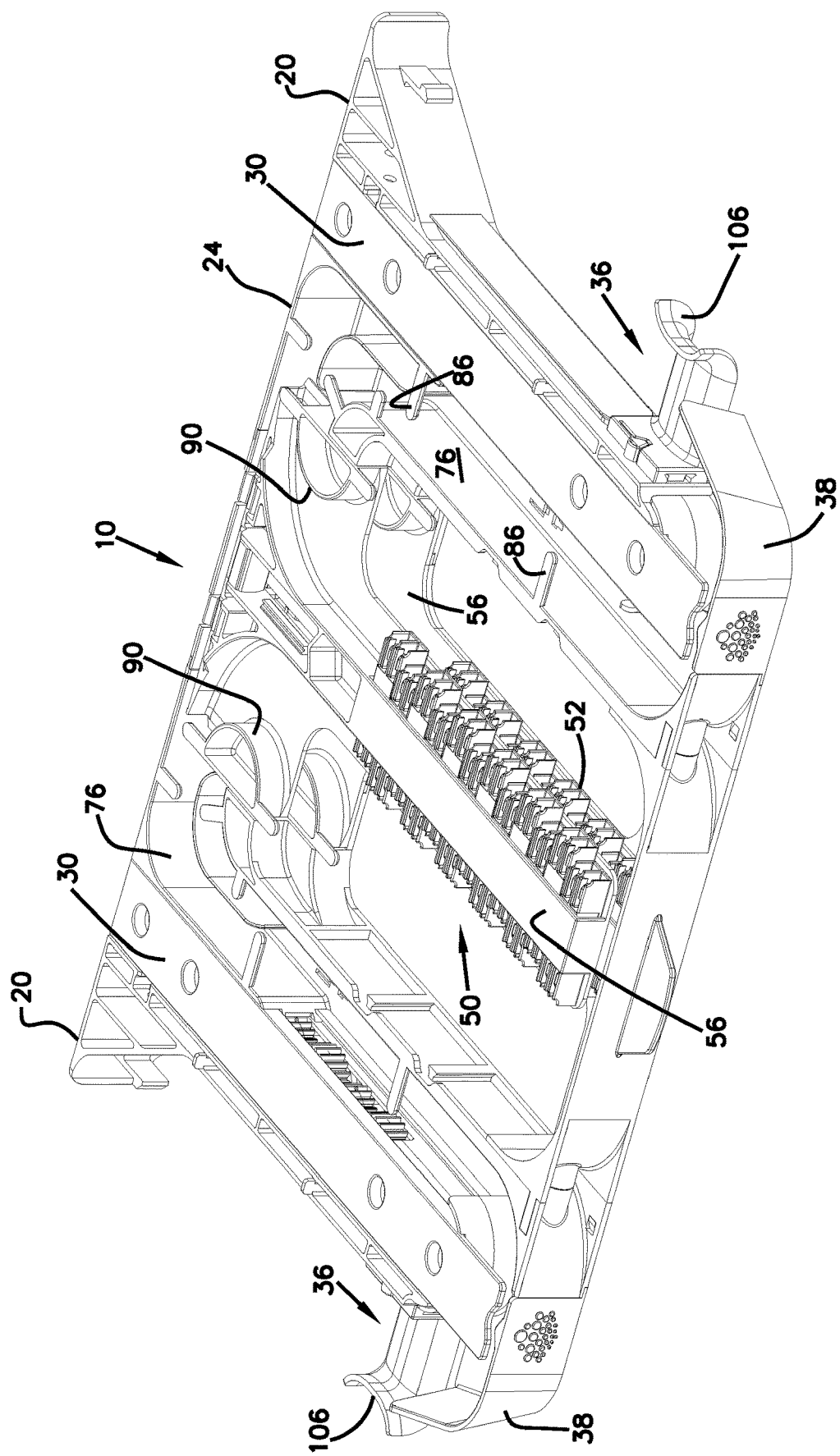
FIG. 1 is an embodiment of an optical fiber distribution element in accordance with the present disclosure.
Figure 2:
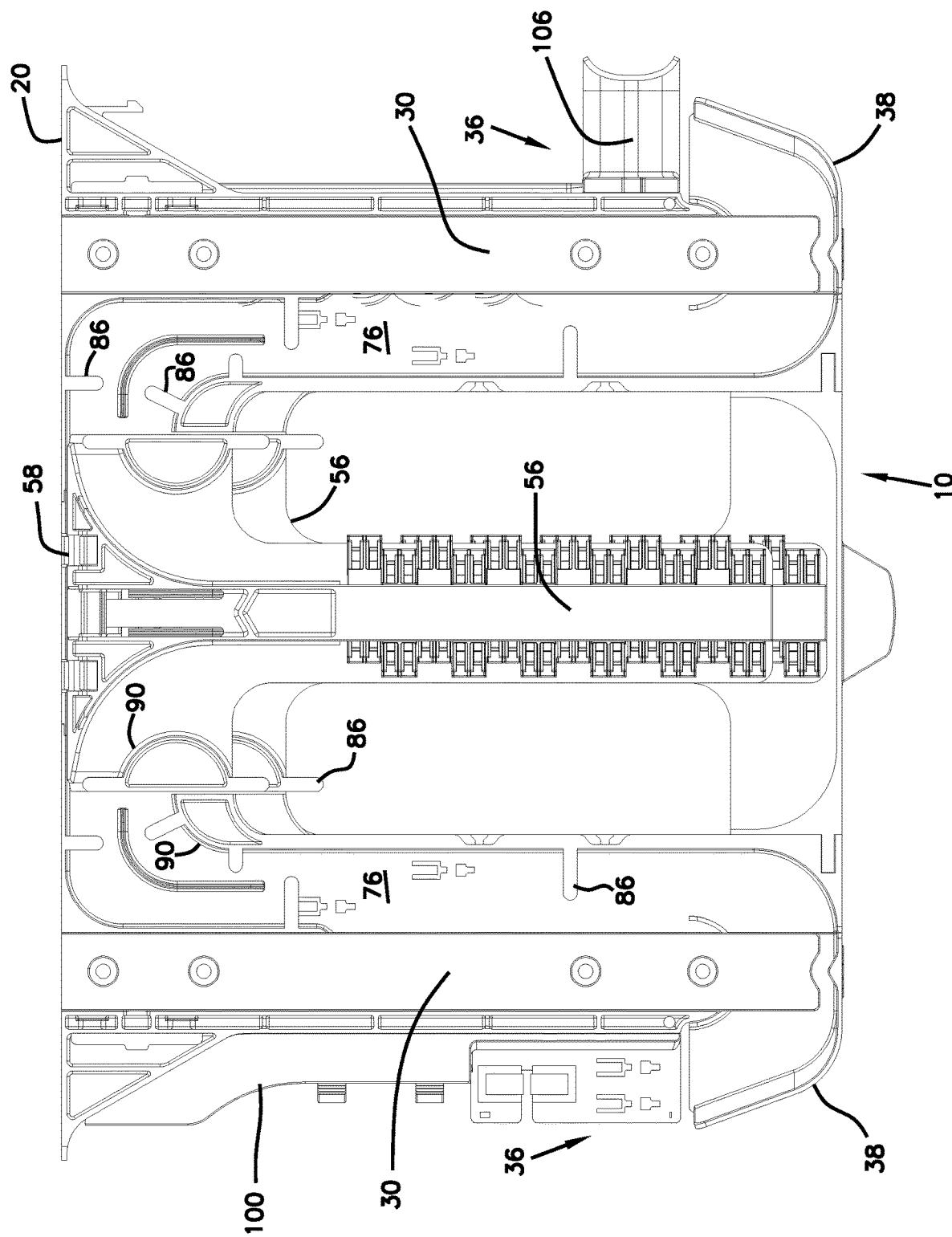
FIG. 2 is a top view of the element of FIG. 1.
Figure 3:
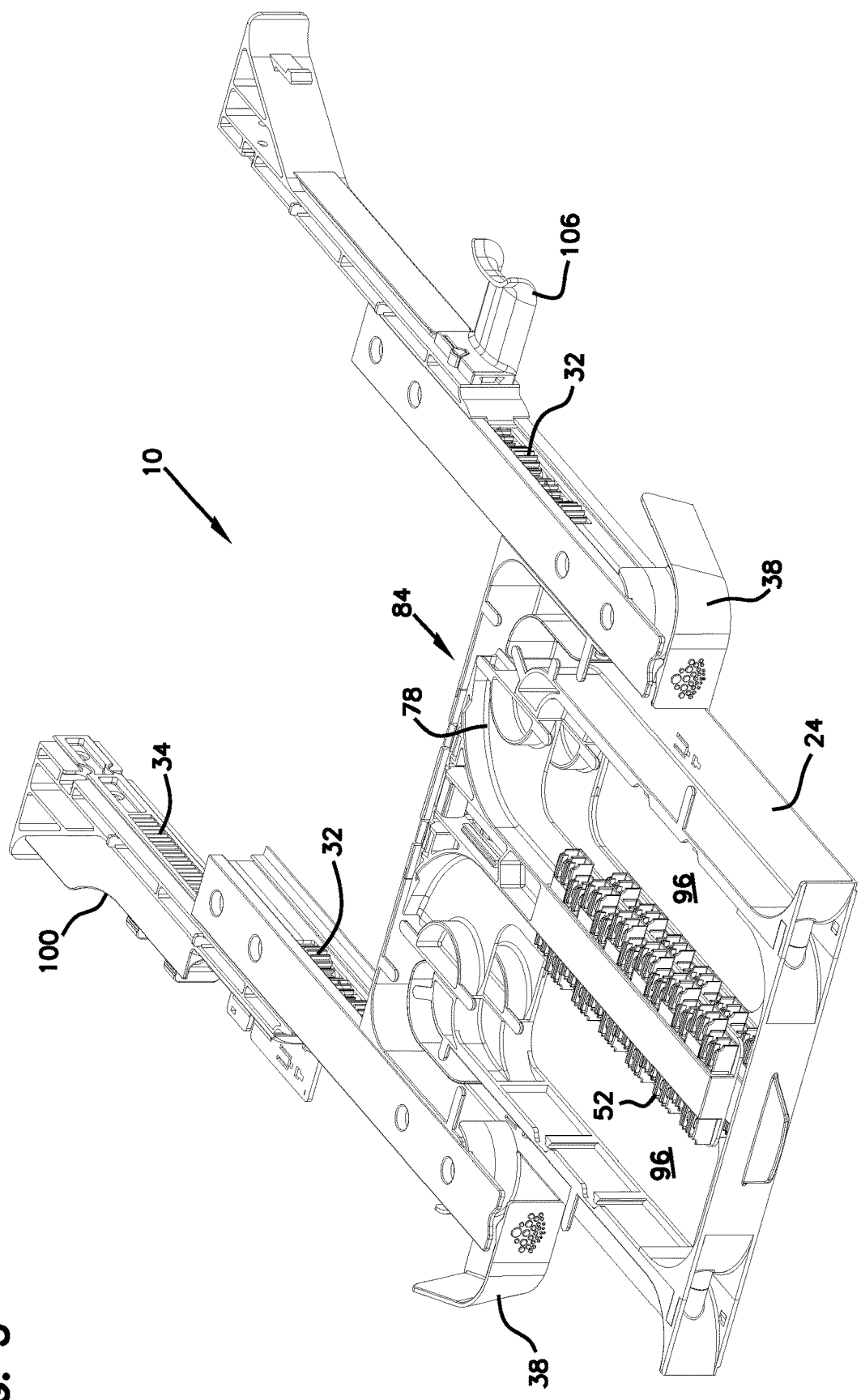
FIG. 3 is a perspective view of the element of FIG. 1 showing a tray pulled forward from the chassis.
Figure 4:
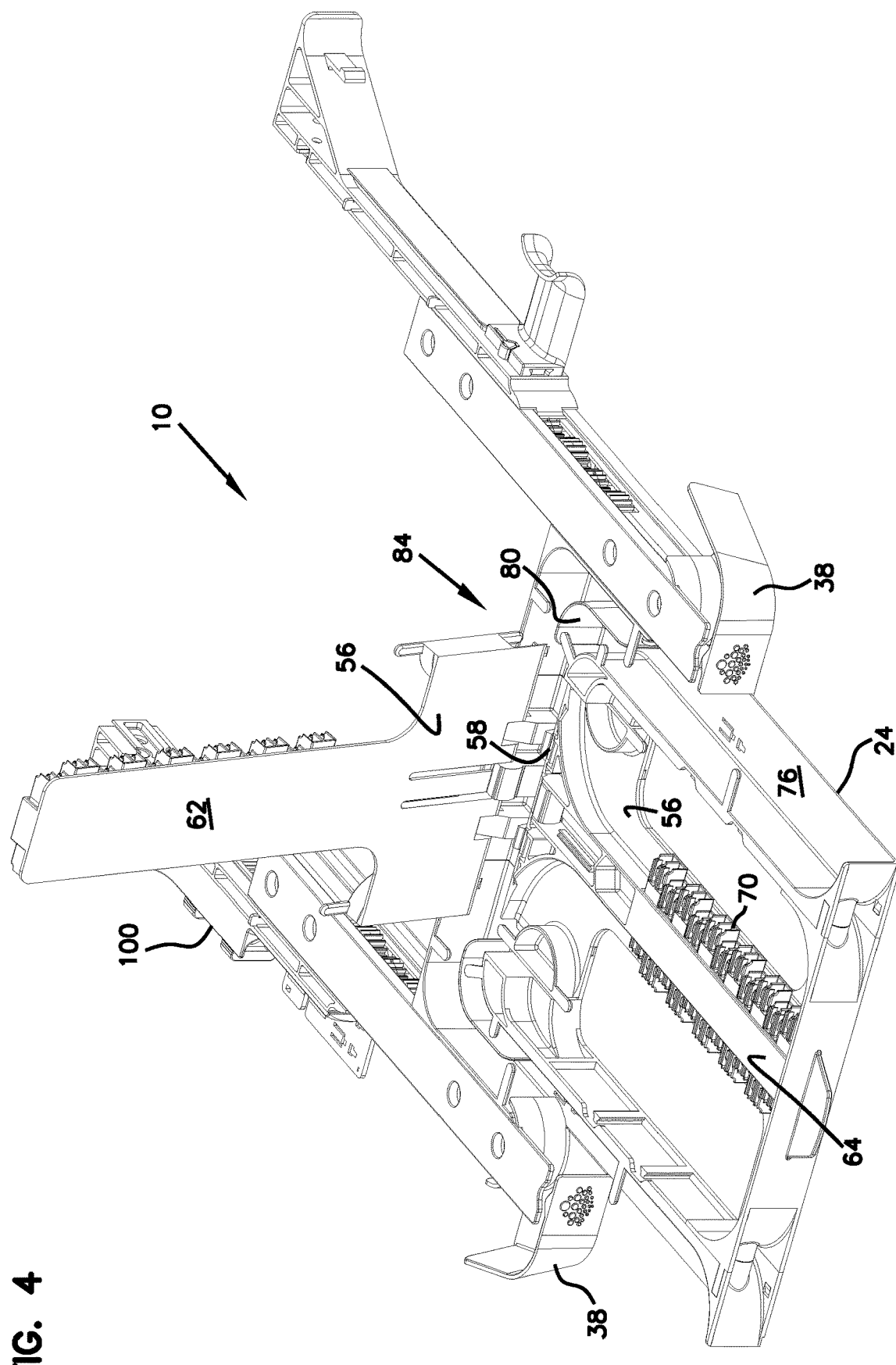
FIG. 4 shows one of the tray frame members pivoted upwardly from the tray.
Figure 5:
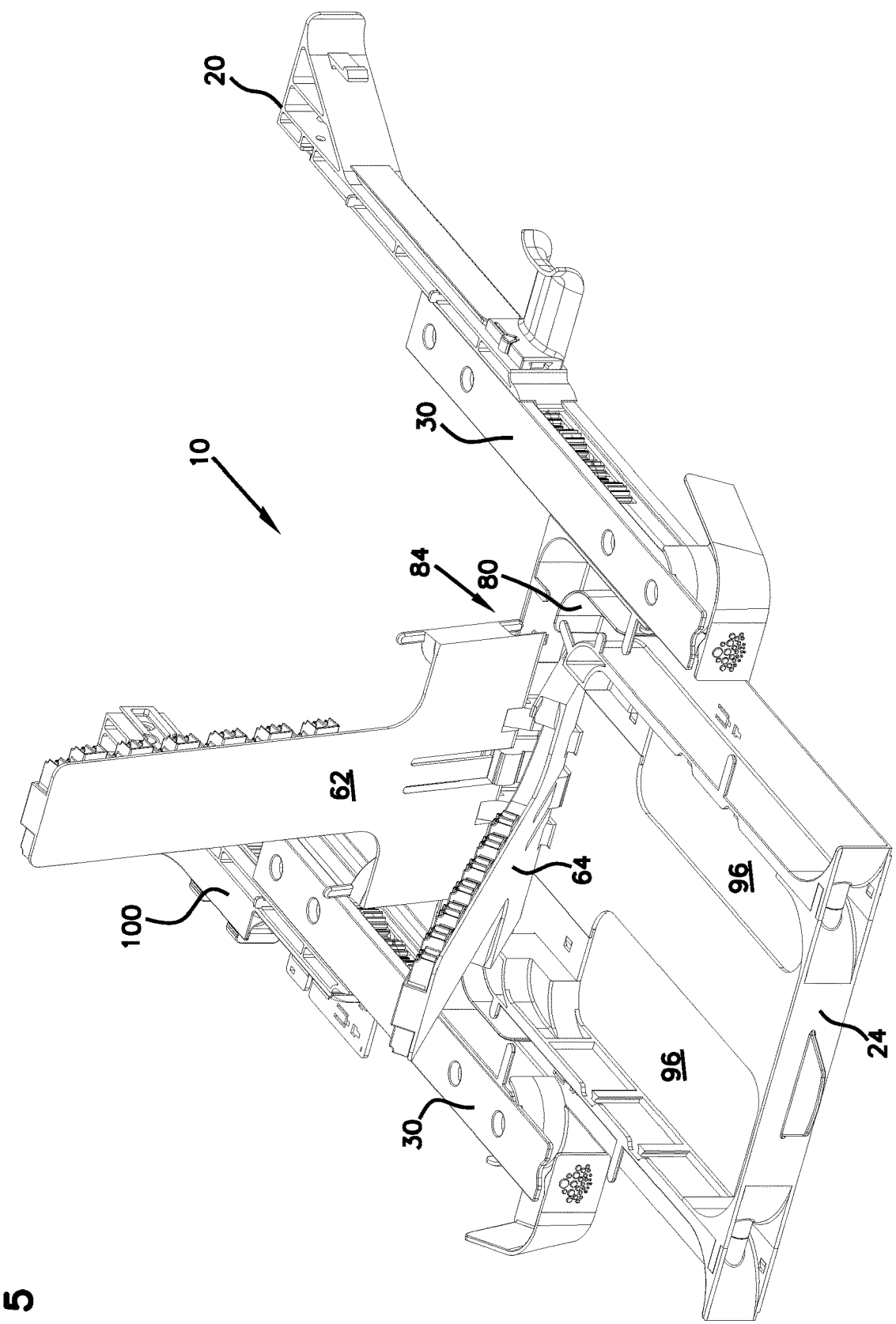
FIG. 5 shows a second frame member pivoted upwardly relative to the tray.
Figure 6:
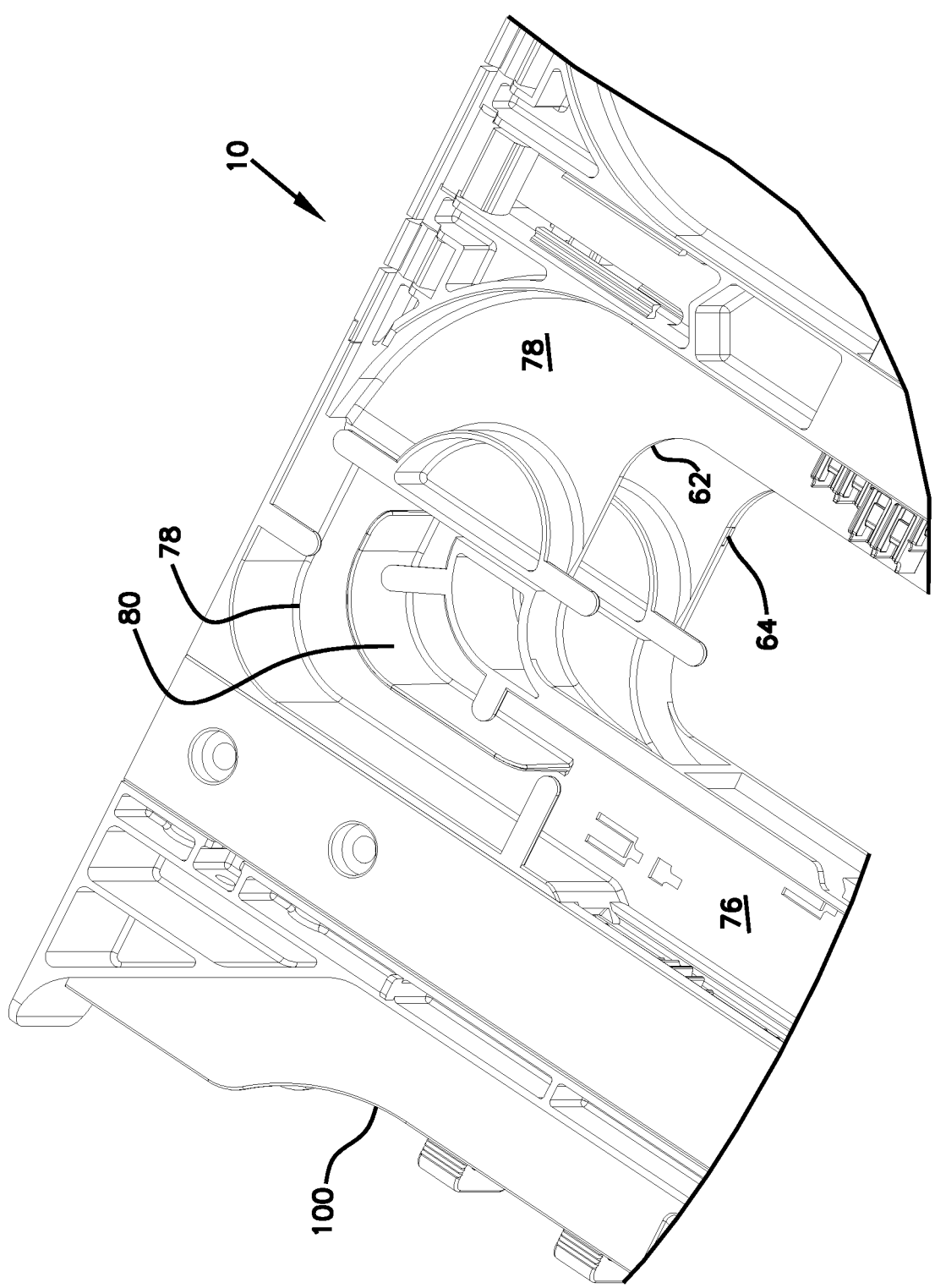
FIG. 6 shows a portion of a cable management area of the element of FIG. 1.
Figure 7:
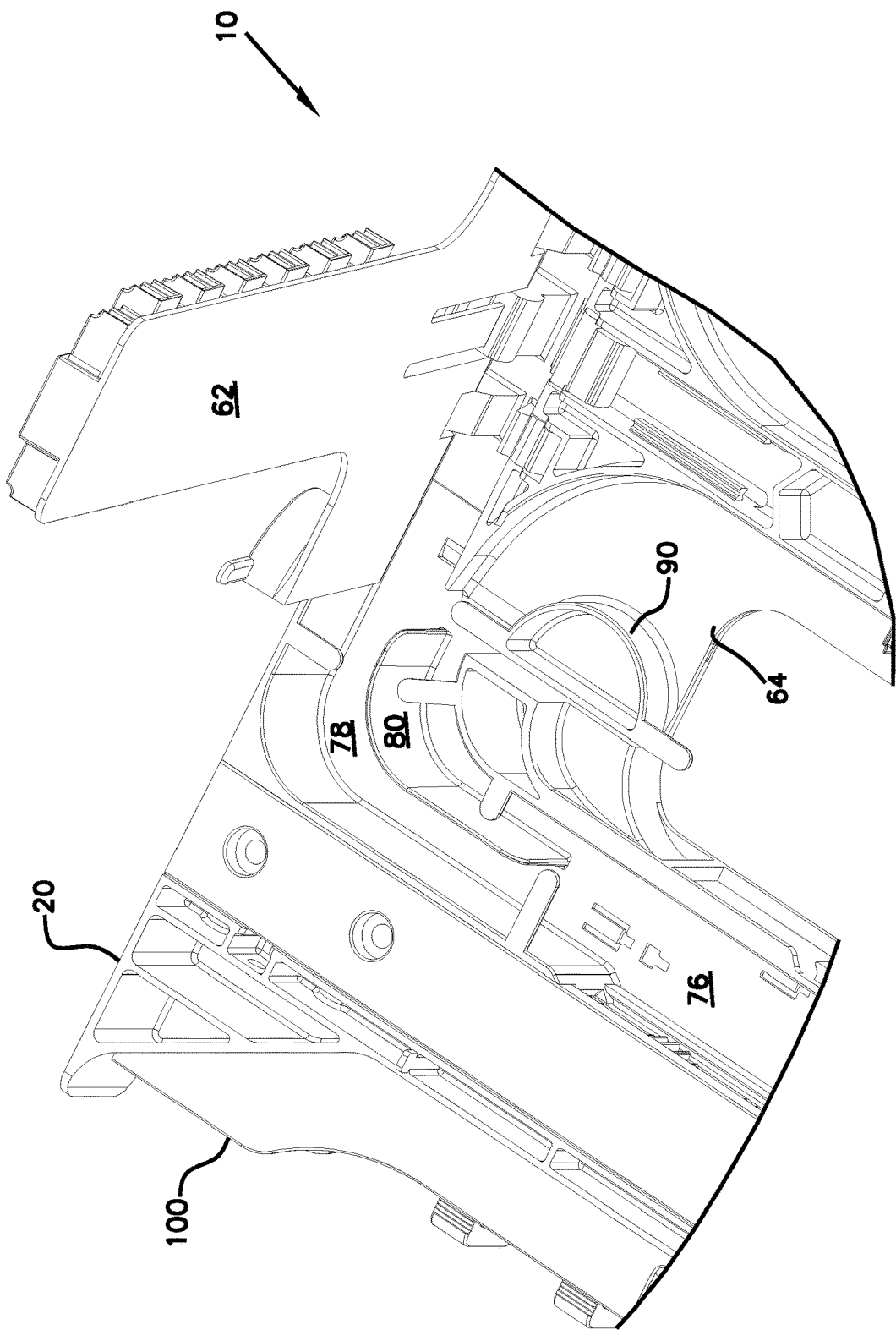
FIG. 7 shows a similar view to FIG. 6, with one of the frame members pivoted upwardly.
Figure 8:
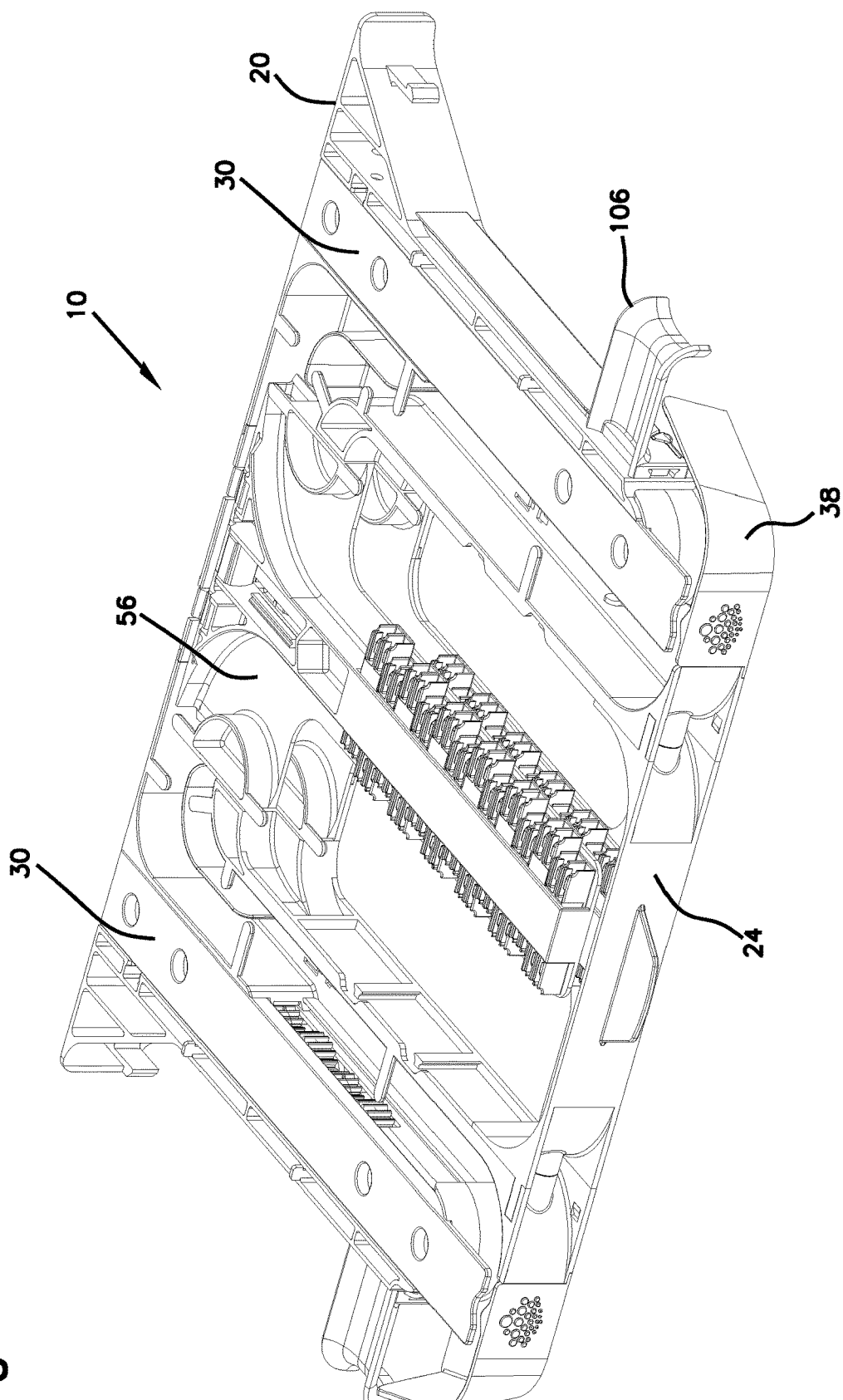
FIG. 8 shows an alternative embodiment of an element with different cable management at the entry points.
Figure 9:
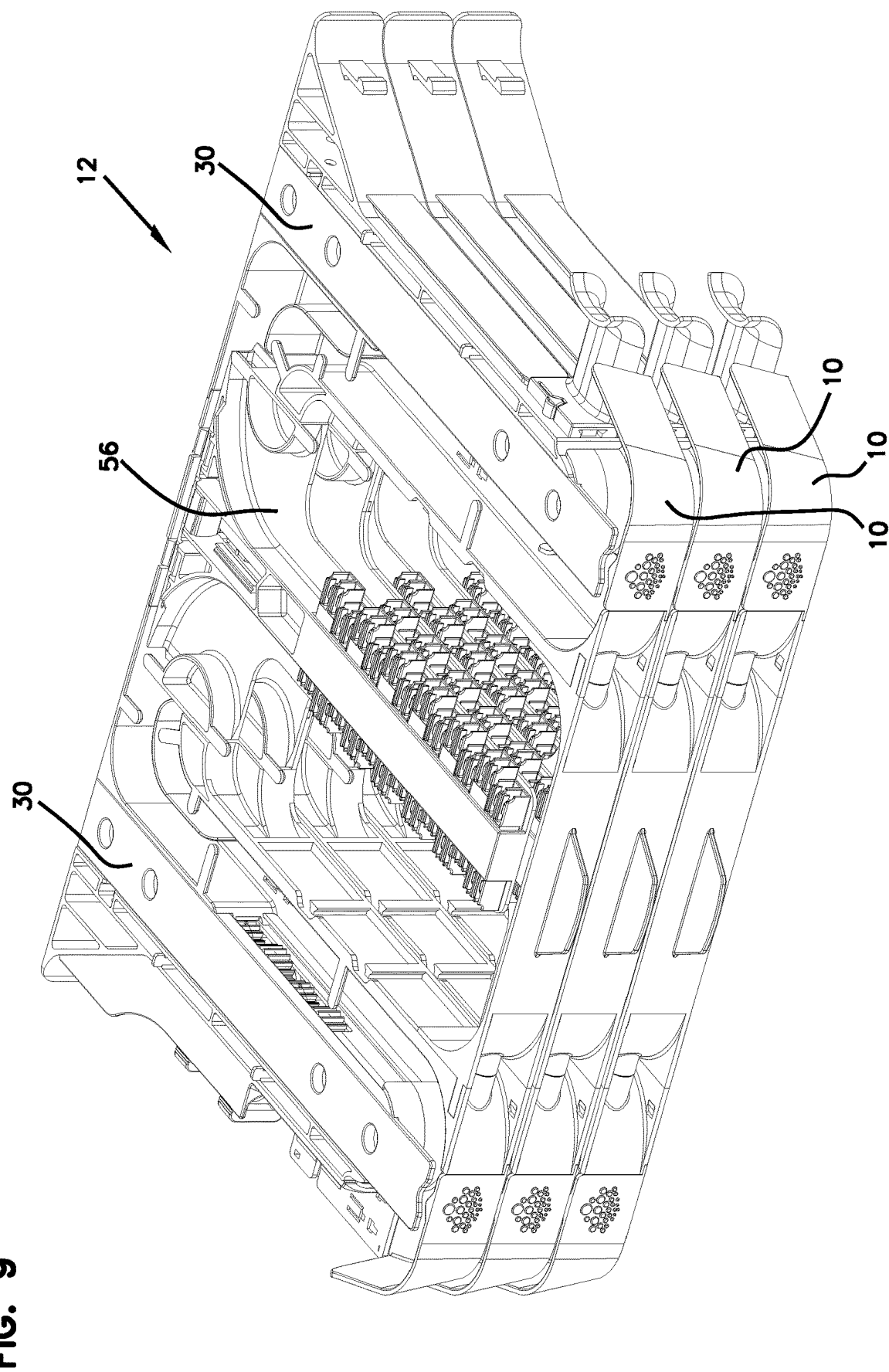
FIG. 9 shows three of the elements of FIG. 8 mounted in a block formation, with cable radius limiters at the entry point mounted in an alternative position.
Figure 10:
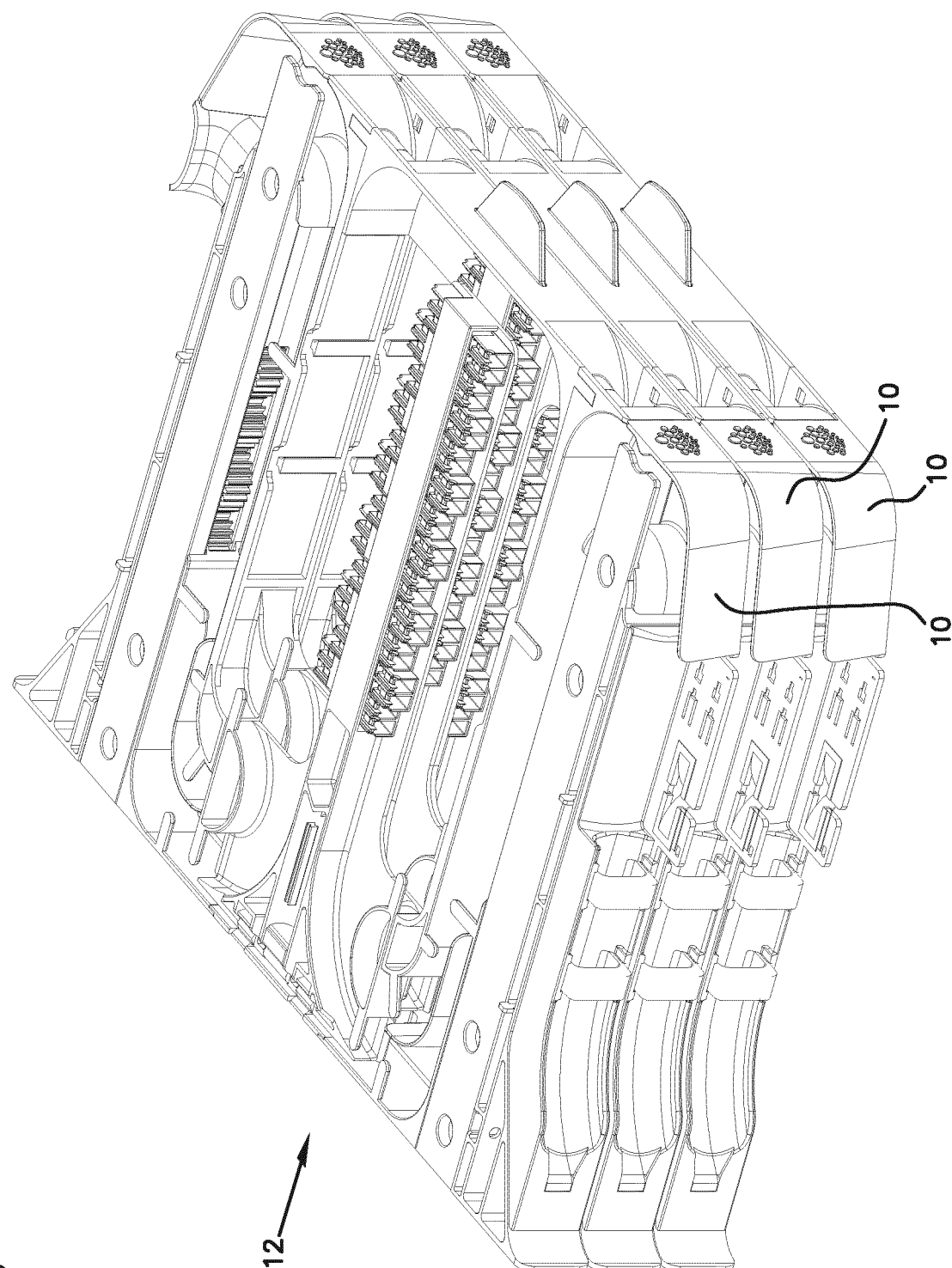
FIG. 10 is a perspective view of the block of FIG. 9.
Figure 11:
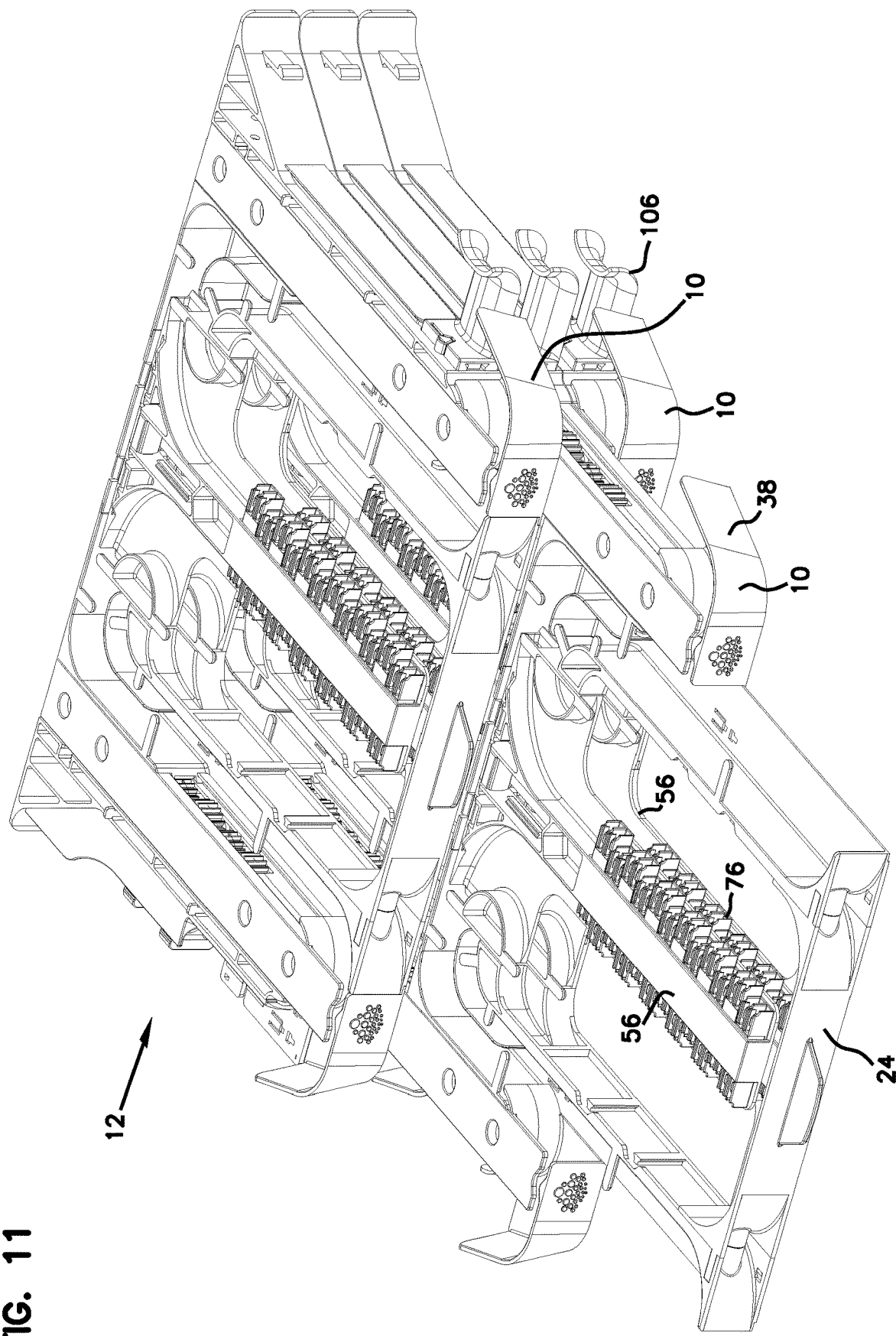
FIG. 11 is a view of the block of FIG. 9, with the tray of the middle element pulled forward for access to the fiber terminations.
Figure 12:
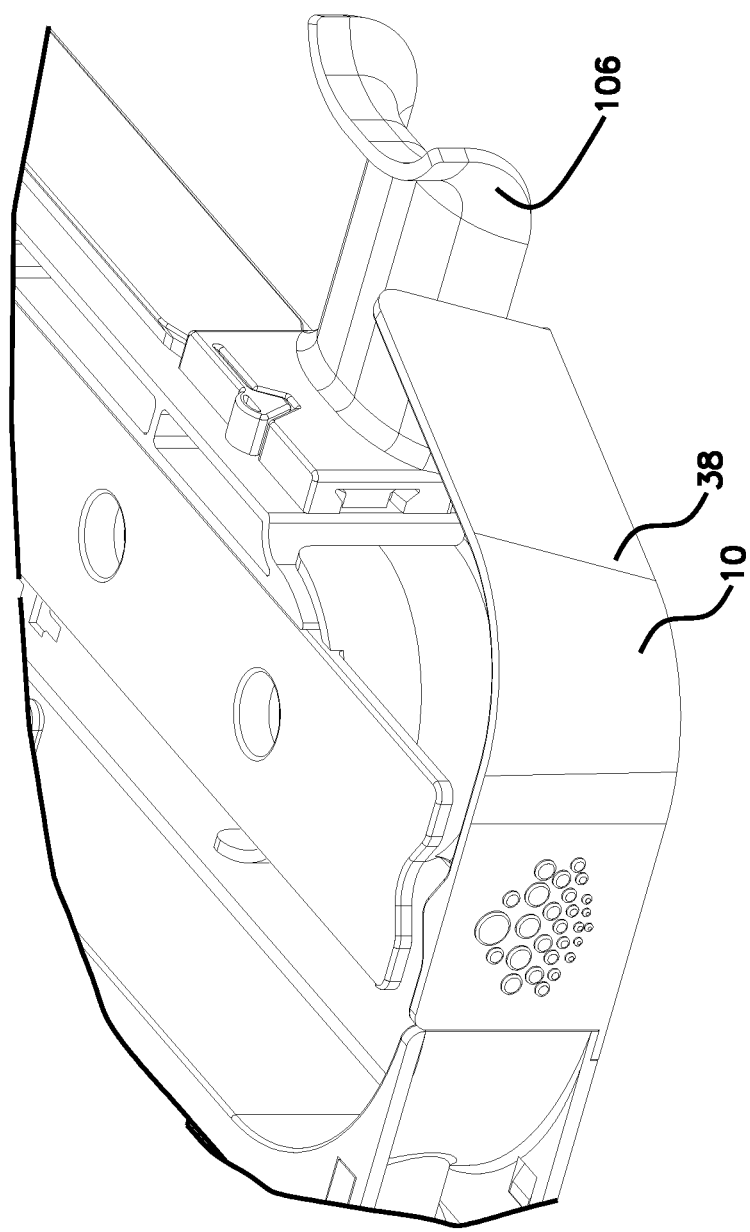
FIG. 12 shows an enlarged portion of an entry point for one of the elements with a cable radius limiter in a first position.
Figure 13:
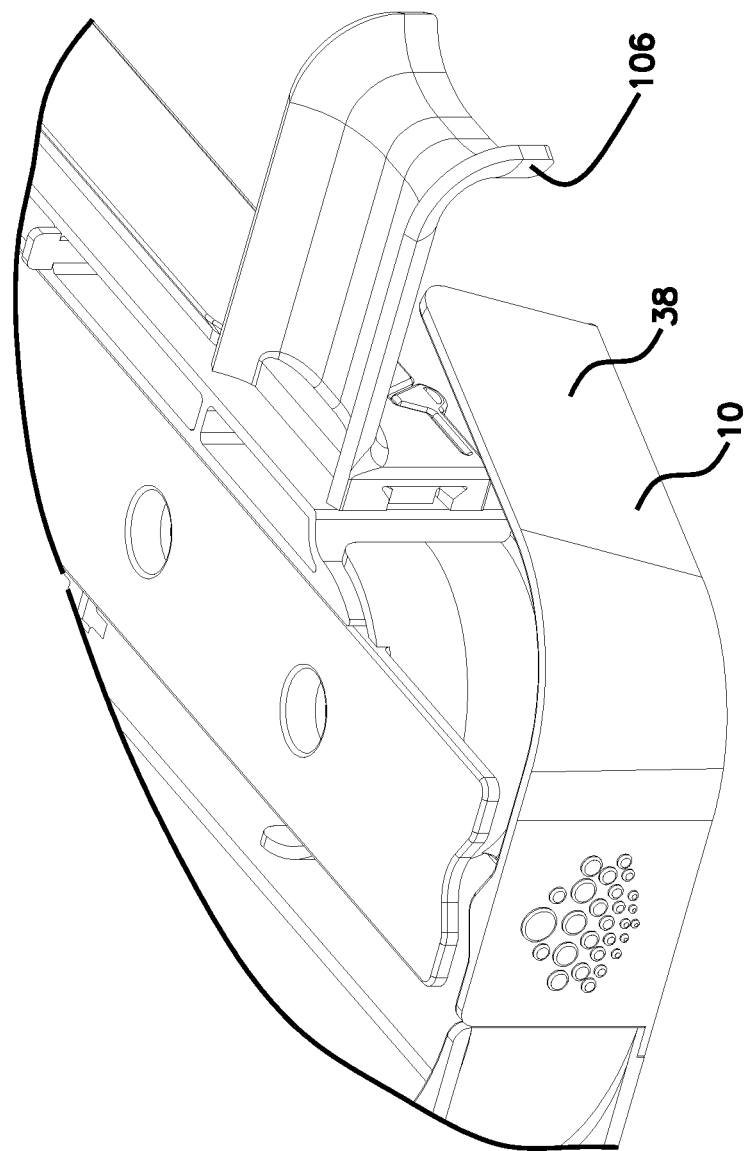
FIG. 13 shows a similar view as in FIG. 12, with the cable radius limiter positioned in an alternate position.
Figure 14:
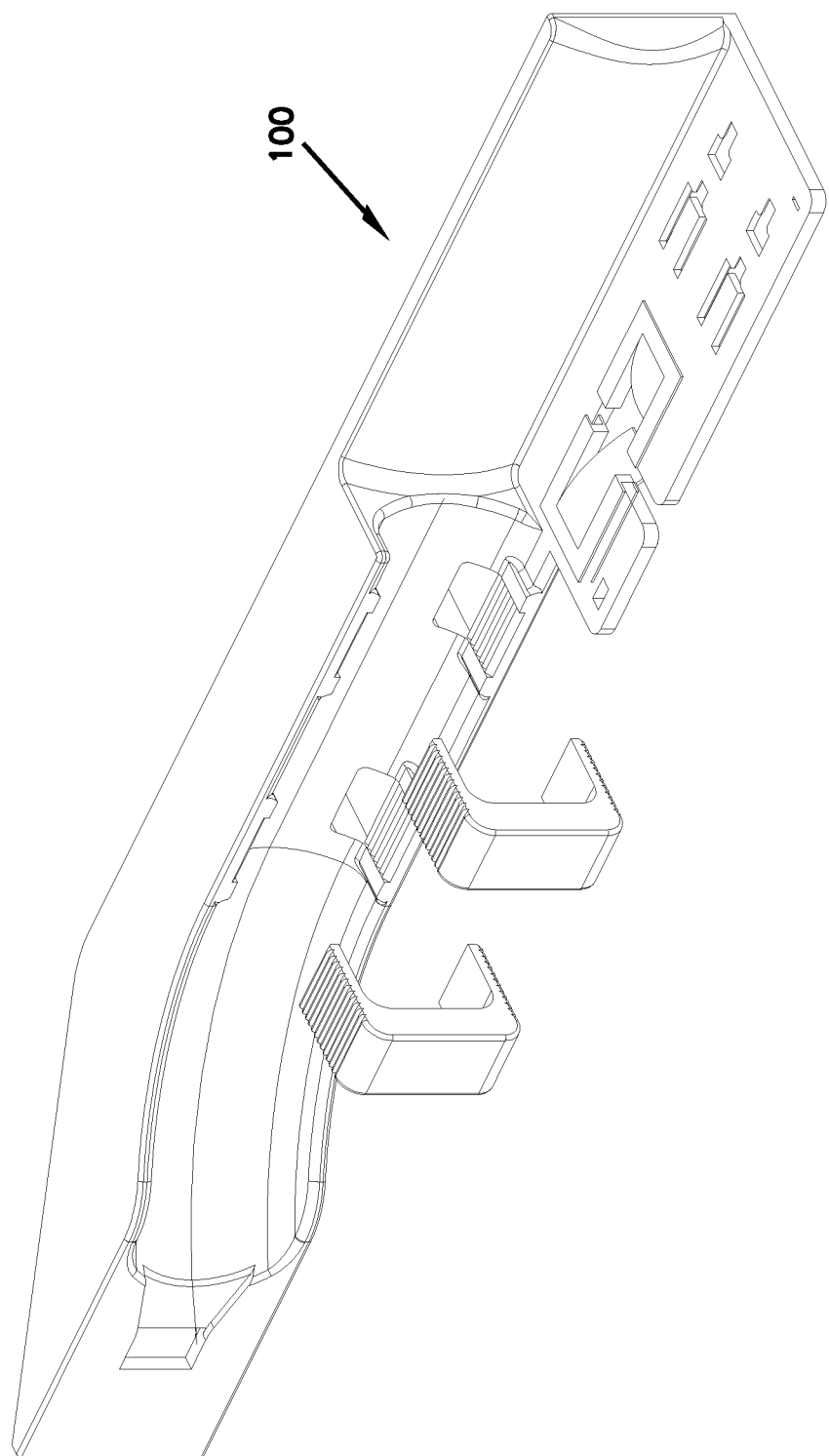
FIG. 14 shows an exploded view of a cable mount.
Figure 15:
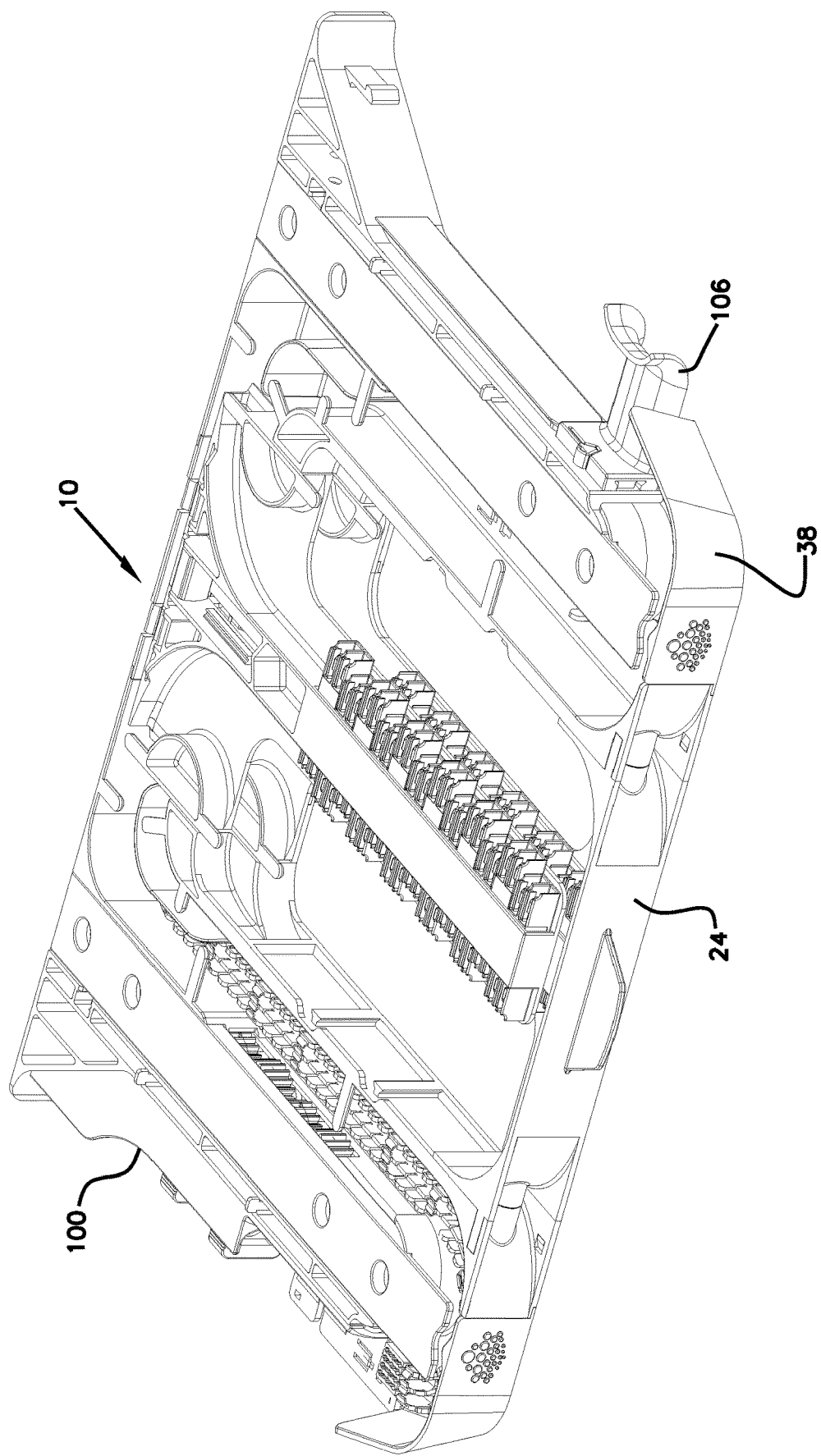
FIG. 15 shows an element with a cable mount on one side, and a cable radius limiter on an opposite side.

Referring now to FIGS. 1-16, various embodiments of an optical fiber distribution element 10, or element 10, are shown. The elements 10 can be individually mounted as desired to telecommunications equipment including racks, frames, or cabinets. The elements 10 can be mounted in groups or blocks 12 which forms a stacked arrangement. In one embodiment, a vertical stack of elements 10 populates an optical fiber distribution rack.

Each element 10 holds fiber terminations, or other fiber components including fiber splitters and/or fiber splices. In the case of fiber terminations, incoming cables are connected to outgoing cables through connectorized cable ends which are connected by adapters, as will be described below.

Each element includes a chassis 20 and a movable tray 24. Tray 24 is movable with a slide mechanism 30 including one or more gears 32 and a set of two toothed racks or linear members 34.

Slide mechanism 30 provides for synchronized movement for managing the cables extending to and from tray 24. Entry points 36 on either side of chassis 20 allow for fixation of the input and output cables associated with each element 10. The radius limiters 38 associated with each slide mechanism 30 move in synchronized movement relative to chassis 20 and tray 24 to maintain fiber slack, without causing fibers to be bent, pinched, or pulled.

Each tray 24 includes mounting structure 50 defining one or more of fiber terminations, fiber splitters, fiber splices, or other fiber components. As shown, mounting structure 50 holds adapters 52 which allow for interconnection of two connectorized ends of cables. Each tray 24 includes one or more frame members 56. In the example shown, two frame members 56 are provided. As illustrated, each frame member 56 is T-shaped. Also, each tray 24 includes two frame members 56 which are hingedly mounted at hinges 58. A top frame member 62 is positioned above a bottom frame member 64. The mounting structure 50 associated with each frame member 62, 64 includes one or more integrally formed adapter blocks 70. Adapter blocks 70 include a plurality of adapter ports for interconnecting to fiber optic connectors. A pathway 76 defines a generally S-shape from radius limiters 38 to adapter blocks 70. As shown, pathway 76 includes an upper level 78 and a lower level 80 in the interior. A portion 84 of pathway 76 is positioned adjacent to hinges 58 to avoid potentially damaging cable pull during pivoting movement of frame members 56. Flanges 86 and radius limiters 90 help maintain cables in pathways 76.

Tray 24 includes openings 96 to allow for technician access to the cable terminations at adapter blocks 70. In addition, the T-shapes of frame members 56 further facilitate technician access to the connectors.

Cables extending to and from element 10 can be affixed with a cable mount 100 as desired. Additional protection of the fiber breakouts can be handled with cable wraps 102. Radius limiters 106 can be additionally used to support and protect the cables.

Figure 16:
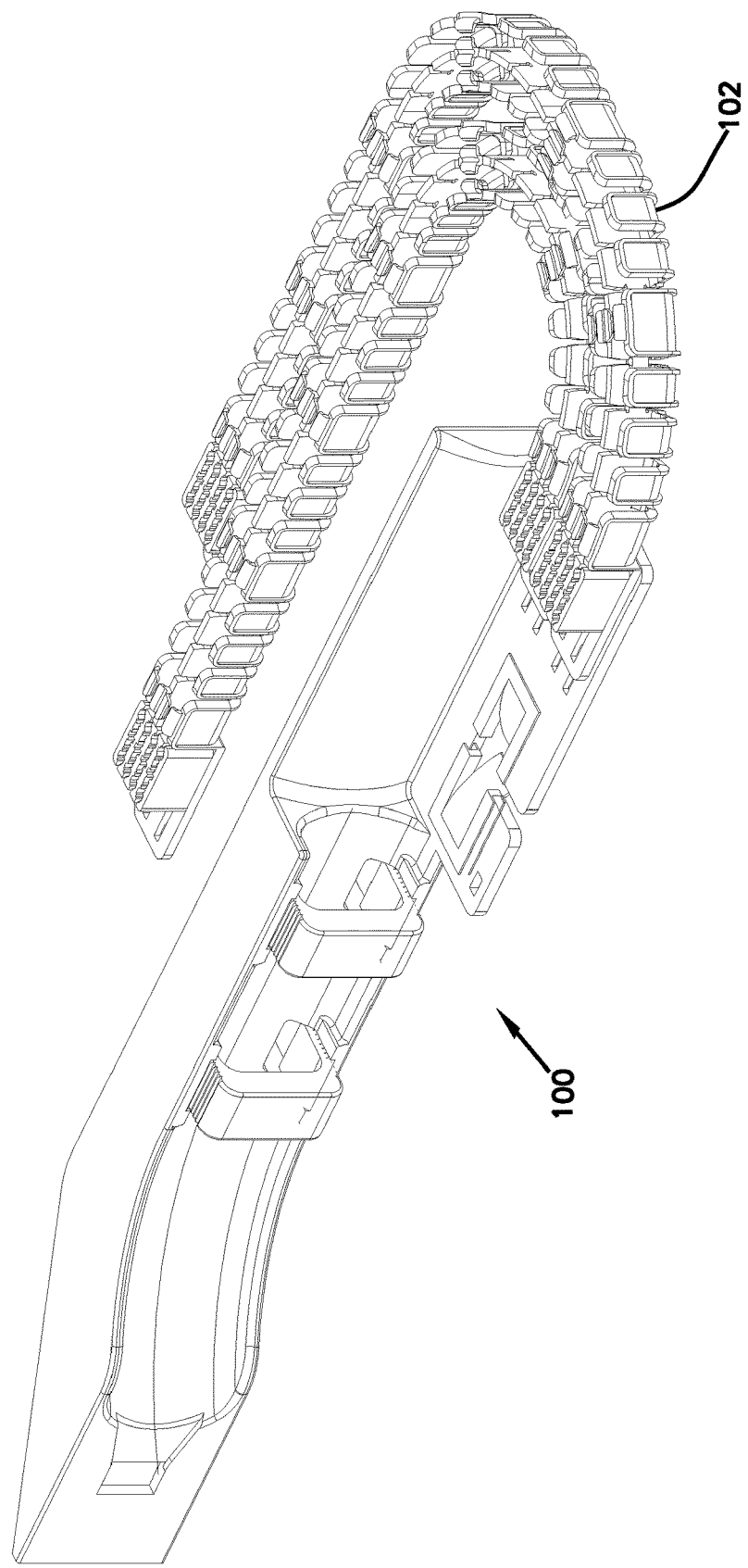
FIG. 16 shows an alternative cable mount.
Figure 17:
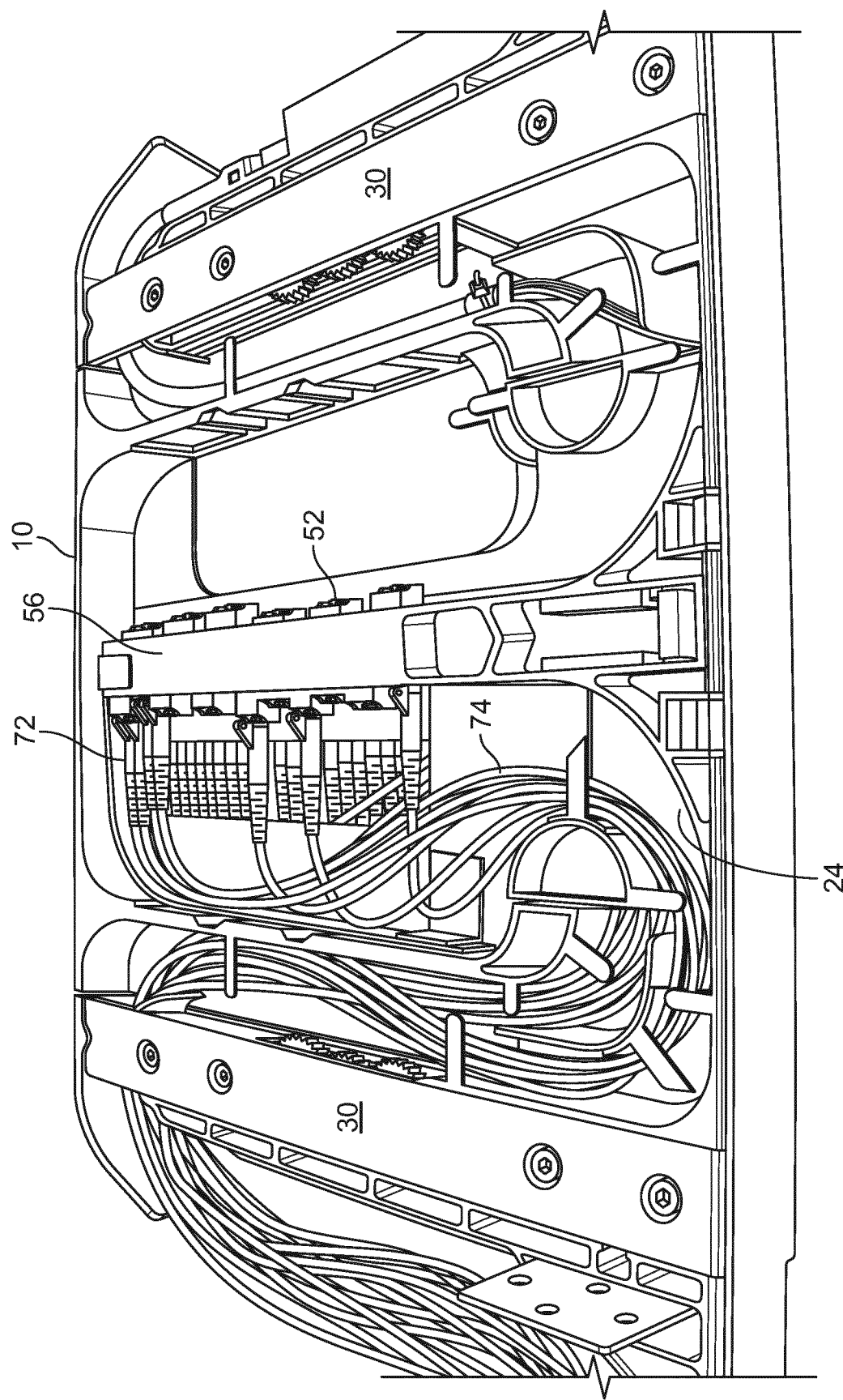
FIGS. 17-29 show various views of the elements shown in FIGS. 1-16 including additional details and cable routings shown for illustration purposes.
Figure 18:
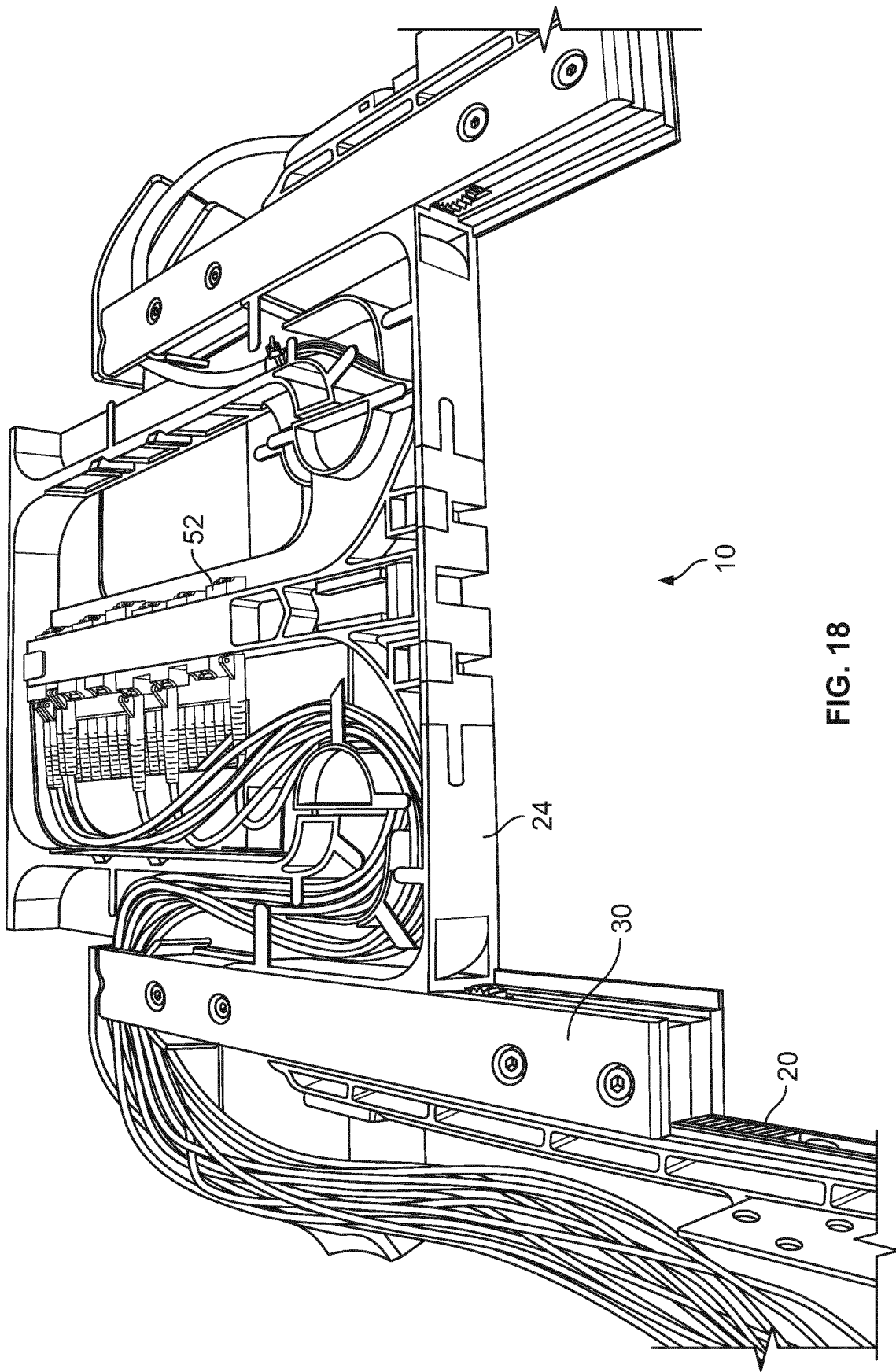
Figure 19:
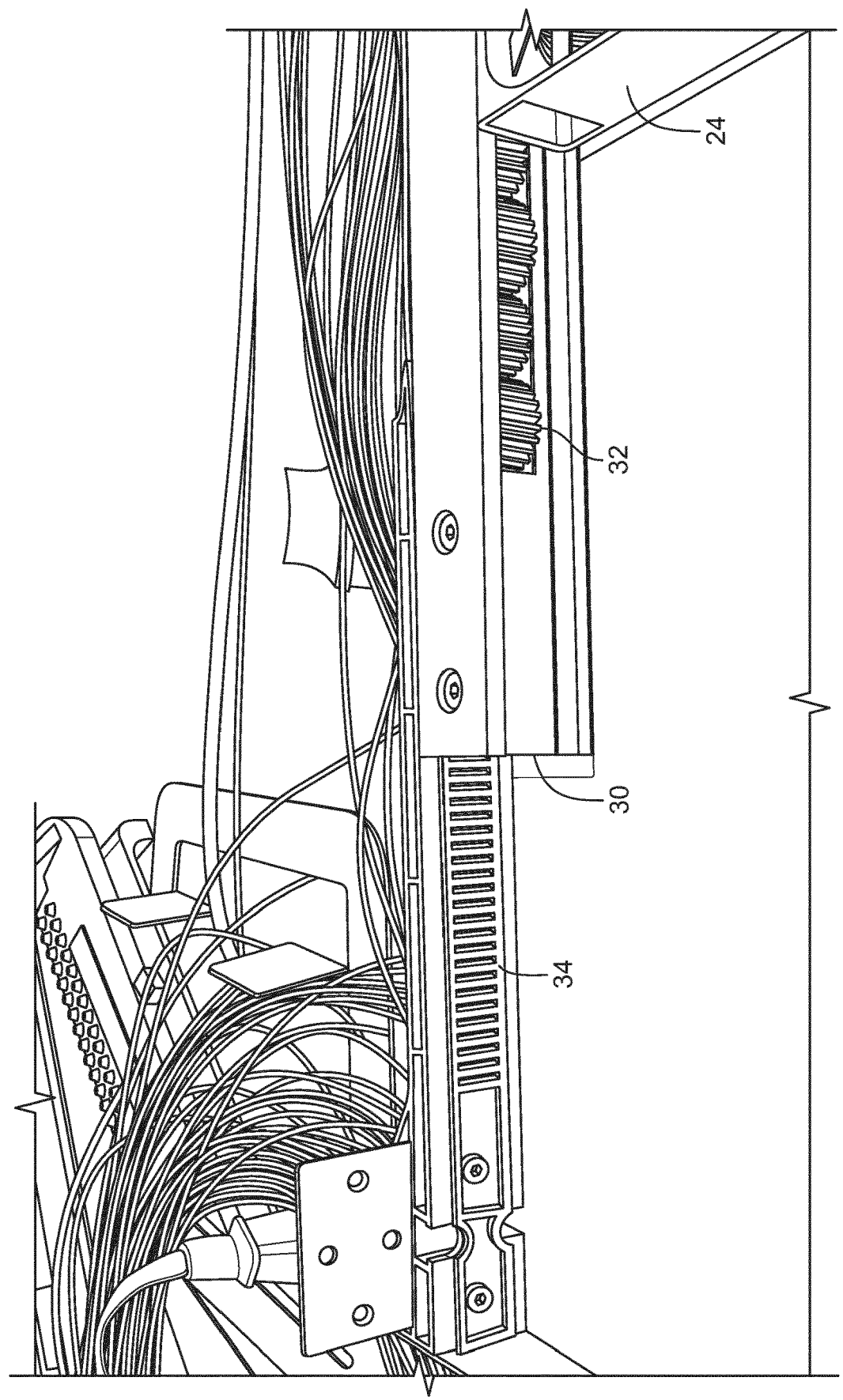
Figure 20:
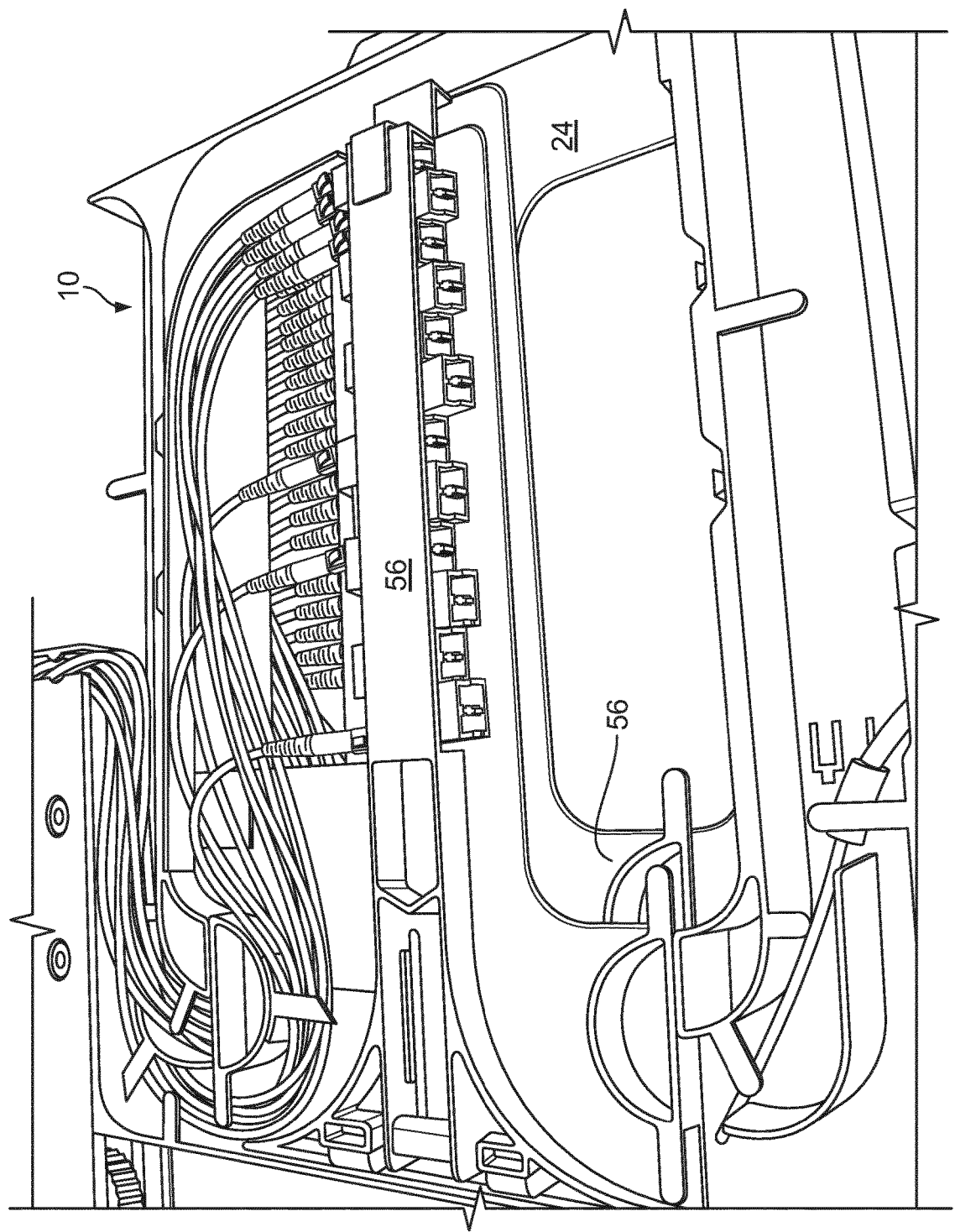
Figure 21:
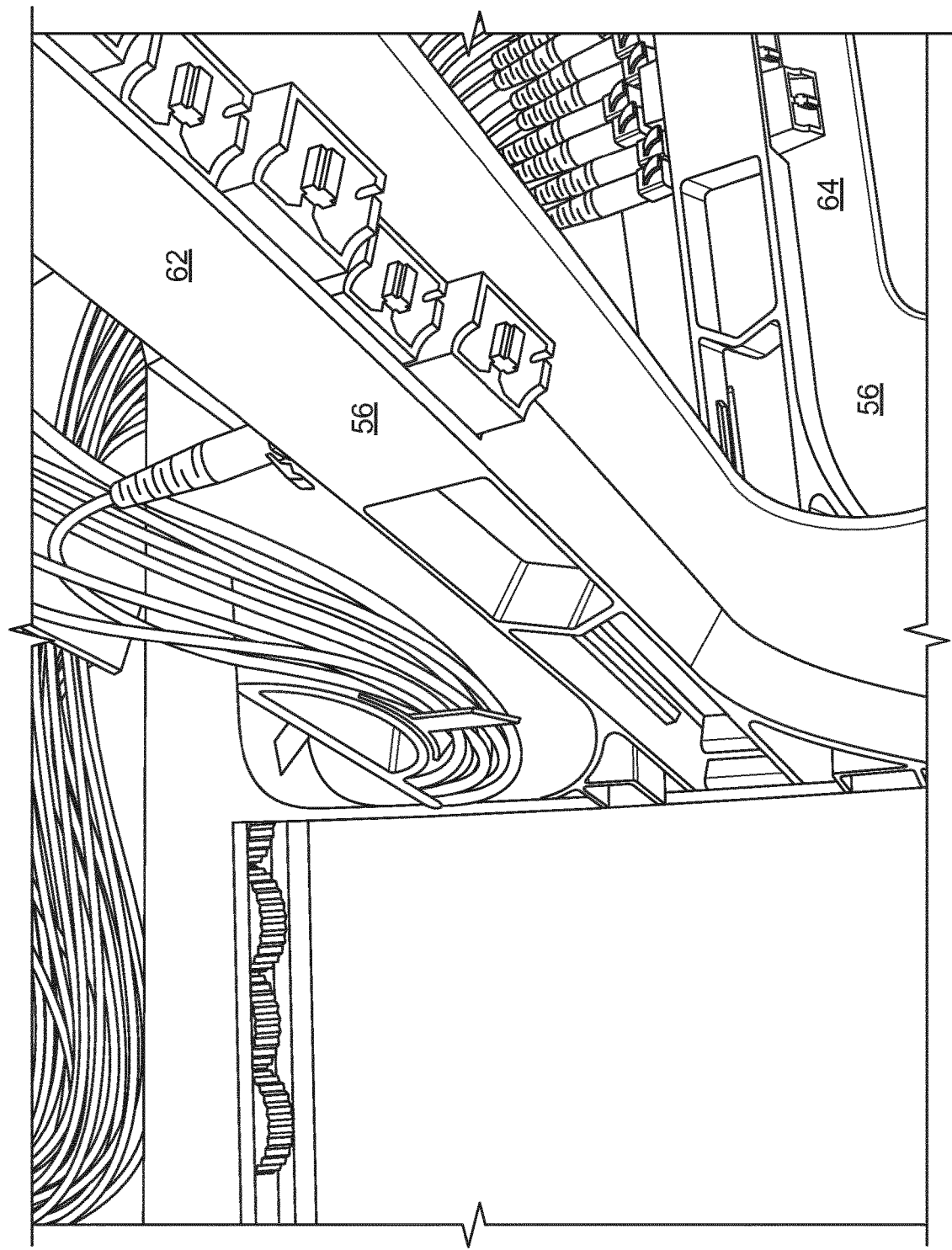
Figure 22:
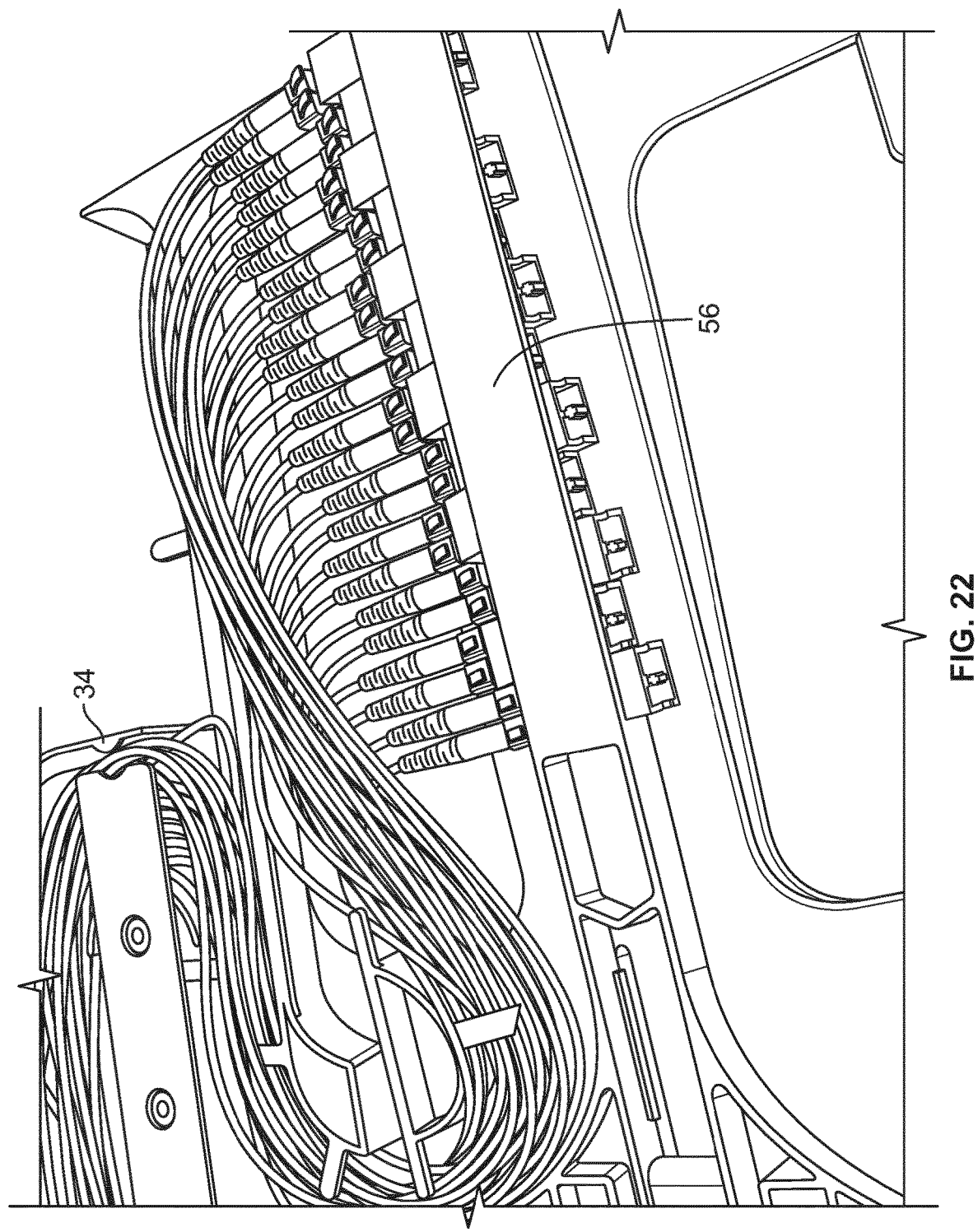
Figure 23:
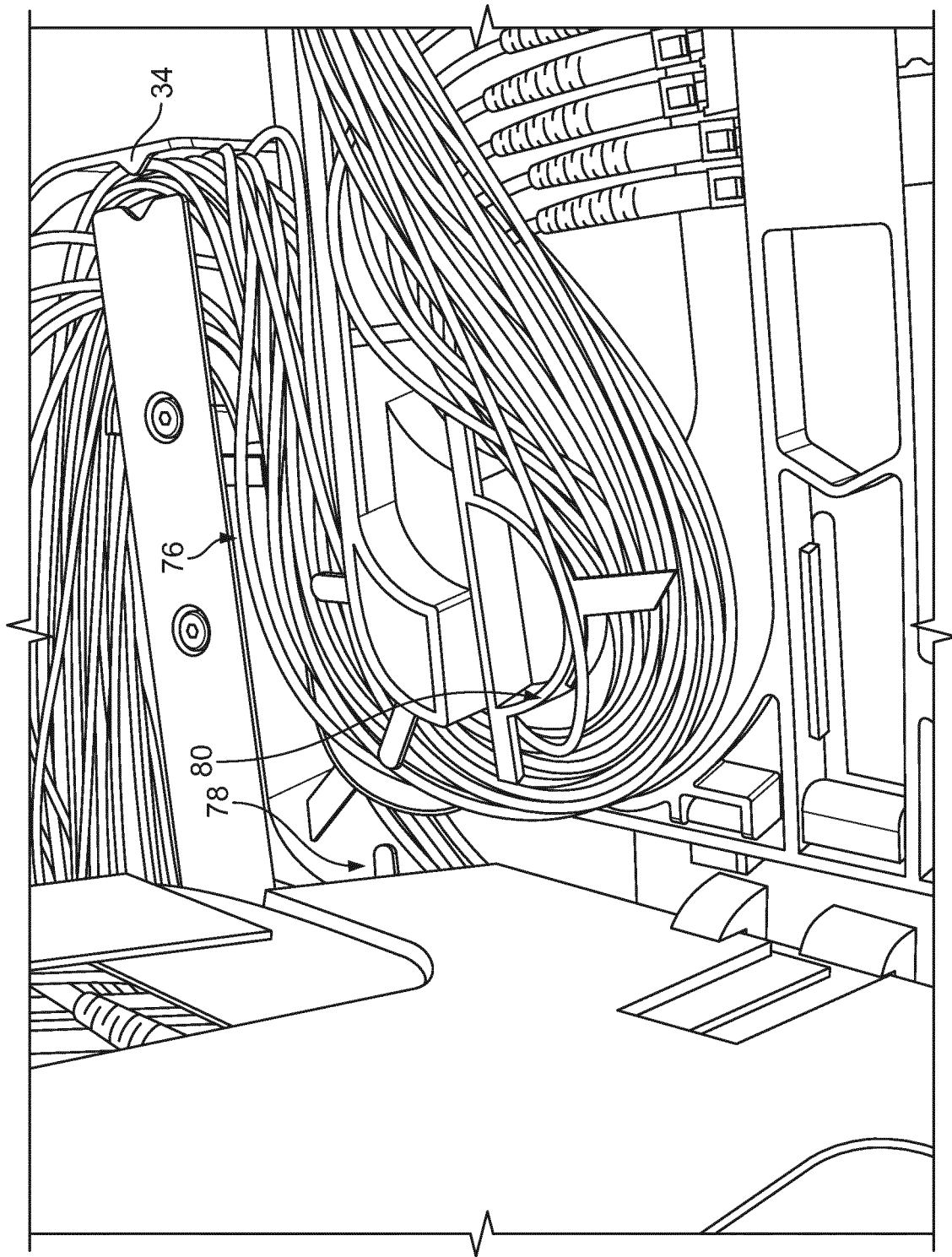
Figure 24:
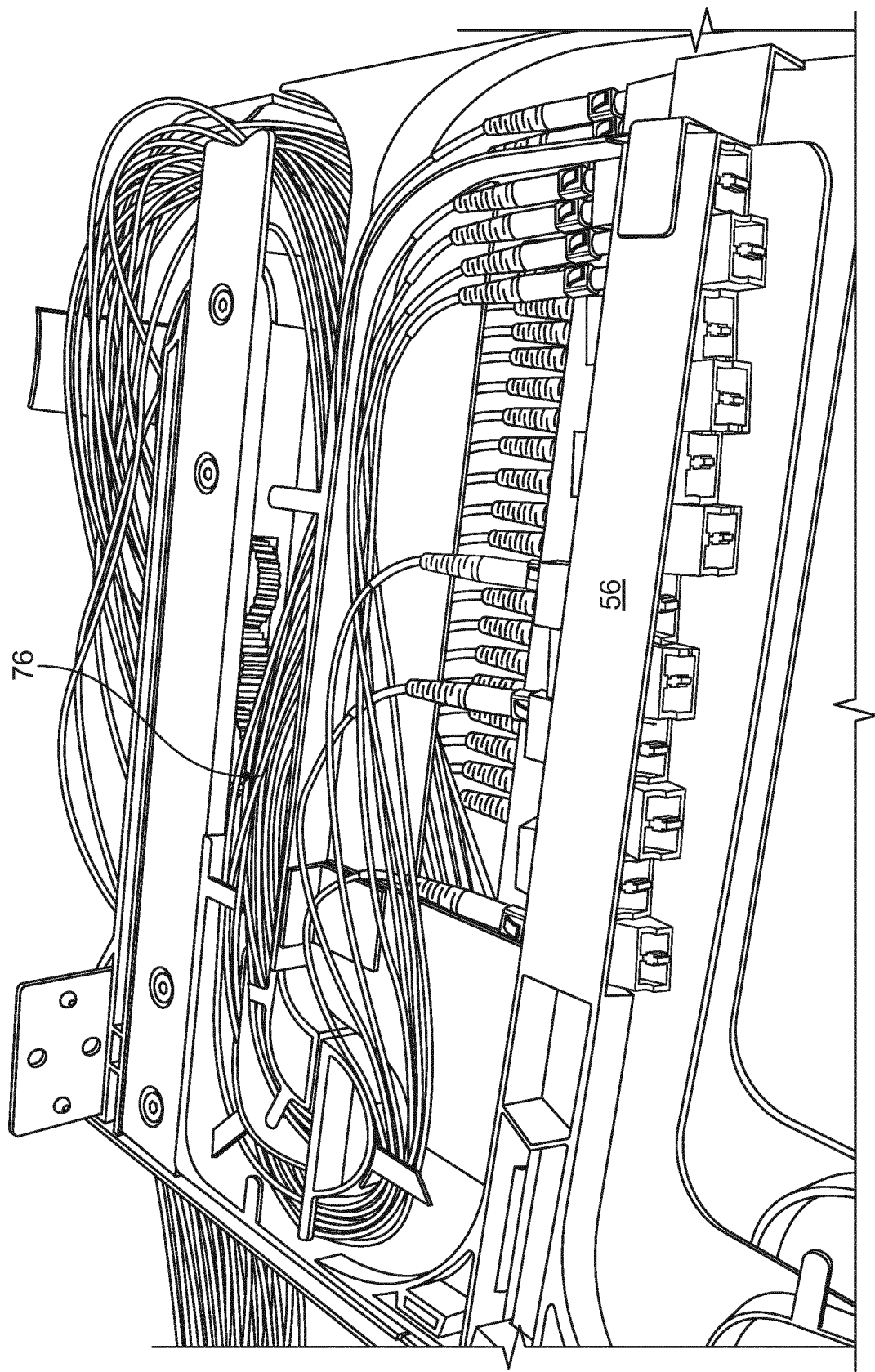
Figure 25:
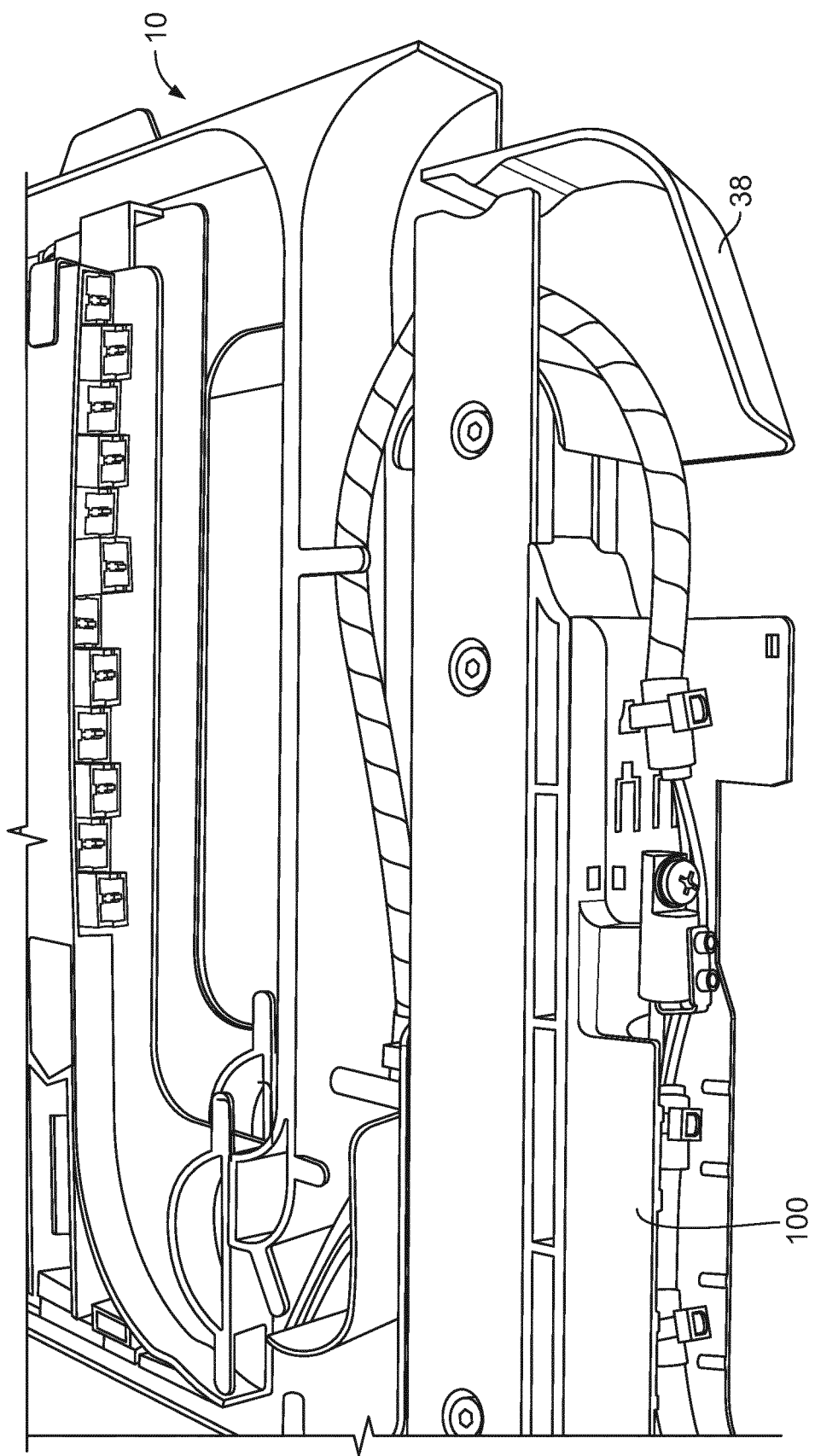
Figure 26:
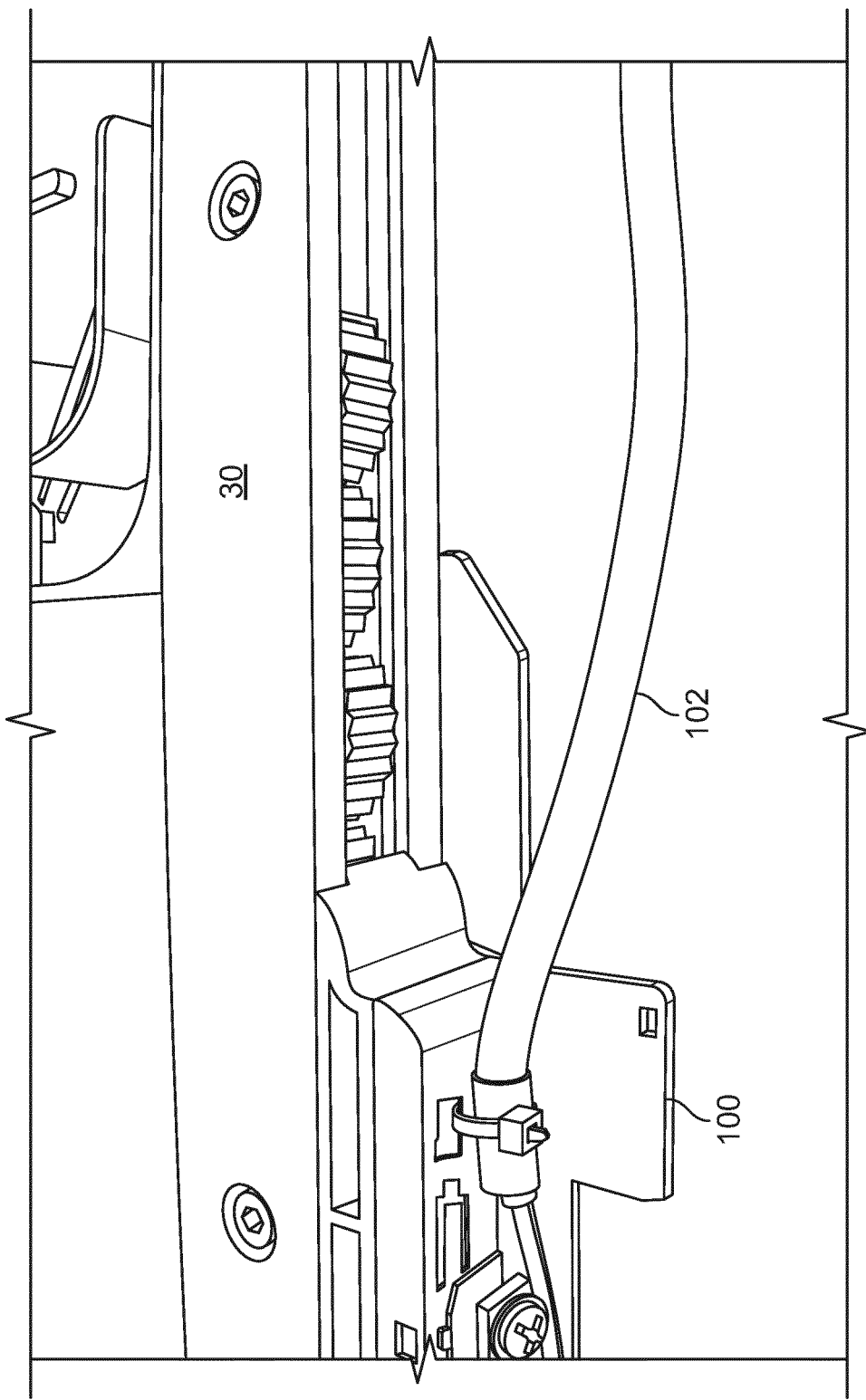
Figure 27:
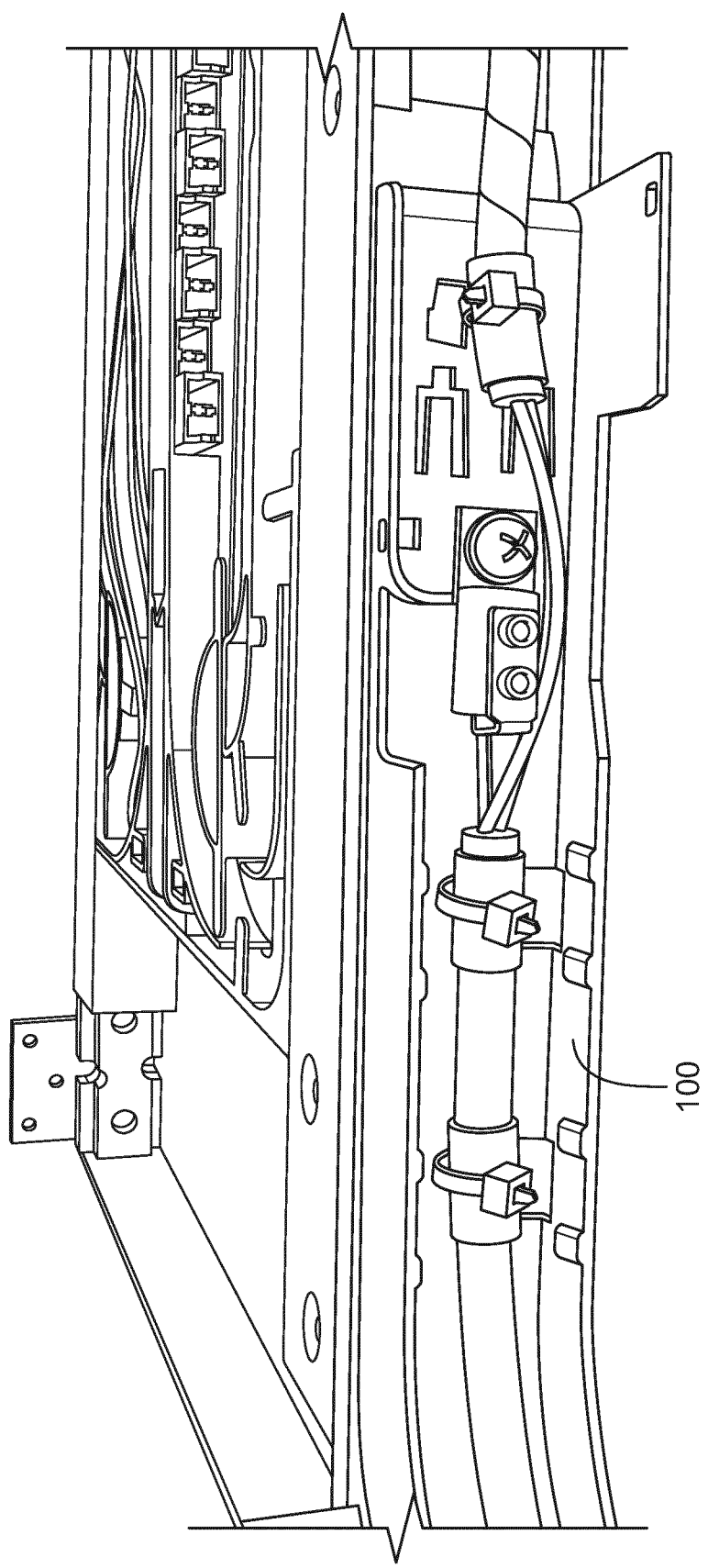
Figure 28:
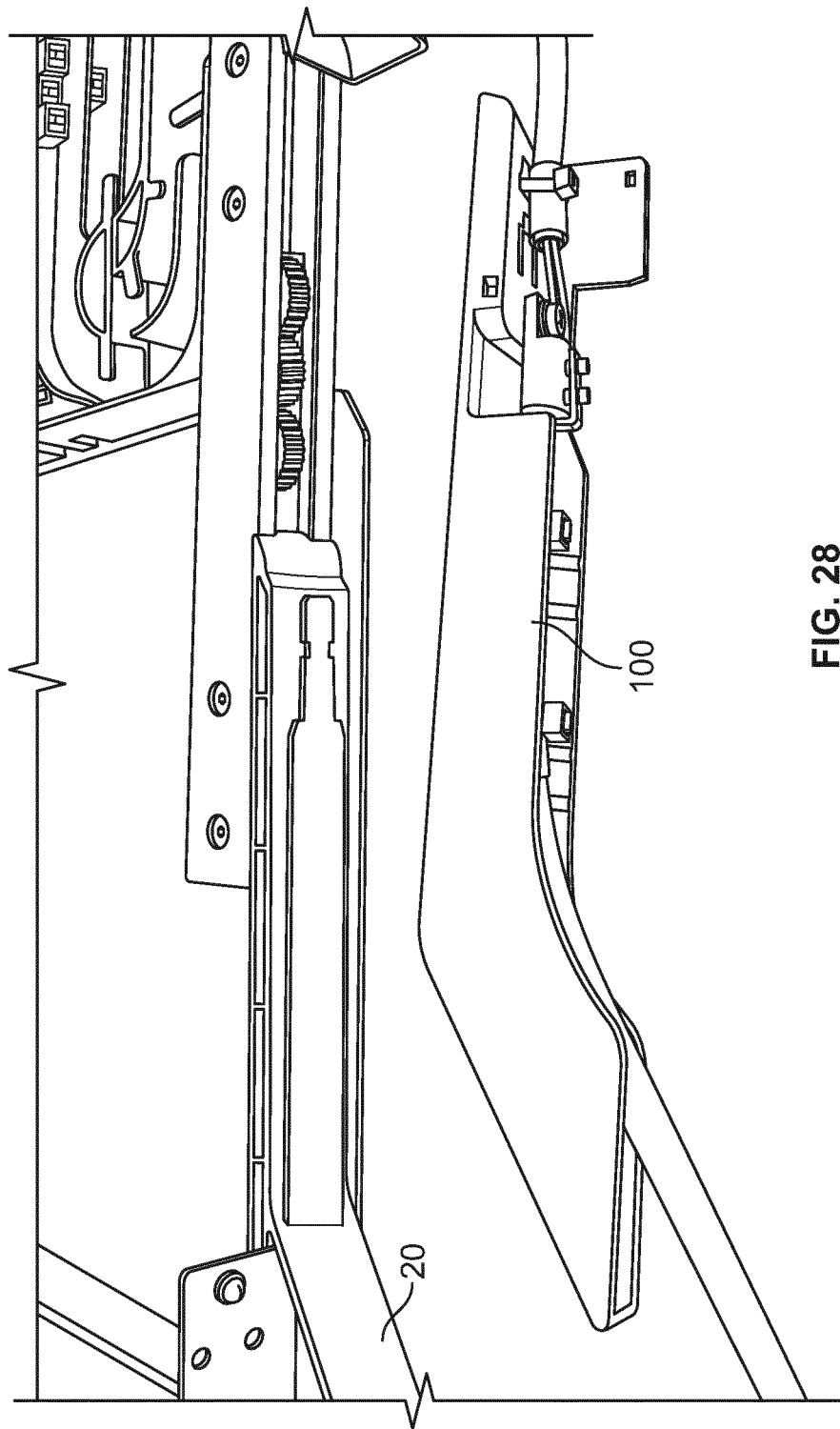
Figure 29:
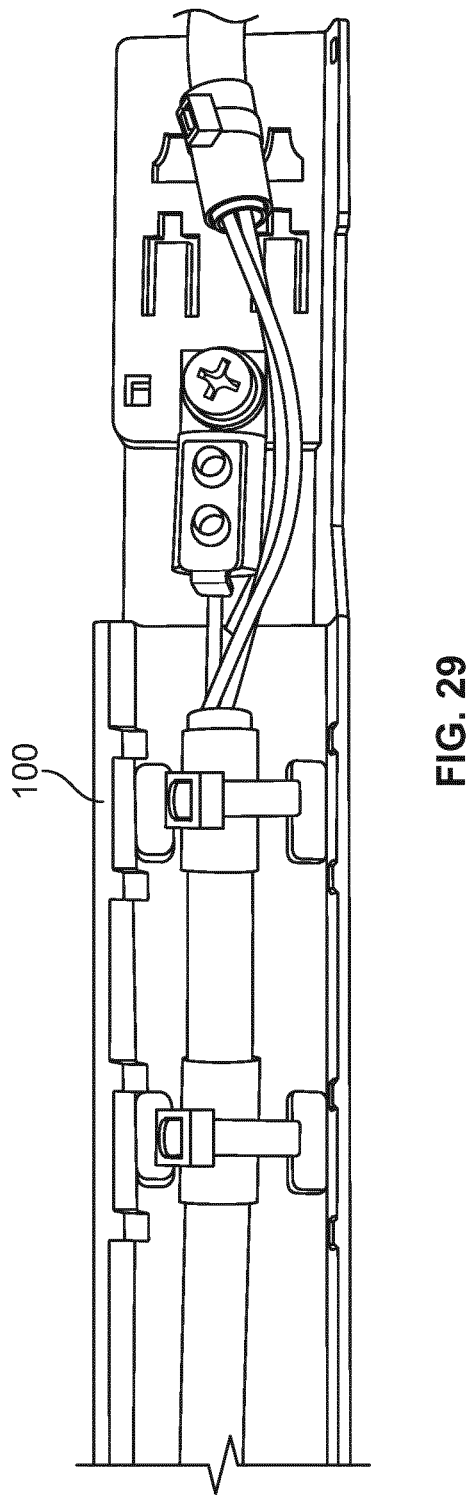
Figure 30:
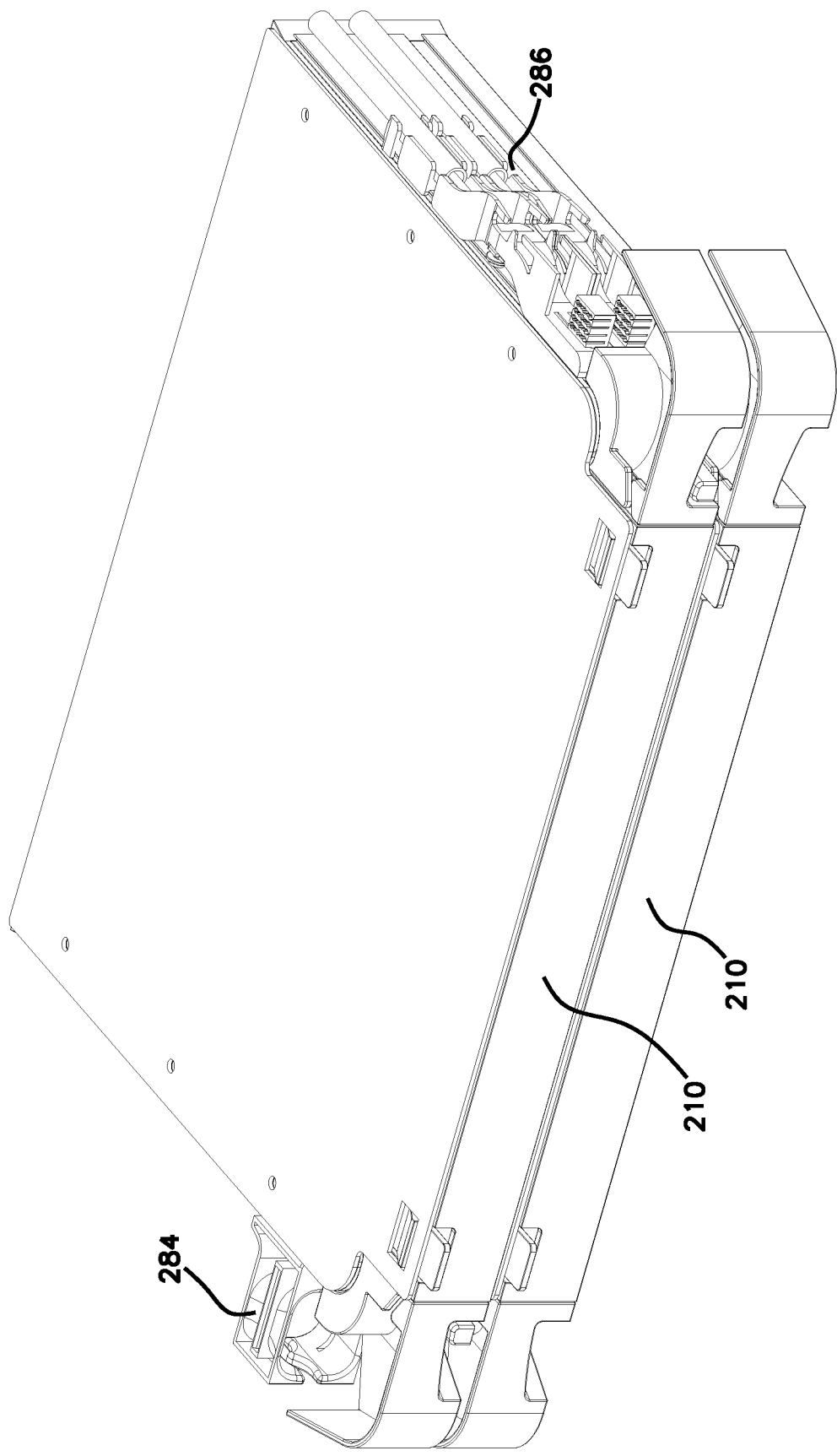
FIG. 30 shows an alternative embodiment of a block of two alternative elements.
Figure 31:
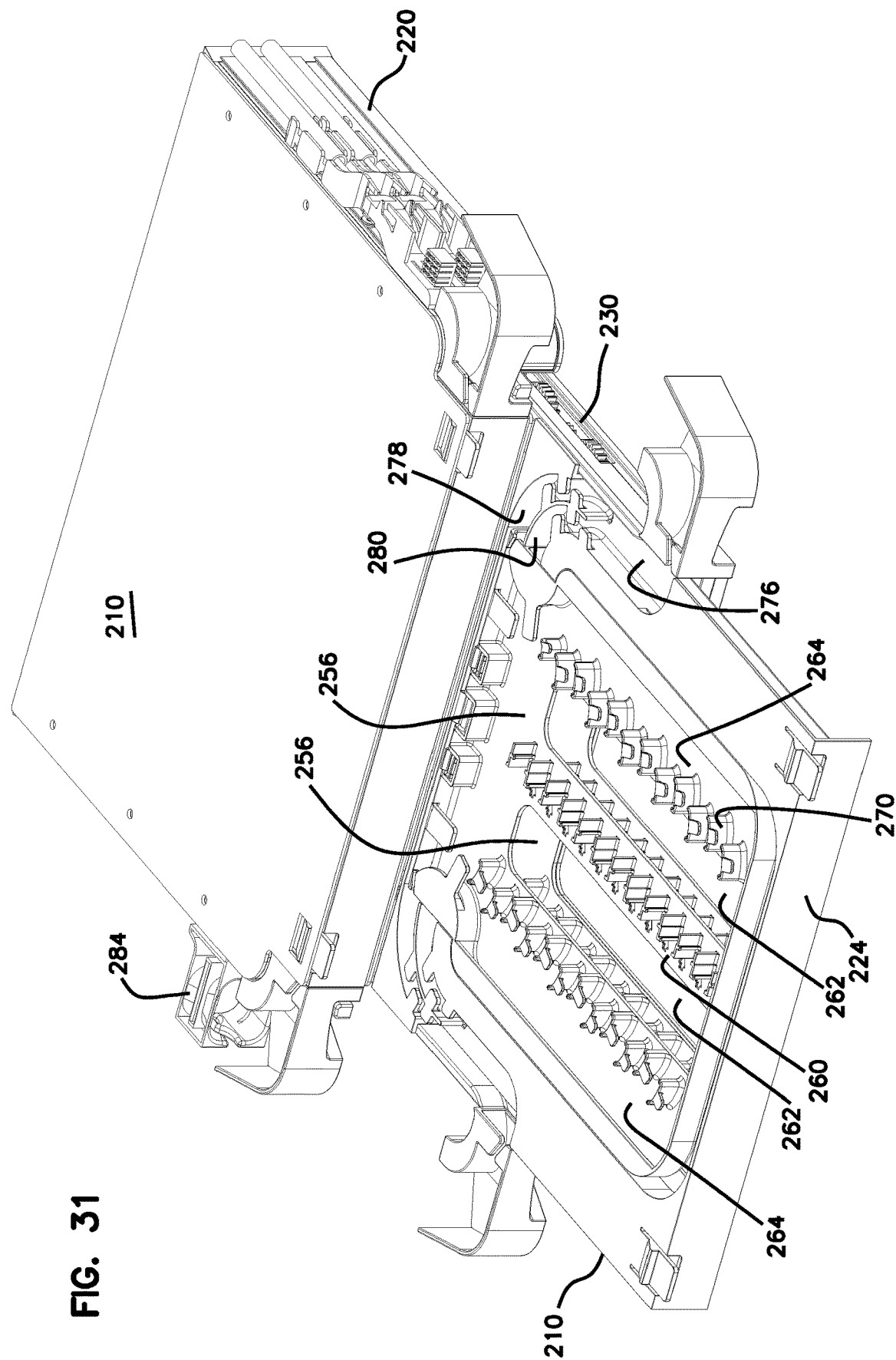
FIG. 31 shows a tray pulled forward from the chassis of one of the elements of the block of FIG. 30.
Figure 32:
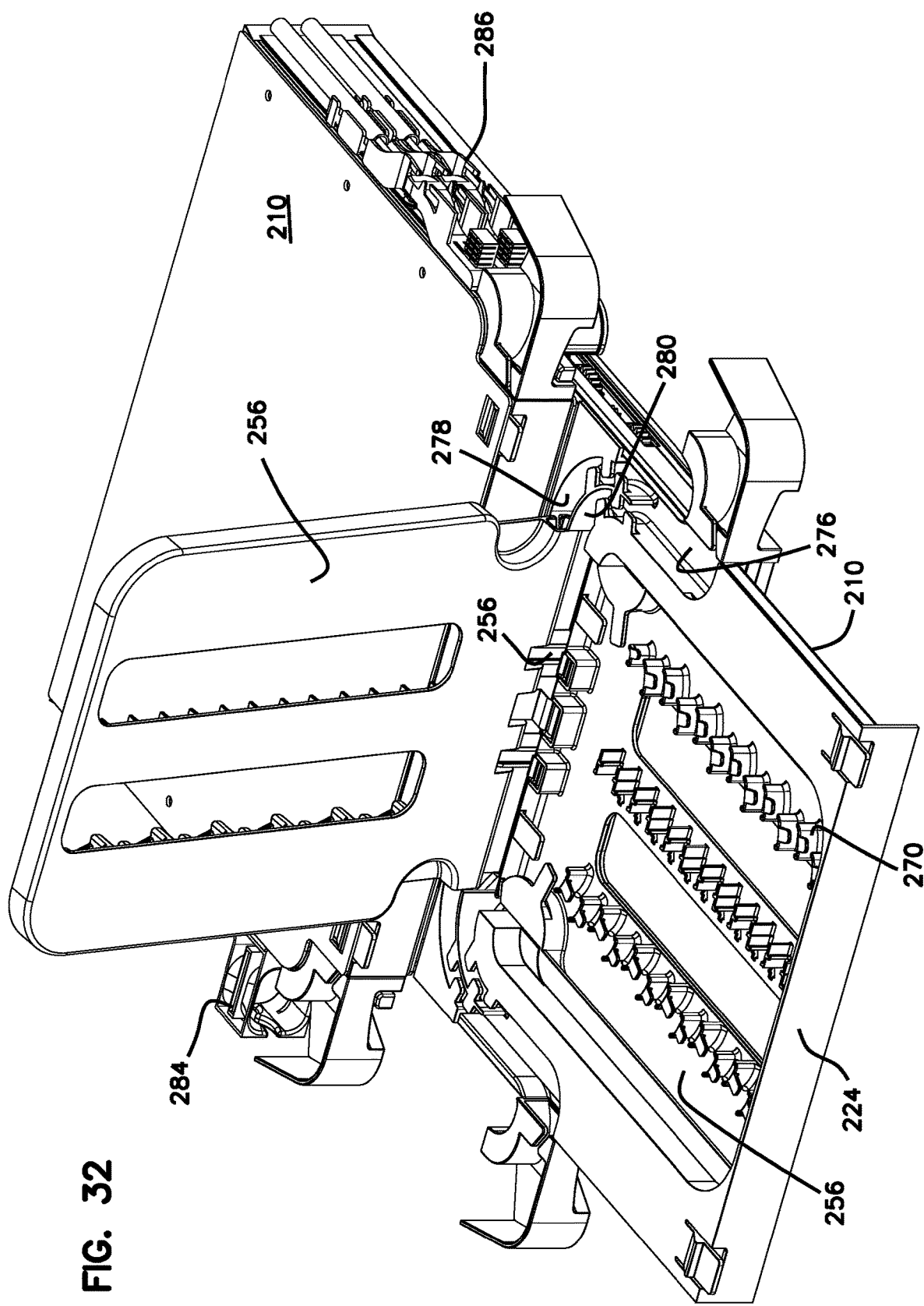
FIG. 32 shows the tray extended forward as in the view of FIG. 31, with one of the frame members pivoted upwardly.
Figure 33:
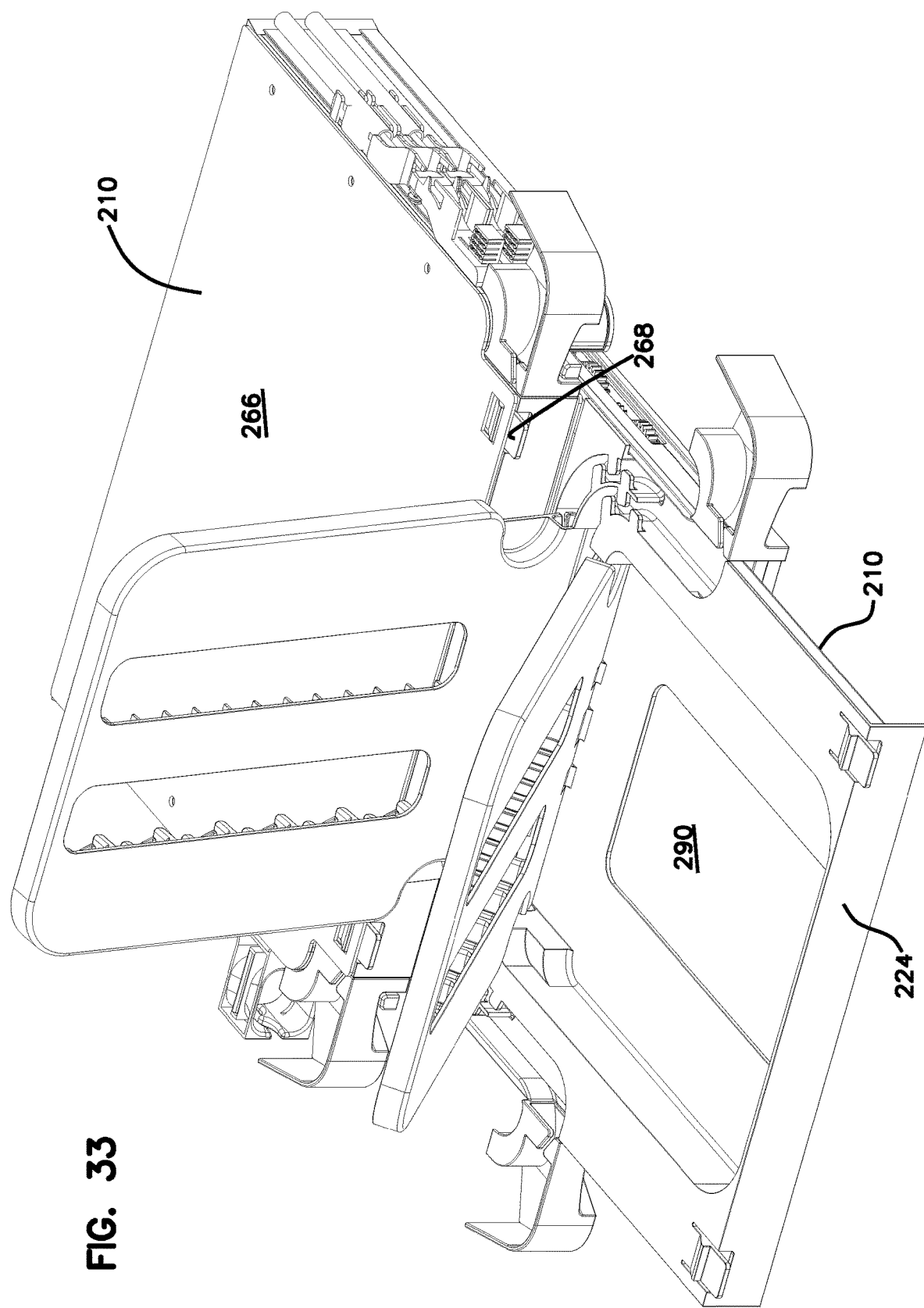
FIG. 33 is a view similar to the view of FIG. 32, with a second frame member pivoted upwardly.
Figure 34:
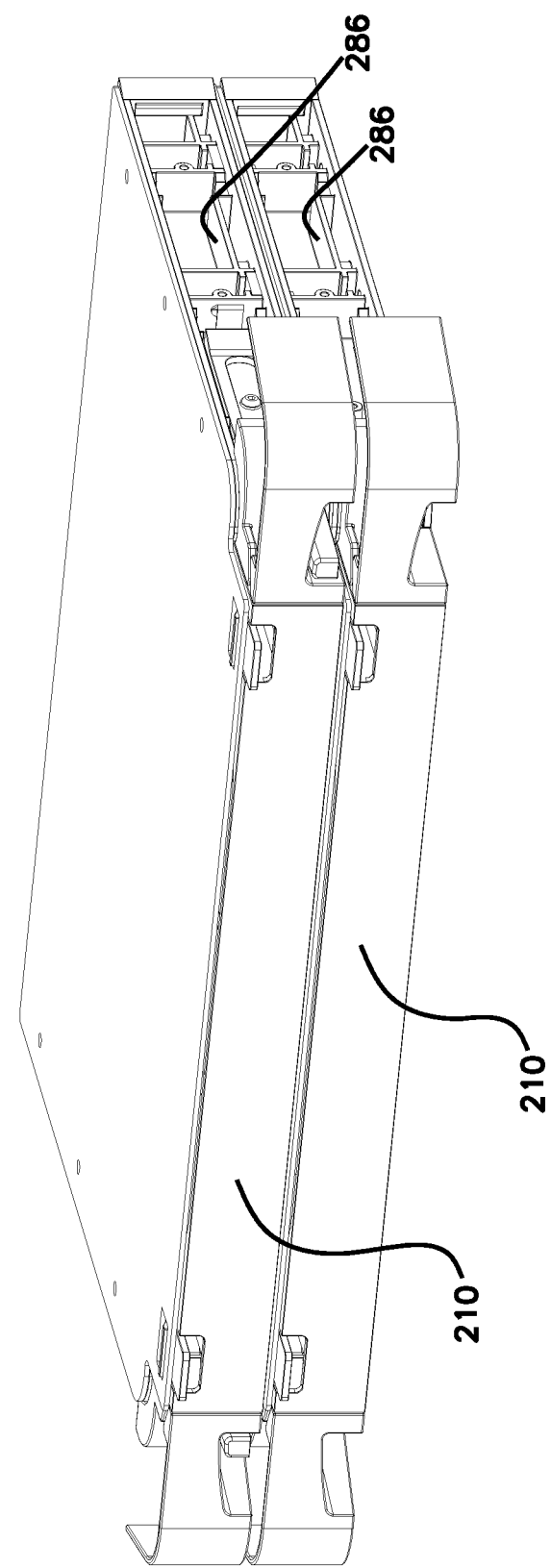
FIG. 34 shows a block including two elements.
Figure 35:
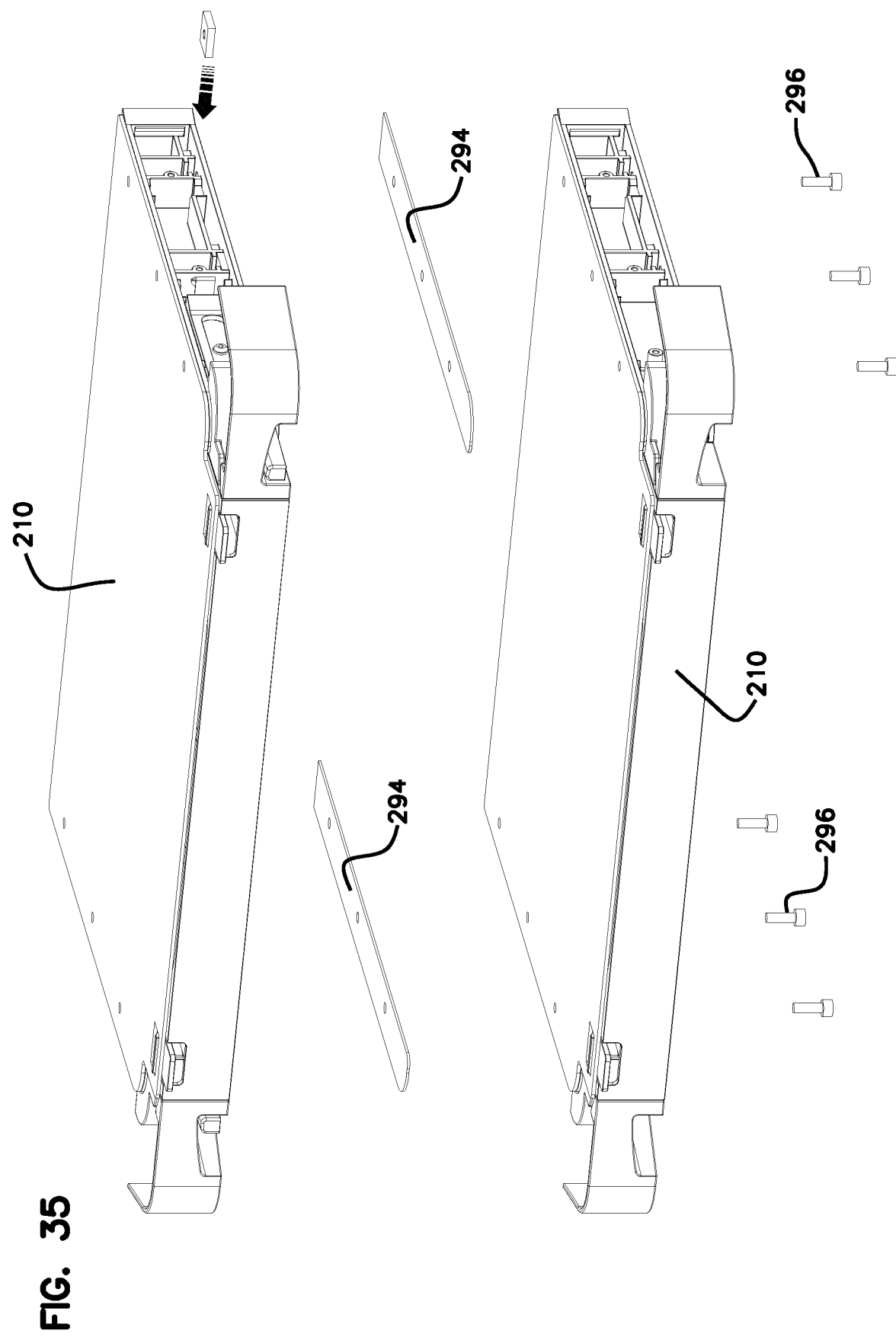
FIG. 35 shows an exploded view of the two elements of the block of FIG. 34.
Figure 36:
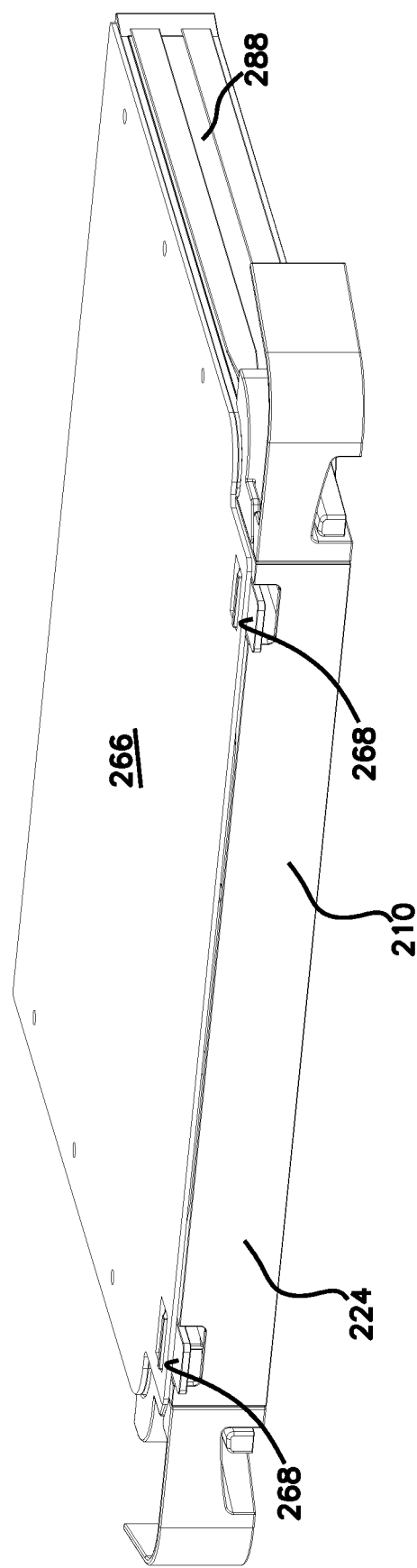
FIG. 36 shows a single element.
Figure 37:
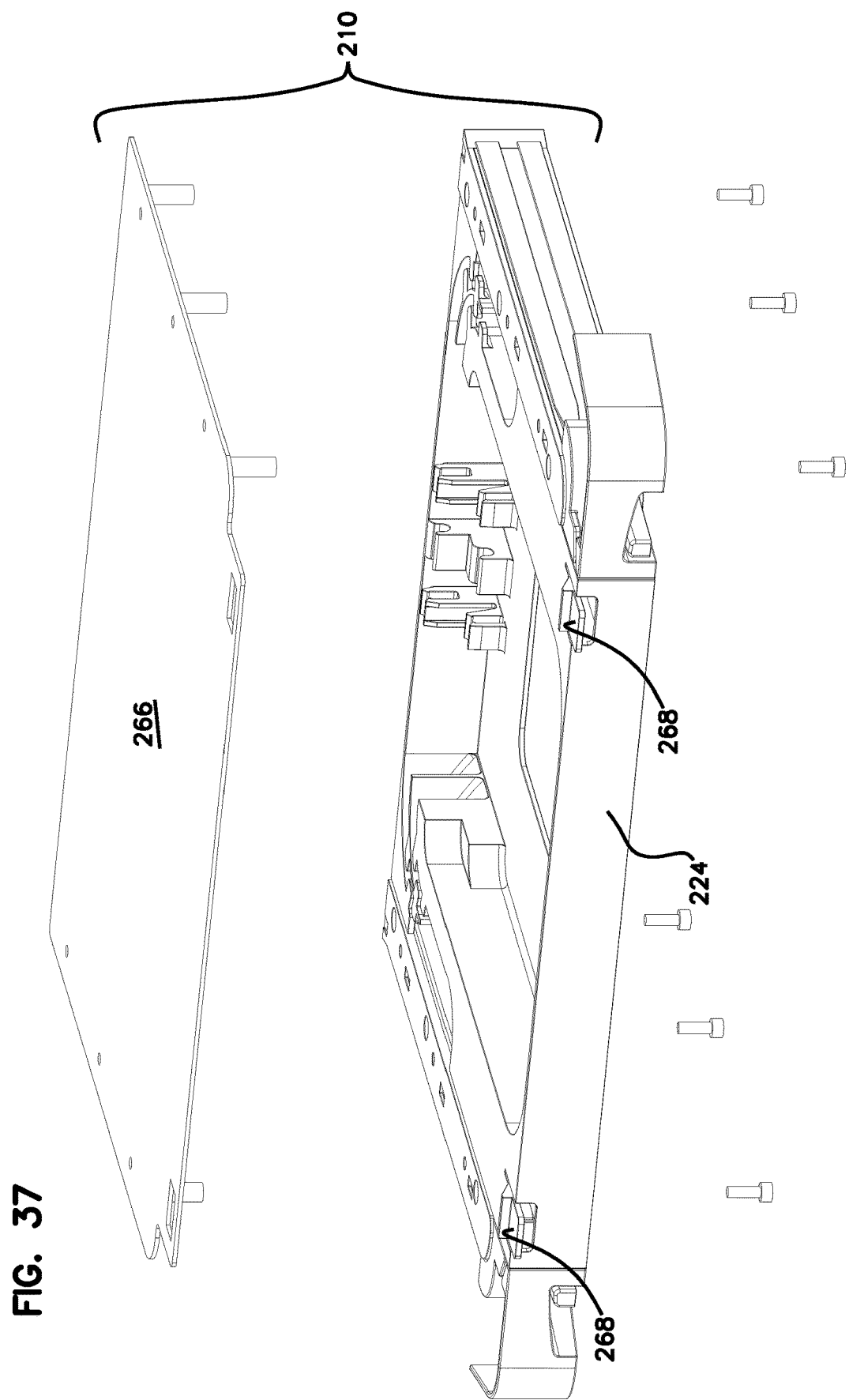
FIG. 37 shows an exploded view of the element of FIG. 36.
Figure 38:
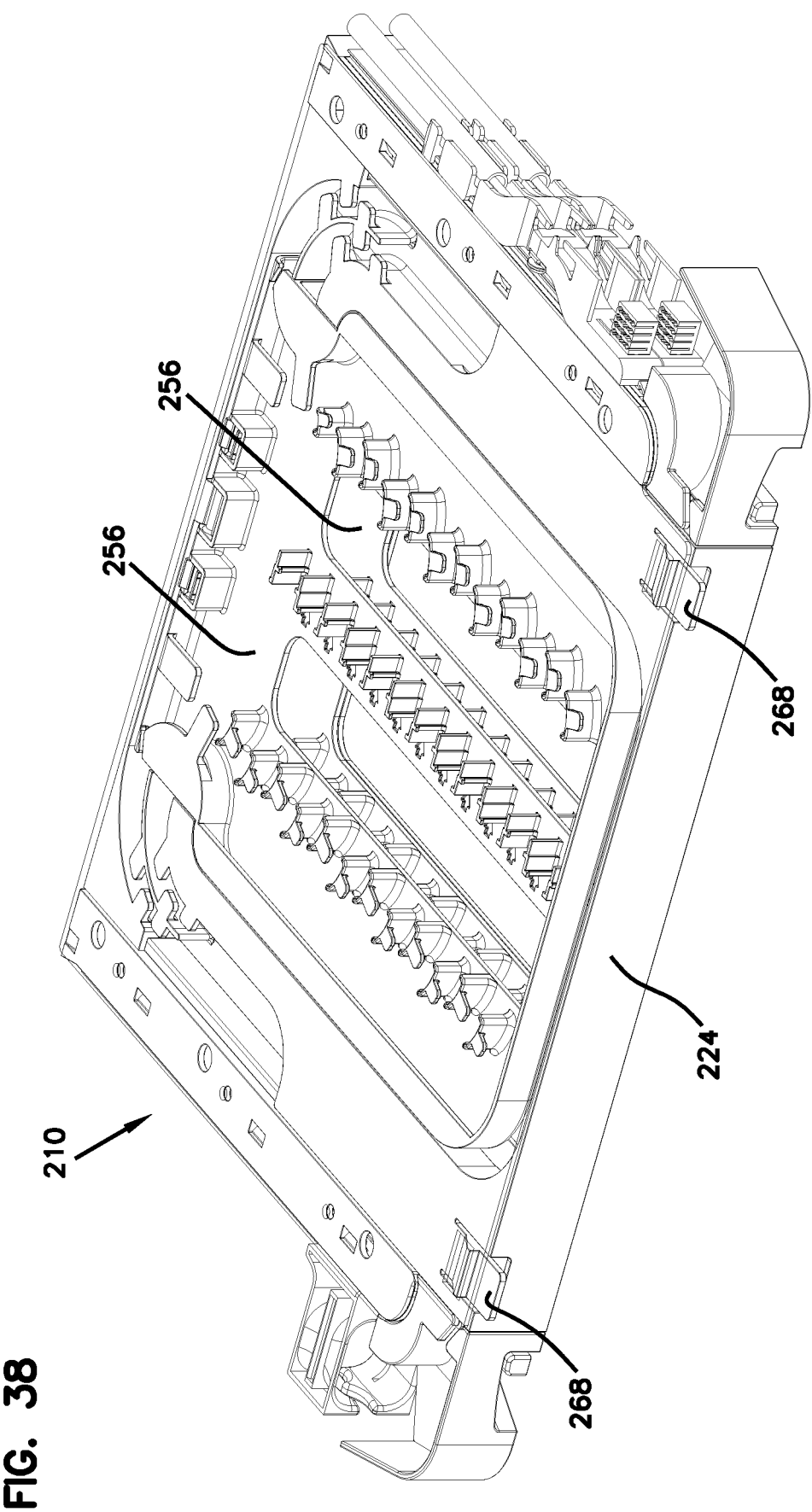
FIG. 38 shows the element of FIG. 37, without the top cover.
Figure 39:
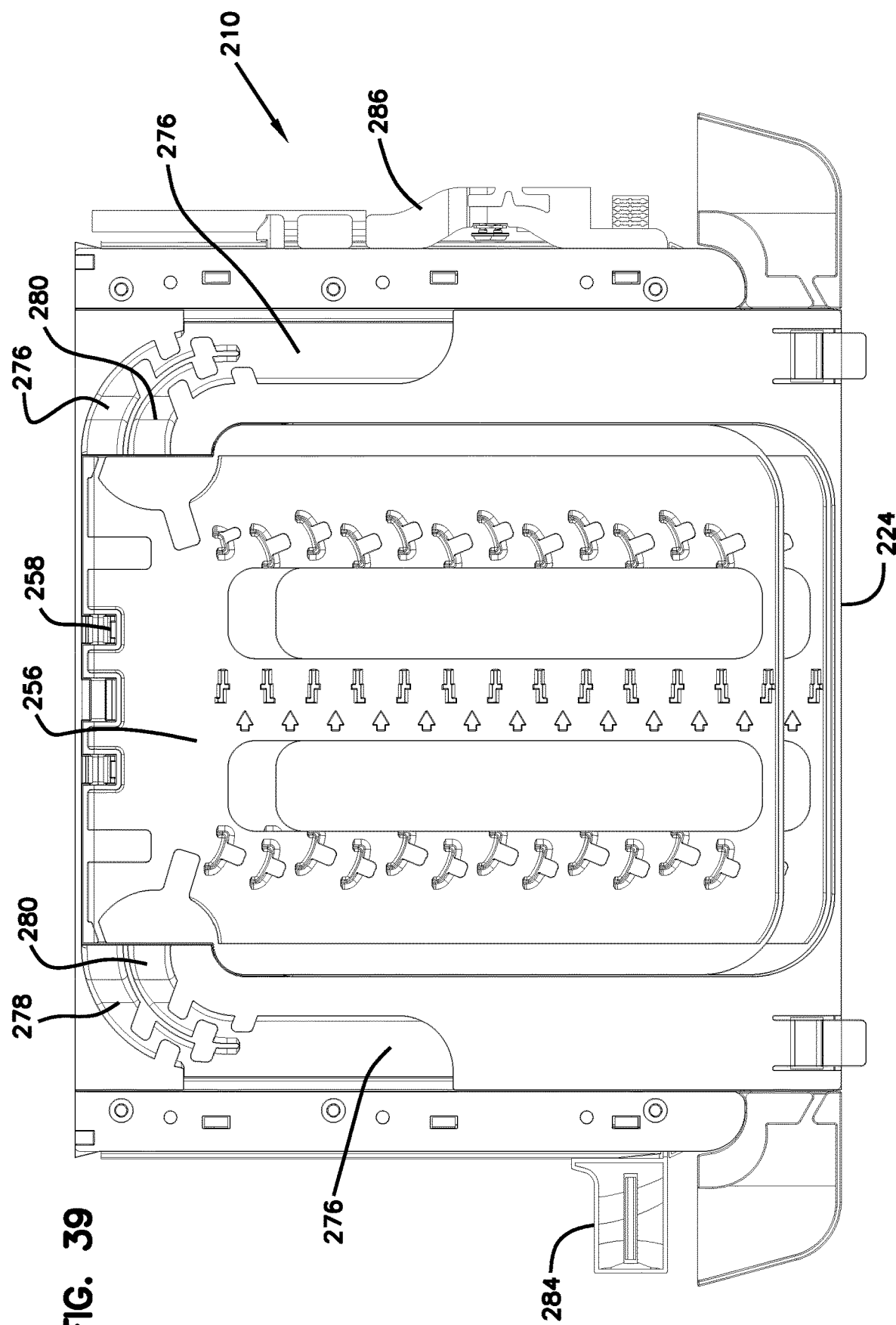
FIG. 39 is a top view of the element of FIG. 38.
Figure 40:
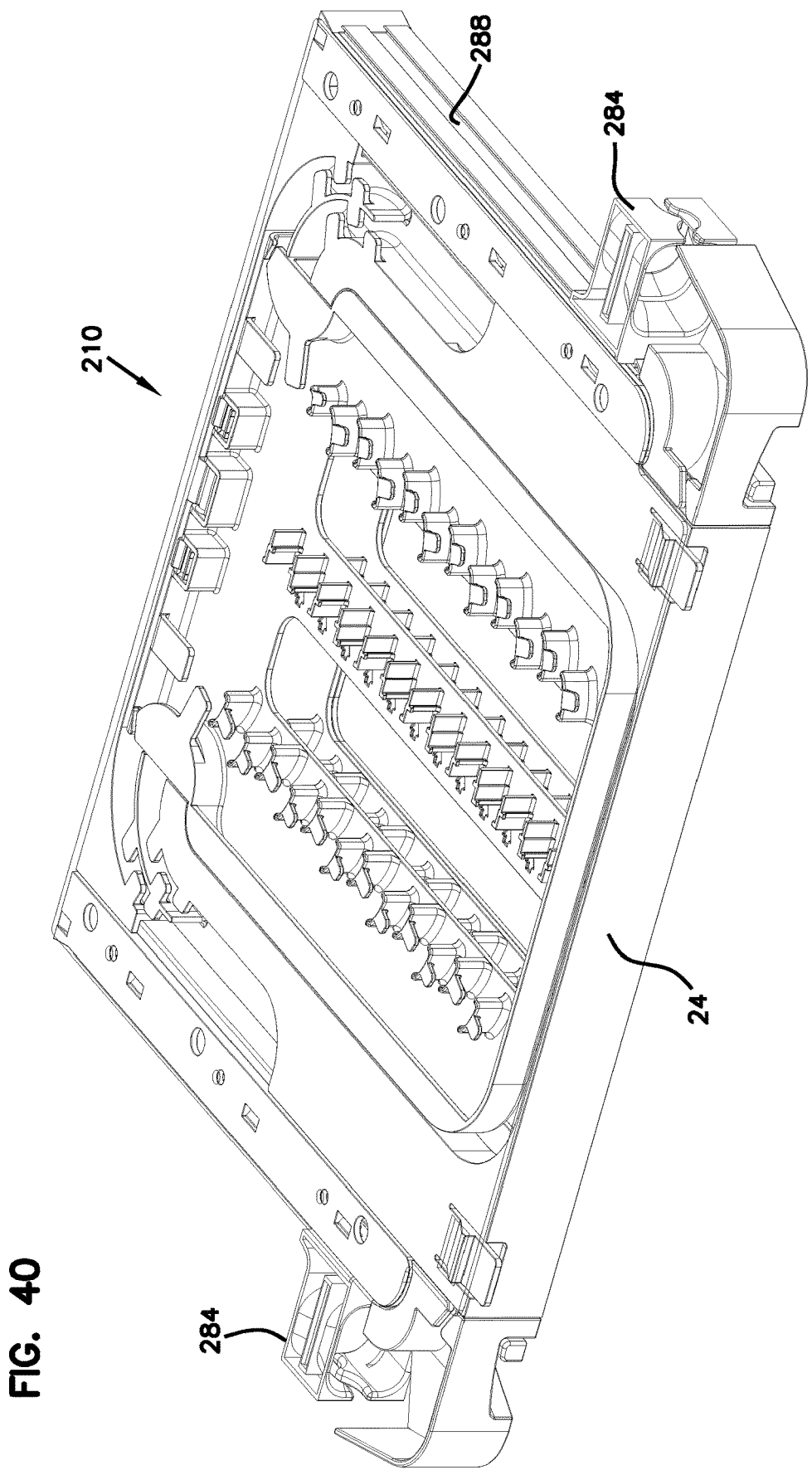
FIG. 40 is an alternative view of the element of FIG. 38, showing alternative devices at the cable entry points.
Figure 41:
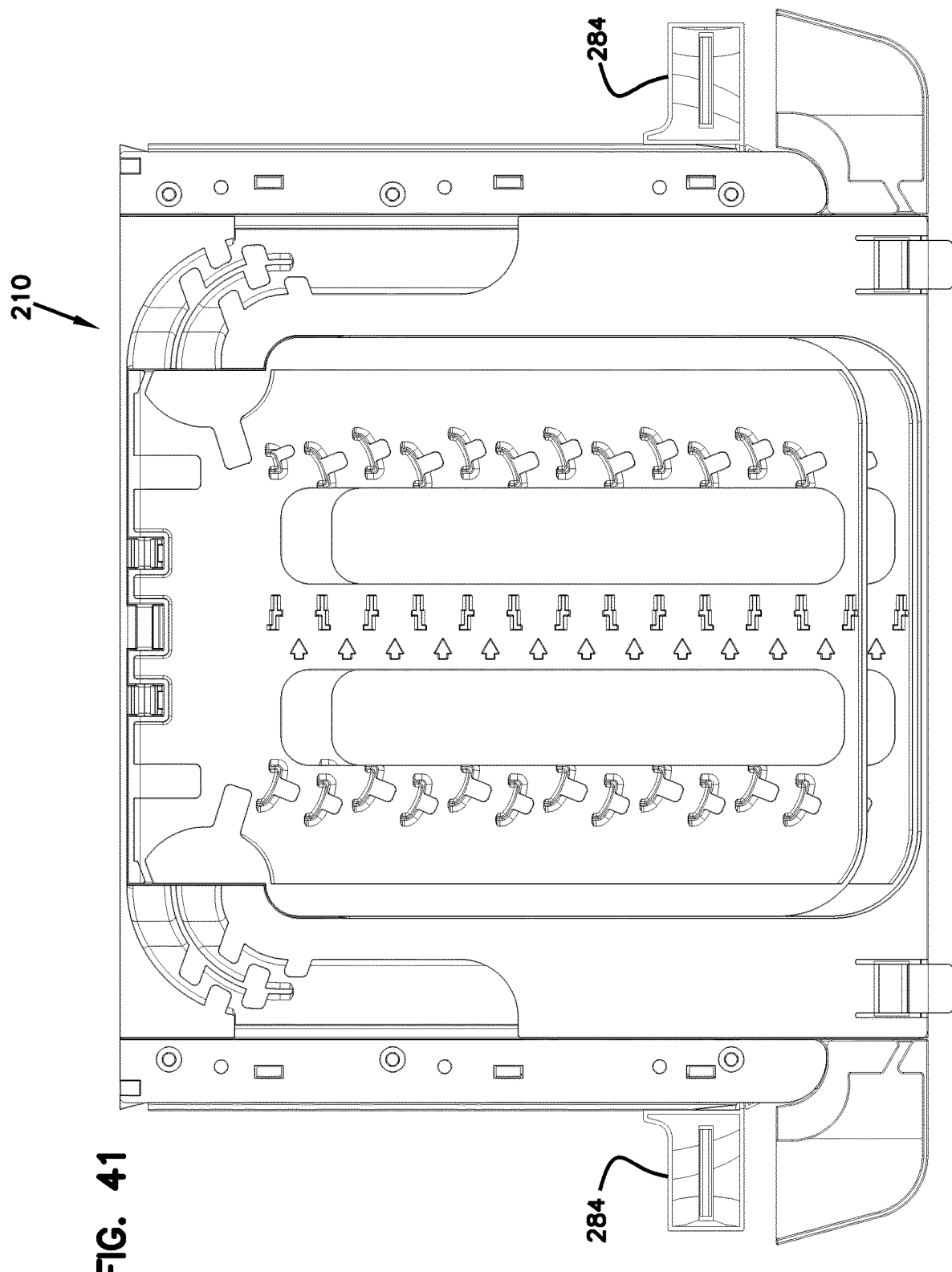
FIG. 41 is a top view of the element of FIG. 40.
Figure 42:
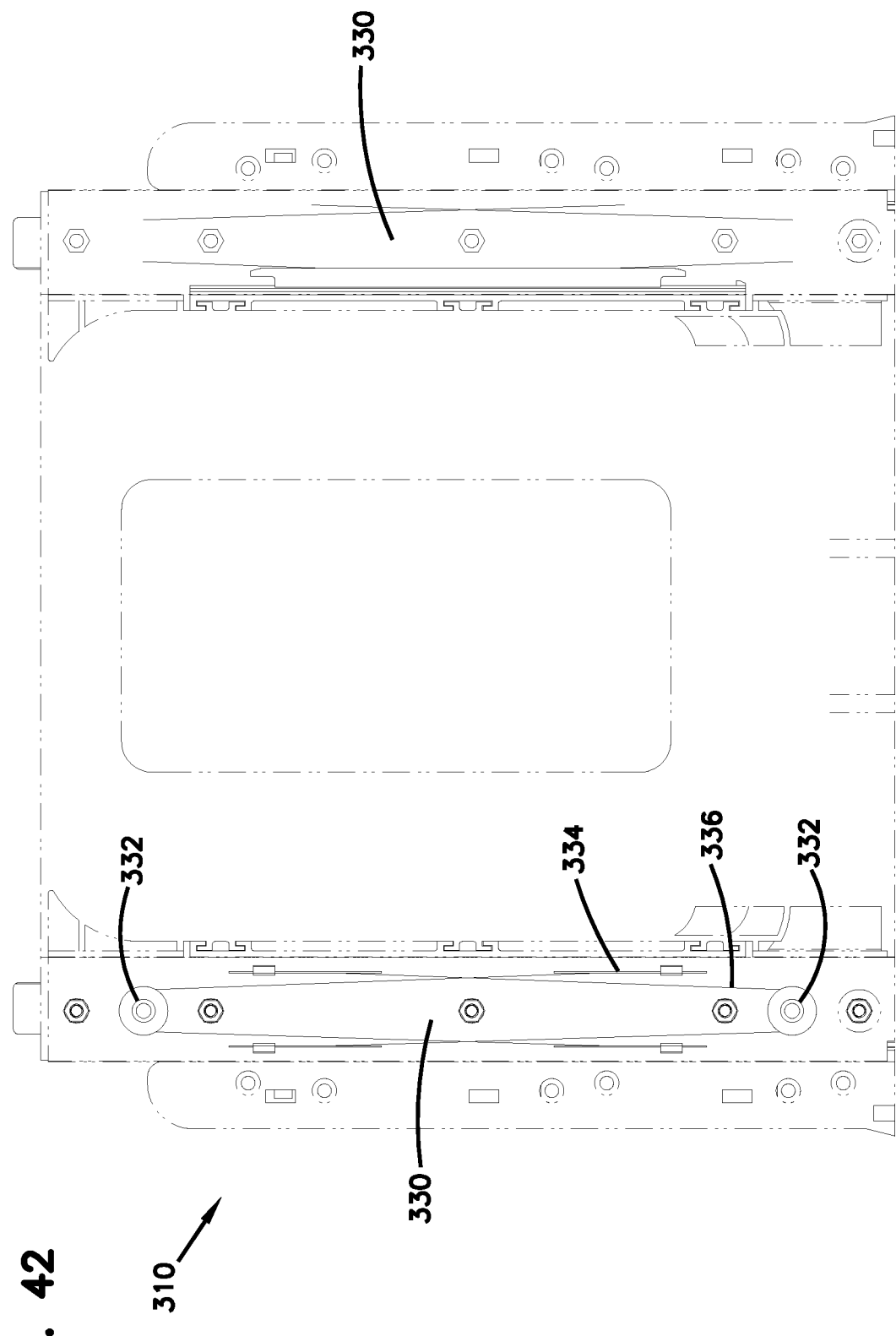
FIG. 42 shows an alternative embodiment of an element in a top view with an alternative synchronized movement feature.
Figure 43:
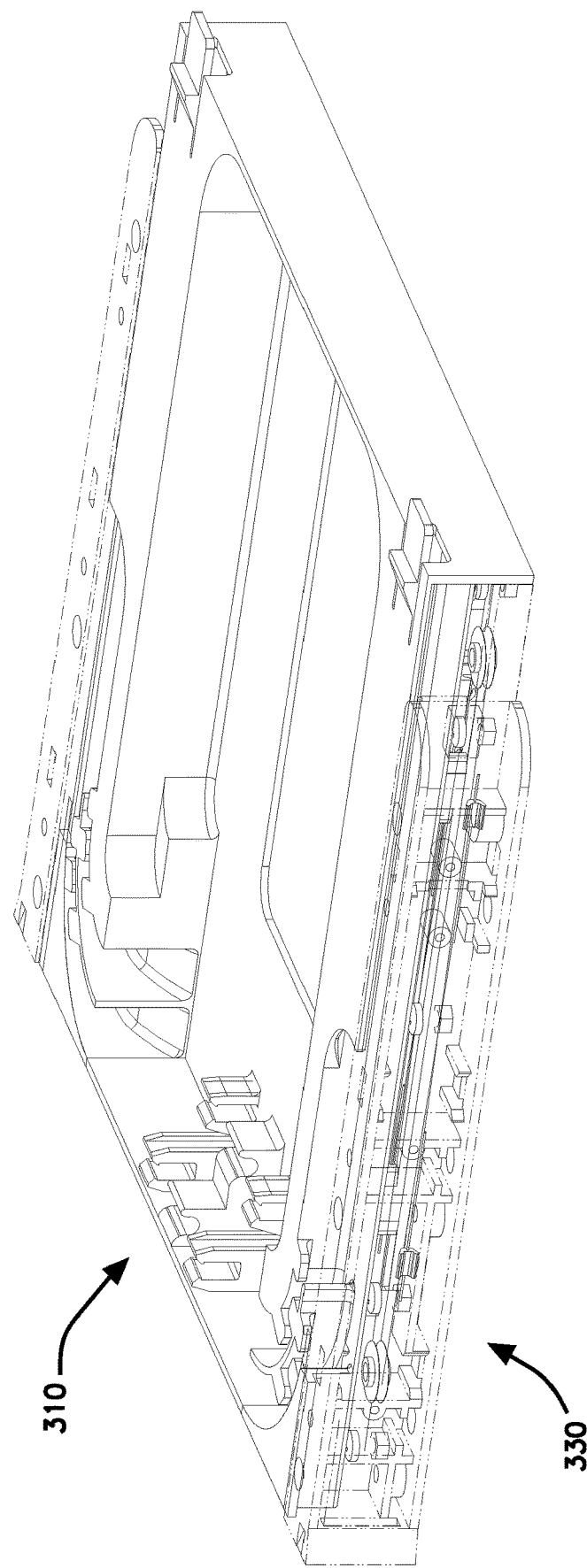
FIG. 43 is a perspective view of the element of FIG. 42.
Figure 44:
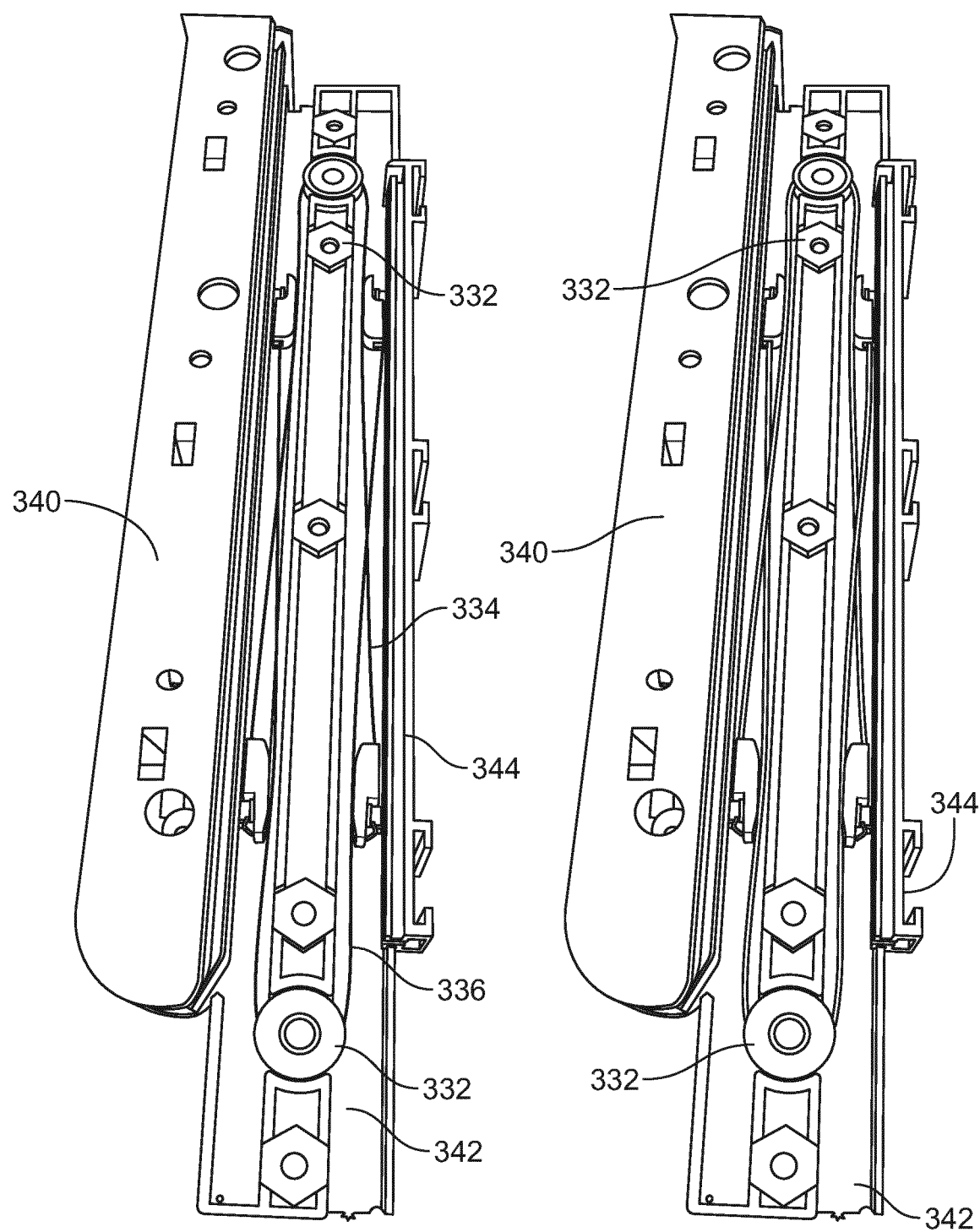
FIGS. 44 and 45 show movement of the various components of the synchronized movement feature of FIGS. 42 and 43.
Figure 45:
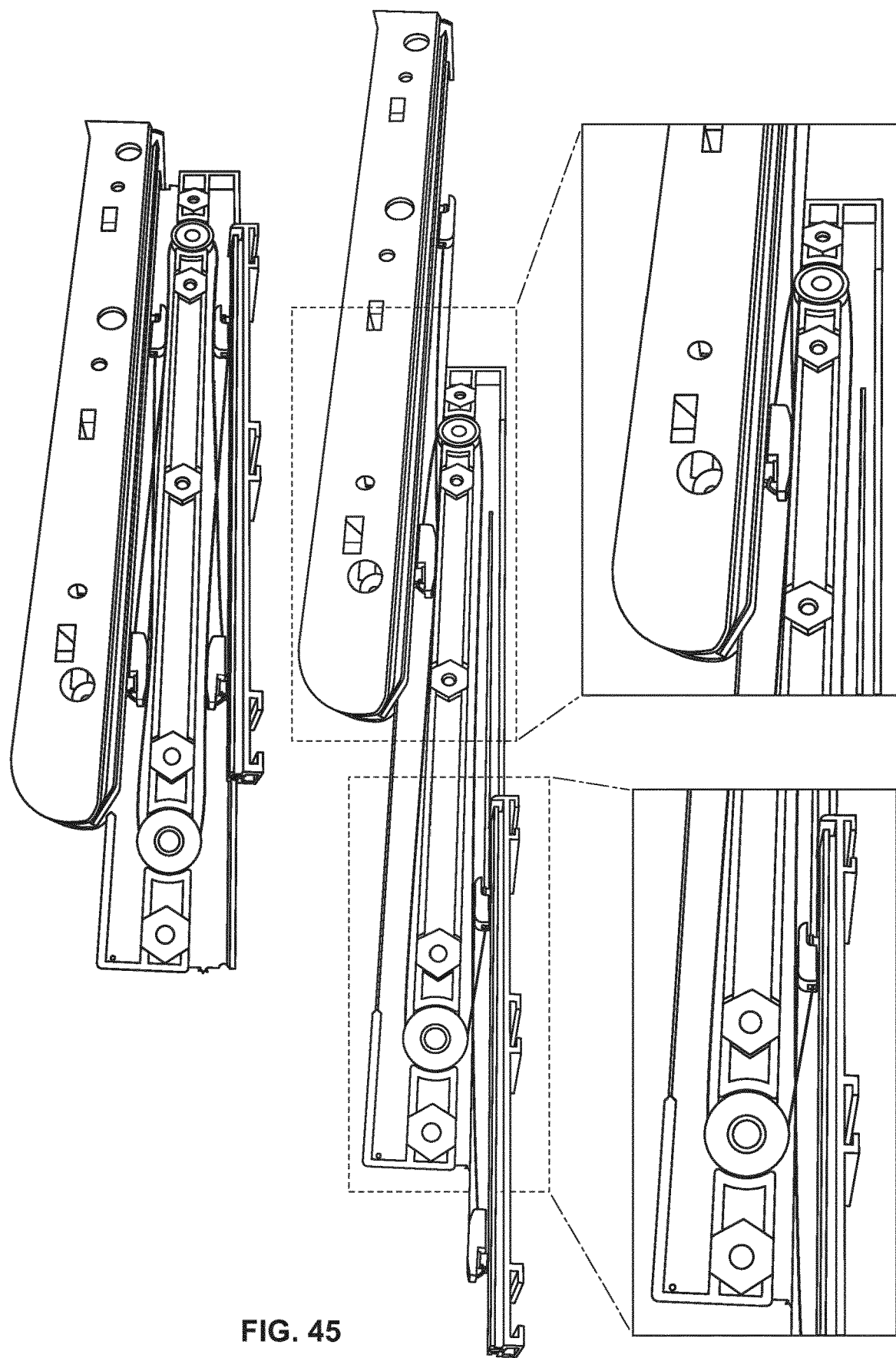

The wrap 102 shown in FIG. 16 is mounted horizontally to the tray 24 wherein both the front and rear ends of the wrap are mounted to horizontal mounts at similar horizontal planes. However, in other embodiments, where the wrap needs to be mounted to mounts that are at different planes or at planes that are perpendicular to each other, the wrap may be flexible enough to be able to be twisted around its longitudinal axis. As such, the front and the rear ends of the wrap may be mounted to mounts that are at perpendicular planes to each other and still not violate minimum bending requirements for the cables as the trays are moved back and forth with respect to the elements. Such wraps may be used on all of the embodiments of the elements discussed herein.

Referring now to FIGS. 17-29, various examples of cable routings are illustrated for element 10.

If desired, more than one feeder cable can supply cabling to more than one element 10.

Referring now to FIGS. 30-41, various additional embodiments of elements 210 are shown. Element 210 includes a chassis 220 in a movable tray 224 mounted with a slide mechanism 230 which promotes synchronized movement of radius limiters 238. Each tray 224 includes two hingedly mounted frame members 256. Each frame member 256 has a middle portion 260 separated by openings 262 from side portions 264. Middle portion 260 can hold fiber terminations. Side portions 264 include radius limiters 270. Cover 266 goes over tray 224. Latches 268 latch tray 224 to cover 266 in the closed position.

A pathway 276 extends from either side from tray 224 to supply cables to each of trays 224. An upper level 278 and a lower level 280 supply the respective frame members 256 with cabling. A general S-shaped pathway 276 is defined wherein the pathway 276 passes close to hinges 258.

A dovetail 288 is used to hold cable mounts 286 and radius limiters 284.

An opening 290 in tray 224 allows for connector access by the technician. Similarly, openings 262 on each frame member 256 allow for technician access to the individual connectors.

To form a block 292 of plural elements 210, bars 294 and fasteners 296 are used. Bars 294 give a small spacing between each element 210.

Referring now to FIGS. 42-45, an alternative slide mechanism 330 is shown in alternative element 310. Slide mechanism 330 allows for movement of the trays and related radius limiters and synchronized movement similar to slide mechanism 30, 230. Alternative slide mechanism 330 includes two wheels 332 and two wires 334, 336. The wheels 332 are located on second part 342. The wires are looped in opposite directions and are connected to the first part 340 and the third part 344.

Figure 46:
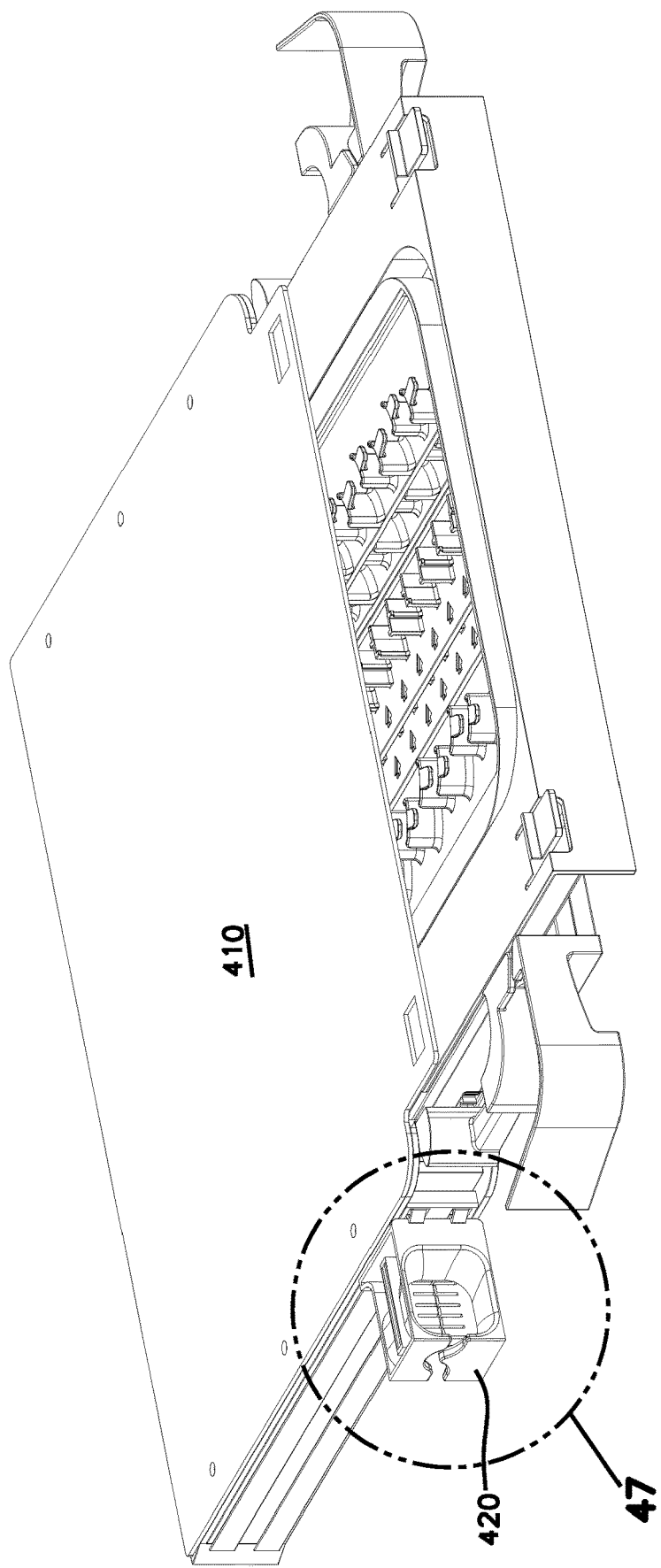
FIGS. 46 and 47 show an element with an alternative radius limiter at the cable entry and exit locations.
Figure 47:
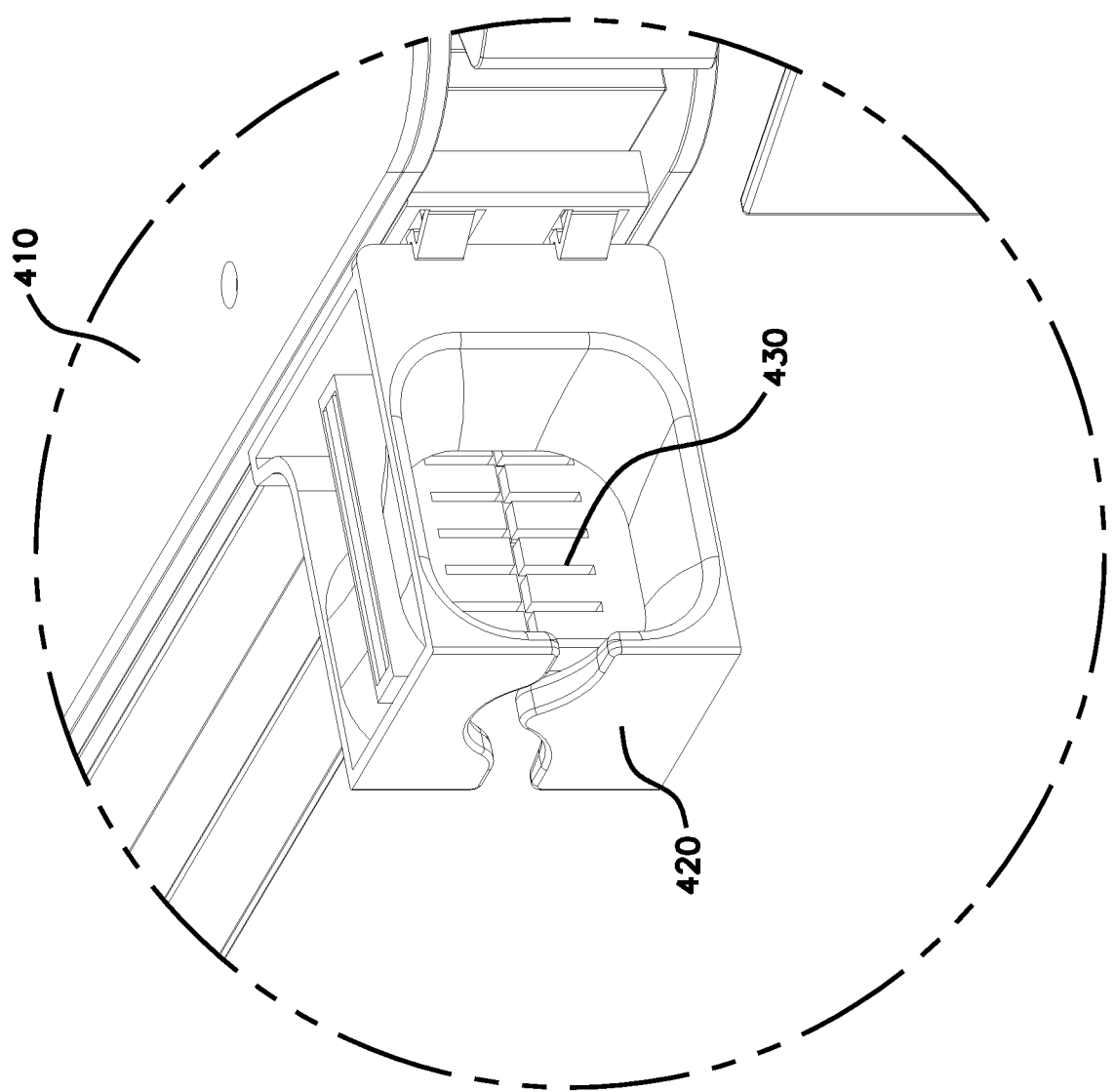

Referring now to FIGS. 46 and 47, an alternative radius limiter 420 is shown on alternative element 410. Radius limiter 420 includes friction members 430 which limit the amount of sliding movement of cables passing through radius limiter 420, to assist with cable management. Friction members 430 include flexible fingers which press lightly on the cables in radius limiter 420 to reduce or eliminate sliding movement of the cables in the radius limiter 420.

Referring now to FIGS. 48-52, a universal mounting mechanism 500 for releasably mounting a telecommunications chassis to a telecommunications fixture, such as an optical fiber distribution rack, is illustrated. In FIGS. 48-52, the universal mounting mechanism 500 is shown as having been adapted for and being used on an optical fiber distribution element 510 having features similar to those elements 210, 410 shown in FIGS. 30-47 of the present disclosure. With the universal mounting mechanism 500 of FIGS. 48-52, telecommunications chassis or elements such as elements 210, 410, and 510 can be mounted as desired to telecommunications fixtures or equipment such as racks, frames, or cabinets.

It should be noted that although the universal mounting mechanism 500 of the present disclosure has been shown as being used on a piece of telecommunications equipment such as the optical fiber distribution element 510 (which has similar features to those elements 210 and 410 of FIGS. 30-47), the optical fiber distribution element 510 is simply one example of telecommunications equipment or chassis on which the mounting mechanism 500 may be used for mounting to equipment such as telecommunications racks, frames, or cabinets. For use with the universal mounting mechanism 500 of FIGS. 48-52, the element 510 has been adapted to receive certain portions of the mounting mechanism 500. However, it should be understood that the mounting mechanism 500 of the present disclosure includes features having inventive aspects in isolation and can be used on other types of optical fiber distribution elements as long as the elements or chassis thereof are adapted to receive portions of the mounting mechanism 500.

Still referring to FIGS. 48-52, the universal mounting mechanism 500 will now be described in further detail.

Figure 48:
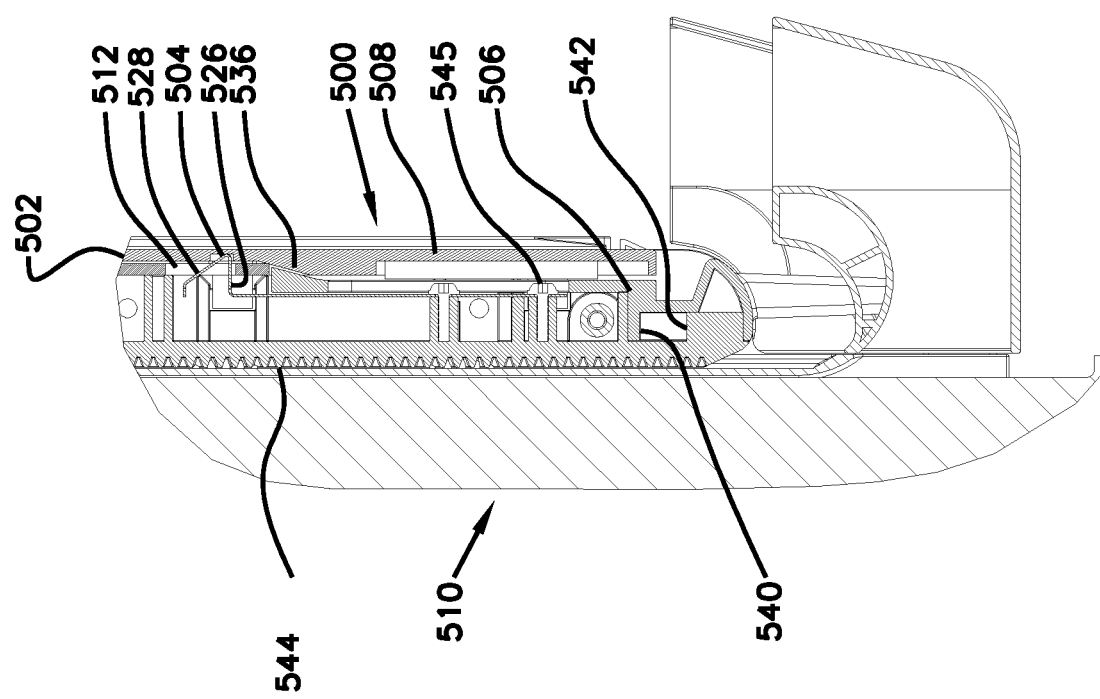
FIG. 48 shows a cross-sectional view of a portion of a universal mounting mechanism configured for mounting an optical fiber distribution element similar to those shown in FIGS. 30-47 of the present disclosure to a telecommunications rack, the mounting mechanism shown in a locked position.
Figure 49:
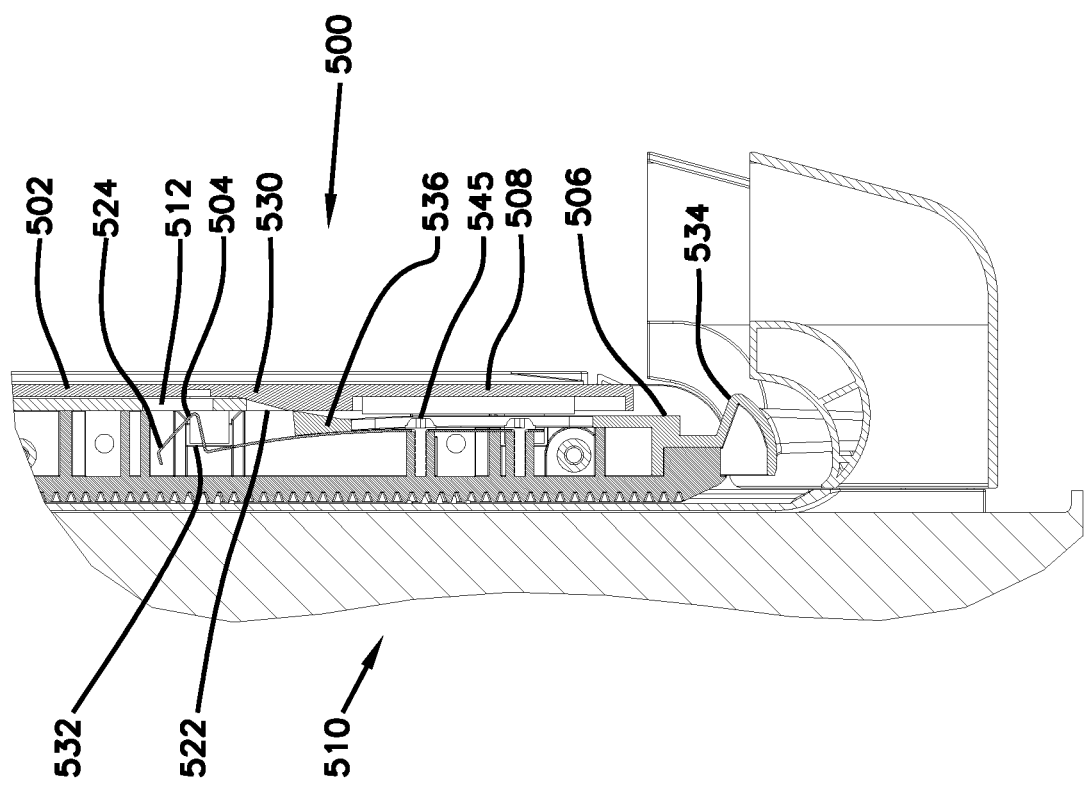
FIG. 49 illustrates the universal mounting mechanism of FIG. 48 in an unlocked position.
Figure 50:
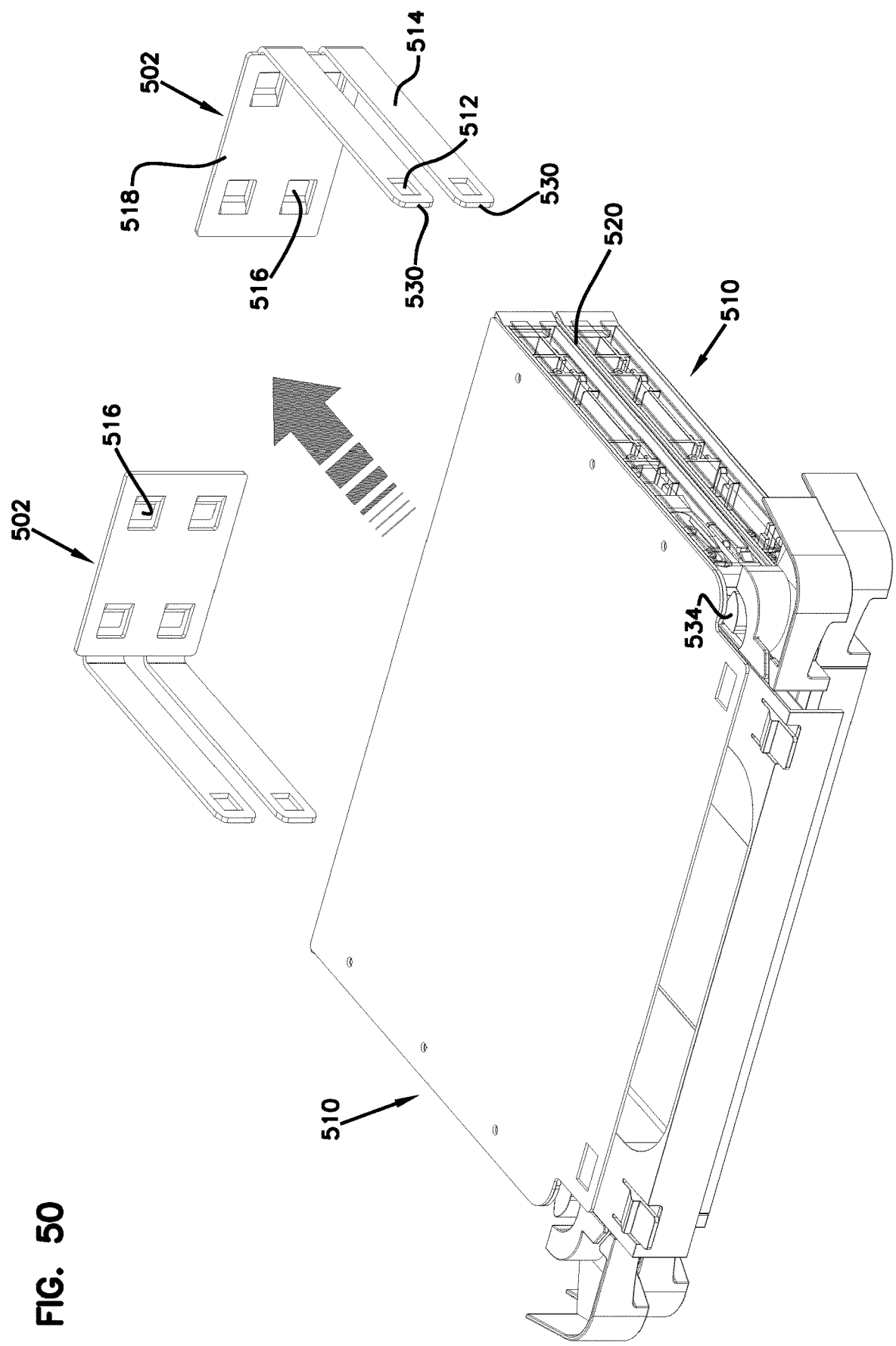
FIG. 50 illustrates a partially exploded perspective view of a portion of the universal mounting mechanism of FIGS. 48-49 being used on an optical fiber distribution element similar to the elements shown in FIGS. 30-47.
Figure 51:
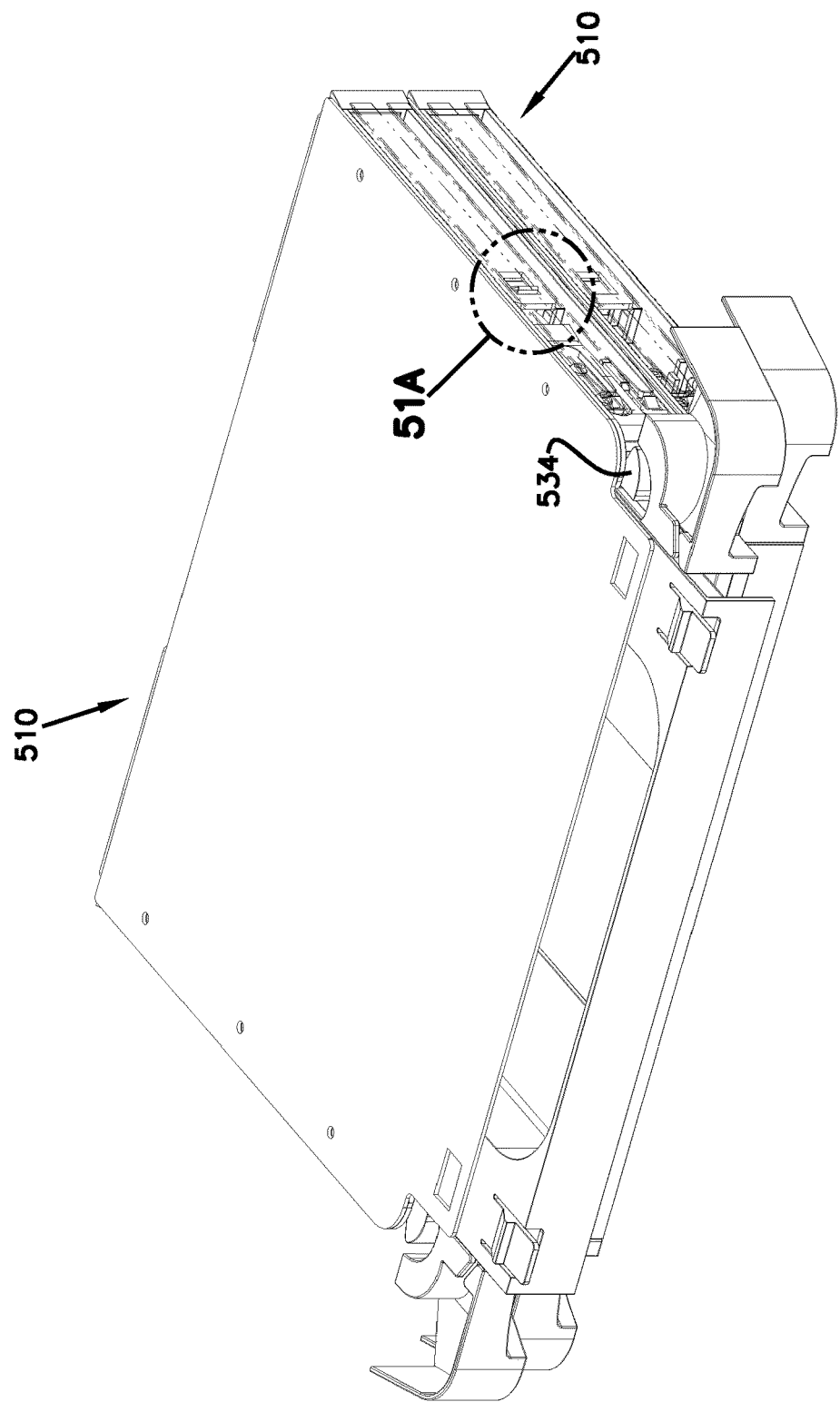
FIG. 51 illustrates the universal mounting mechanism of FIG. 50 with the universal mounting brackets of the mechanism mounted to the element of FIG. 50.
Figure 51A:
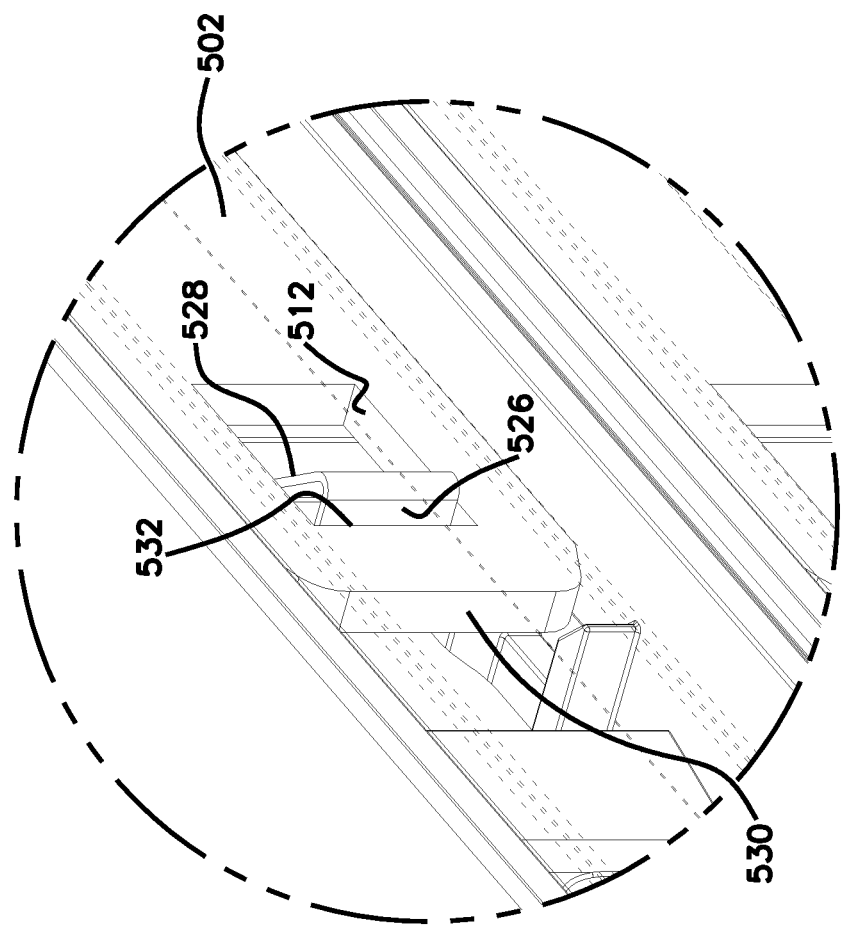
FIG. 51A is a close-up view of a portion of the universal mounting mechanism of FIG. 51, illustrating the locking spring in a locked position with respect to the universal mounting bracket.
Figure 52:
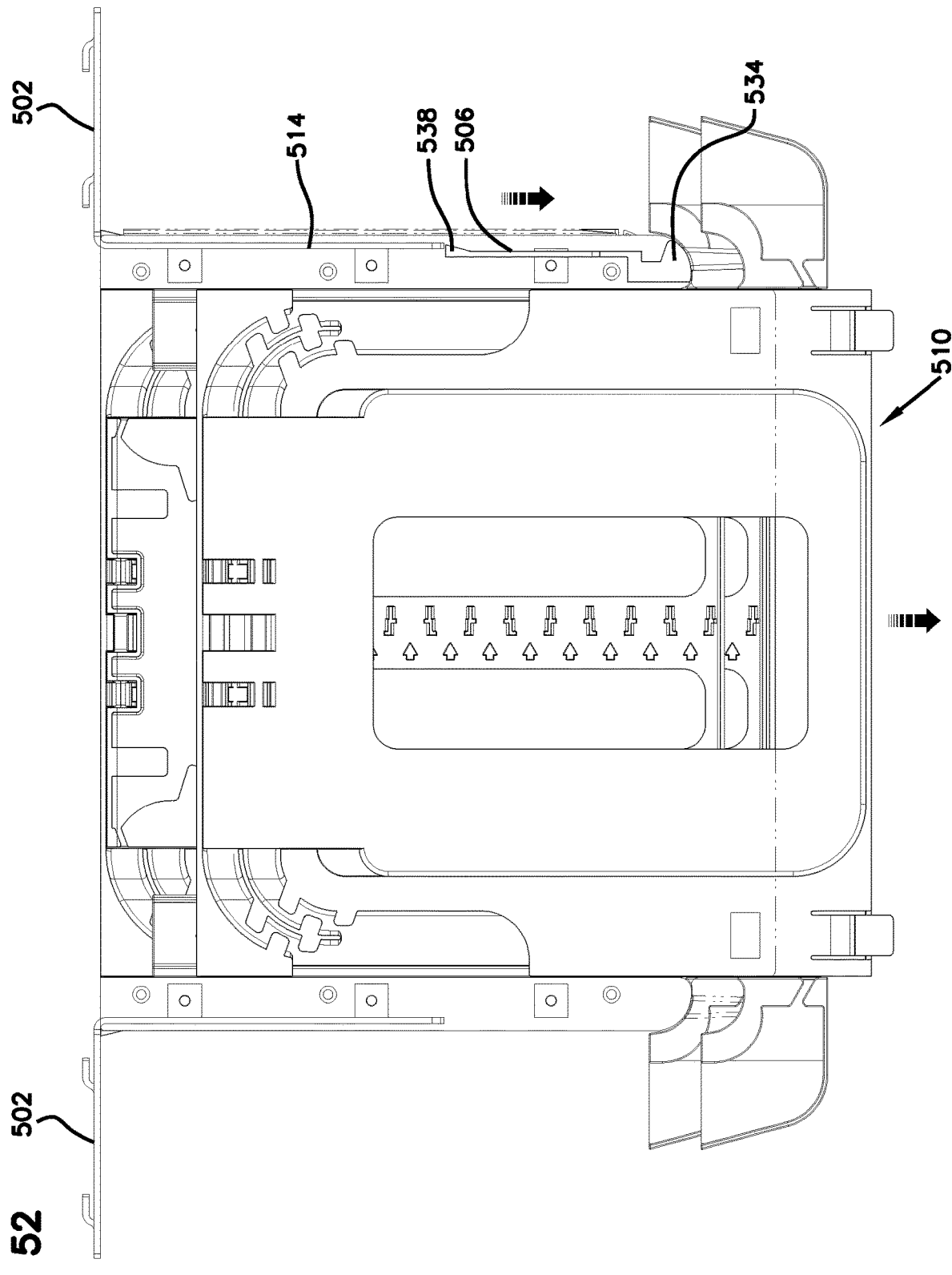
FIG. 52 is a cross-sectional view of a portion of the universal mounting mechanism of FIG. 48 showing the positional relationship between the universal mounting bracket and the release handle of the mounting mechanism when the mounting mechanism is in a locked state.

FIG. 48 shows a cross-sectional view of a portion of the universal mounting mechanism 500, wherein the mounting mechanism 500 is in a locked state or position. FIG. 49 illustrates the universal mounting mechanism 500 in an unlocked position. FIG. 50 illustrates a partially exploded perspective view of a portion of the universal mounting mechanism 500 being used with the optical fiber distribution element 510, which is similar to the elements 210, 410 shown in FIGS. 30-47, as noted above. FIG. 51 illustrates the universal mounting mechanism 500 with the universal mounting brackets 502 of the mechanism 500 mounted to the element 510. FIG. 51A is a close-up view of a portion of the universal mounting mechanism 500, illustrating a locking spring 504 of the mechanism 500 in a locked position with respect to the universal mounting bracket 502 of the mechanism 500. FIG. 52 is a cross-sectional view of a portion of the universal mounting mechanism 500 showing the positional relationship between the universal mounting bracket 502 and a release handle 506 of the mounting mechanism 500 when the mechanism 500 is in a locked state.

The universal mounting mechanism 500 generally includes the right and left universal mounting brackets 502, release handles 506 for each of the mounting brackets 502, a cover 508 for each of the mounting brackets 502, and the locking spring 504 for each of the mounting brackets 502.

In the depicted embodiment, each of the universal mounting brackets 502 is designed for mounting two stacked elements 510. Thus, each of the right and left mounting brackets 502 includes two latch openings 512 adjacent the front 514 of the mounting bracket 502 (one for each element 510) and upper and lower mounting tabs 516 at the rear 518 of the bracket 502.

In the given embodiment, the mounting tabs 516 at the rear 518 of the mounting brackets 502 are designed to slidably mount the brackets 502 to fixtures such as telecommunications racks along a sideway or lateral direction. As such, in mounting elements 510 to a rack, the universal mounting brackets 502 are initially slid into openings provided on the rack using the mounting tabs 516. Once the brackets 502 are secured on a rack, the elements 510 can be slid onto the brackets 502 in a sliding fashion, as will be described in further detail. The latch openings 512 of the brackets 502 are, then, used to lock the elements 510 in place.

In using the universal mounting mechanism 500 of the present disclosure, each element 510, on each of the right and left sides thereof, defines a bracket channel 520. The channel 520 is configured to slidably receive the front portions 514 of the mounting brackets 502. The cover 508 closes the bracket channel 520 to the exterior of each element 510. The cover 508 defines a deflection ramp 522 at the inner face thereof, the purpose of which will be discussed in further detail below. The locking spring 504 is mounted to each element 510 such that an end portion 524 of the locking spring 504 can flex in and out of the latch opening 512 of the universal mounting bracket 502. As shown in the cross-sectional views of FIGS. 48 and 49 and in FIGS. 51 and 51A, the end portion 524 of the locking spring 504 defines a perpendicular locking face 526 and an angular insertion face 528. When an element 510 is initially being slidably mounted on the mounting bracket 502, the angled insertion face 528 rides over the front end 530 of the front portion 514 of the mounting bracket 502 until the end portion 524 of the locking spring 504 flexibly snaps into the latch opening 512.

The element 510, at this point, is prevented from being pulled out forwardly. The locking spring 504 abuts an inner front face 532 defined by the latch opening 512 of the mounting bracket 502 to prevent removal of the chassis from a rack.

The release handle 506 is positioned between the locking spring 504 and the cover 508. The release handle 506 has a grip portion 534 for pulling the release handle 506 forwardly to release the chassis for removal from the mounting brackets 502. The release handle 506 also defines a deflection tab 536 at the rear end 538. The deflection tab 536 is configured to ride over the deflection ramp 522 of the cover 508 when the grip portion 534 is pulled forwardly. The interaction of the deflection tab 536 and the deflection ramp 522 causes lateral inward movement of the deflection tab 536, which in turn, pushes the spring 504 laterally inwardly, clearing the end portion 524 of the locking spring 504 from the latch opening 512. In this manner, when the release handle 506 is pulled forwardly, the interaction of the deflection tab 536 and the deflection ramp 522 causes the release of the spring 504, and thus the entire element 510, from the mounting bracket 502. The chassis and the entire element 510 can be pulled forwardly from the mounting bracket 502.

In using the universal mounting mechanism 500 on the element 510, a tray of the element 510 has to be pulled from its chassis to allow enough room for gripping the release handle 506 as seen in FIG. 52, to pull it forwardly. In initially mounting the element 510 to a rack using the universal mounting mechanism 500, the release handle 506 has to be either pushed rearwardly by the user to allow the spring 504 to be positioned in its locking position or the user can simply push a tray of the element 510 rearwardly to contact the grip portion 534 of the release handle 506 to push the release handle 506 rearwardly. Thus, when the element 510 is mounted to a rack using the universal mounting mechanism 500, the release handle 506 must be in its rearward position to allow the spring 504 to be in its locking position. Otherwise, if the release handle 506 is in its forward position, the element 510 can simply slide out of the brackets 502.

The release handle 506 defines a positive stop 540 that is configured to abut a stop face 542 defined by a portion of a slide mechanism 544 within the element 510. The abutment of the stop 540 with the stop face 542 prevents further forward pulling of the release handle 506.

The universal mounting mechanism 500 includes a design that may be retrofitted on a number of telecommunications chassis. As long as a bracket channel 520 is provided in the chassis and the chassis includes enough spacing on the sides thereof for receiving a locking spring 504, a release handle 506, and a cover 508 for interacting with the release handle 506 and closing the mounting mechanism 500 to the exterior of the chassis, the universal mounting mechanism 500 can be utilized on any given chassis.

Also, as noted above, the rear portion 518 of the mounting brackets 502 may be modified to fit different types of mounting configurations on different types of telecommunications racks, frames, or cabinets. The mounting arrangement of the brackets 502 of the present disclosure that utilizes the tabs 516 for lateral slide-locking is simply one example of a mounting arrangement. Also, even though the mounting mechanism 500 of the present disclosure has been shown with mounting brackets 502 that can accommodate two vertically stacked elements 510, the mounting brackets 502 can be modified to receive other number of chassis, including a single chassis per bracket 502.

In the given embodiment, the locking spring 504 is fixed to the chassis with fasteners 545, allowing the end portion 524 of the locking spring 504 to be flexible. Other fixing methods may be used for the locking spring 504 in other types of telecommunications equipment.

Since the universal mounting mechanism 500 is designed to allow an element such as element 510 to be installed and uninstalled on a telecommunications rack without the use of tools, it may be advantageous or important to provide means to disable unlocking or releasing of the universal mounting mechanism 500 after installation to avoid accidental removal or theft.

Figure 52A:
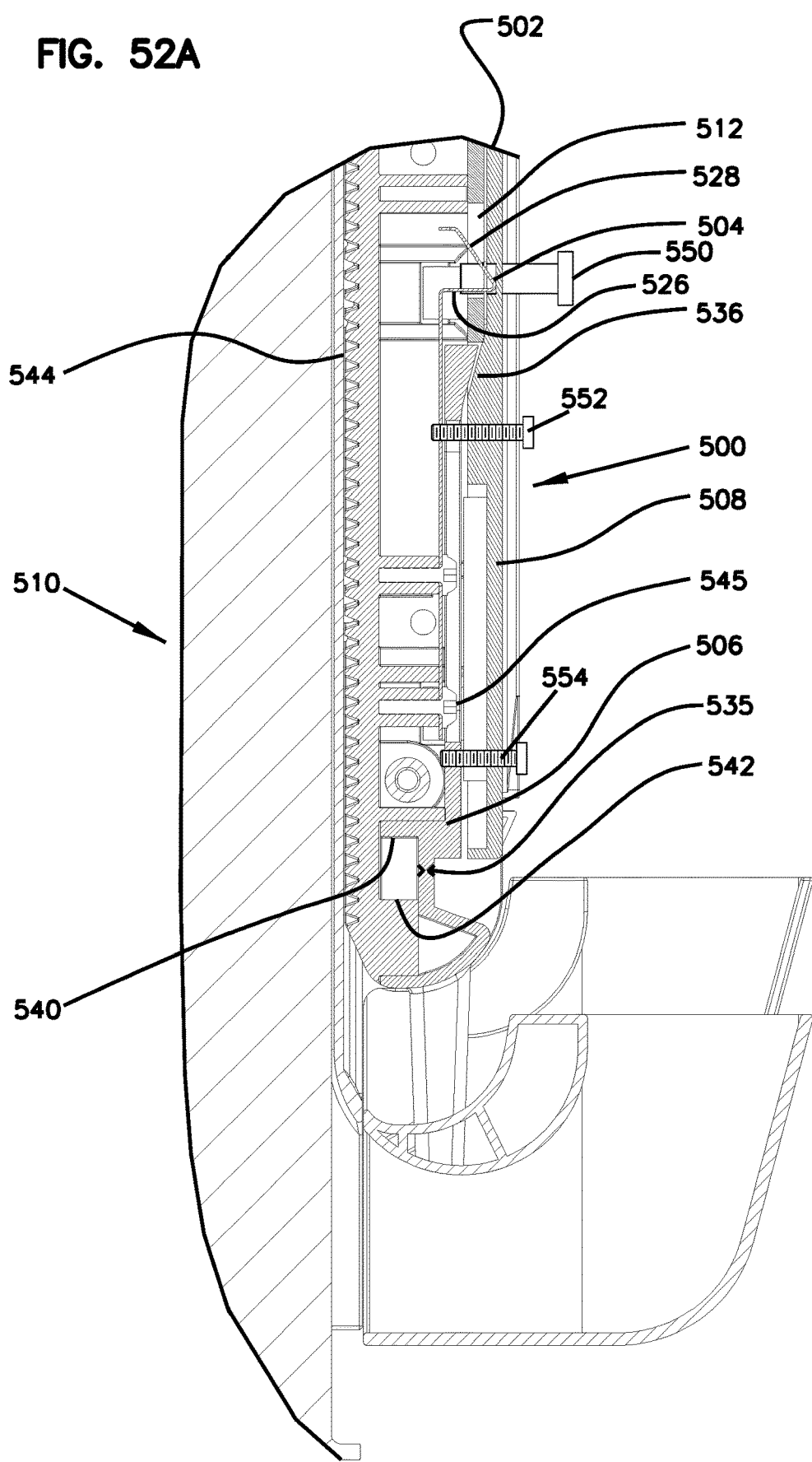
FIG. 52A illustrates the universal mounting mechanism of FIG. 52 with various anti-removal/anti-theft features represented diagrammatically.

Referring now to FIG. 52A, according to the inventive aspects of the present disclosure, a number of methods will be discussed for disabling the release of the universal mounting mechanism 500 to avoid accidental removal or theft.

According to the examples illustrated diagrammatically in FIG. 52A, one method may involve the use of a release handle 506 that is designed with a frangible or breakable portion 535 such that the release handle 506 can be made inoperable after final installation. As shown, the grip portion 534 of the release handle may be configured as forming a frangible or breakable part 535 so as to be removed from the rest of the release handle after final installation of the element 510 on a rack. In other embodiments, the release handle 506 may not necessarily include a designated breakable portion but may be configured or molded such that the grip portion 534 is simply broken off after installation.

Still referring to FIG. 52A, another method may involve the use of a blocking structure 550 that extends all the way from the cover 508 through the latch opening 512 and block the mounting bracket 502 from sliding with respect to the element 510. The blocking structure 550 may be a pin type structure or a fastener such as a screw.

It should be noted that the blocking structure 550 may be used to not only prevent relative sliding between the mounting bracket 502 and the element 510 but to also visually block from view the presence of the locking spring 524 from an exterior of the element 510. In this manner, only an installer will know that the mounting bracket 502 may normally be removed from the element 510 by flexing inwardly the spring 524 and clearing the locking face 526 from the latch opening 512. After installation is complete, the installer can install such a blocking structure 550 to not only prevent relative sliding movement between the mounting bracket 502 and the element 510 but to hide from view the presence of the spring 524 (which would otherwise allow removal of the element 510 from the mounting bracket 502 by inward flexing).

Another method that is contemplated by the present disclosure is the use of a fastener 552 such as a screw that does not necessarily act as a blocking structure by extending through the latch opening 512 to prevent relative sliding between the mounting bracket 502 and the element 510 but secures the locking spring 524 to the cover 508 to prevent inward flexing of the spring 524. Such a spring fastener 552 can be inserted through an opening molded on the cover 508 and thread through an opening provided on the locking spring 524. A similar concept that is also contemplated by the present disclosure involves the use of a fastener 554 to simply secure the otherwise slidable release handle 506 to a fixed portion of the element 510 such as the cover 508 after installation. Such a handle fastener 554 can extend through openings formed or molded in the cover 508 and the release handle 506 after final installation to prevent relative sliding.

It should be noted that a blocking structure 550 (physical/visual) or a fastener 552 (between cover 508 and spring 524) or 554 (between cover 508 and release handle 506) may be used in combination with a breakable release handle 506 (or a release handle 506 that has a frangible portion 535) to provide dual anti-theft protection.

Figure 53:
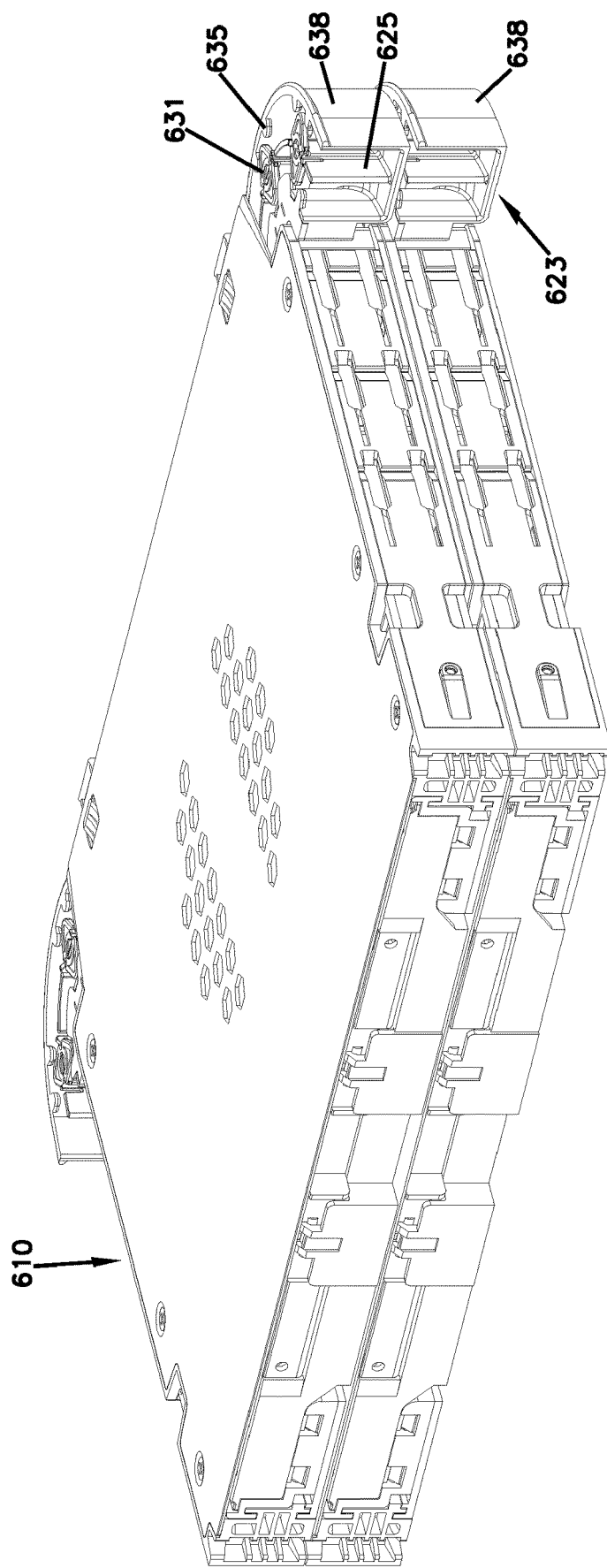
FIG. 53 shows a pair of elements in a stacked configuration, the elements shown with another alternative radius limiter on the slide mechanism.
Figure 54:
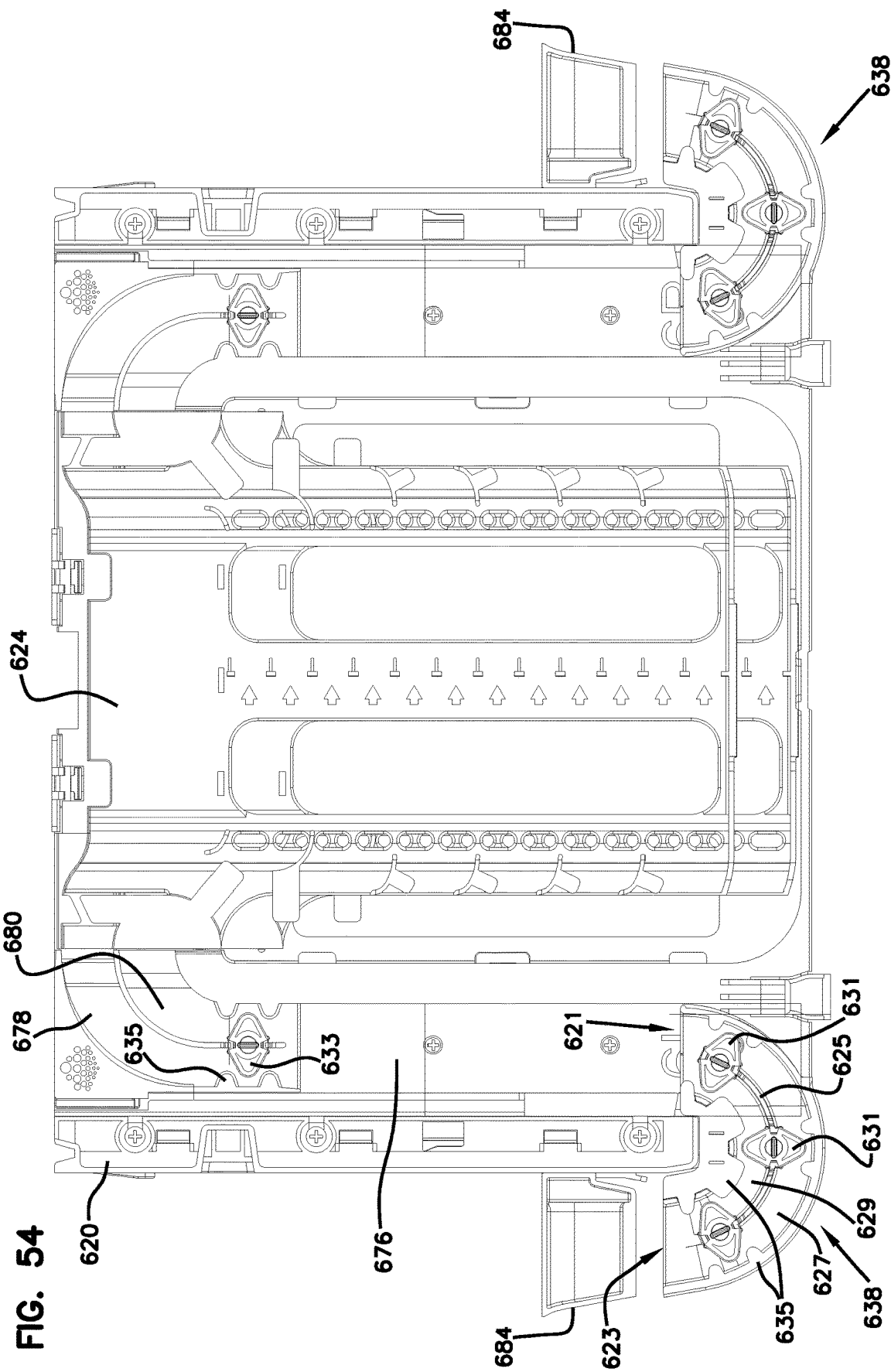
FIG. 54 is a top view of one of the elements of FIG. 50 illustrating the alternative radius limiter.

Referring now to FIGS. 53 and 54, an alternative radius limiter 638 is shown on the slide mechanisms of alternative elements 610. Elements 610 are generally similar in construction and function to those of the elements discussed previously. Radius limiter 638 defines a generally U-shaped configuration that leads cables from and to the element 610 while preserving minimum bend radius requirements.

The U-shaped radius limiter 638 defines an inner end 621 and an outer end 623 and a divider 625 extending from adjacent the inner end 621 to adjacent the outer end 623. The outer end 623 of the radius limiter 638 cooperates with a cable guide 684 that is mounted to the chassis 620 of the element 610 for leading cables to and from the tray 624 of the element 610.

The divider 625 of the radius limiter 638 forms two separate troughs 627, 629 for the radius limiter 638. The two troughs 627, 629 isolate and separate the cables (e.g., coming in and going out) of the element 610 into two distinct paths. According to one example cable routing configuration, the two troughs 627, 629 may guide the cables to the upper and lower levels 678, 680 defined toward the rear of the tray 624 while maintaining the S-shaped pathway 676 created within the element 610. The divider 625 of the radius limiter 638 includes a plurality of cable management tabs 631 mounted thereon for retaining the cables within the troughs 627, 629. A similar tab 633 is also found at the rear of the tray 624 for retaining the cables that are being lead to the upper and lower levels 678, 680. The tabs 631 and 633 may be removable, snap-on structures.

The tabs 631 and 633 cooperate with additional cable management fingers 635 defined both on the radius limiter 638 and toward the rear of the tray 624 in retaining the cables within the S-shaped pathway 676.

Referring now to FIGS. 55-61, a mounting system 700 for fixedly stacking two or more telecommunications elements in a vertical column or stack is illustrated. In FIGS. 55-61, the mounting system 700 of the present disclosure is illustrated as being used to stack elements having features similar to those elements 610 shown in FIGS. 53-54.

It should be noted that although the mounting system 700 of the present disclosure has been shown as being used on a piece of telecommunications equipment such as the optical fiber distribution element 610 (which has similar features to those elements 10, 210, 410, and 510 of FIGS. 1-52), the optical fiber distribution element 610 is simply one example of telecommunications equipment on which the mounting system 700 may be used for fixedly stacking such elements for further mounting to equipment such as telecommunications racks, frames, or cabinets. As will be discussed in further detail below, the element 610 has been configured specifically to incorporate certain aspects of the mounting system 700. However, it should be understood that the mounting system 700 of the present disclosure includes features having inventive aspects in isolation and can be used on other types of optical fiber distribution elements as long as the elements or chassis thereof are adapted to incorporate aspects of the mounting system 700. According to certain embodiments of the disclosure, the mounting system 700 of the present disclosure may be used as a retro-fit solution on pre-existing telecommunications equipment by modifying certain aspects of the preexisting equipment to incorporate features of the system 700, as will be apparent from the following description.

Figure 60:
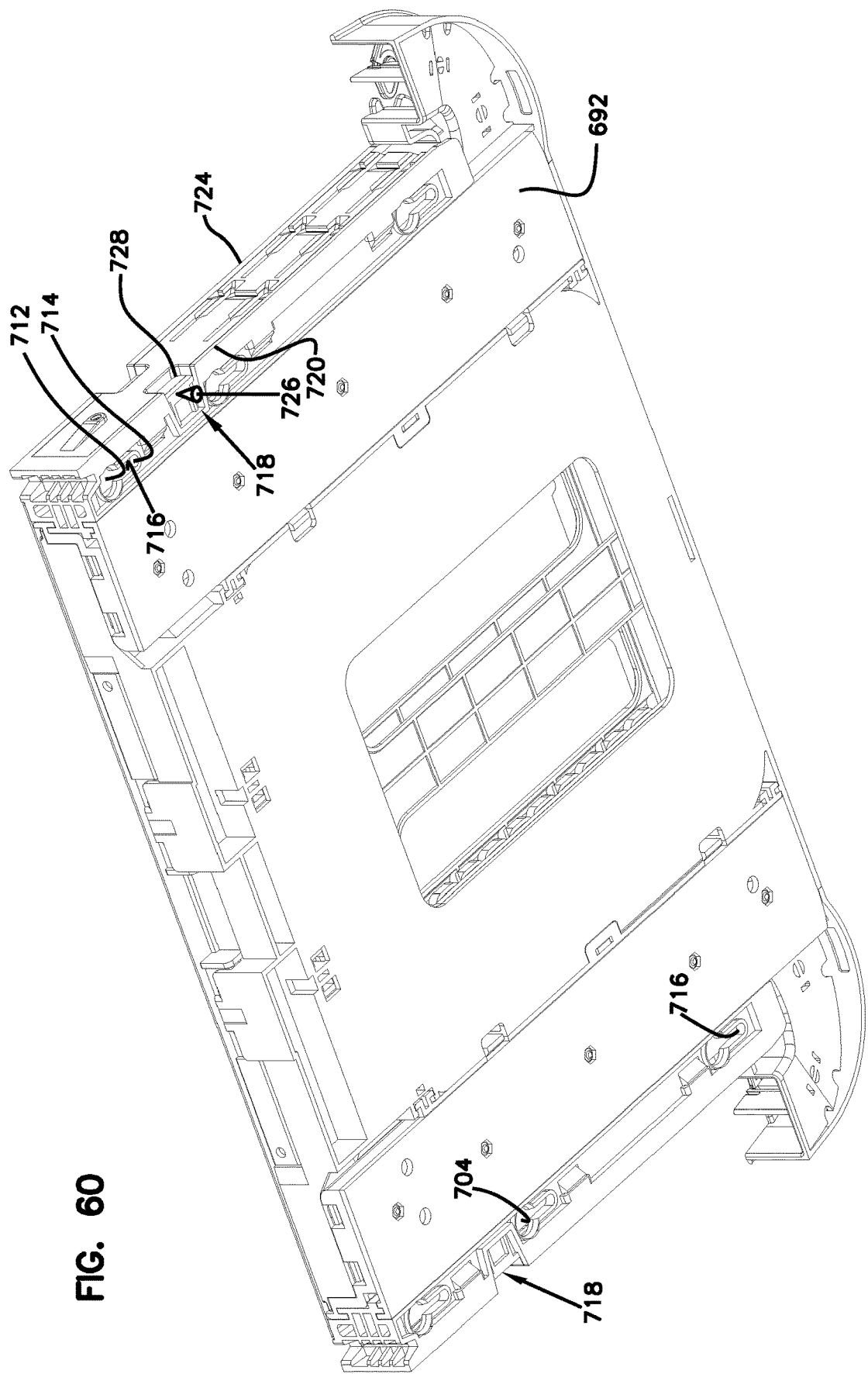
FIG. 60 is a bottom perspective view of one of the telecommunications distribution elements of FIGS. 55-59, illustrating the slots of the mounting system.

Still referring to FIGS. 55-61, the mounting system 700 will now be described in further detail. FIGS. 55-59 illustrate the steps for stacking two of the elements 610 in a vertical stack or column using the mounting system 700 of the present disclosure. FIG. 60 is a bottom perspective view of one of the elements 610 of FIGS. 55-59 and FIG. 61 is a bottom plan view of the element 610 of FIG. 60.

According to an example embodiment, the mounting system 700 includes a first locking feature 701 in the form of at least one stud 702 (e.g., a plurality of studs 702 as depicted) that is provided at a top surface 690 of an element 610 and a second locking feature 703 in the form of at least one slot 704 (e.g., a plurality of slots 704 as depicted) that is provided at a bottom surface 692 of an element 610. According to an example embodiment, to improve manufacturing efficiency and standardization, an element 610 may include both the studs 702 at its top surface 690 and the slots 704 at its bottom surface 692. Thus, when stacking similarly configured elements 610, the studs 702 that are located at the top surface 690 of an element 610 can cooperate with the slots 704 that are located at the bottom surface 692 of an adjacent element that is to be stacked vertically with the first element 610.

In addition to the studs 702 and slots 704 which cooperate to partially fix the elements 610 together, the mounting system 700 of the present invention also includes a third locking feature 705 in the form of a removably mounted slide lock 706. As will be described in further detail below, the slide lock 706 is configured to prevent two stacked elements 610 from relatively sliding along the horizontal direction so as to prevent removal of the studs 702 from the slots 704, and, thus, separation of the two elements 610.

Figure 61:
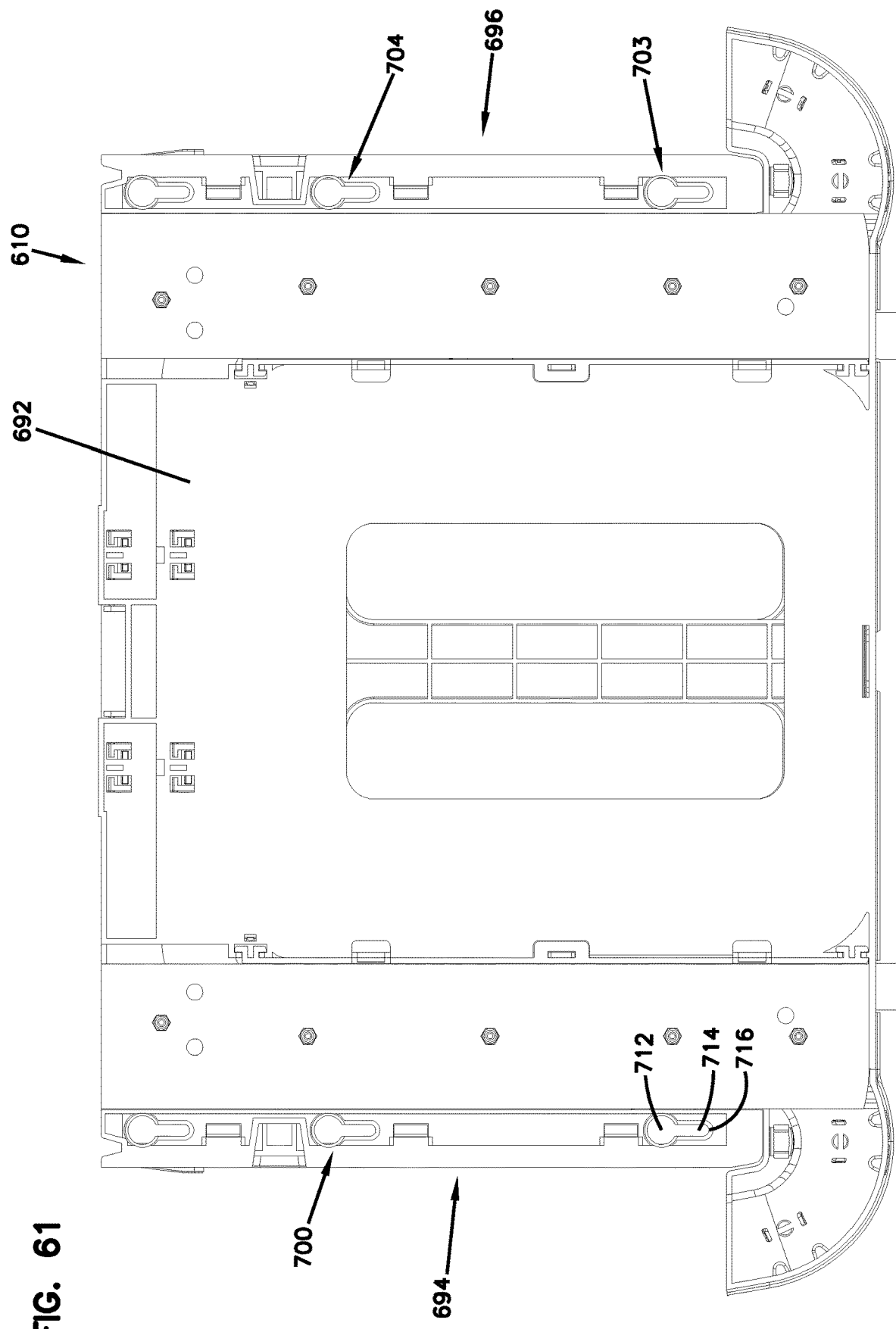
FIG. 61 is a bottom plan view of the telecommunications distribution element of FIG. 60.

Still referring to FIGS. 55-61, in the depicted embodiment, the studs 702 are located along both the right side 694 and the left side 696 of the element 610. Similarly, as shown in FIGS. 60 and 61, the slots 704 are also positioned on the right and left sides 694, 696 of the element 610 so as to align and cooperate with the studs 702 of an adjacent element 610 for using the mounting system 700.

Each stud 702 includes a stem portion 708 and a flange portion 710. Each slot 704 includes a receiver portion 712 and a retention portion 714. The receiver portion 712 is sized to accommodate the flange portion 710 of the stud 702. Once the flange portion 710 of a stud 702 has been inserted through the receiver portion 712 of a slot 704, the stem portion 708 of the stud 702 slides through the retention portion 714 until the flange portion 710 of the stud 702 is positioned above the retention portion 714. Further advancement of a stud 702 within a slot 704 is prevented due to the abutment of the stem portion 708 of the stud 702 with an end 716 of the retention portion 714 of the slot 704 that acts as a positive stop.

In this manner, once the flange portion 710 of a stud 702 has been positioned above the retention portion 714 of a slot 704, the stud 702 cannot be separated from the slot 704 along a direction perpendicular to the sliding direction.

Figure 55:
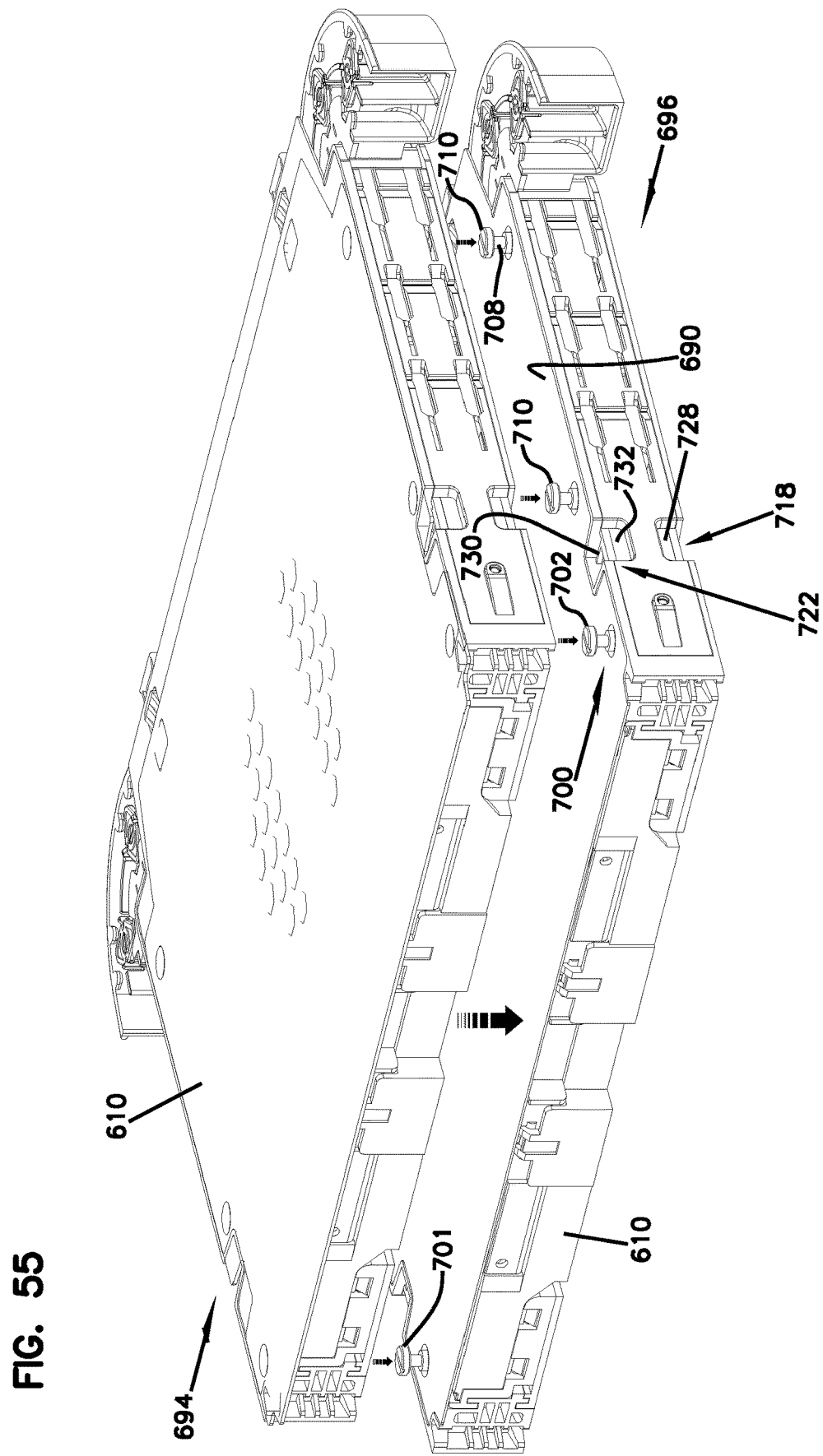
FIGS. 55-59 illustrate the steps for stacking two telecommunications distribution elements in a vertical stack or column using the mounting system of the present disclosure.
Figure 56:
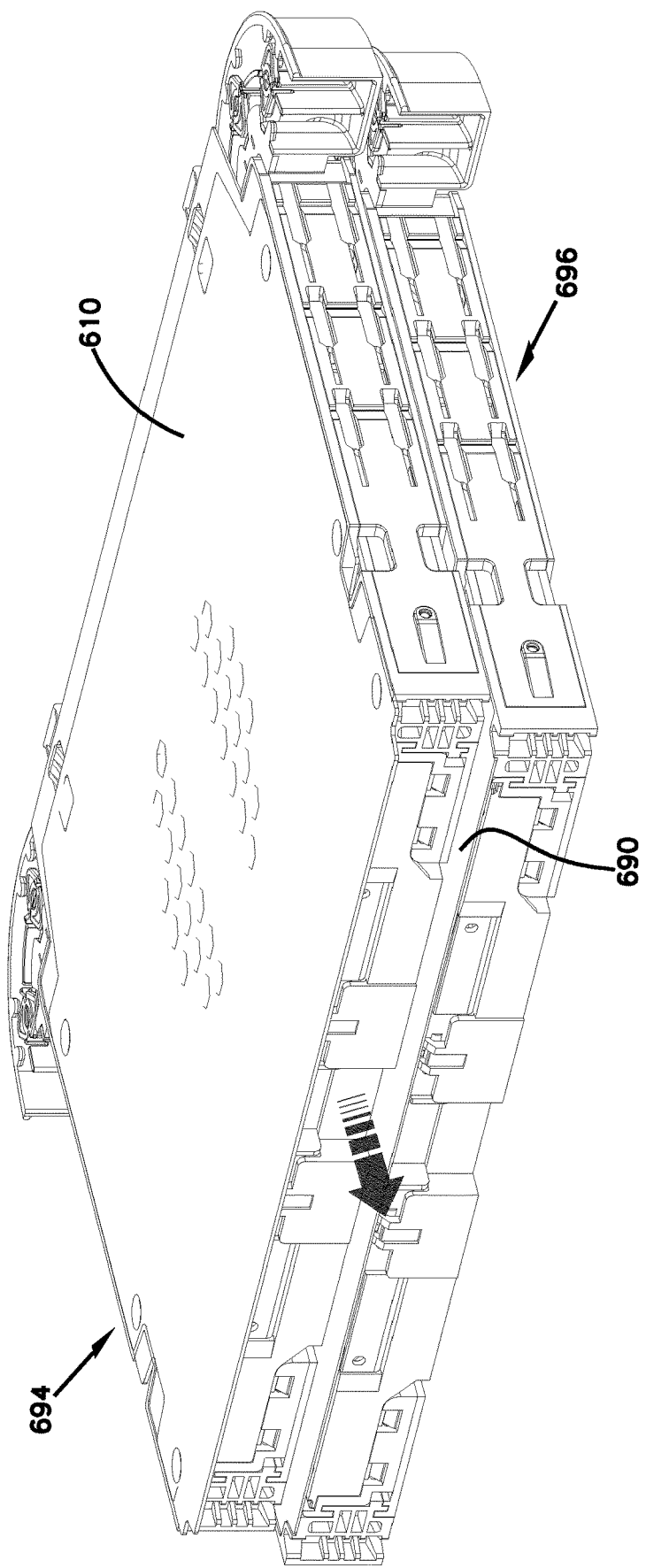
Figure 57:
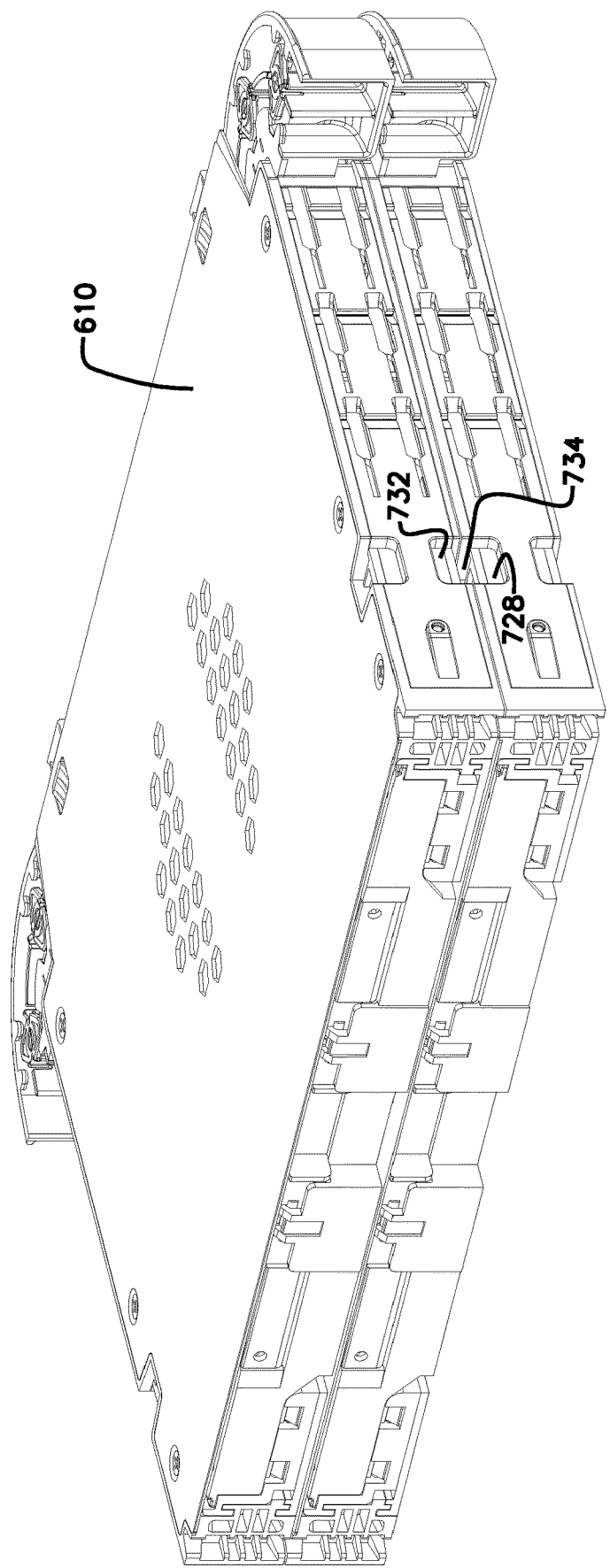
Figure 58:
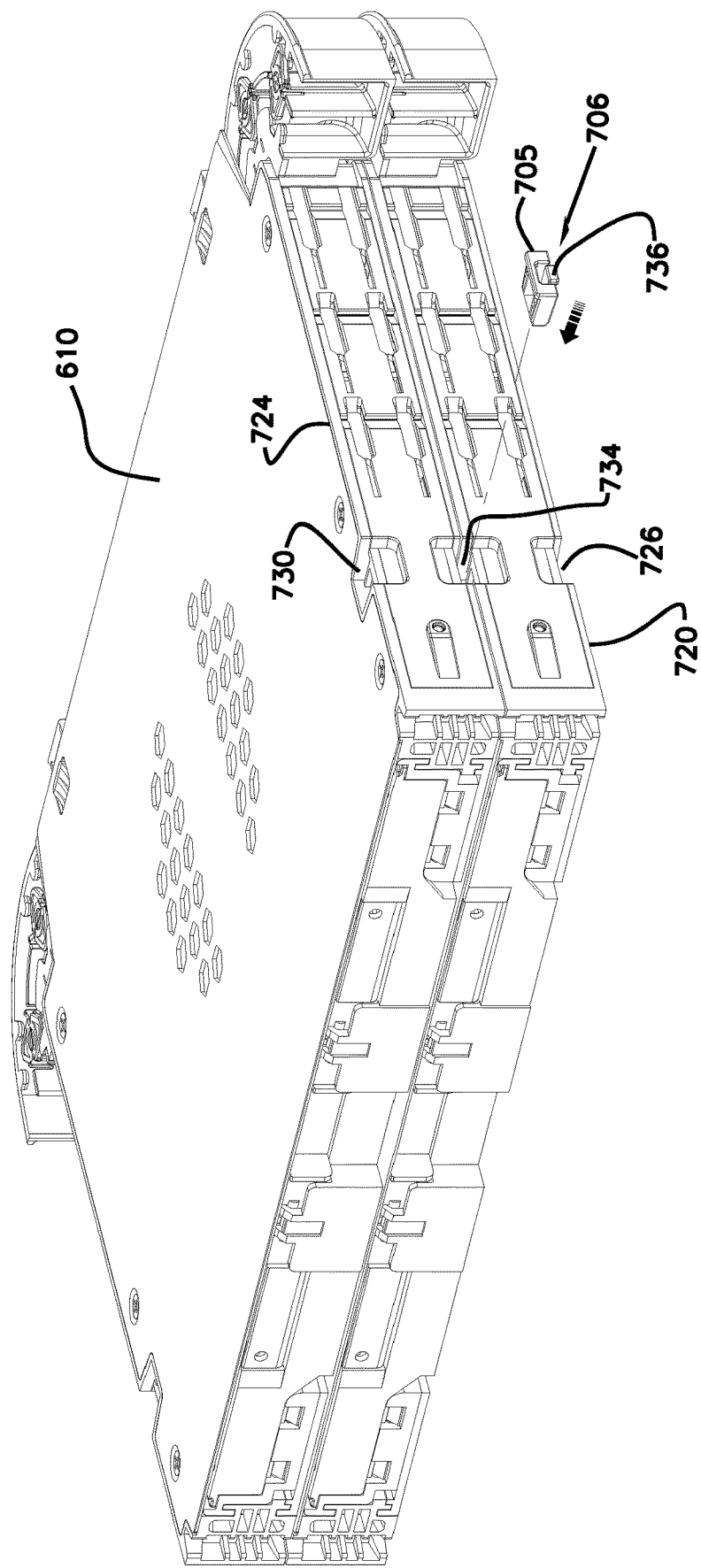
Figure 59:
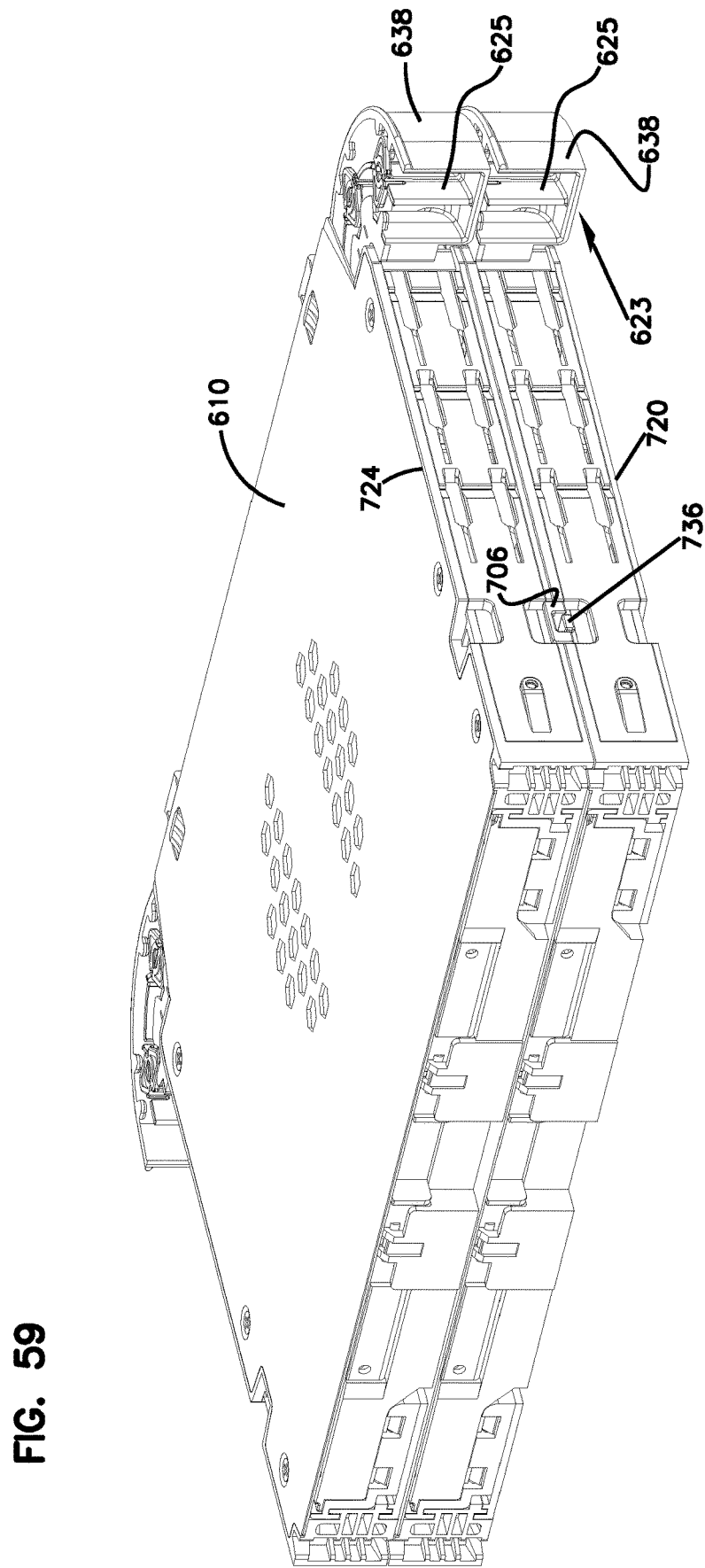

As shown in FIG. 55, when stacking two elements 610 together, the elements 610 are initially aligned to position the flange portions 710 of the studs 702 of a bottom element 610 with the receiver portions 712 of the slots 704 of an upper element 610. As shown in FIGS. 56 and 57, after the elements 610 are brought together, the elements 610 are slid with respect to each other. In the depicted embodiment, the upper element 610 is slid rearwardly with respect to the bottom element 610. This movement results in the stem portions 708 of the studs 702 sliding through the retention portions 714 of the slots 704 and bringing the flange portions 710 of the studs 702 over the retention portions 714 of the slots 704. When the stem portion 708 finally abuts the positive stop defined by the end 716 of the slot 704 and the relative sliding of the elements 610 is completed, separation in the vertical direction is prevented. Separation of the two elements 610, at this point, requires a reversal of the steps used in fixing the two elements 610. For separation, the stem portions 708 of the studs 702 have to be slid through the retention portions 714 of the slots 704 until the flange portions 710 are aligned with the receiver portions 712 of the slots 704. And, at that point, the two elements 610 can be separated from each other along a vertical direction perpendicular to the sliding direction.

Since separation of the two elements 610, after they have been fixed via the studs 702 and the slots 704, requires reverse relative horizontal movement between the elements 610, the mounting system 700 of the present disclosure further includes the slide lock 706 noted above and shown in FIGS. 58 and 59. The slide lock 706 is configured to prevent two stacked elements 610 from sliding along the horizontal direction with respect to each other such that the studs 702 cannot be removed from the slots 704.

As shown in FIG. 60, each element 610 has been provided with specific features to utilize the slide lock 706. In the example shown in FIG. 60, each element 610 defines a cutout 718 at a lower side edge 720 thereof (i.e., lower cutout 718) at both the right and left sides 694, 696 of the element 610 and a cutout 722 at an upper side edge 724 thereof (i.e., upper cutout 722) at both the right and left sides 694, 696 of the element 610. The upper cutouts 722 are configured to align with and cooperate with the lower cutouts 718 when two elements 610 are stacked in order to use the slide lock 706 to prevent separation of the elements 610. Again, as noted above, each element 610 may be provided with both an upper cutout 722 and a lower cutout 718 for manufacturing efficiency and standardization of the parts.

It should be noted that although the depicted example of the mounting system 700 utilizes a slide lock 706 on both the right and left sides 694, 696 of an element stack, a slide lock 706 can be used on a single side of the stack if desired. Also, it should be noted that although the depicted example of the mounting system 700 utilizes a single slide lock 706 on each of the right and left sides 694, 696 of an element stack, more slide locks 706 can be used if desired.

Referring specifically now to a lower cutout 718 of an element 610, the cutout 718 defines both a bottom notch 726 and a side notch 728. The upper cutout 722 defines both a top notch 730 and a side notch 732. The cutouts 718, 722 are configured such that when the lower cutout 718 of an upper element 610 aligns with the upper cutout 722 of a lower element 610, an opening 734 is created between the two elements 610. The opening 734 is created by the alignment of the bottom notch 726 of a lower cutout 718 and the top notch 730 of an upper cutout 722.

The slide lock 706 is inserted into the opening 734 and prevents any horizontal movement between two stacked elements 610. The slide lock 706, according to the depicted embodiment, is a removable snap-fit structure that includes a flexible cantilever tab 736. The flexible cantilever tab 736 provides a frictional fit against the top and bottom notches 730, 726 of the upper and lower cutouts 722, 718, respectively, and can be flexed back toward the center of the slide lock 706 in removing the slide lock 706.

The side notches 732, 728 of the upper and lower cutouts 722, 718 also align when the elements 610 are moved into position. The side notches 732, 728 accommodate a user's fingers for accessing the slide lock 706 for either insertion or removal.

Thus, the mounting system 700 of the present disclosure provides a quick-attach solution that can be used in stacking elements 610 in a column for further mounting to equipment such as telecommunications racks, frames, or cabinets. The mounting system 700 of the present disclosure provides an unobtrusive attachment solution that can be incorporated in a variety of telecommunications distribution element designs. The mounting system 700 of the present disclosure may be used as a retro-fit solution on pre-existing telecommunications equipment with slight modification to certain aspects of the preexisting equipment to incorporate features of the system.

The mounting system 700 may be used to mount or stack two or more elements (such as the optical fiber distribution elements 610) that have similar configurations.

The mounting system 700 may also be used to mount or stack dissimilar equipment together if those pieces of equipment include features of the system 700 that allow them to intermate. For example, elements including equipment other than optical distribution features may be mounted to optical distribution elements such as elements 610 using the system 700 of the present disclosure as long as those equipment are configured with features of the system 700 that allow them to intermate with the features of equipment such as elements 610.

The mounting or stacking system 700 of the present disclosure may be used in instances where a single element includes features for mounting that element to a telecommunications rack, frame, or cabinet and other elements may be stacked with respect to that element using the system 700. For example, as shown in the example version of the element 510 in FIGS. 48-52, an element or chassis may include a universal quick-connect mounting mechanism similar to mechanism 500 of FIGS. 48-52 including universal mounting brackets 502 for releasably mounting that element or chassis to a telecommunications fixture, such as an optical fiber distribution rack. Using the stacking system 700 of the present disclosure, only one of the elements that are to be mounted to a separate fixture such as a rack would need to have the structure for utilizing a mechanism such as the universal mounting mechanism 500. The rest of the elements could be stacked with respect to that element by using the mounting or stacking system 700 of the present disclosure that relatively fixes the elements and prevents relative sliding between the elements and relative separation between the elements in a direction generally perpendicular to the direction of the relative sliding.

The element utilizing the mounting features (such as the universal quick-connect mechanism 500 shown in FIGS. 48-52) for mounting to a separate telecommunications fixture may be located at the top of the stack, at the bottom of the stack, or in the middle of the stack using the features of the stacking system 700 of the present disclosure.

In using a mounting system such as the universal quick-connect mechanism 500 as shown in FIGS. 48-52, since the tray of an element has to be pulled from its chassis to allow enough room for gripping the grip portion 534 of the release handle 506, as seen in FIG. 52, to pull the tray forwardly, it might be useful for a technician to know from an exterior of an element whether that element is one that includes the quick-connect mechanism 500.

Figure 81:
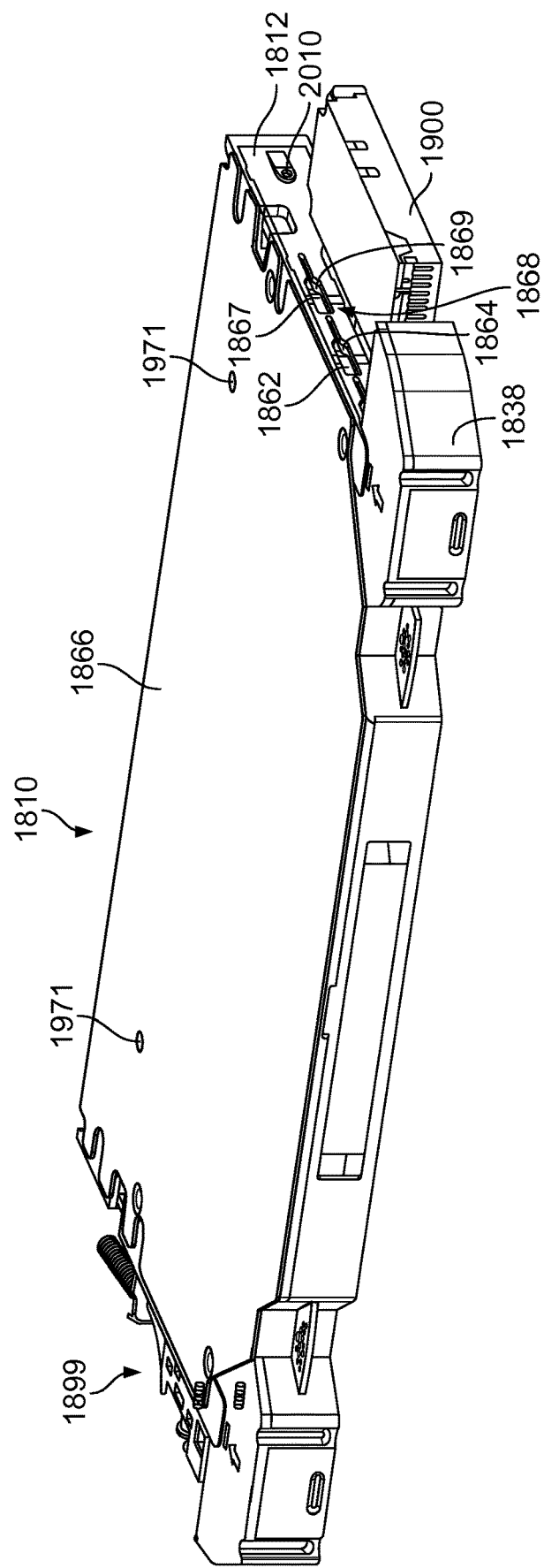
FIGS. 81-82 illustrate the element of FIG. 80 with a piece of telecommunications equipment in the form of a fiber optic splitter mounted to an exterior of the tray of the element.
Figure 82:
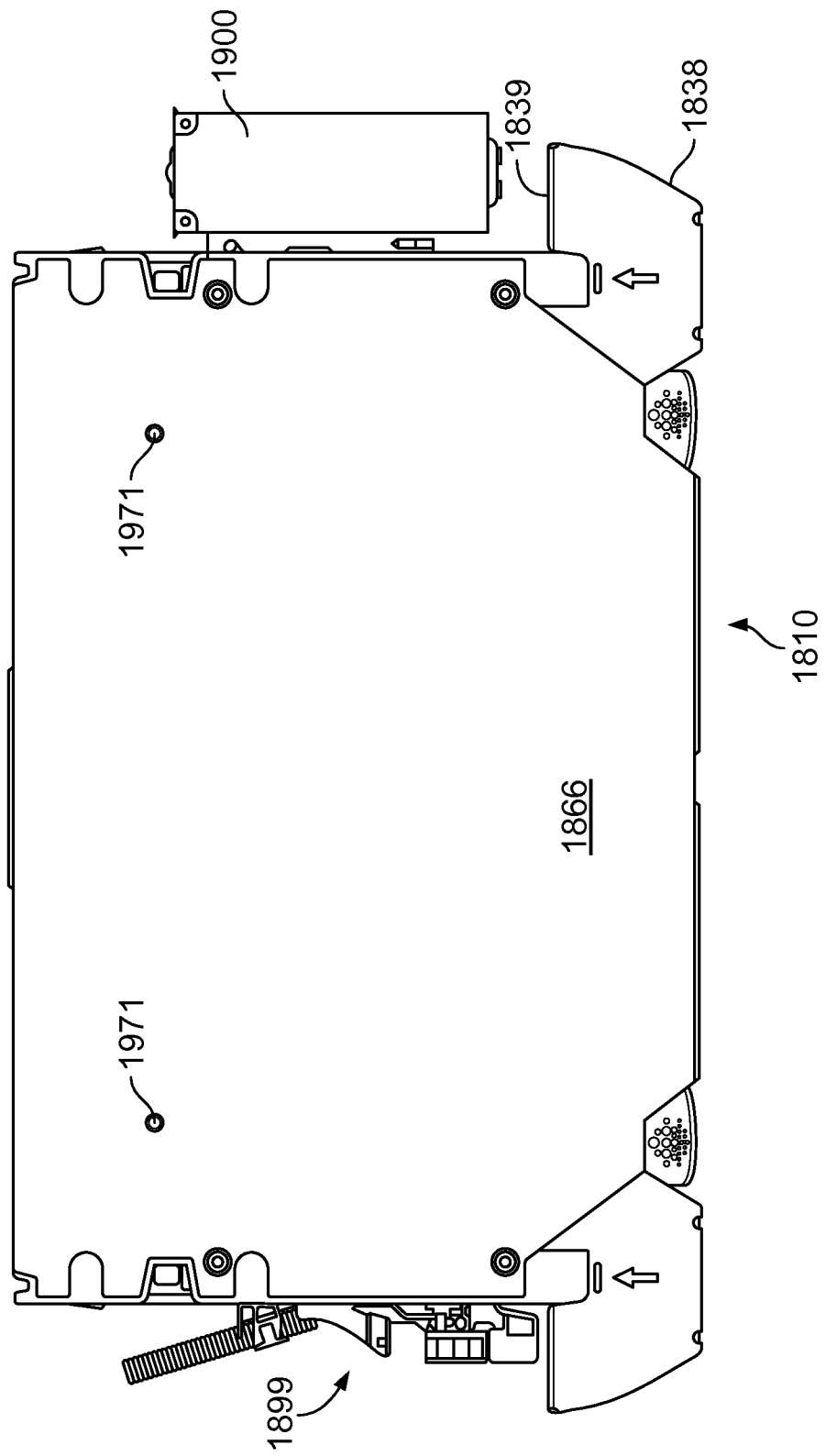
Figure 92:
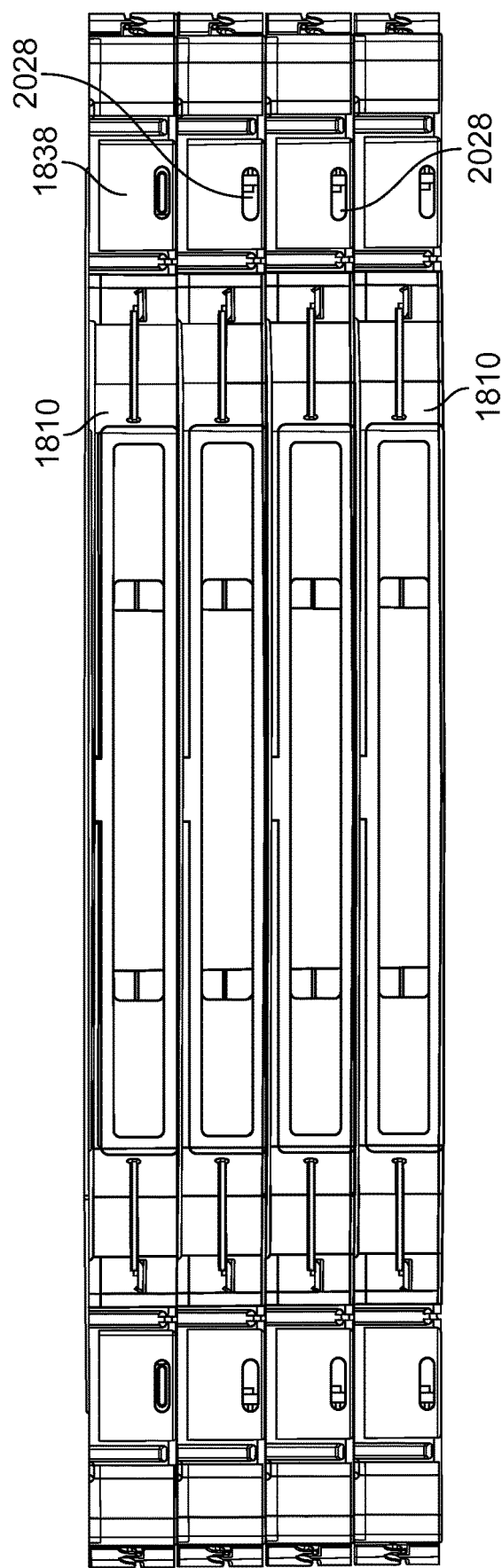
FIG. 92 illustrates a stack of elements similar to those shown in FIGS. 80-82 and 89-91, wherein the U-shaped radius limiters of the elements include openings allowing a user to see portions of a universal mounting mechanism such as that of FIGS. 48-52 if the elements are equipped with such a mounting mechanism.
Figure 93:
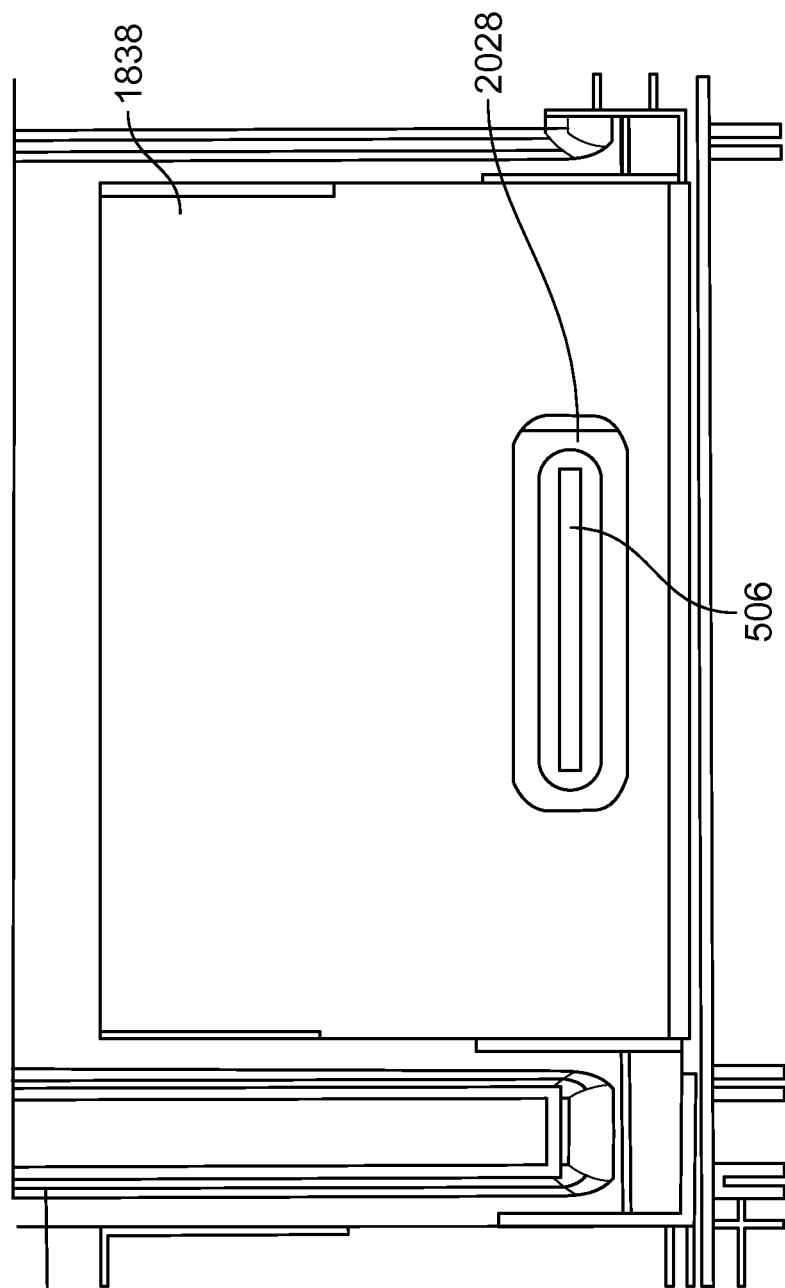
FIG. 93 illustrates a close-up view of the front face of a U-shaped radius limiter showing the opening.

For this reason, as illustrated in the examples of elements 1810 shown in FIGS. 81 and 82 and elements similar to elements 1810 shown in FIGS. 92 and 93, the U-shaped radius limiters 1838 on these elements 1810 may define at least one opening 2028 (two openings in the depicted version) at a front face thereof for allowing a user to see whether an element includes mounting features such as the universal quick-connect system 500 from an exterior of the element. In the version of the elements 1810 shown in FIGS. 81, 82, 92, and 93, at least a portion of the release handle 506 is visible from an exterior of the element via the openings 2028 even when the element is in a fully-closed position. In FIG. 92, only the top element 1810 in the stack of elements is illustrated as having a quick-connect mechanism 500. A portion of the release handle 506 is visible through the opening 2028 only on the top element 1810. FIG. 93 illustrates a close-up view of the front face of the U-shaped radius limiter 1838 showing the opening 2028.

Referring now to FIGS. 62-65, another embodiment of a mounting system 900 for fixedly stacking two or more telecommunications elements in a vertical column or stack is illustrated. In FIGS. 62-65, the mounting system 900 of the present disclosure is illustrated as being used to stack elements 810 having features similar to those elements 610 shown in FIGS. 53-61.

It should be noted that although the mounting system 900 of the present disclosure has been shown as being used on a piece of telecommunications equipment such as the optical fiber distribution element 810 (which has similar features to those elements 10, 210, 410, 510, and 610 of FIGS. 1-61), the optical fiber distribution element 810 is simply one example of telecommunications equipment on which the mounting system 900 may be used for fixedly stacking such elements for further mounting to equipment such as telecommunications racks, frames, or cabinets. As will be discussed in further detail below, the element 810 has been configured specifically to incorporate certain aspects of the mounting system 900. However, it should be understood that the mounting system 900 of the present disclosure includes features having inventive aspects in isolation and can be used on other types of optical fiber distribution elements as long as the elements or chassis thereof are adapted to incorporate aspects of the mounting system 900. According to certain embodiments of the disclosure, the mounting system 900 of the present disclosure may be used as a retro-fit solution on pre-existing telecommunications equipment by modifying certain aspects of the preexisting equipment to incorporate features of the system 900, as will be apparent from the following description.

Figure 64:
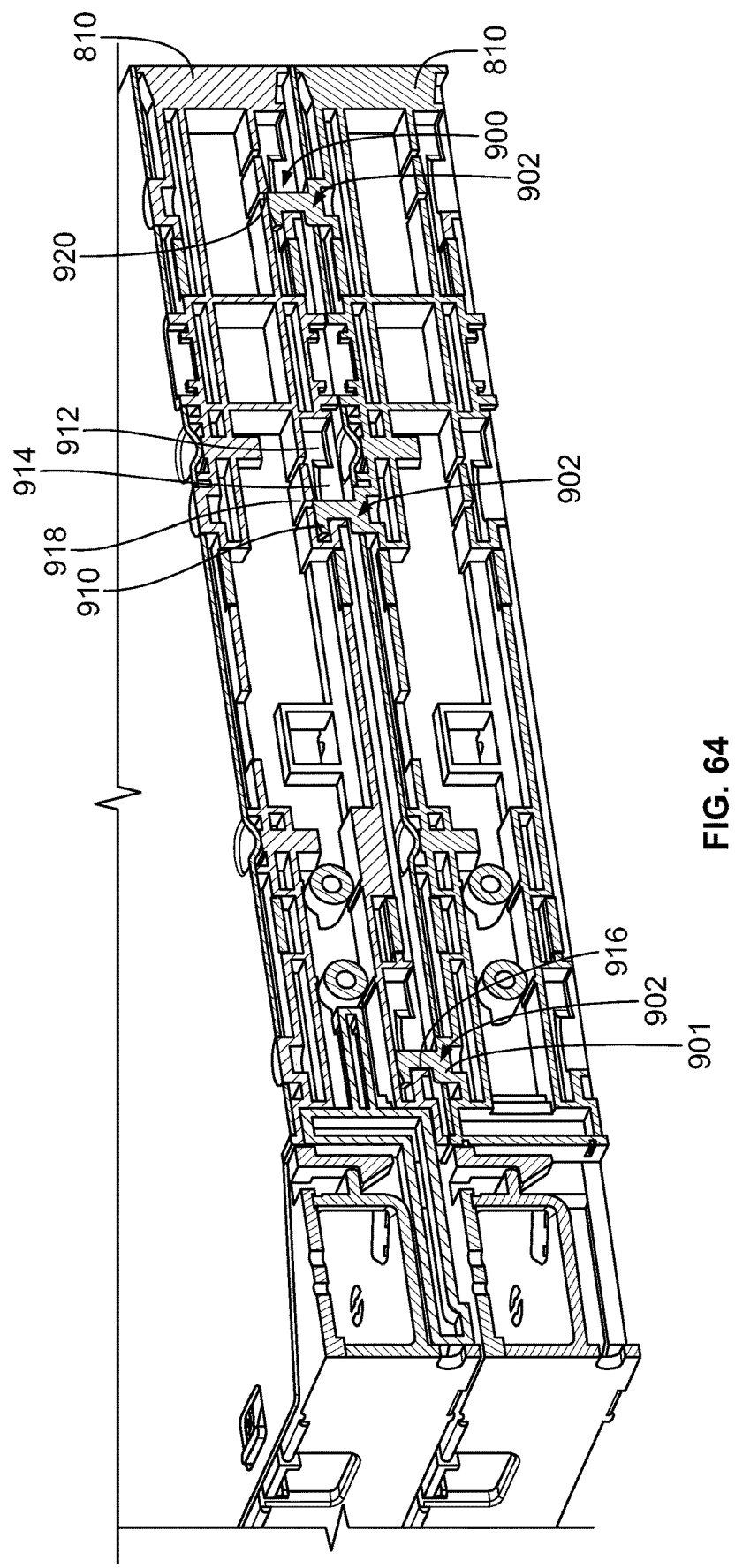
FIG. 64 is a cross-section taken along line 64-64 of FIG. 63.
Figure 65:
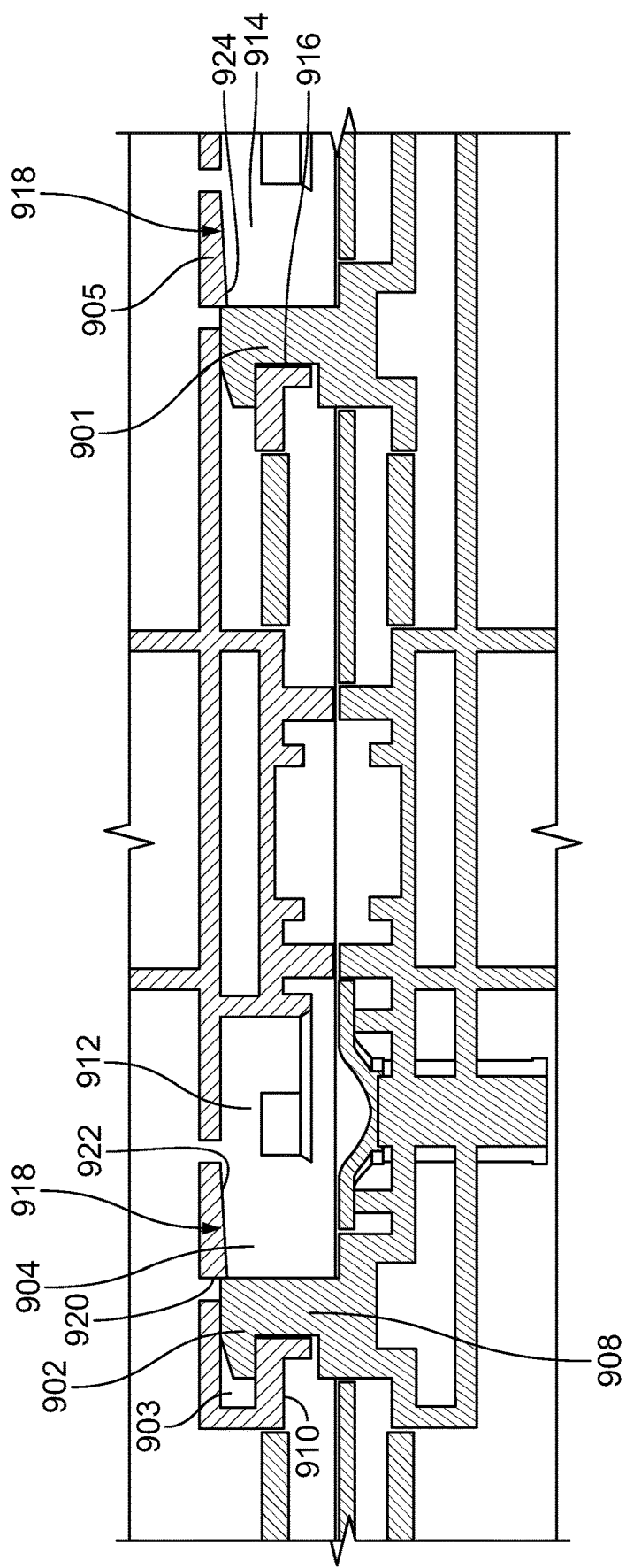
FIG. 65 illustrates a portion of the cross-section of FIG. 64 from a direct side-view.

Still referring to FIGS. 62-65, the mounting system 900 will now be described in further detail. FIGS. 62-63 illustrate the steps for stacking two of the elements 810 in a vertical stack or column using the mounting system 900 of the present disclosure. FIG. 64 is a cross-section taken along line 64-64 of FIG. 63, and FIG. 65 illustrates a portion of the cross-section of FIG. 64 from a direct side view.

According to an example embodiment, the mounting system 900 includes a first locking feature 901 in the form of at least one stud 902 (e.g., a plurality of studs 902 as depicted) that is provided at a top surface 890 of an element 810 and a second locking feature 903 in the form of at least one slot 904 (e.g., a plurality of slots 904 as depicted) that is provided at a bottom surface 892 of an element 810. According to an example embodiment, to improve manufacturing efficiency and standardization, an element 810 may include both the studs 902 at its top surface 890 and the slots 904 at its bottom surface 892. Thus, when stacking similarly configured elements 810, the studs 902 that are located at the top surface 890 of an element 810 can cooperate with the slots 904 that are located at the bottom surface 892 of an adjacent element that is to be stacked vertically with the first element 810. It should be noted that slots 904 are similar in configuration to slots 704 that are shown at the bottom of the element 610 in FIGS. 60-61.

In addition to the studs 902 and slots 904 which cooperate to partially fix the elements 810 together, the mounting system 900 of the present invention also includes a third locking feature 905 in the form of a slide lock 906. As will be described in further detail below, the slide lock 906 is configured to prevent two stacked elements 810 from relatively sliding along the horizontal direction so as to prevent removal of the studs 902 from the slots 904, and, thus, separation of the two elements 810.

Still referring to FIGS. 62-65, in the depicted embodiment, the studs 902 are located along both the right side 894 and the left side 896 of the element 810. Similarly, the slots 904 are also positioned on the right and left sides 894, 896 of the element 810 so as to align and cooperate with the studs 902 of an adjacent element 810 for using the mounting system 900.

Each stud 902 includes a stem portion 908 and a flange portion 910. Each slot 904 includes a receiver portion 912 and a retention portion 914. The receiver portion 912 is sized to accommodate the flange portion 910 of the stud 902. Once the flange portion 910 of a stud 902 has been inserted through the receiver portion 912 of a slot 904, the stem portion 908 of the stud 902 slides through the retention portion 914 until the flange portion 910 of the stud 902 is positioned above the retention portion 914. Further advancement of a stud 902 within a slot 904 is prevented due to the abutment of the stem portion 908 of the stud 902 with an end surface 916 defined by the retention portion 914 of the slot 904 that acts as a positive stop.

In this manner, once the flange portion 910 of a stud 902 has been positioned above the retention portion 914 of a slot 904, the stud 902 cannot be separated from the slot 904 along a direction perpendicular to the sliding direction.

As shown in FIG. 62, when stacking two elements 810 together, the elements 810 are initially aligned to position the flange portions 910 of the studs 902 of a bottom element 810 with the receiver portions 912 of the slots 904 of an upper element 810. As shown in FIGS. 63 and 64, after the elements 810 are brought together, the elements 810 are slid with respect to each other. In the depicted embodiment, the upper element 810 can be slid rearwardly with respect to the bottom element 810 or the bottom element 810 can be slid forwardly with respect to the upper element 810. This movement results in the stem portions 908 of the studs 902 sliding through the retention portions 914 of the slots 904 and bringing the flange portions 910 of the studs 902 over the retention portions 914 of the slots 904. When the stem portion 908 finally abuts the positive stop defined by the end surface 916 of the slot 904 and the relative sliding of the elements 810 is completed, separation in the vertical direction is prevented. Separation of the two elements 810, at this point, requires a reversal of the steps used in fixing the two elements 810. For separation, the stem portions 908 of the studs 902 have to be slid through the retention portions 914 of the slots 904 until the flange portions 910 are aligned with the receiver portions 912 of the slots 904. And, at that point, the two elements 810 can be separated from each other along a vertical direction perpendicular to the sliding direction.

Since separation of the two elements 810, after they have been fixed via the studs 902 and the slots 904, requires reverse relative horizontal movement between the elements 810, the mounting system 900 of the present disclosure further includes the slide lock 906 noted above and shown in FIGS. 65 and 66. The slide lock 906 is configured to prevent two stacked elements 810 from sliding along the horizontal direction with respect to each other such that the studs 902 cannot be removed from the slots 904.

As shown in FIGS. 64 and 65, each element 810 has been provided with specific features to utilize the slide lock 906. In the example shown in FIGS. 62-65, the slide lock 906 is defined by a cantilever arm 918. The cantilever arm 918 defines a stop surface 920, at least a portion of which is configured to abut the stud 902 and prevent the stud 902 from sliding horizontally from the retention portion 914 to the receiver portion 912 of the slot 904. The stop surface 920 captures the stud 902 against the end surface 916.

As shown in FIGS. 64-65, at least a portion of the cantilever arm 918 (i.e., the portion that defines the stop surface 920) communicates with the retention portion 914 of the slot 904. In this manner, the portion of the cantilever arm 918 that communicates with the retention portion 914 of the slot 904 can abut the stud 902 and prevent the stud 902 from sliding.

As also shown in FIGS. 64-65, the cantilever arm 918 defines a tapered flex surface 922 that is configured to facilitate flexing of the cantilever arm 918 elastically upwardly as the stud 902 is slid from the receiver portion 912 of the slot 904 toward the retention portion 914 of the slot 904. The flex surface 922 tapers downwardly as it extends in a direction from the back to the front of the element 810. The flex surface 922 intersects the stop surface 920 of the cantilever arm 918 to define a lower front edge 924. In order to horizontally move the stud 902 from the retention portion 914 to the receiver portion 912 of the slot 904, the edge 924 has to be cleared by the flange portion 910 of the stud 902. This may be accomplished by flexing the cantilever arm 918 elastically upwardly in order to pass the flange portion 910 of the stud 902 thereunder.

In should be noted that a slide lock 906 in the form of a cantilever arm 918 may be provided at one or more of the slots 904 found on the elements 810. In certain embodiments, each slot 904 may include a cantilever arm 918 communicating therewith for providing the slide lock 906. In the example depicted in FIGS. 64-65, only two of the three slots 904 on each side of the element include the cantilever arm 918.

It should also be noted that although the depicted example of the mounting system 900 utilizes a slide lock 906 on both the right and left sides 894, 896 of an element stack, a slide lock 906 can be used on a single side of the stack if desired. However, using a slide lock 906 on both sides 894, 896 of the element stack may provide more stability to the locking mechanism.

Thus, the mounting system 900 of the present disclosure, similar to the locking system 700, provides a quick-attach solution that can be used in stacking elements 810 in a column for further mounting to equipment such as telecommunications racks, frames, or cabinets. The mounting system 900 of the present disclosure provides an unobtrusive attachment solution that can be incorporated in a variety of telecommunications distribution element designs. The mounting system 900 of the present disclosure may be used as a retro-fit solution on pre-existing telecommunications equipment with slight modification to certain aspects of the preexisting equipment to incorporate features of the system.

The mounting system 900 may be used to mount or stack two or more elements (such as the optical fiber distribution elements 810) that have similar configurations.

The mounting system 900 may also be used to mount or stack dissimilar equipment together if those pieces of equipment include features of the system 900 that allow them to intermate. For example, elements including equipment other than optical distribution features may be mounted to optical distribution elements such as elements 810 using the system 900 of the present disclosure as long as that equipment is configured with features of the system 900 that allow them to intermate with the features of equipment such as elements 810.

The mounting or stacking system 900 of the present disclosure may be used in instances where a single element includes features for mounting that element to a telecommunications rack, frame, or cabinet and other elements may be stacked with respect to that element using the system 900. For example, as shown in the example version of the element 510 in FIGS. 48-52, an element or chassis may include a universal quick-connect mounting mechanism similar to mechanism 500 of FIGS. 48-52 including universal mounting brackets 502 for releasably mounting that element or chassis to a telecommunications fixture, such as an optical fiber distribution rack. Using the stacking system 900 of the present disclosure, only one of the elements that are to be mounted to a separate fixture such as a rack would need to have the structure for utilizing a mechanism such as the universal mounting mechanism 500. The rest of the elements could be stacked with respect to that element by using the mounting or stacking system 900 of the present disclosure that relatively fixes the elements and prevents relative sliding between the elements and relative separation between the elements in a direction generally perpendicular to the direction of the relative sliding.

The element utilizing the mounting features (such as the universal quick-connect mechanism 500 shown in FIGS. 48-52) for mounting to a separate telecommunications fixture may be located at the top of the stack, at the bottom of the stack, or in the middle of the stack using the features of the stacking system 900 of the present disclosure.

Figure 66:
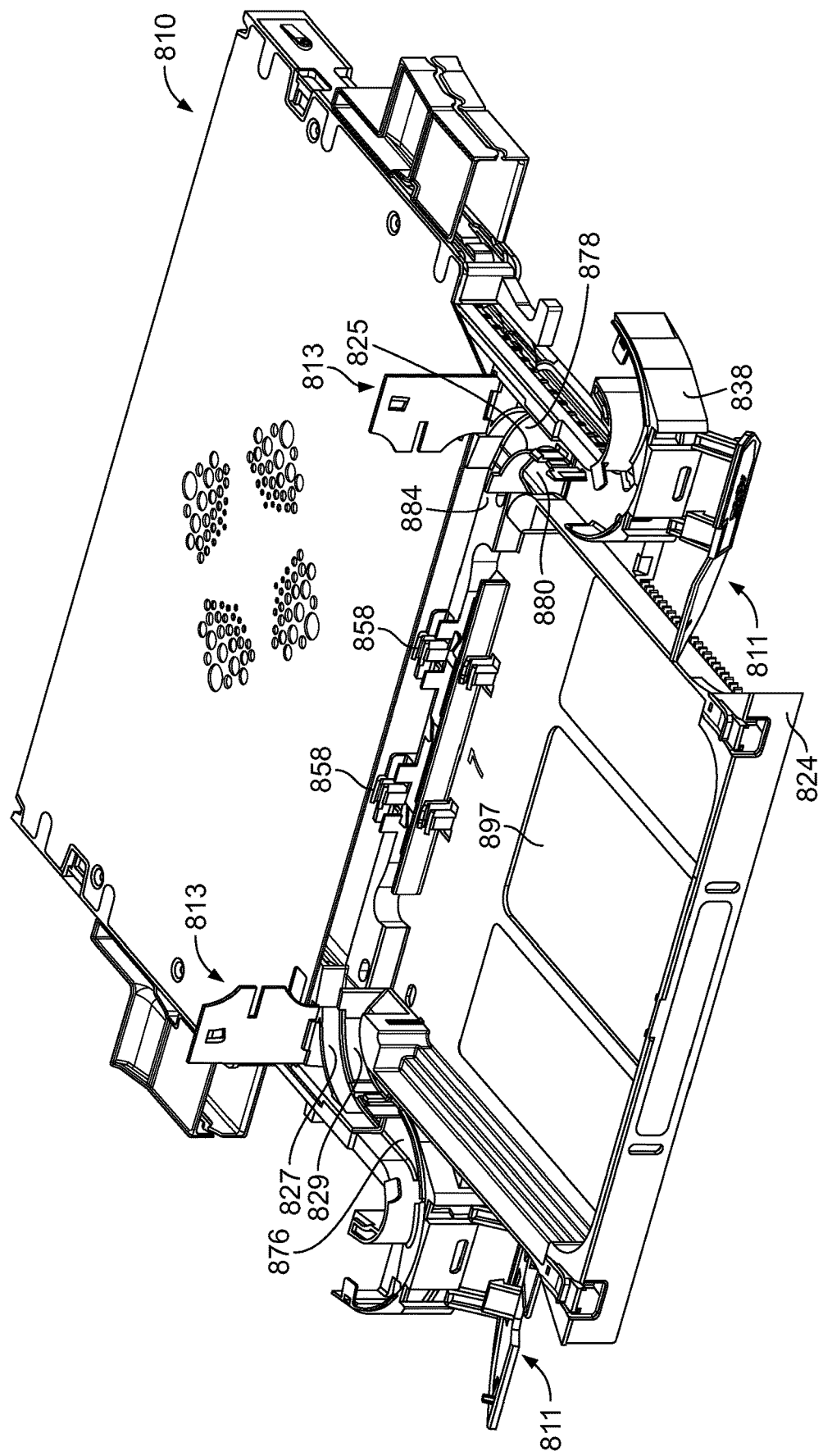
FIG. 66 illustrates the element of FIGS. 62-65 with the tray at an extended position, the element including pivotable covers over the U-shaped radius limiter and the S-shaped cable pathway within the element, the covers shown in an open configuration.
Figure 67:
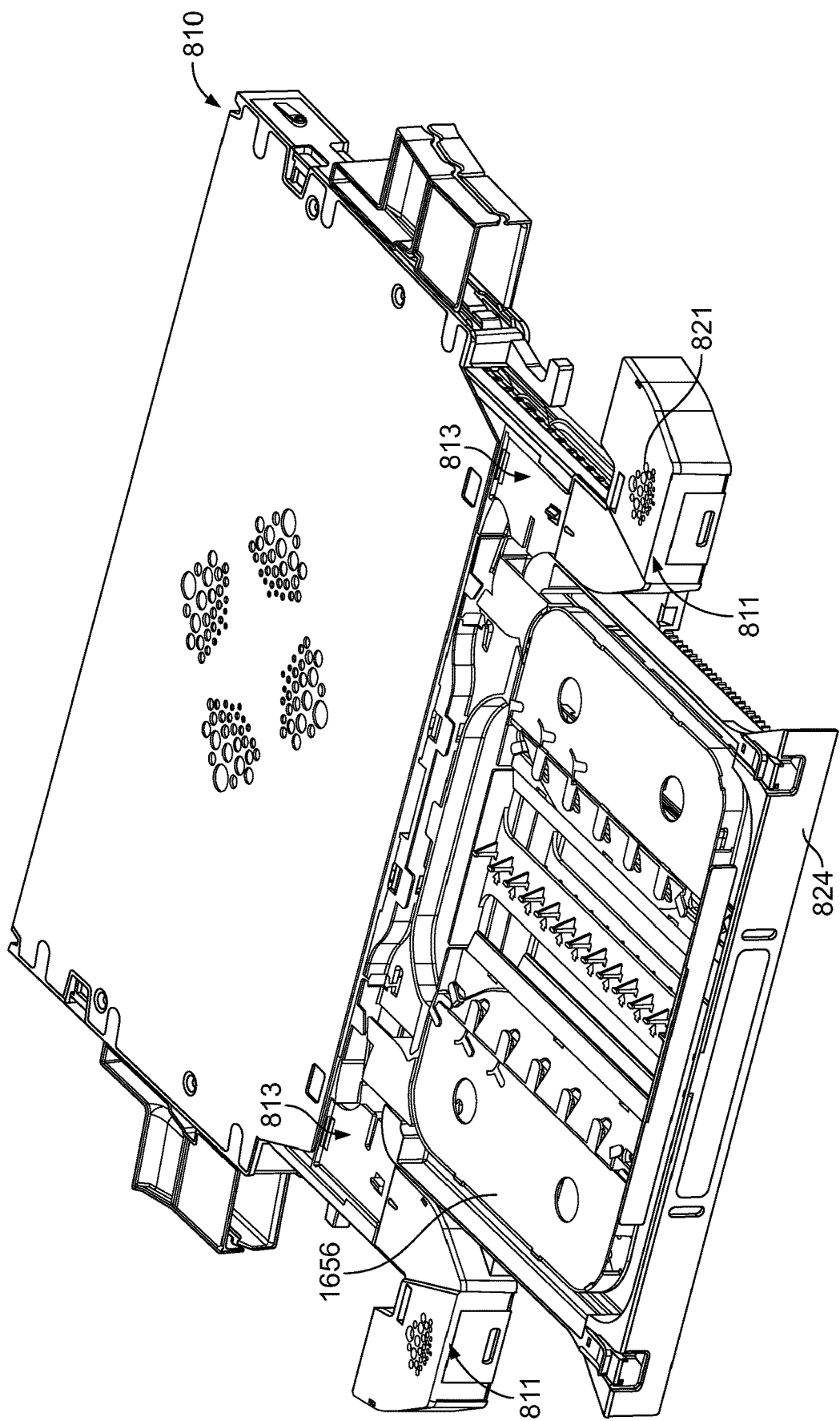
FIG. 67 illustrates the element of FIG. 66 with the covers in a pivotally closed position.

Referring now to FIGS. 66-67, the element 810 of FIGS. 62-65 is shown with the tray 824 of the element 810 at an extended position to illustrate some of the internal features of the element 810. As shown, in FIG. 66, the tray 824 is illustrated empty without any frame members, and in FIG. 67, the tray 824 is illustrated populated with frame members, one of which is further illustrated in further detail in isolation in FIG. 79. As will be discussed, the tray 824 of element 810 may be used with a variety of different versions of frame members, examples of which will be discussed in further detail below.

Still referring to FIGS. 66-67, the element 810 includes a first pivotable snap-fit cover 811 over a U-shaped radius limiter 838 that is on the slide mechanism of the element 810. The U-shaped radius limiter 838 includes features similar to radius limiter 638 shown in FIGS. 53-54. The element 810 further includes a second pivotable snap-fit cover 813 over a rear portion 815 of the S-shaped cable pathway 876 defined within the tray 824 of the element 810. The covers 811, 813 are shown in an open configuration in FIG. 66 and shown in a closed configuration in FIG. 67.

The S-shaped pathway 876, similar to the embodiment of the element 610 discussed previously, is divided into two separate troughs 827, 829 by a divider 825 that is toward the rear of the tray. According to an example cable routing configuration, the two troughs 827, 829 may guide the cables to upper and lower levels 878, 880 defined toward the rear of the tray 824 while maintaining the S-shaped pathway 876 created within the element 810. The covers 811, 813 help retain cables within the S-shaped pathway 876 defined within the tray 824 as the cables lead to and from the radius limiter 838 to the tray 824 within element 810. The pivotability aspect of the covers 811, 813 facilitates initial placement of the cables within the S-shaped pathway 876 and provides access to the cables for removal. As shown, the covers 811, 813 may also include apertures 821 for viewing the cables within the S-shaped pathway 876 from an exterior of the tray 824 when the covers 811, 813 are closed.

Referring now to FIGS. 68-79, as noted above, various hingedly mountable frame members that may be used within the trays 824 of the elements 810 are illustrated. Each of the frame members in FIGS. 68-79 is illustrated in isolation removed from the tray 824 of the element 810. In FIG. 67, discussed previously, the tray 824 is shown populated with frame members, one of which is illustrated in isolation in further detail in FIG. 79.

Similar to the earlier embodiments of the elements, each tray 824 of element 810 may include two frame members in a stacked arrangement, wherein the frame members are hingedly mounted at hinges 858. A top frame member is normally positioned above a bottom frame member. As discussed previously, the S-shaped pathway 876 includes an upper level 878 and a lower level 880 in the interior. The upper level 878 is configured to supply an upper frame member, and the lower level 880 is configured to supply a lower frame member that is positioned below the upper frame member. The trays cooperate with the frame members in defining openings for guiding the cables to the specified frame members.

A portion 884 of the S-shaped pathway 876 is positioned adjacent to hinges 858 to avoid potentially damaging cable pull during pivoting movement of frame members.

Similar to previously discussed trays, each tray 824 of element 810 includes openings 897 to allow for technician access to the cable terminations within the tray 824. Furthermore, as will be discussed in further detail, most of the embodiments of the frame members that are configured to be used within the tray 824 of element 810 include a middle portion that is separated by openings from side portions, similar to the frame members discussed previously, for allowing connector access to the technicians.

Figure 68:
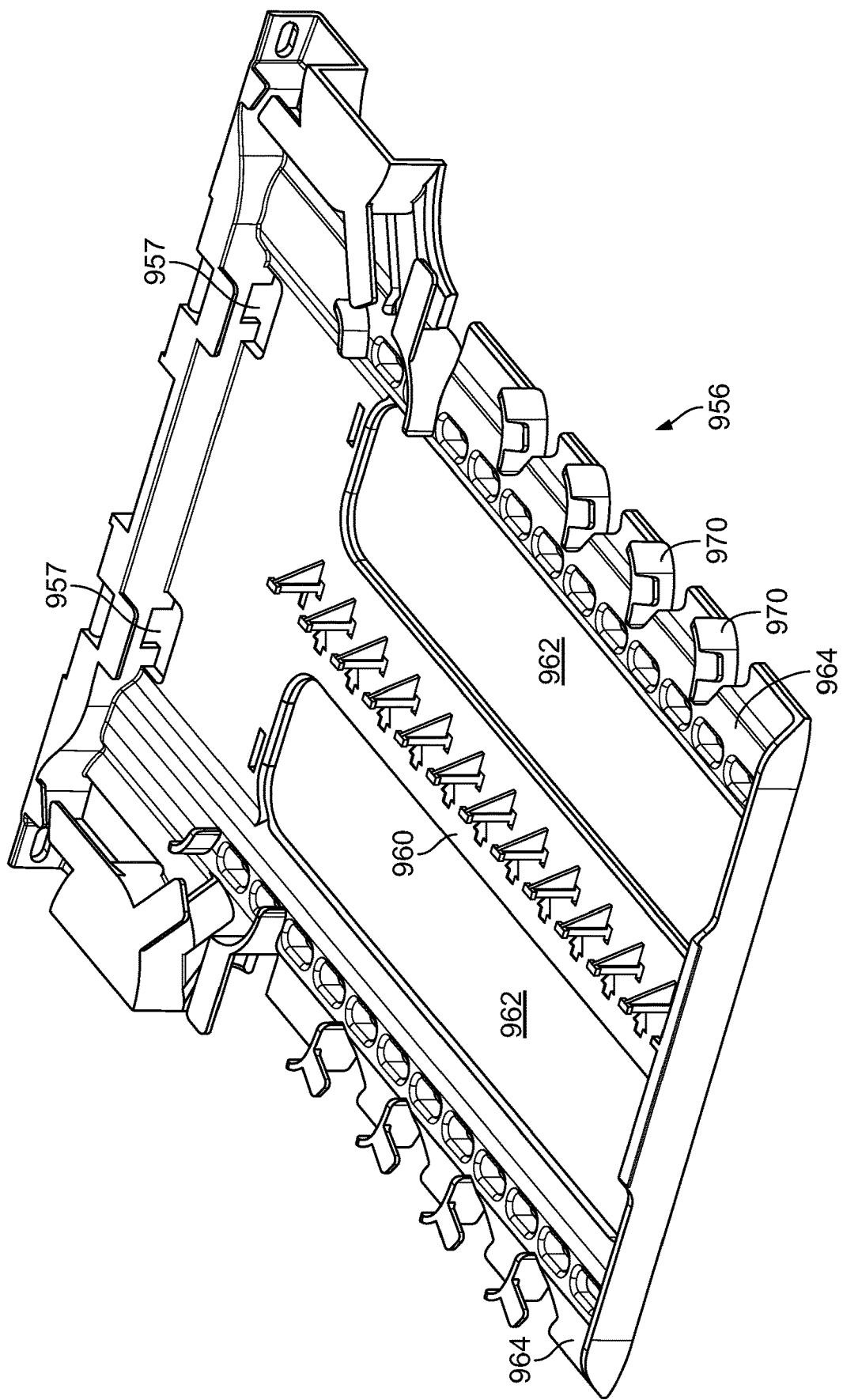

Referring now to FIG. 68, an embodiment of a frame member 956 that can be used with the tray 824 of element 810 is illustrated in isolation. Each frame member 956 has a middle portion 960 separated by openings 962 from side portions 964. Middle portion 960 can hold fiber terminations in the form of fiber optic adapters that can receive fiber optic connectors. Side portions 964 include radius limiters 970. The frame member 956 may include openings 957 at a rear portion thereof for allowing cables to be routed from an upper frame member 956 to a lower frame member 956. Such openings 957 adjacent the hinges of the frame members can be used on other frame members of the present application.

Figure 69:
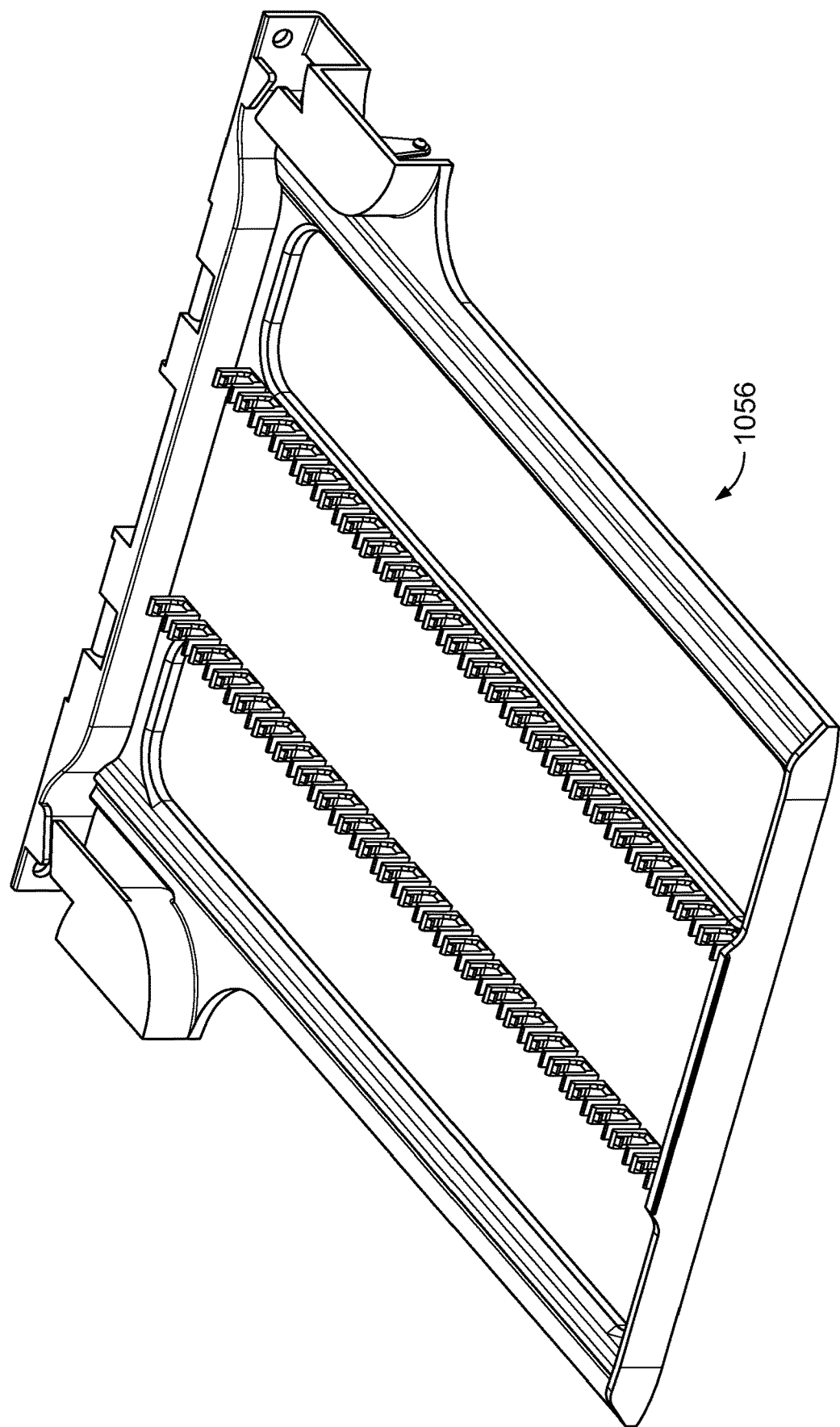

Referring now to FIG. 69, another embodiment of a frame member 1056 that can be used with the tray 824 of element is illustrated in isolation. Frame member 1056 is configured to hold fiber terminations in the form of fiber optic connectors that are different in format than those received by the frame member 956 of FIG. 68.

Figure 70:
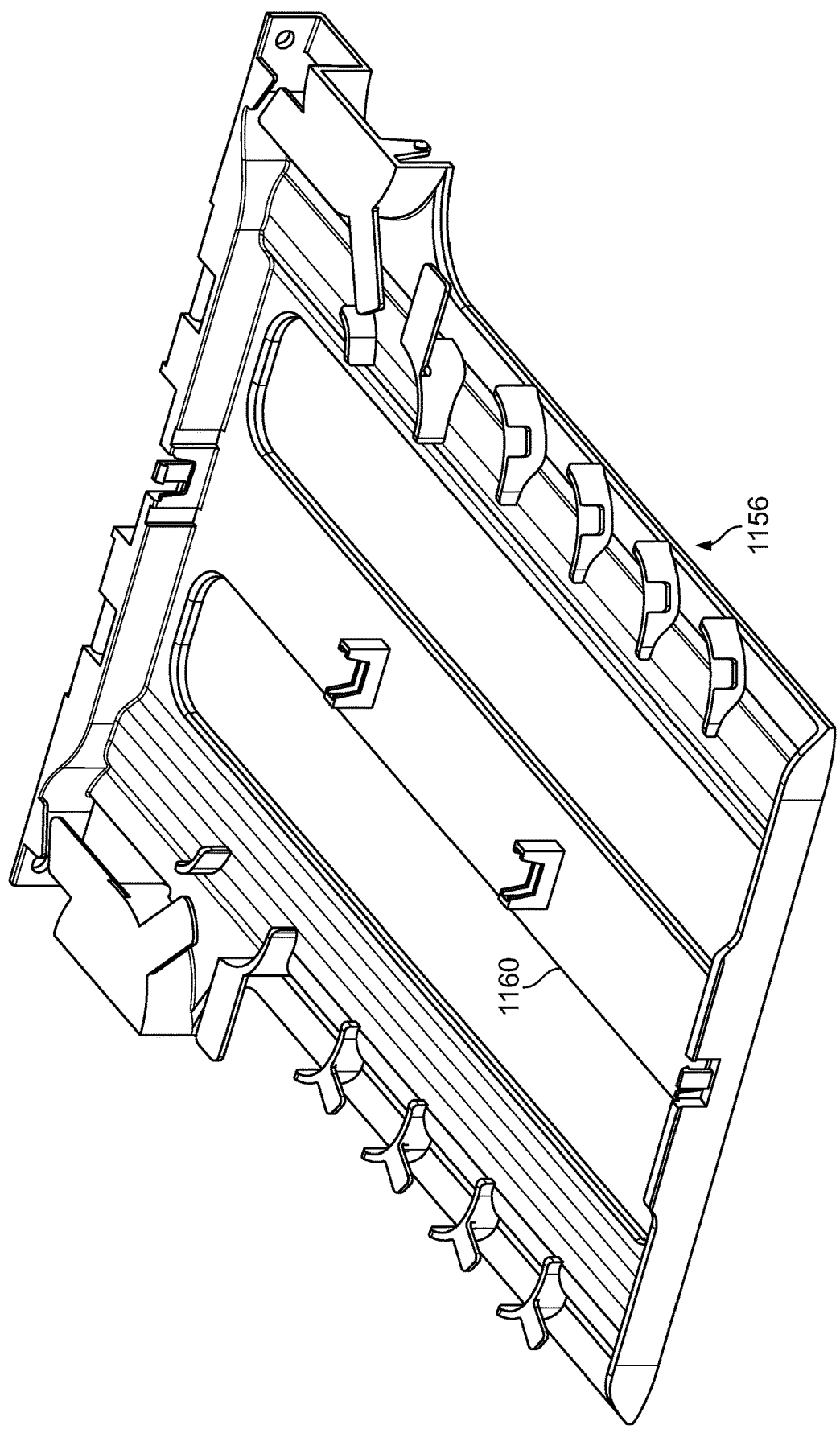

Referring now to FIG. 70, an embodiment of a frame member 1156 that is similar in configuration to the frame member 956 of FIG. 68 is illustrated. The middle portion 1160 of frame member 1156 can hold fiber terminations in the form of fiber optic adapter blocks.

Referring now to FIGS. 71-72, another embodiment of a frame member 1256 that can be used with the tray 824 of element 810 is illustrated in isolation. Frame member 1256 is configured to hold fiber terminations in the form of fiber optic adapters that can receive fiber optic connectors at a center portion 1260 of the frame member 1256. The front portion 1261 of the frame member 1256 includes splice regions 1263 for splicing of fiber optic cables. A cover 1265 may be used to cover the splice regions 1263.

Figure 73:
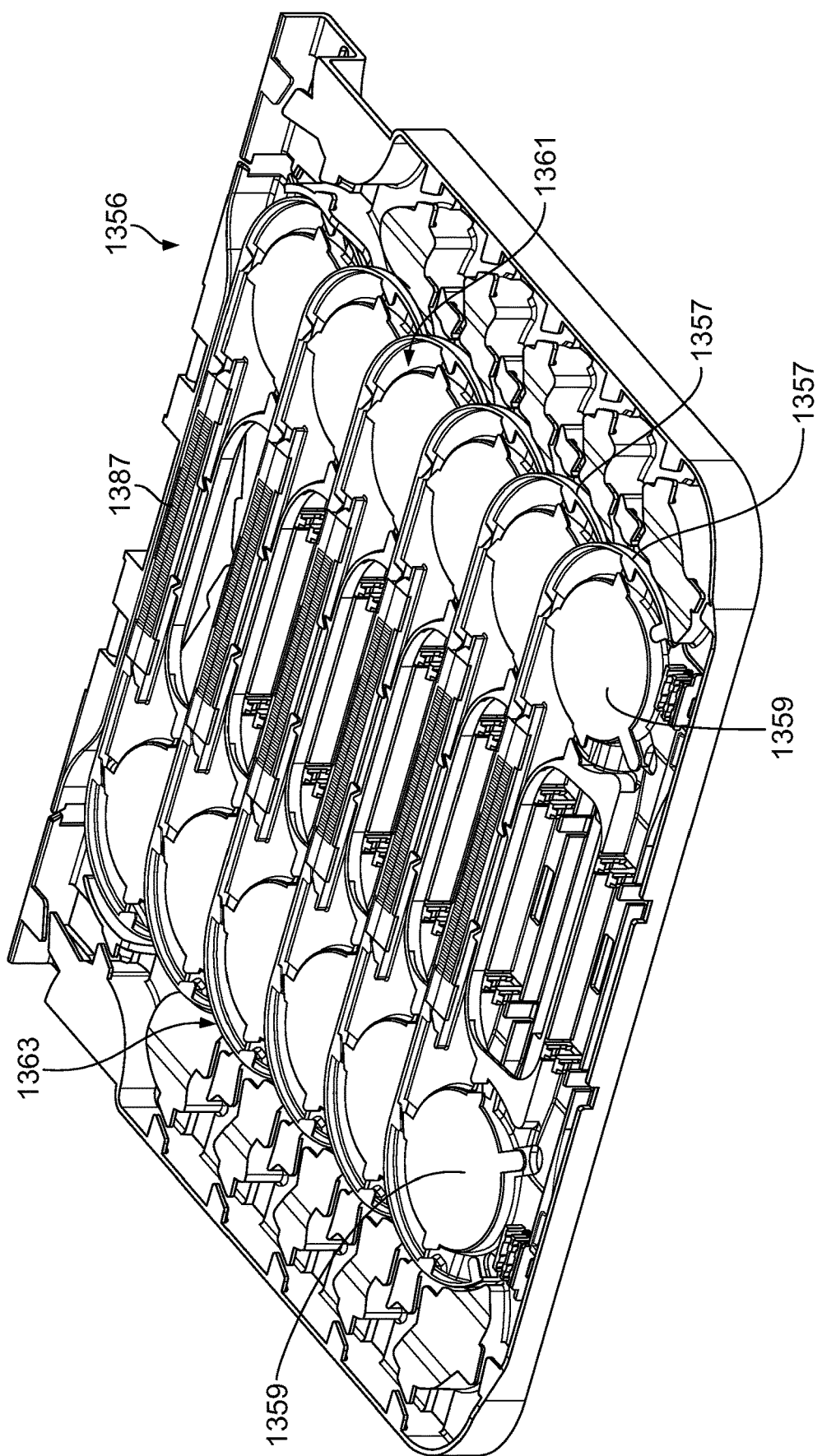

Referring now to FIG. 73, another embodiment of a frame member 1356 that can be used with the tray 824 of element 810 is illustrated in isolation. Frame member 1356 defines a plurality of individually pivotable flip-trays 1357 that can support fiber optic equipment in the form of fiber terminations such as fiber optic connectors and other fiber optic equipment such as splitters 1387. Radius limiters 1359 in the form of spools are positioned at both the right side 1361 and the left side 1363 of each flip-tray 1357.

Figure 74:
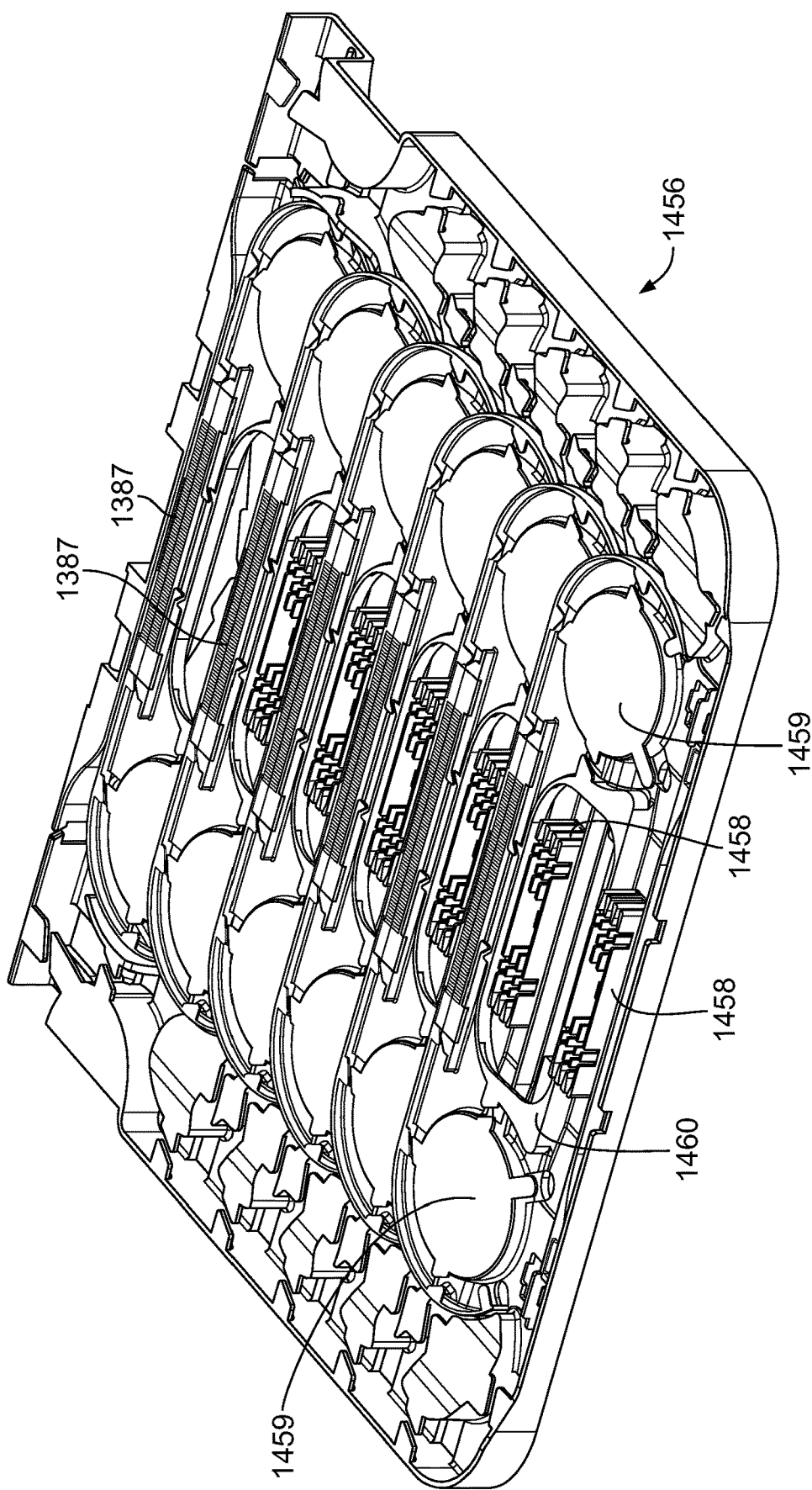

FIG. 74 illustrates a frame member 1456 that is similar in construction to the frame member 1356 of FIG. 73. Frame member 1456 defines splice regions 1458 at the center portion 1460 of the individual flip-trays 1457 between the radius limiters 1459, in addition to fiber optic splitters 1387.

Figure 75:
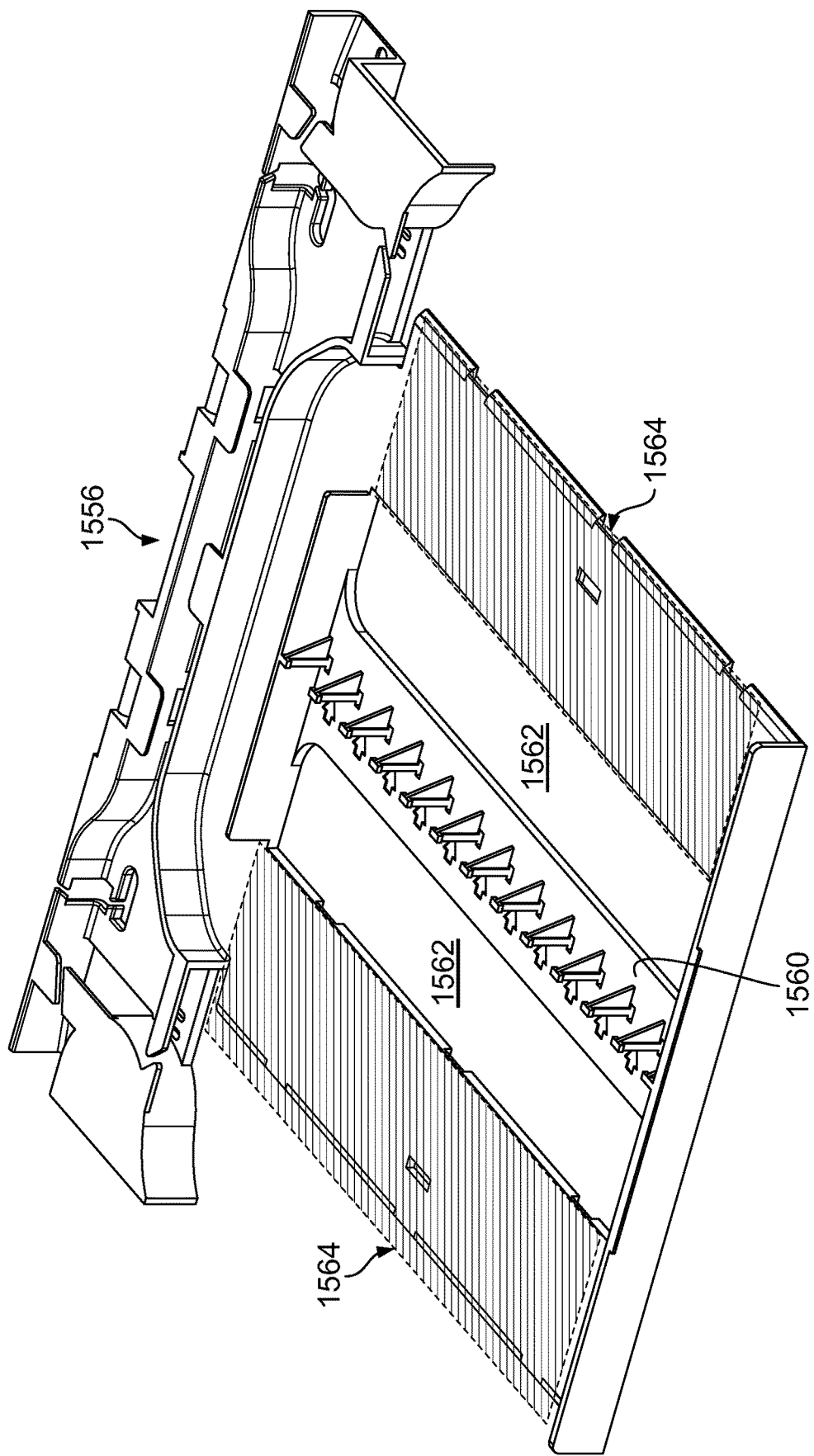

FIG. 75 illustrates a base portion 1556 for a frame member that can be used to mount different modular elements for changing the configuration or the layout of the fiber optic connectivity within the frame member. The base portion 1556 has a middle portion 1560 separated by openings 1562 from side portions 1564. Middle portion 1560 can hold fiber terminations in the form of fiber optic adapters that can receive fiber optic connectors. The side portions 1564 are configured to receive different modular elements for varying the layout of a frame member. The modular elements can be mounted to the side portions 1564 via snap-fit interlocks. For example, the base portion 1556 is shown in FIG. 76 with a pair of modular elements 1569 that are configured to provide a layout that is similar in configuration to that of the frame member 956 of FIG. 68, wherein the modular elements 1569 define radius limiters 1570.

Figure 77:
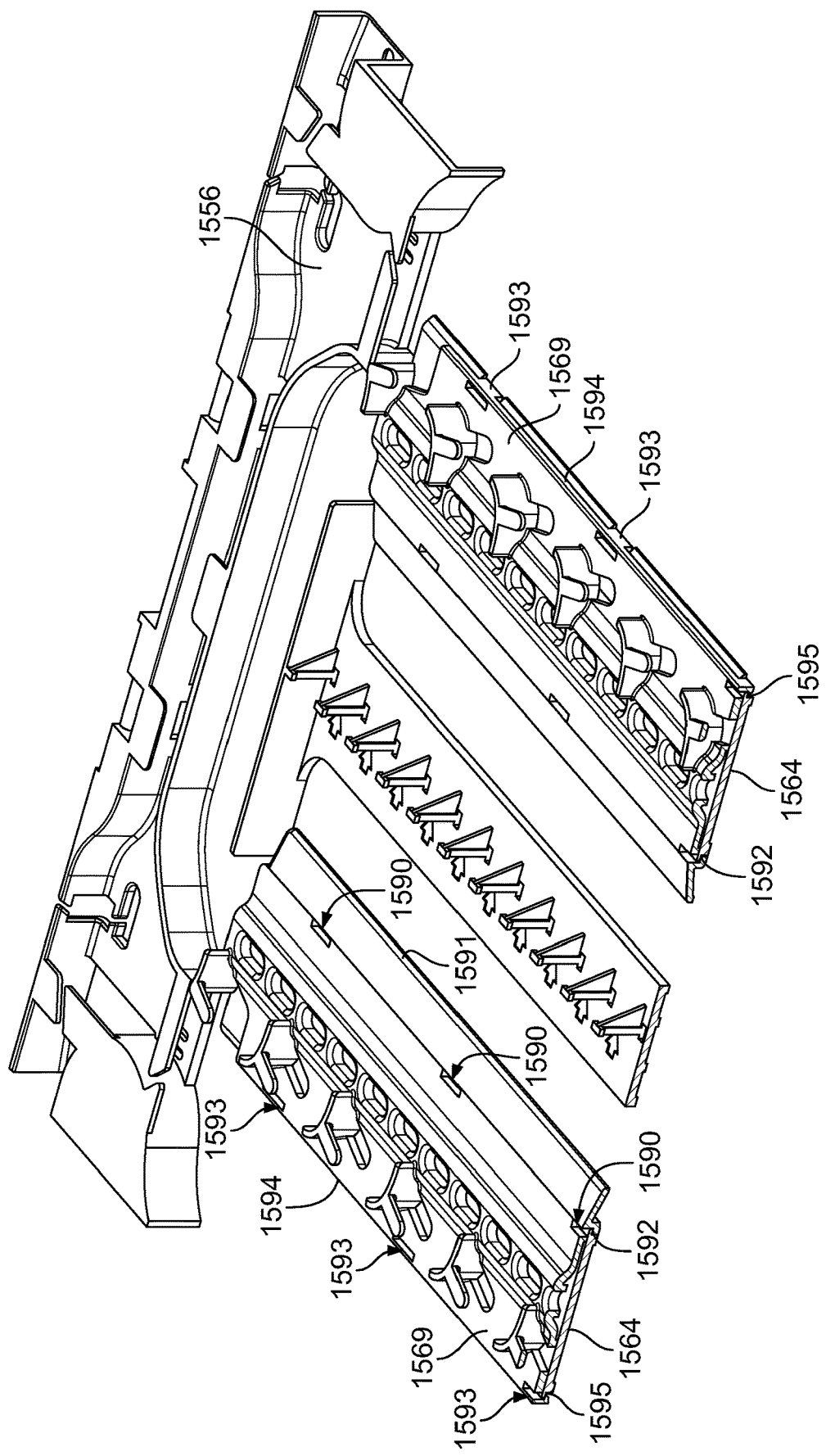

FIG. 77 illustrates the snap-fit feature of the modular elements 1569 in a cross-sectional view. According to the depicted example, the modular elements 1569 may include a plurality of hooks 1590 on a first side 1591 for catching against a first edge 1592 defined by one of the side portions 1564. The modular elements 1569 may include a plurality of elastically flexible snap-fit catches 1593 on an opposing second side 1594 for catching against an opposing second edge 1595 defined by the side portions 1564. In this manner, using the hooks 1590 and catches 1593, the modular elements 1569 can be mounted to the side portions 1564 with a snap-fit and removed therefrom to allow changing the layout of a frame member.

Figure 76:
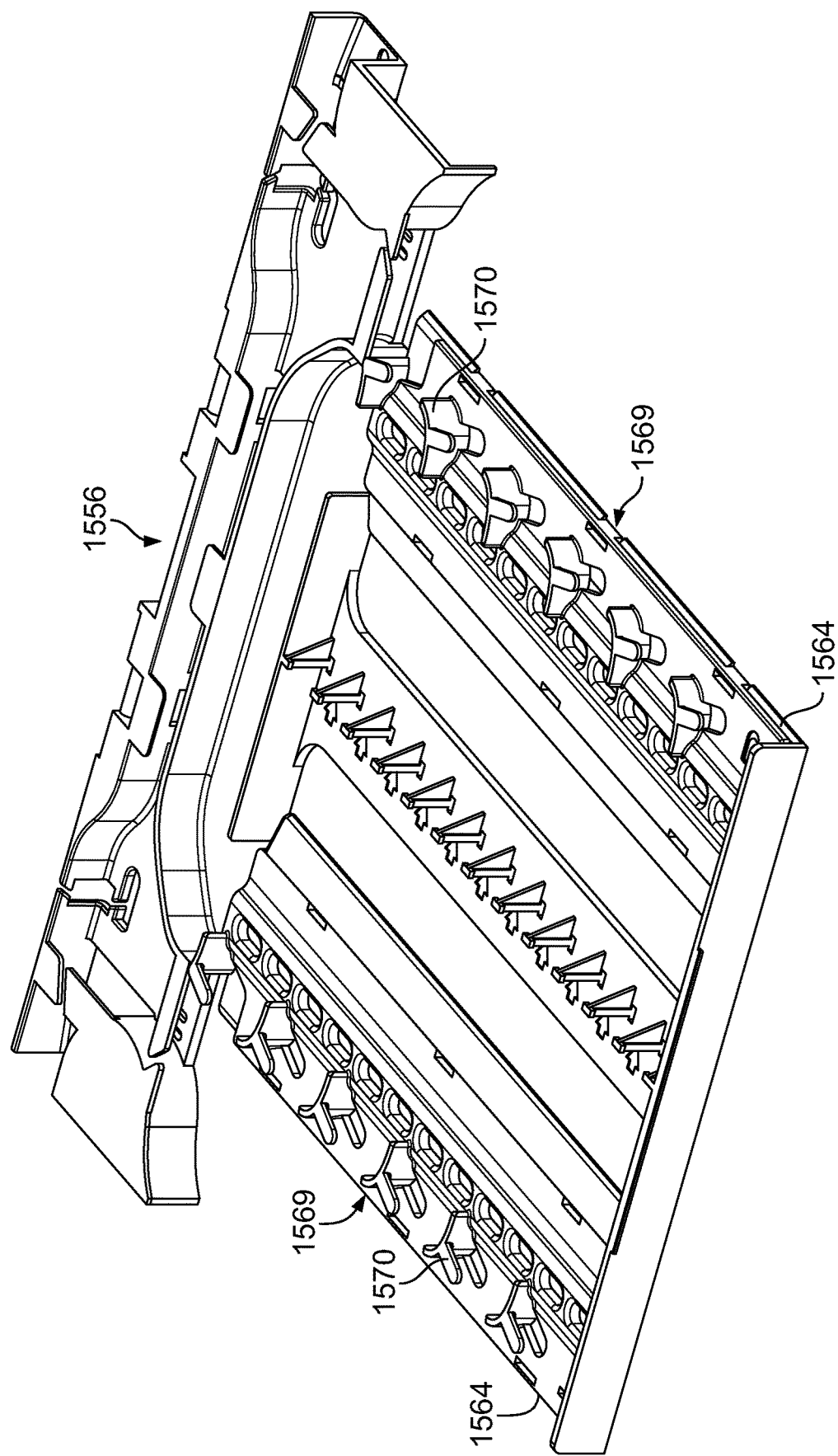
Figure 78:
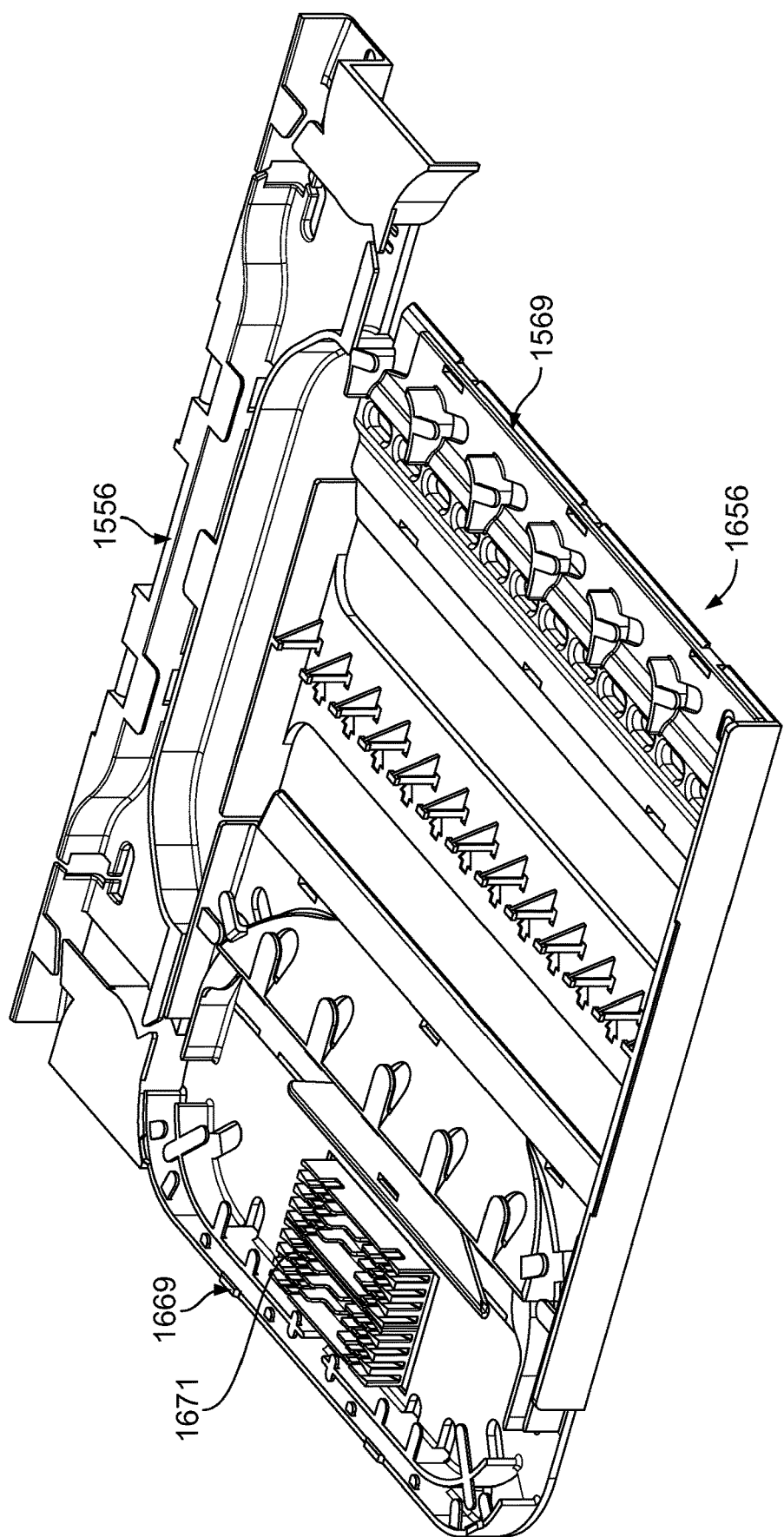
Figure 79:
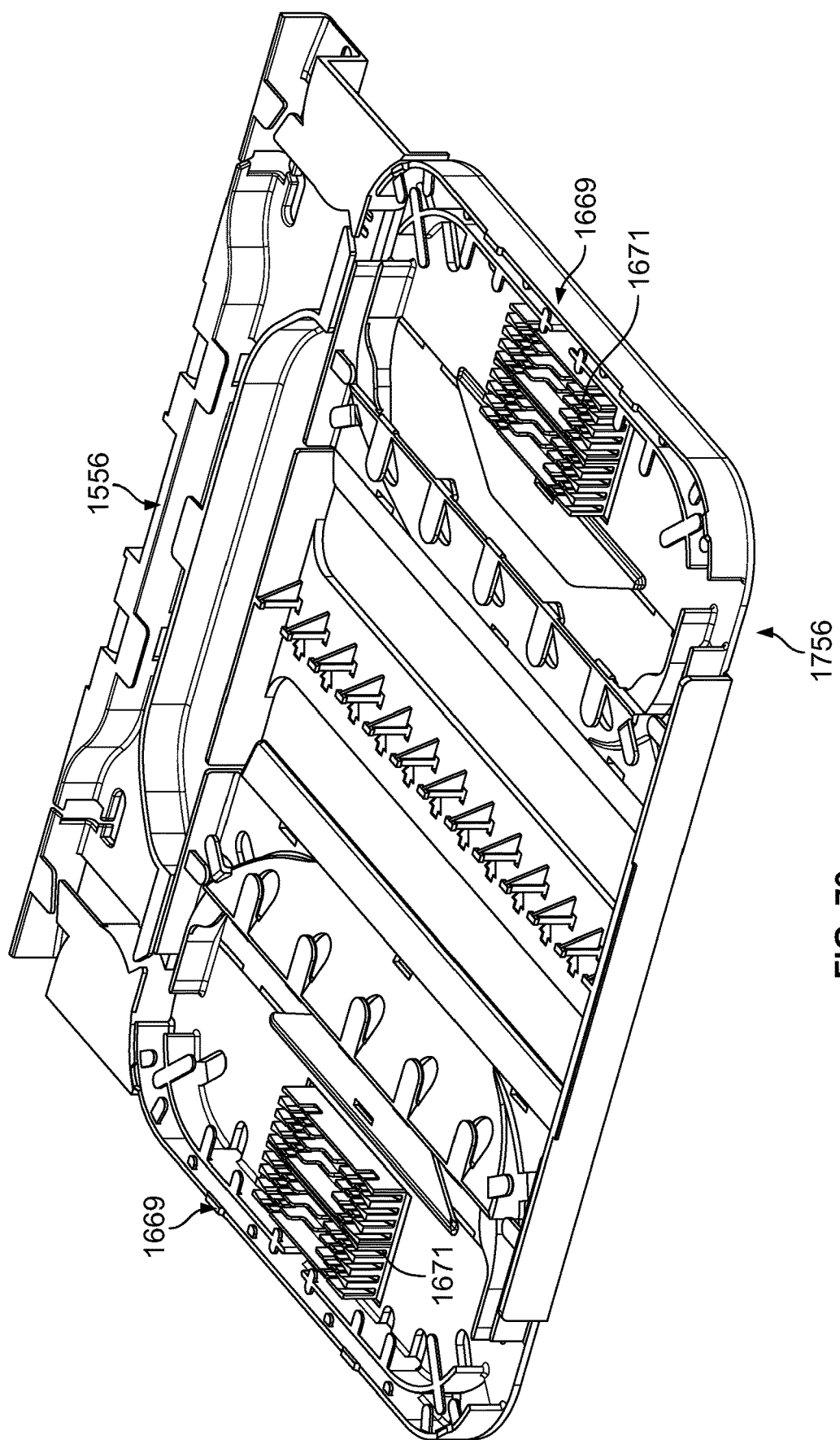

FIG. 78 illustrates an embodiment of a frame member 1656 that includes one of the modular elements 1569 of FIGS. 76-77 and another modular element 1669 defining a splice region 1671. FIG. 79 illustrates a frame member 1756 that has been formed by snap-fitting two modular elements 1669 that include splice regions 1671 to the base portion 1556. A pair of the frame members 1756 can be seen in the tray 824 of element 810 of FIG. 67 as discussed previously.

Figure 80:
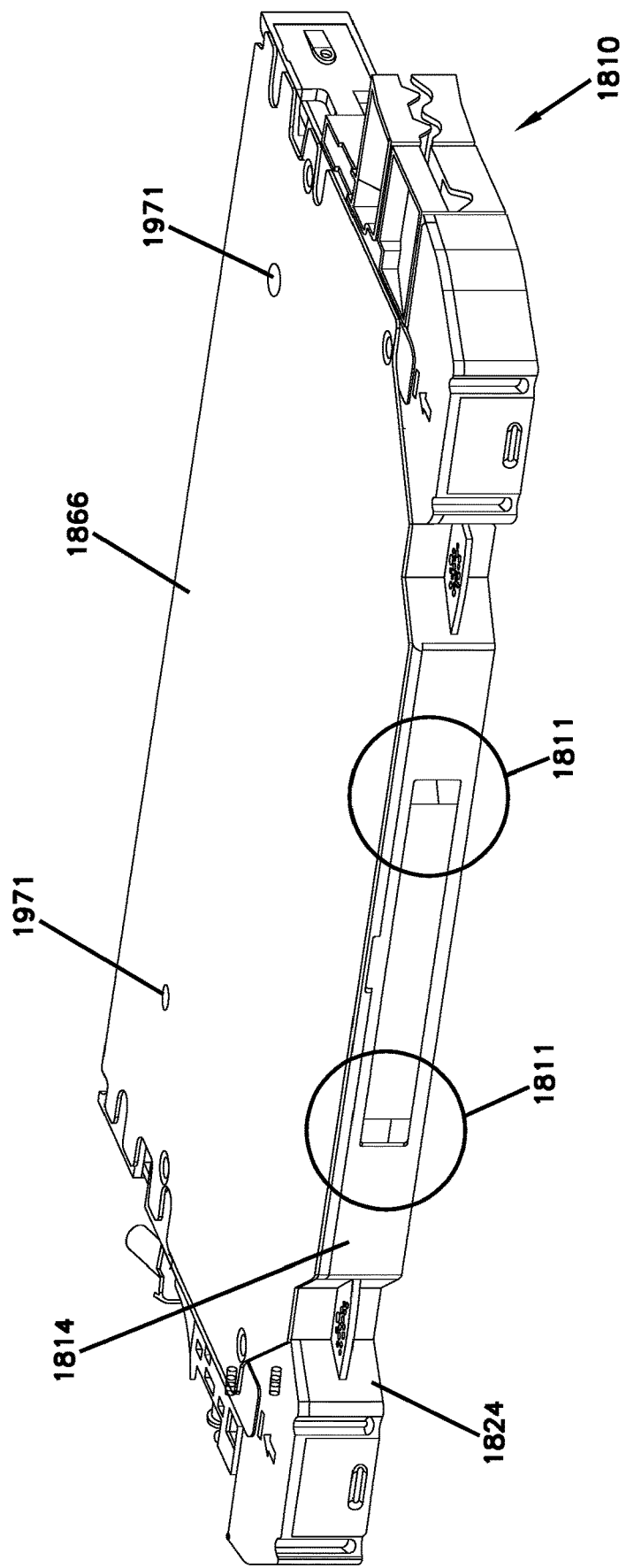
FIG. 80 illustrates another element having features similar to the element of FIGS. 62-67; the element of FIG. 80 defining at least one opening at a front face thereof for allowing a user to see the type of frame member that is being housed within the element.

FIG. 80 illustrates another embodiment of an element 1810 having features similar to the element 810 of FIGS. 62-67. The element 1810 defines at least one opening 1811 (two openings in the depicted version) at a front face 1814 defined by the slidable tray 1824 of the element 1810. The opening(s) 1811 allow a user to see the type of frame member that is being housed within the tray 1824 from an exterior of the element 1810. For example, frame members housed within the tray 1824 such as the various hingedly-mountable frame members illustrated in FIGS. 68-79 may be color-coded based on the different types of frames or connectivity arrangements provided by the frames. The opening(s) 1811 allow a user or technician to be able to see the color of the frame member within the tray 1824 from an exterior of the element 1810 and determine the type or the connectivity arrangement without having to slidably open the tray 1824.

Even though all of the various embodiments of the elements illustrated in the present application have been shown with telecommunications equipment housed within the trays of the elements, FIGS. 81-82 illustrate the element 1810 of FIG. 80 with a piece of telecommunications equipment (e.g., fiber optic splitter) 1900 mounted to an exterior of the tray 1824. The fiber optic splitter 1900 is positioned adjacent a U-shaped radius limiter 1838 that is positioned on the front of the element 1810 with the inputs or the outputs of the fiber optic splitter 1900 generally aligned with an entrance 1839 of the U-shaped radius limiter 1838. In this manner, cables extending from the fiber optic splitter 1900 can be managed by the radius limiter 1838 as the cables lead into or extend out of the tray 1824. As in the previous embodiments of the elements discussed, the U-shaped radius limiter 1838 is configured to be able to slide with respect to the chassis of the element 1810. The radius limiter 1838 moves in synchronized movement relative to the chassis and the tray 1824 to maintain fiber slack, without causing fibers extending from the splitter 1900 to be bent, pinched, or pulled.

In the embodiment of the element 1810 shown in FIGS. 80-82, the fiber optic splitter 1900 is mounted to one of the sidewalls 1812 of the element 1810 with locking features 1862. In the depicted embodiment, the locking features 1862 are provided in the form of a slide lock 1864 that is defined by intermating dovetail structures between the wall 1812 and the optical device 1900 itself. It should be noted that the slide lock 1864 can be configured in a variety of different configurations as long as it allows equipment such as the optical equipment 1900 to be slidably and removably coupled to the sidewall 1812. In the depicted example, the dovetail structures are defined by dovetails that are provided on the optical equipment 1900 and dovetail receivers 1868 that are provided on the walls 1812.

As shown in FIGS. 80-82, each dovetail receiver 1868 defines a receiving portion 1867 and a retention portion 1869. When an optical device 1900 is mounted to the side wall 1812, each dovetail of the equipment 1900 is inserted into and through the receiving portion 1867 in a transverse direction, and the device 1900 is slid rearwardly along a longitudinal direction until the dovetail thereof is moved into the retention portion 1869 of the dovetail receiver 1868. The movement is reversed for removal of the optical device 1900 from the sidewall 1812, wherein the device 1900 is first slid forwardly and then moved transversely to clear the dovetail receivers 1868.

In the depicted example of the element 1810, the side wall 1812 is configured with two rows of dovetail receivers 1868 for receiving two fiber optic devices 1900 in a stacked arrangement.

It should be noted that the locking features 1862 in the form of dovetail receivers 1868 of the element 1810 may be used for mounting a variety of different structures at the sidewalls 1812 of the element 1810, such as additional radius limiters, cable fixation clamps, other fiber optic equipment, etc.

Figure 86A:
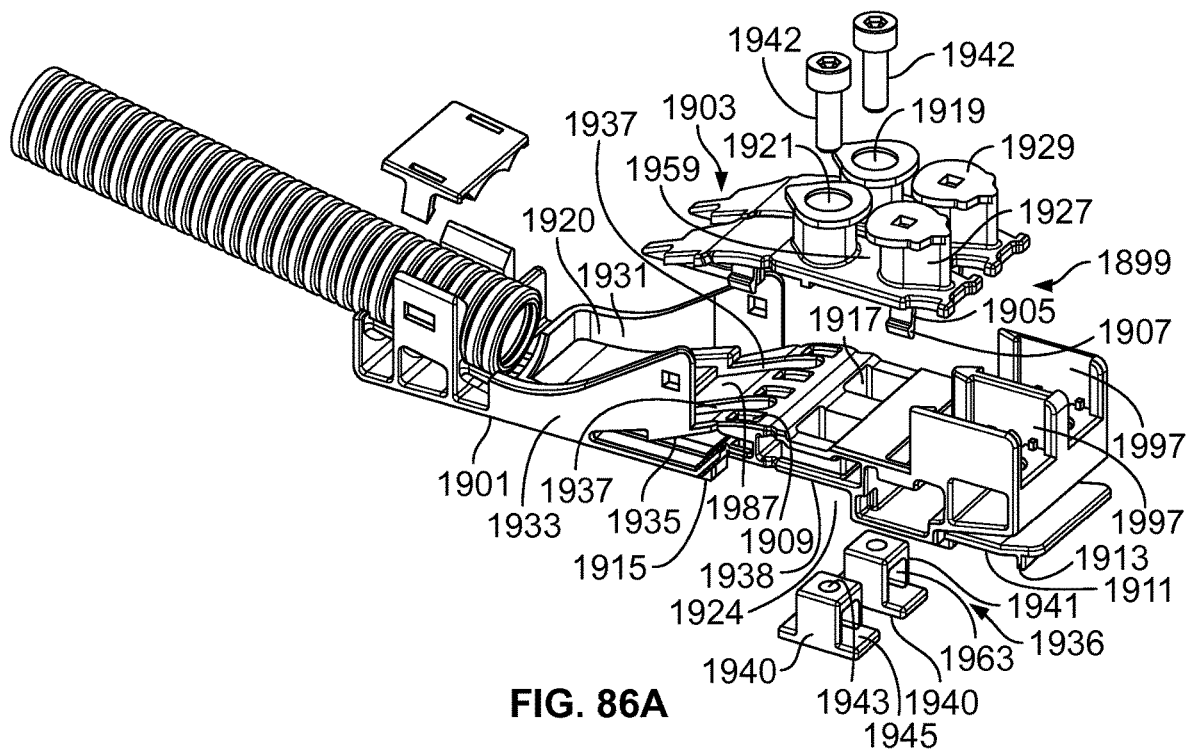
FIG. 86A illustrates an exploded view of a horizontal cable fixation device that may be mounted to the sidewalls of the element of FIGS. 80-82.
Figure 86B:
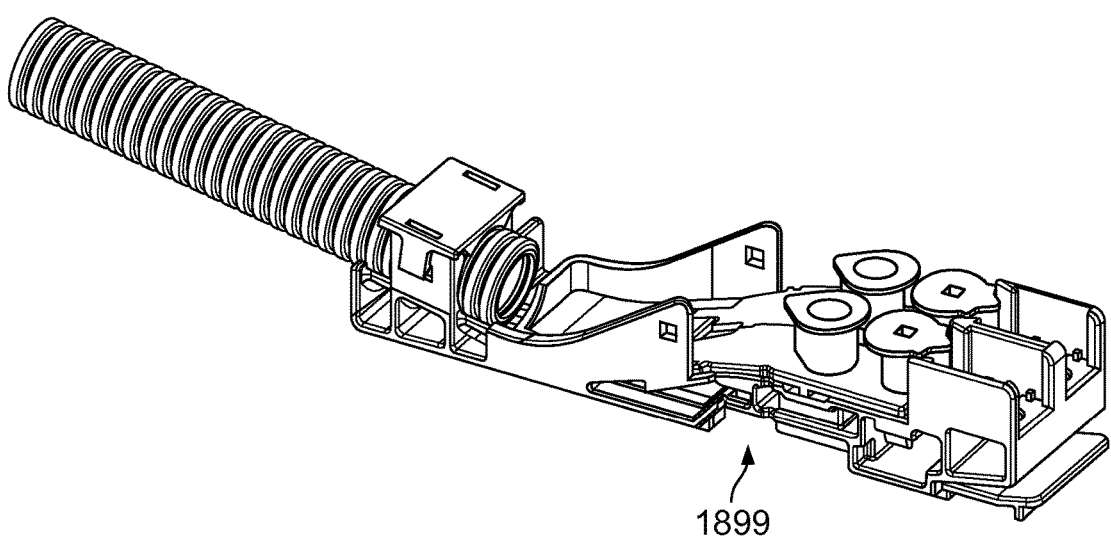
FIG. 86B illustrates the cable fixation device of FIG. 86A in an assembled configuration.
Figure 86C:
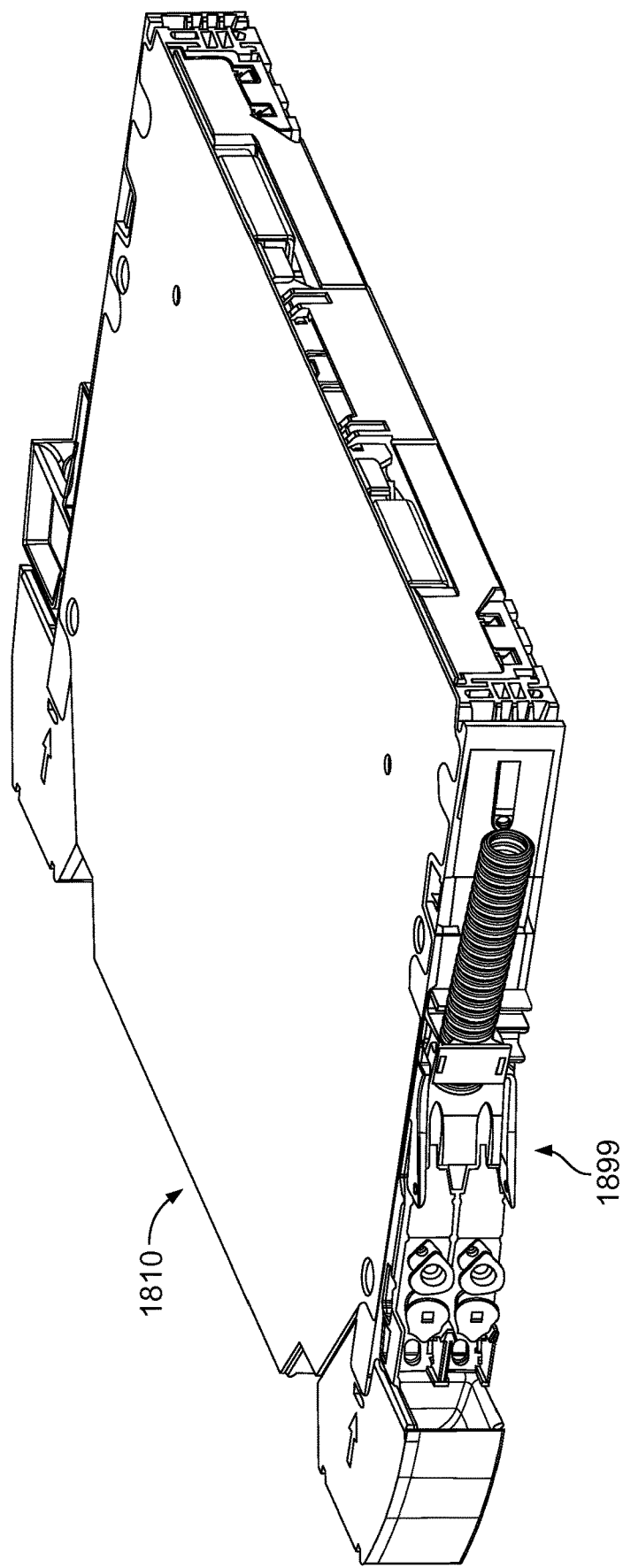
FIG. 86C illustrates the cable fixation device of FIG. 86A mounted to the element of FIGS. 80-82.

For example, FIGS. 86A-86C illustrate an example of a cable fixation device or clamp 1899 that may be slidably mounted to the sidewalls 1812 of element 1810. Cable fixation devices similar to device 1899 shown in FIGS. 86A-86C are described in further detail in International Publication No. WO 2014/173930, the entire disclosure of which is incorporated herein by reference.

The cable fixation device 1899 is similar to the cable fixation devices shown and described in WO 2014/173930 in that the cable mount 1899 is configured for securing an incoming cable such as a distribution or feeder cable to a side of an element such as an element 1810. The cable mount 1899 is sized for mounting cables that are larger in diameter than those mounted by the cable fixation devices in WO 2014/173930.

Similar to the cable fixation devices in WO 2014/173930, the cable mount 1899 of the present application is defined by a base portion 1901 and a fiber routing portion 1903 that is configured to be mounted to the base portion 1901 with a snap-fit interlock.

As shown in FIG. 86A, the fiber routing portion 1903 defines flexible cantilever fingers 1905 with ramped tabs 1907 that are configured to be received within slots 1909 on the base portion 1901. When the fiber routing portion 1903 is snap-fit with respect to the base portion 1901, the two portions 1901, 1903 cooperatively form the cable mount 1899.

The cable mount 1899 includes features for securing or clamping the strength members of an incoming cable to limit axial pull on the cable to preserve the optical fibers. A strength member clamp 1936 of the cable mount 1899 is defined by the interaction of a portion (i.e., a clamping surface 1938) of the base portion 1901 and fixation plates 1940 that are configured to be clamped against the base portion 1901 via fasteners 1942. The strength member clamp 1936 will be described in further detail below. The portion of the base 1901 that forms the clamping surface 1938 for clamping the strength members may also be referred to as a first clamp member, and the fixation plates 1940 may also be referred to as second clamp members of the strength member clamp 1936.

The cable mount 1899, once assembled, defines a front end and a rear end. The cable mount 1899 is configured to receive an incoming cable through the rear end. The base portion 1901 of the cable mount 1899 defines a jacket channel 1920 for housing the jacket of the incoming cable. A strength member pocket 1924 is defined by the base portion for receiving strength members of the incoming cable. The fiber routing portion 1903 of the cable mount 1899 includes features for guiding individual fiber-carrying loose tubes to different desired directions as the fibers extend toward the front end of the cable mount 1899.

The jacket channel 1920 is defined by upper and lower transverse walls 1931, 1933. A divider wall 1935 of the cable mount 1899 separates the jacket channel 1920 from the strength member pocket 1924. The strength member pocket 1924 is defined on an opposite side of the divider wall 1935 from the jacket channel 1920. The divider wall 1935 defines a pair of openings 1937 through which the jacket channel 1920 communicates with the strength member pocket 1924. When a cable is received from the rear end of the cable mount 1899, the strength members of the cable protruding from the jacket of the cable are inserted into the strength member pocket 1924 through the openings 1937 before being clamped using the strength member clamp 1936.

According to the depicted embodiment, the base portion 1901 of the cable mount 1899 is configured to be mounted to equipment such as element 1810 with a snap-fit interlock. As shown, the base portion defines a cantilever arm 1911 with a ramped tab 1913 adjacent the front end of the cable mount 1899 for interlocking with a notch that may be provided on a piece of telecommunications equipment. The base portion 1901 of the cable mount 1899 also defines catches 1915 having dovetail profiles along the base portion 1901 that are configured to slidably mate with intermating structures provided on the element 1810. In this manner, the cable mount 1899 may be slidably attached to the element 1810 before being locked into a notch defined by the equipment with the cantilever arm 1911. It should be noted that a snap-fit interlock utilizing dovetail profiles and a flexible cantilever lock is only one example of an attachment mechanism that may be used to mount the cable mount 1899 to an element such as element 1810 and that other types of attachment mechanisms or methods (that limit axial pull on a secured cable) may be used.

As noted above, the cable mount 1899 is configured for securing or clamping the strength members of an incoming cable to limit axial pull on the cable to preserve the optical fibers. Once the strength members of an incoming cable are inserted into the strength member pocket 1924 through the openings 1937, the strength members may be clamped between the clamping surface 1938 defined by the base portion 1901 and the fixation plates 1940.

The fixation plates 1940 each define a fastener mount 1941 that has a threaded opening 1943 for receiving the fastener 1942 when clamping the fixation plates 1940 with respect to the base portion 1901. The fastener mount 1941 defines a throughhole 1963 that extends along a longitudinal axis of the fixation plates (generally perpendicular to the threaded opening 1943) that is for receiving the strength member of the cable. When the fasteners 1942 are used to clamp the fixation plates 1940 with respect to the base portion 1901, at least a portion of each fastener may extend through the threaded opening 1943 and into the throughhole. The throughhole 1963 is preferably sized such that a strength member can extend therethrough without interference from the fastener 1942 that extends at least partially into the throughhole 1963.

The fastener mount 1941 of each fixation plate 1940 extends from a top of the fixation plate 1940 to a portion of the fixation plate 1940 that defines a clamping surface 1945. The clamping surface 1945 of the fixation plate 1940 is configured to abut against the clamping surface 1938 defined by the base portion 1901 in clamping the strength member of the cable. As noted above, clamping the fixation plates 1940 against the base portion 1901 is accomplished by using the fasteners 1942, which are threadedly engaged with the fastener mounts 1941 and which draw the fixation plates 1940 towards the base portion 1901. The base portion 1901 defines openings 1917 that are configured to accommodate and receive the fastener mounts 1941 as the fixation plates 1940 are pulled up with respect to the base portion 1901.

The fiber routing portion 1903 of the cable mount 1899 is configured to receive and guide the fiber carrying tubes of a cable being mounted using the cable mount 1899. Fiber carrying tubes are lead up a ramp 1987 defined by the fiber routing portion 1903 after the strength member of the cable has been separated therefrom and has been inserted into the strength member pocket 1924. The divider wall 1935 keeps the fiber carrying tubes and the cable jacket separate from the strength member pocket 1924 similar to the embodiments of the cable mount discussed previously. In this manner, when the cables are subjected to pulling forces, the fiber carrying components are isolated from the part of the cable mount that clamps the strength member.

The fiber routing portion 1903 of the cable mount 1899 defines a pair of fastener mounts 1919. The fastener mounts 1919 define pockets 1921 for accommodating the heads of the fasteners 1942. The fastener mounts 1919 allow the fasteners 1942 to pass from the fiber routing portion 1903 through the opening 1917 of the base portion 1901 into the fastener mounts 1941 of the fixation plates 1940. As the fasteners 1942 are threadably turned with respect to the fiber routing portion 1903, the fixation plates 1940 are pulled toward the base portion 1901 to clamp the strength members between the clamping surfaces 1938 and 1945.

As noted previously, the fiber routing portion 1903 of the cable mount 1899 includes features for guiding individual fiber-carrying loose tubes to different desired directions as the fibers extend toward the front end of the cable mount 1899. The fiber routing portion 1903 defines cable management structures in the form of spools 1927 that are configured to guide the fiber carrying tubes to different desired directions without violating minimum bend requirements.

As shown, the spools 1927 may include flanges 1929 for retaining the fibers within the fiber routing portion 1903. A plurality of fiber channels 1959 are formed between the spools 1927. The flanges 1929 of the spools facilitate in keeping the fibers within desired fiber channels 1959.

As shown, the base portion 1901 may define walls 1997 at the front end to cooperate with the spools 1927 of the fiber routing portion 1903 for directing or guiding the fiber carrying tubes extending from the spools 1927 to different locations around a distribution element.

The fiber routing portion 1903, specifically the spools 1927, are designed to allow the fibers to be routed to different locations around an element or to different elements. The fiber routing portion 1903 is configured to allow the fiber carrying tubes to extend straight upwardly, straight downwardly, diagonally upwardly, diagonally downwardly, or straight through after passing through the channels 1959.

Figure 87A:
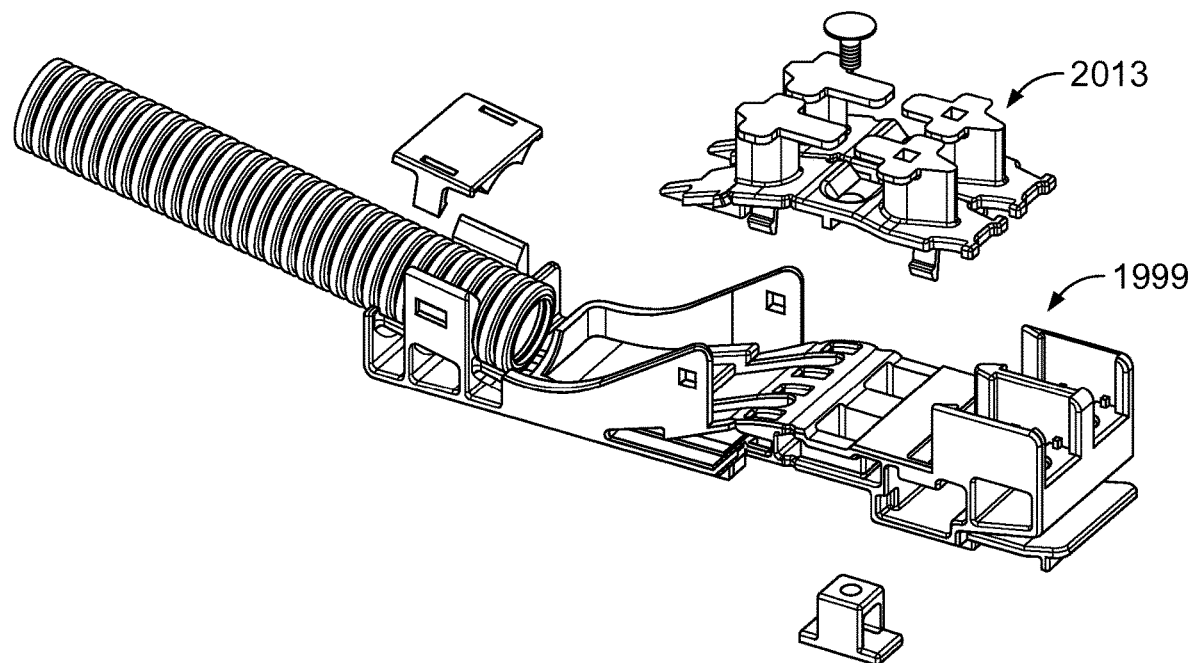
FIG. 87A illustrates an exploded view of another horizontal cable fixation device similar to that shown in FIG. 86A that may be mounted to the sidewalls of the element of FIGS. 80-82.
Figure 87B:
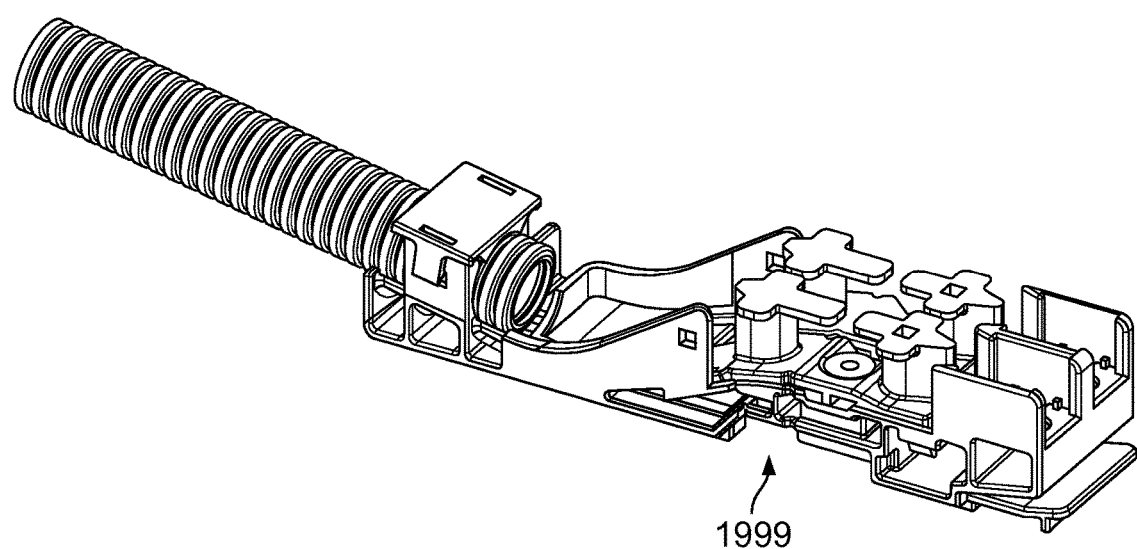
FIG. 87B illustrates the cable fixation device of FIG. 87A in an assembled configuration.
Figure 87C:
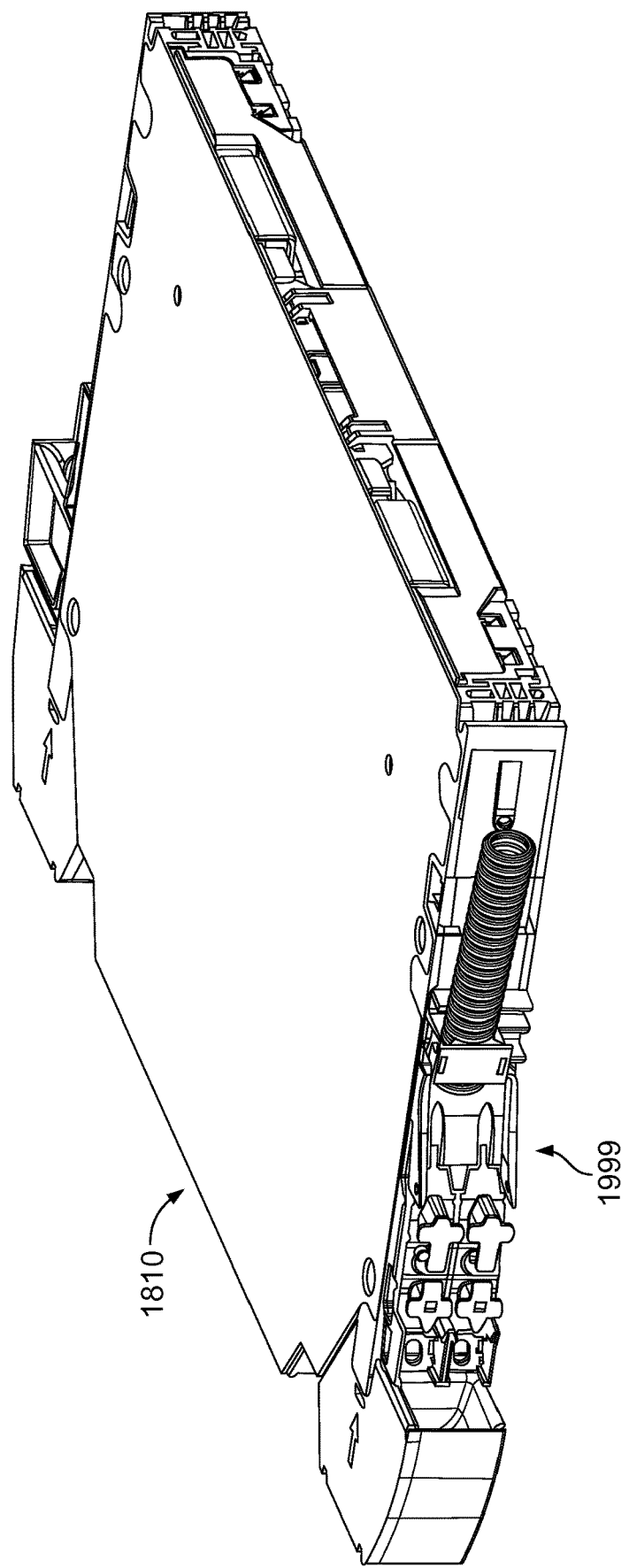
FIG. 87C illustrates the cable fixation device of FIG. 86A mounted to the element of FIGS. 80-82.
Figure 88A:
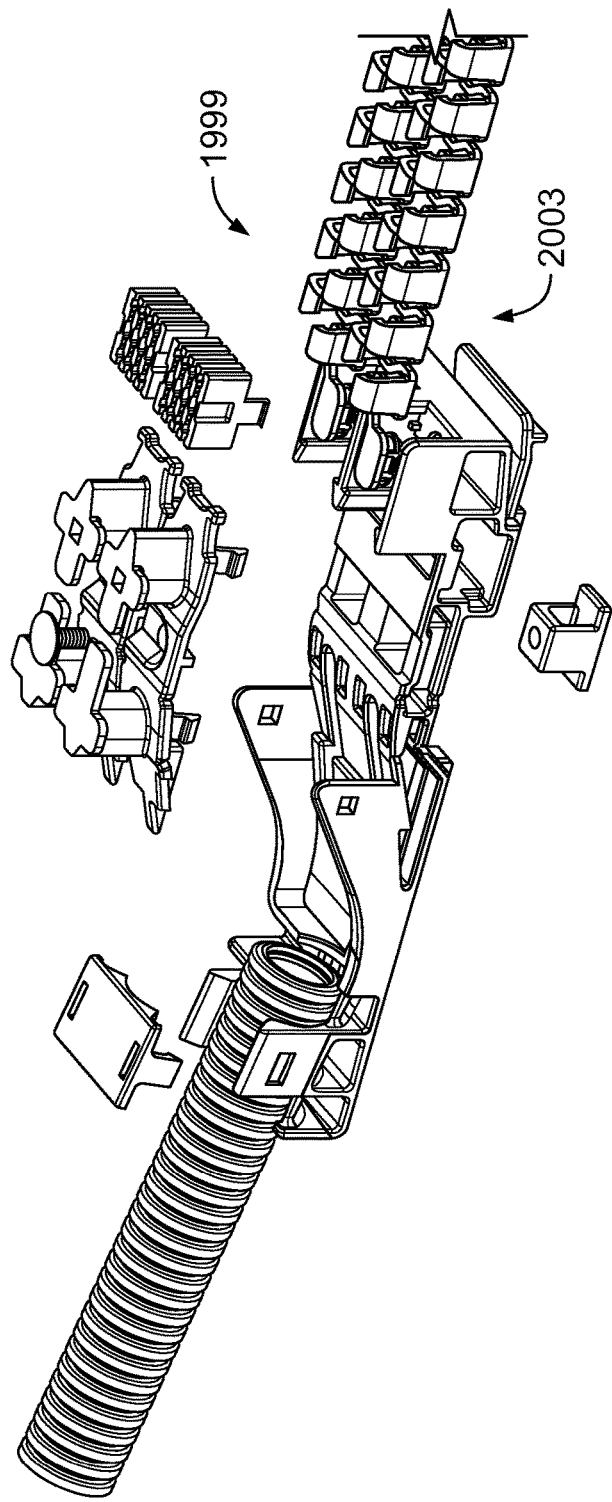
FIGS. 88A-88C illustrate the horizontal cable fixation device of FIGS. 87A-87C used with a cable wrap similar to the cable wrap shown in FIG. 16.
Figure 88B:
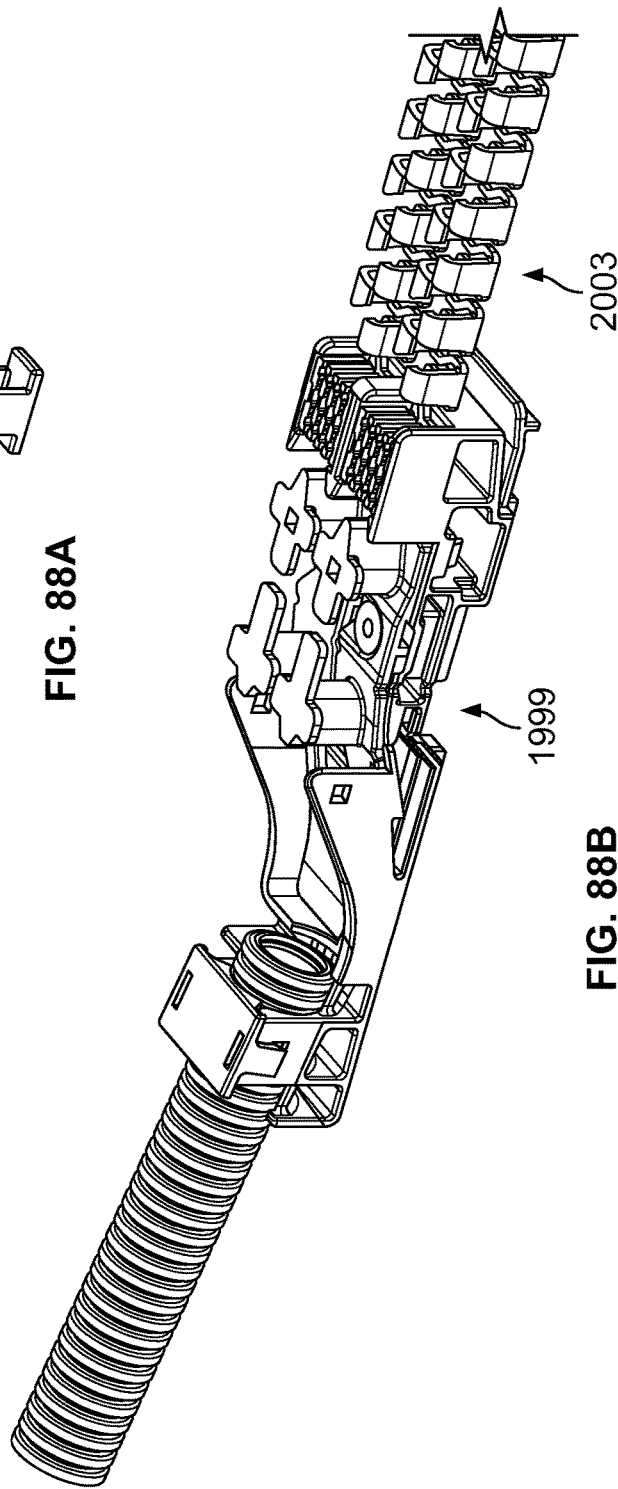
Figure 88C:
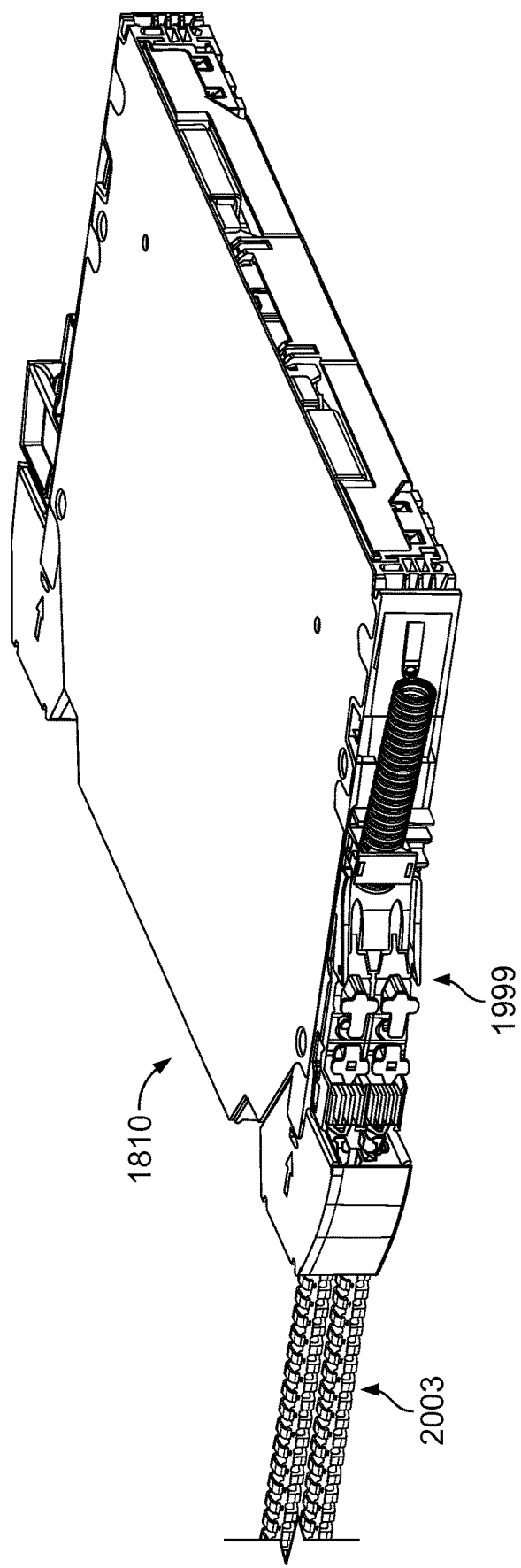

In the embodiment of the cable mount 1899 illustrated, the fiber routing portion 1903 is provided as a separate structure than the base portion 1901 of the cable mount 1899 and is mounted to the base portion 1901 with a snap-fit interlock. The two portions are provided as separate structures so that the base portion 1901 can be used with fiber routing portions that may have a different configuration than the fiber routing portion 1903 that is shown in FIGS. 86A-86C. The separability of the two portions 1901 and 1903 allows variability in the design of the fiber routing portion depending upon the type of cable used. For example, the number and the structure of the spools 1927 can be varied depending upon the size and the number of the fibers of the clamped cable. FIGS. 87A-87C illustrate an example of a cable fixation device 1999 that has a different fiber routing portion 2013. In FIGS. 88A-88C, the cable fixation device 1999 of FIGS. 87A-87C is shown used with a cable wrap 2003 similar to the cable wrap 102 of FIG. 16 that provides additional protection of the fiber breakouts extending from the cable mount 1999.

Figure 83A:
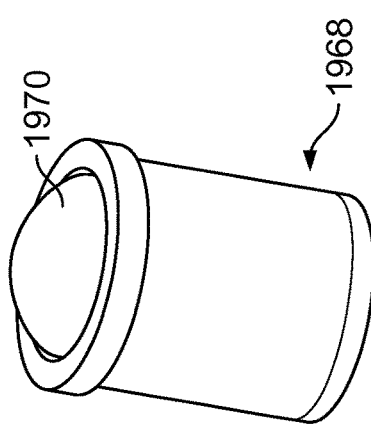
FIG. 83A is a close-up view of a portion of the latch of FIG. 83.
Figure 83:
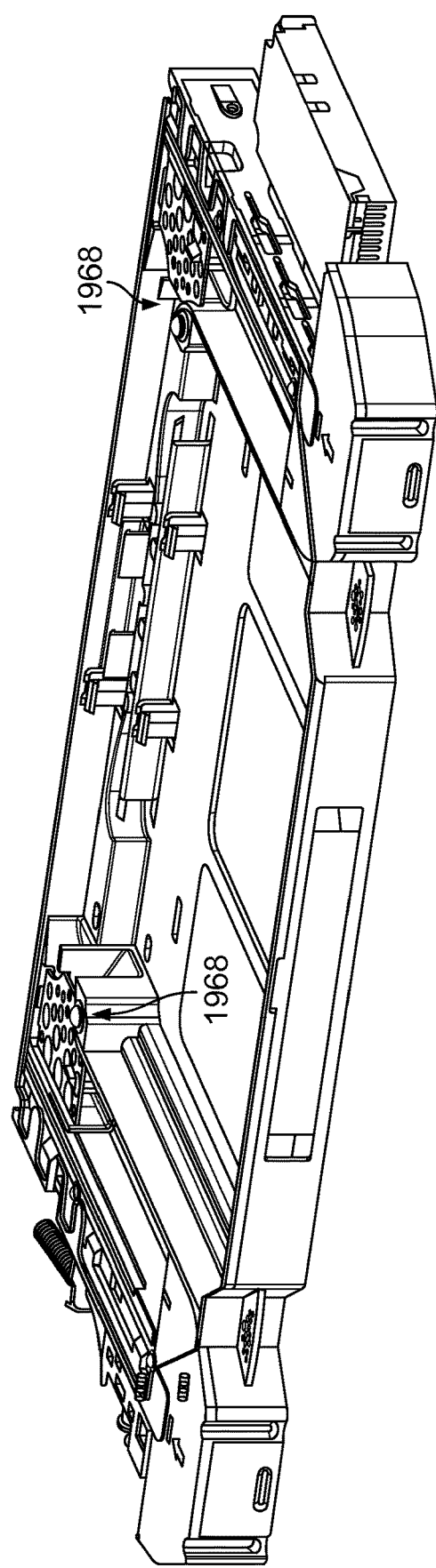
FIG. 83 illustrates another version of a latch for latching the tray of an element to the cover of the element in a closed position, the latch shown as being used on the element of FIGS. 80-82.

Referring now to FIGS. 83 and 83A, another version of a latch 1968 for latching the tray 1824 to the cover 1866 in the closed position is illustrated on element 1810. The latch 1968, which is provided as part of the tray 1824, includes a spring-loaded ball 1970 that is configured to be nested within notches or holes 1971 defined on the cover 1866 of each of the elements 1810. The notches or holes 1971 of the cover 1866 are shown in FIGS. 80-82. The spring-loaded ball 1970 is configured to keep the tray 1824 in a closed position. If a user applies enough force to overcome the tension of the spring pushing against the spring-loaded ball 1970, the user can slide the tray 1824 to an open position. The latch 1968, even though illustrated on an element such as element 1810, can be used on any of the versions of the elements discussed previously.

Figure 89:
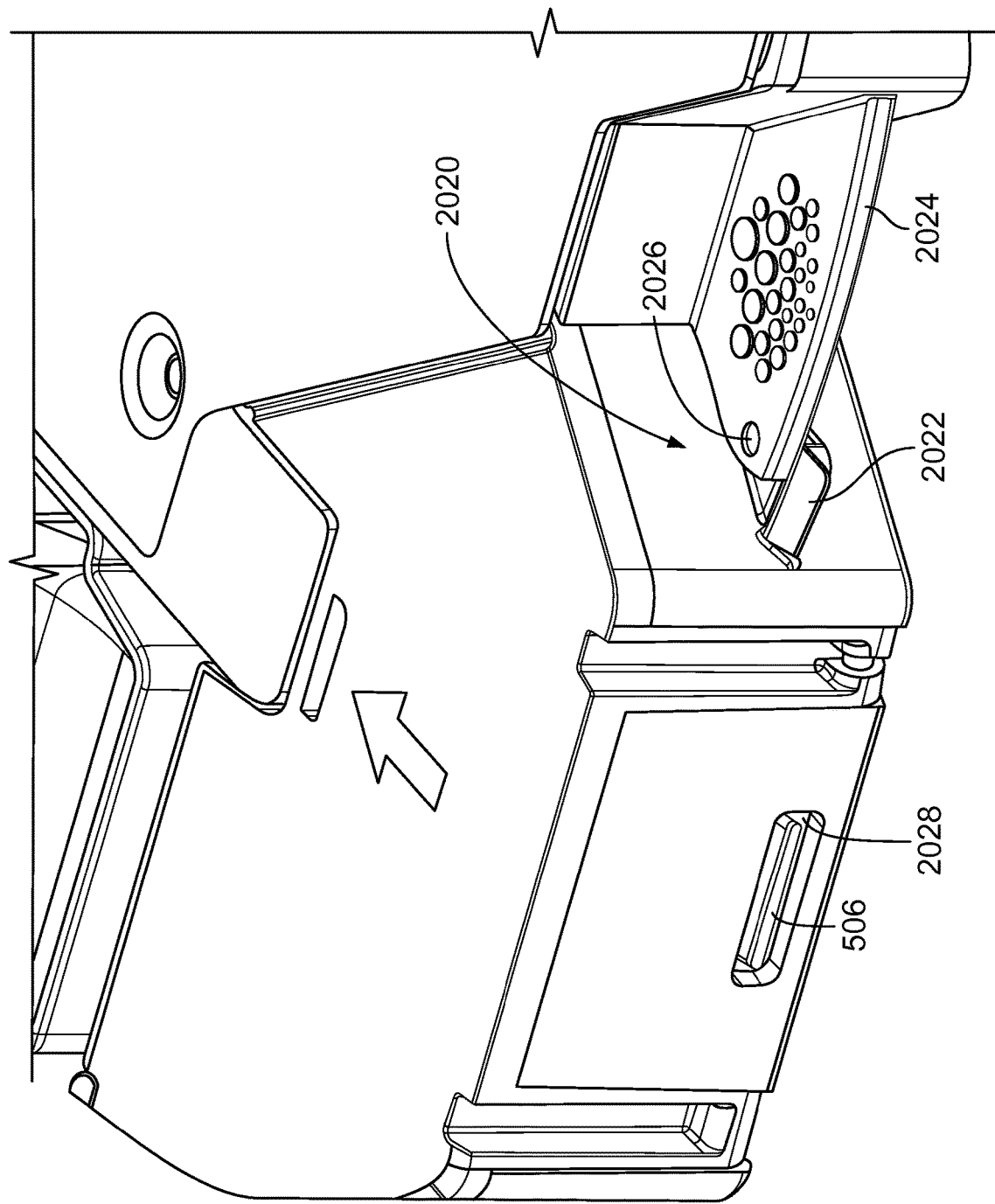
FIG. 89 illustrates another version of a latch for keeping the tray of an element in the closed position, the latch shown as being used on an element similar to that of FIGS. 80-82, the tray shown in a closed position.
Figure 90:
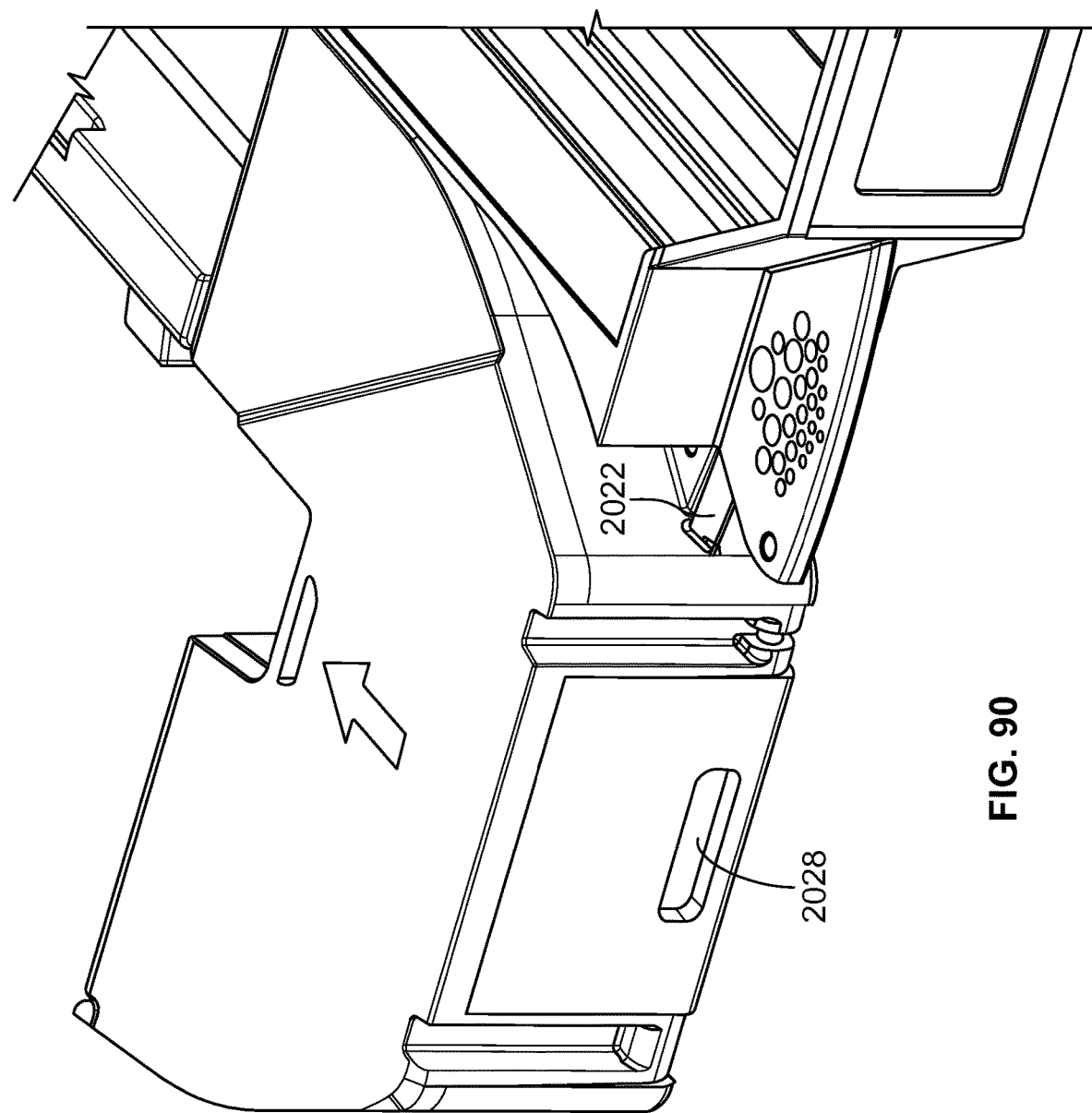
FIG. 90 illustrates the tray of FIG. 89 being moved from the closed position to an open position.
Figure 91:
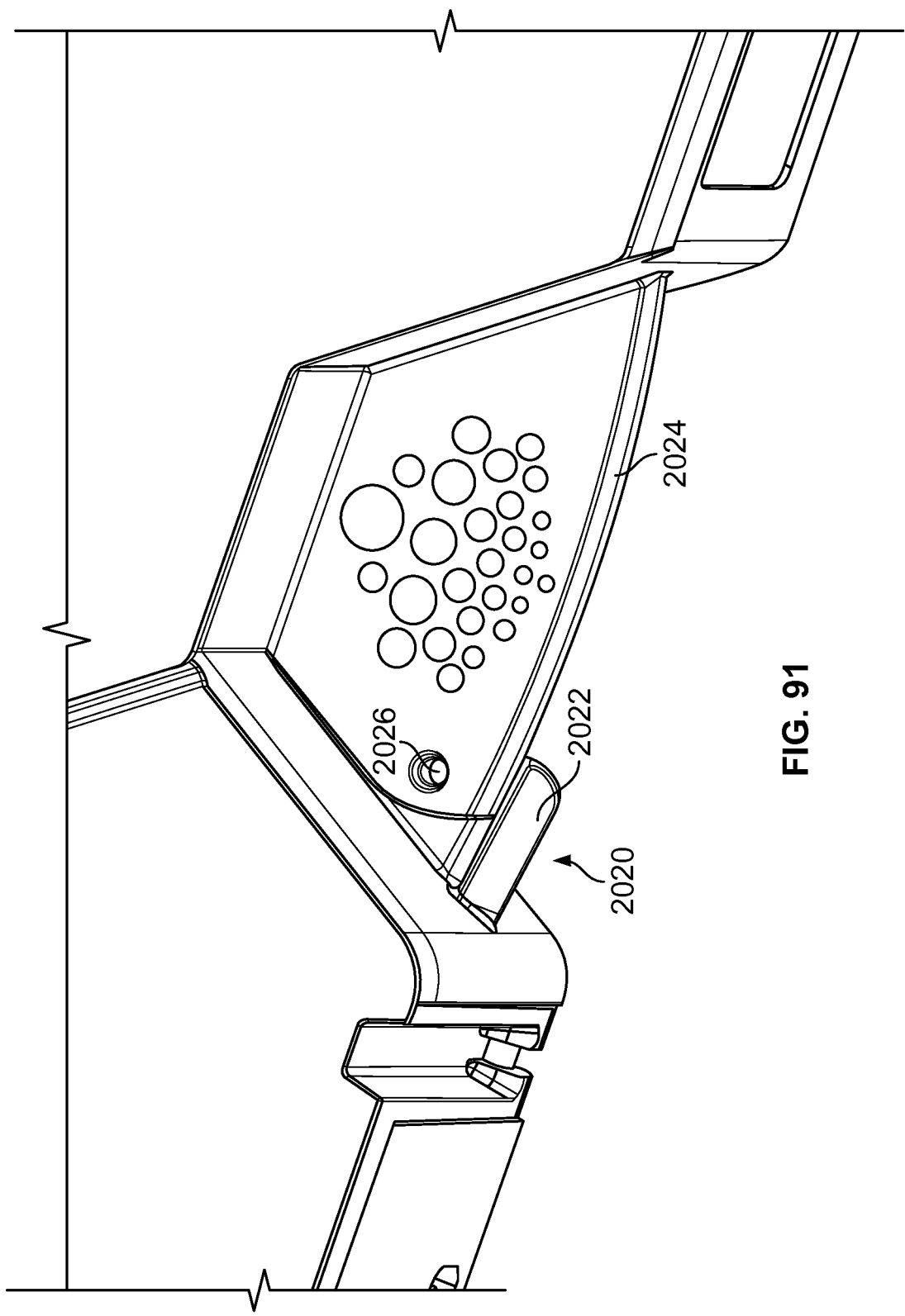
FIG. 91 illustrates a close-up view of the tray of FIG. 89 showing the additional openings on the tray used for securing the tray in a closed position.

Yet another embodiment of a latch 2020 for keeping the tray of an element in a closed position is illustrated in FIGS. 89-91. The latch 2020 is shown as being used on an element similar to element 1810 of FIGS. 80-82. The latch 2020 is formed by a rib 2022 that is provided on the U-shaped radius limiter 1838. The rib 2022 interacts with a handle 2024 of the tray 1824 in keeping the tray 1824 in a closed position. When moving the tray 1824 toward an open position, the handle 2024 is simply forced over the rib 2022 or the rib 2022 is flexed slightly downwardly. As noted previously, the U-shaped radius limiter 1838 is configured to be able to slide with respect to the chassis of the element 1810. The radius limiter 1838 moves in synchronized movement relative to the chassis and the tray 1824 to maintain fiber slack. The latch 2020 operates to keep the tray 1824 in a closed position by preventing relative separation between the tray 1824 and the radius limiter 1838. Since the tray 1824 and the radius limiter 1838 are configured to move simultaneously but with the tray 1824 moving at twice the speed of the radius limiter 1838, preventing relative separation between the tray 1824 and the radius limiter 1838 keeps the entire slide mechanism, and thus the tray 1824, from moving.

FIG. 89 illustrates the tray 1824 in a closed position, and FIG. 90 illustrates the tray 1824 being moved from the closed position to an open position.

Now referring to FIG. 91, the handle 2024 of the tray 1824 and the rib 2022 formed on the U-shaped radius limiter 1838 may include additional openings 2026 that are configured to align when the tray 1824 is in the closed position. The openings 2026 may be used to permanently or semi-permanently secure the tray 1824 in the closed position via attachment structures such as zip-ties, wires, etc.

Figure 85:
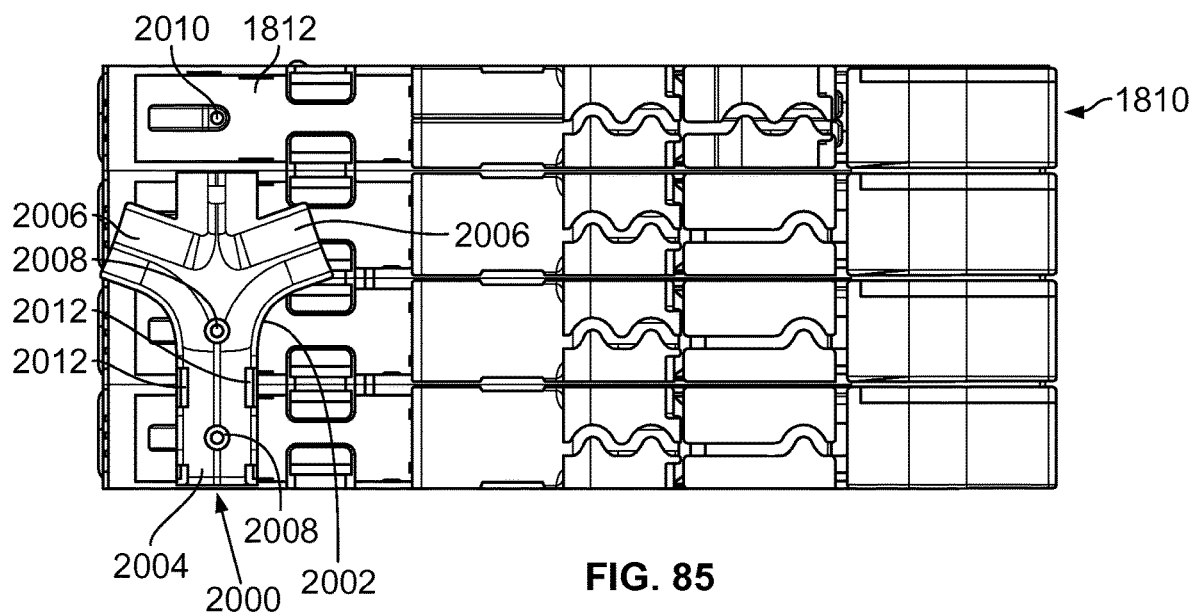
FIGS. 84-85 illustrate a vertical cable mount that is configured for use with the element of FIGS. 80-82.
Figure 84:
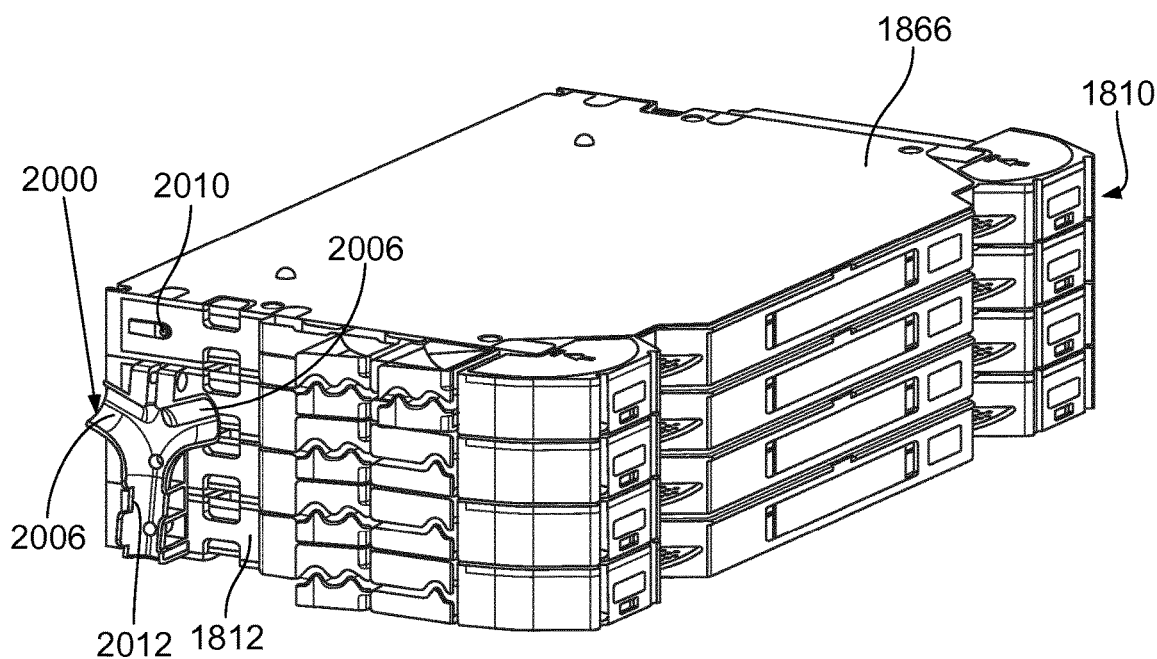

Referring now to FIGS. 84 and 85, another example of a cable mount 2000 is illustrated as being attached to the sidewall of element 1810. The cable mount 2000 includes a Y-shaped body 2002 that defines an entrance trough 2004 and two oppositely-extending exit troughs 2006. The cable mount 2000 is shown as attached vertically to the sidewall 1812 of element 1810 via fasteners 2008 that are inserted into fastener mounts 2010 positioned toward the rear of the chassis of the element 1810.

A cable extending vertically within a telecommunications rack to which the element 1810 is mounted enters the entrance trough 2004 of cable mount 2000 and can lead either toward the front of the element 1810 or toward the rear of the element 1810 via the exit troughs 2006.

The body 2002 of the cable mount 2000 defines tabs 2012 at the sides of the entrance trough 2004 for pressing against the outer jackets of the cables to frictionally hold the cables mounted using the cable mount 2000. The tabs 2012 may also be provided along the sides of the exit troughs 2006.

The cable mount can be mounted to any of the elements 1810 along a vertical block depending upon where the vertical cable needs to be directed.

Figure 94:
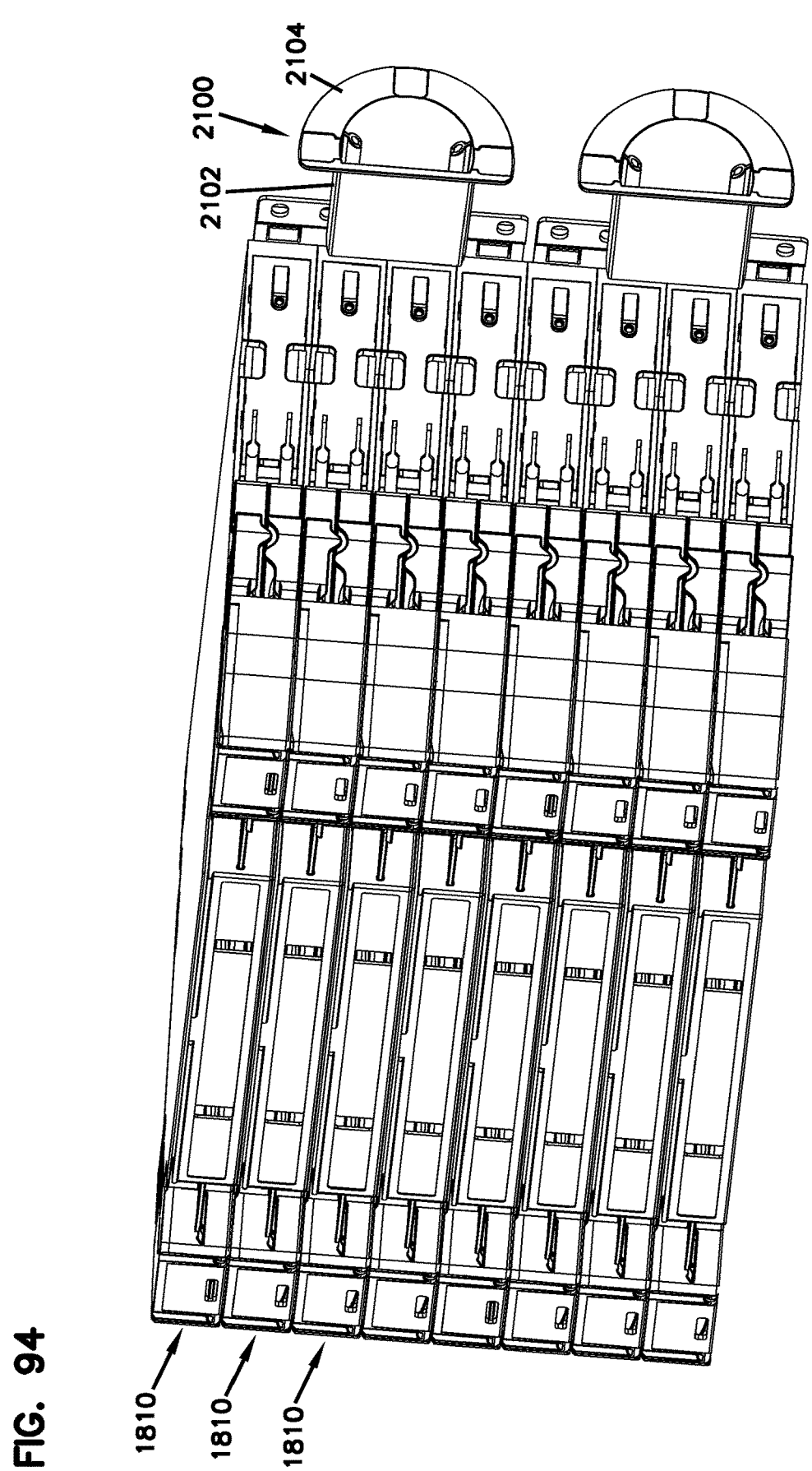
FIG. 94 illustrates another embodiment of a cable manager that is used with a stack of elements similar to those shown in FIGS. 80-82 and 89-91, the stack of elements illustrated in FIG. 94 are shown with a pair of the cable managers.
Figure 95:
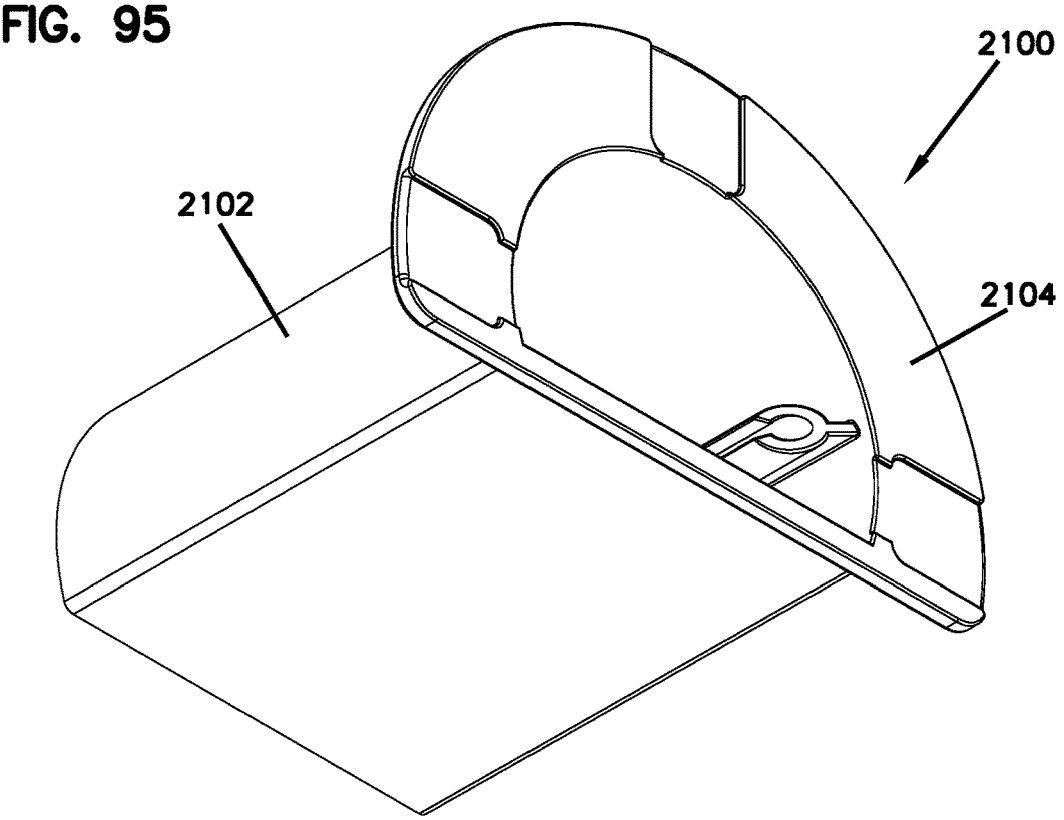
FIG. 95 is a top, front, right side perspective view of one of the cable managers of FIG. 94 shown in isolation.
Figure 96:
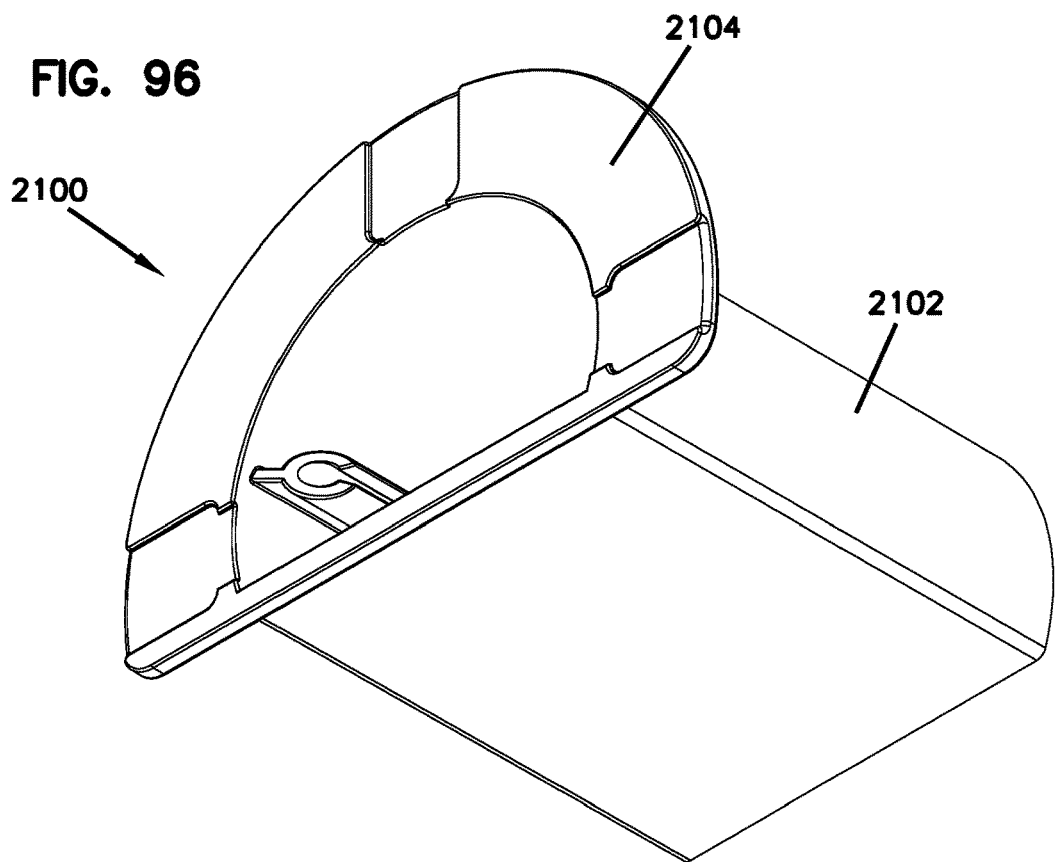
FIG. 96 is a bottom, front, right side perspective view of the cable manager of FIG. 95.
Figure 97:
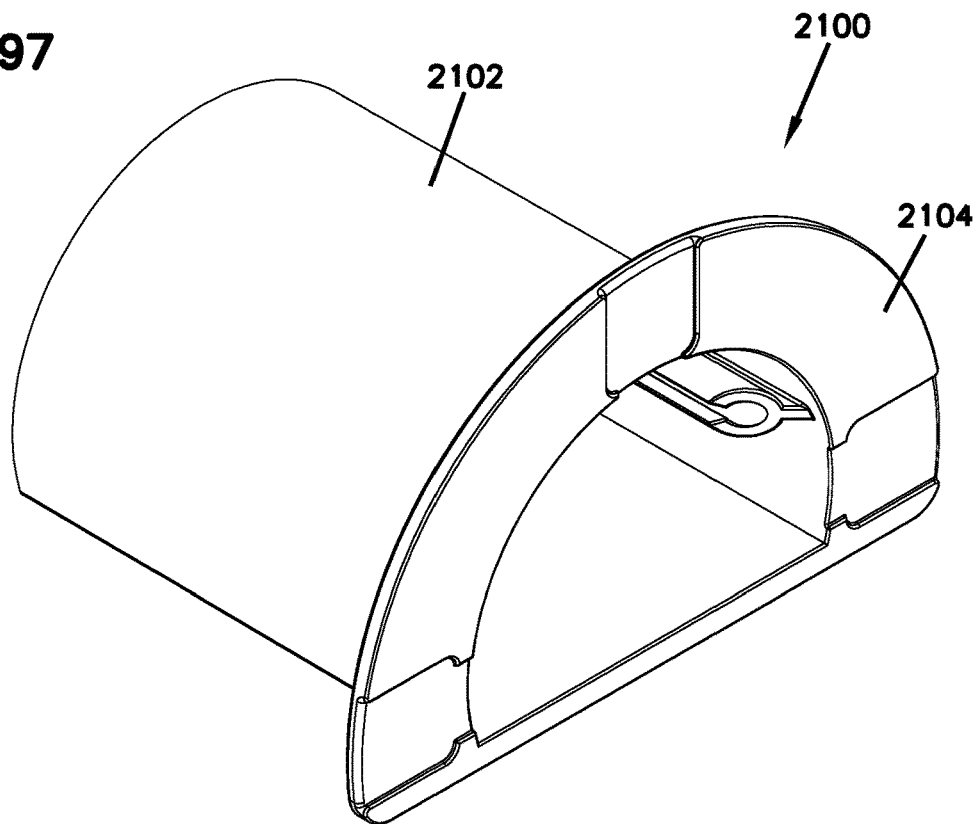
FIG. 97 is a top, rear, right side perspective view of the cable manager of FIG. 95.
Figure 98:
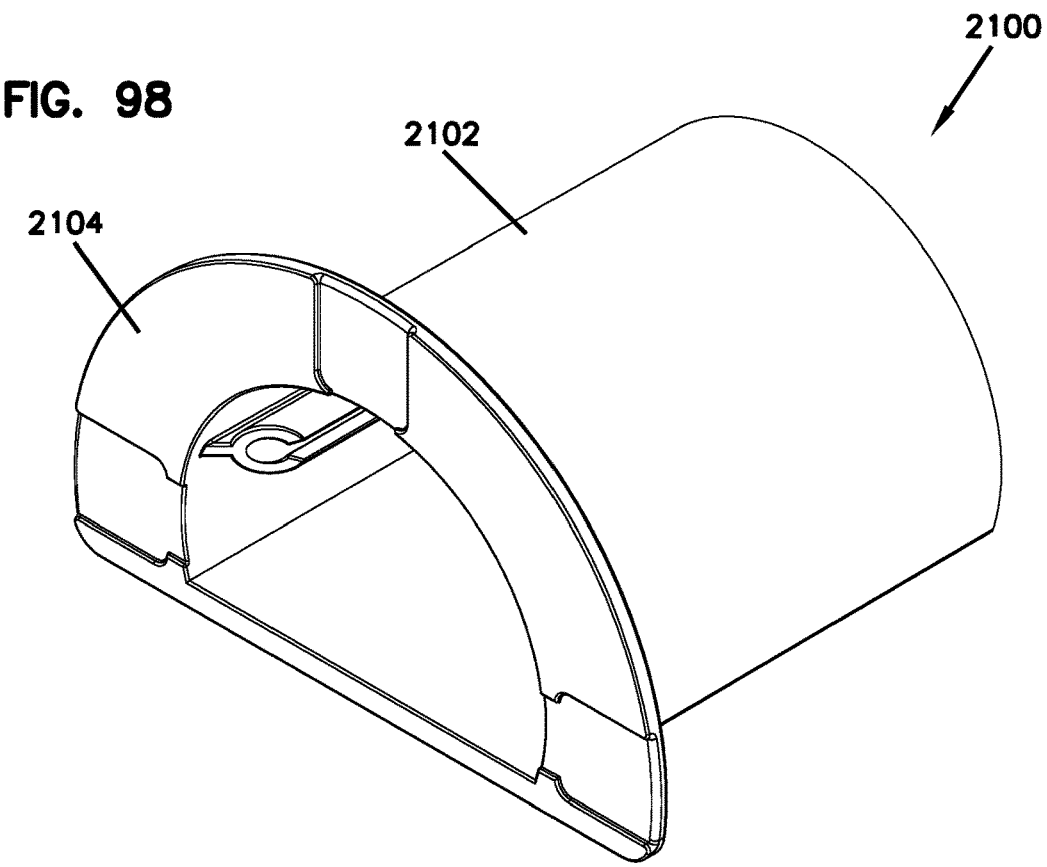
FIG. 98 is a bottom, rear, right side perspective view of the cable manager of FIG. 95.
Figure 99:
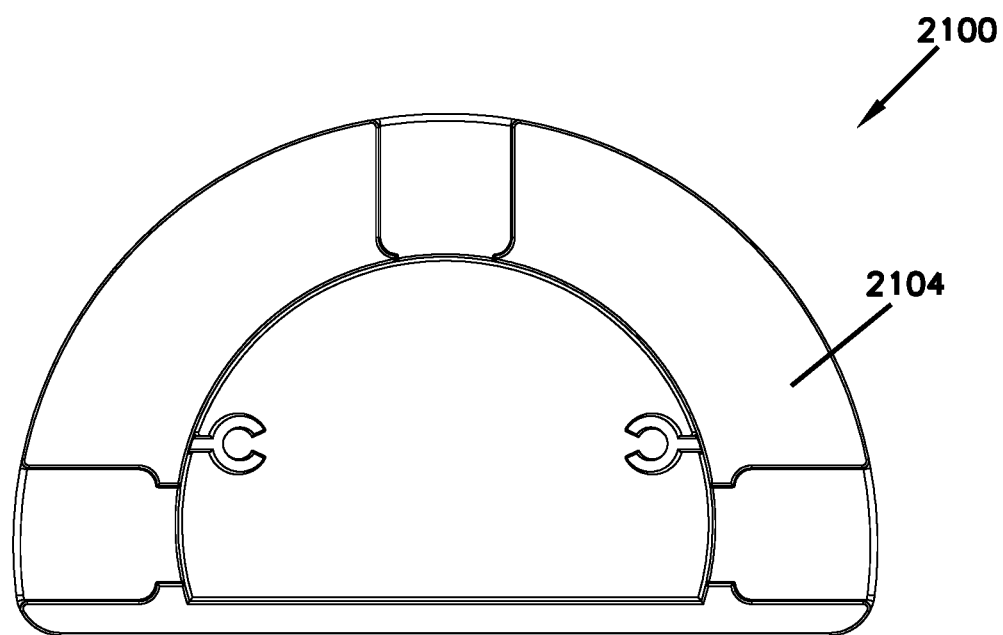
FIG. 99 is a right side view of the cable manager of FIG. 95.
Figure 100:
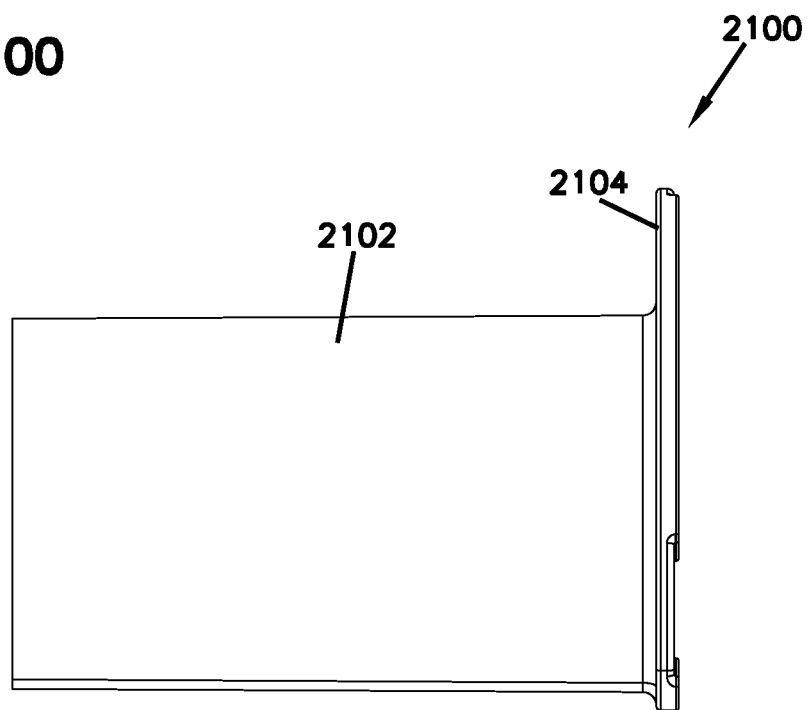
FIG. 100 is a top view of the cable manager of FIG. 95.
Figure 101:
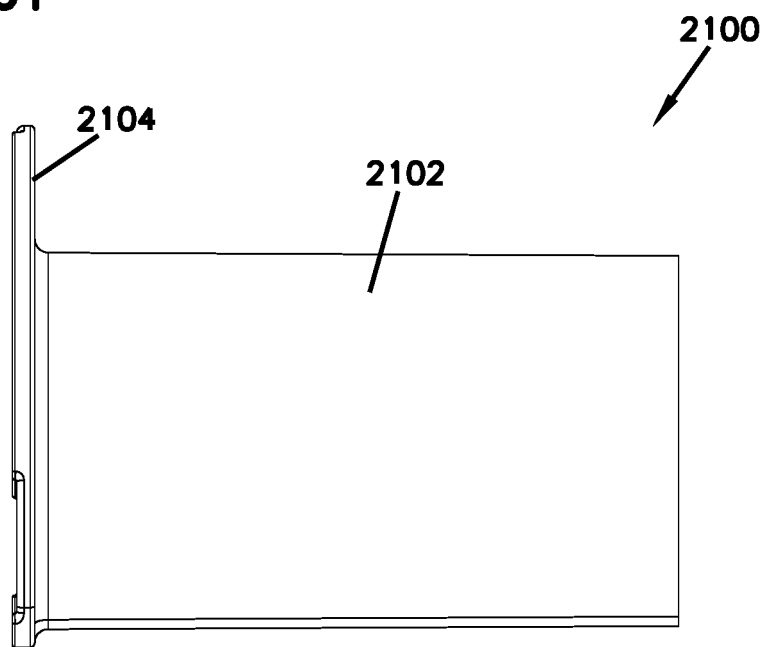
FIG. 101 is a bottom view of the cable manager of FIG. 95.
Figure 102:
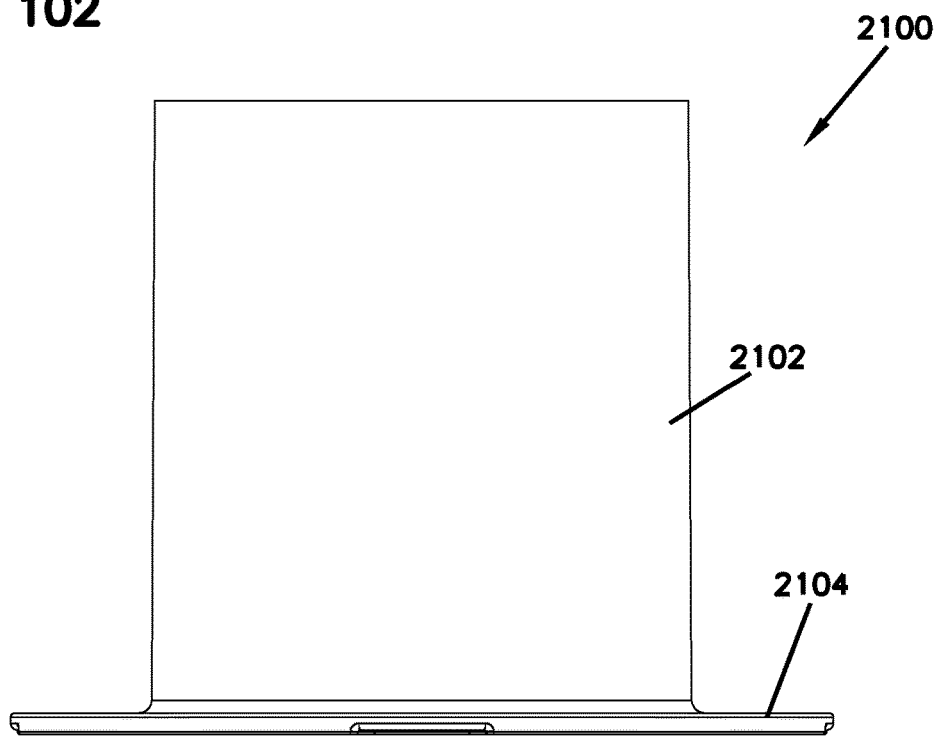
FIG. 102 is a rear view of the cable manager of FIG. 95.
Figure 103:
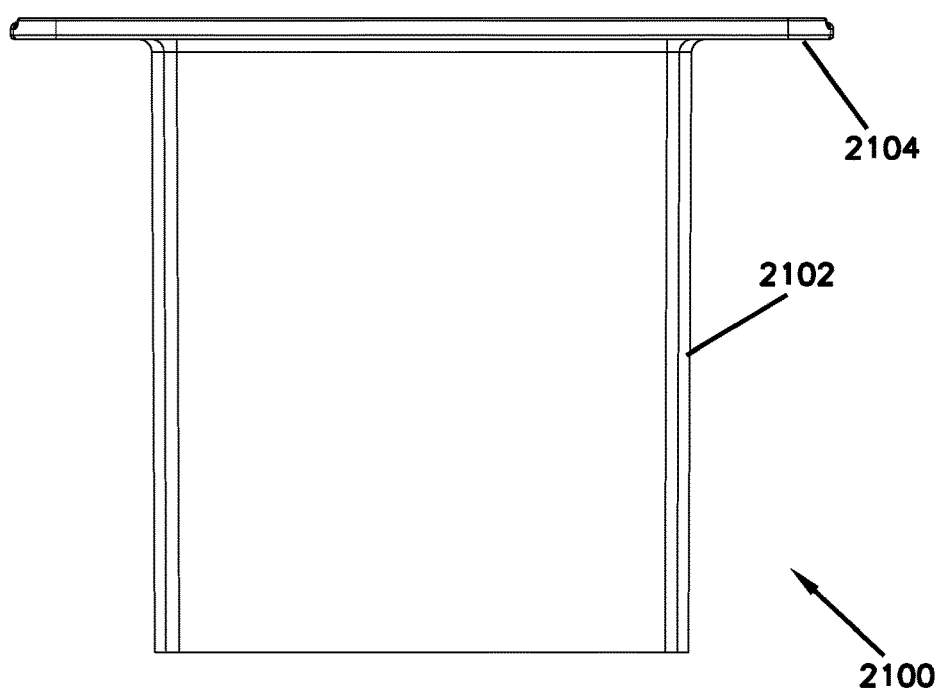
FIG. 103 is a front view of the cable manager of FIG. 95.
Figure 104:
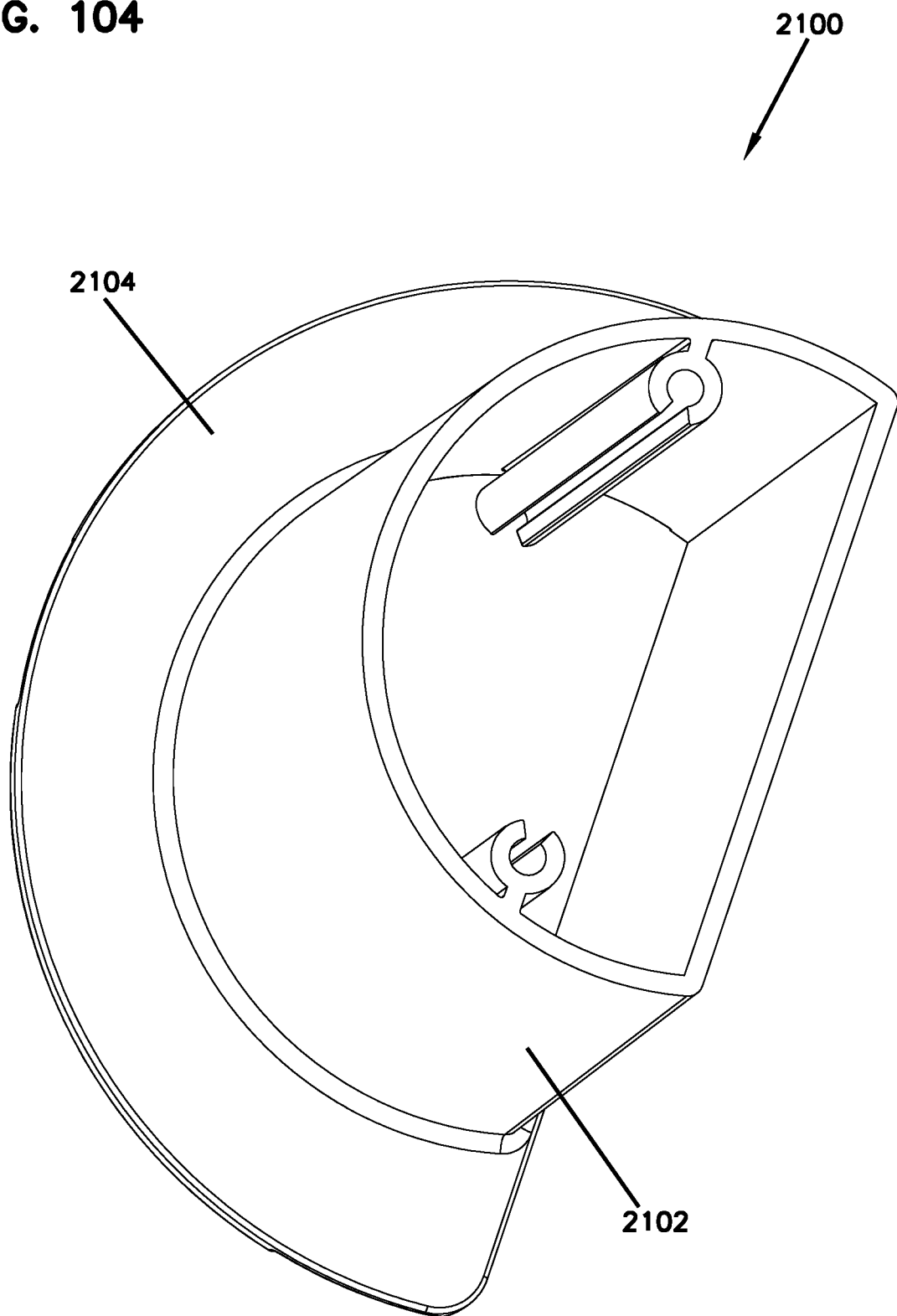
FIG. 104 is a bottom, rear, left side perspective view of the cable manager of FIG. 95.

Referring now to FIGS. 94-104, another embodiment of a cable manager 2100 that is used with a stack of elements similar to elements 1810 shown in FIGS. 80-82 and 89-91 is illustrated. In FIG. 94, the stack of elements 1810 is illustrated with a pair of the cable managers 2100. Various views of one of the cable managers 2100 in isolation is shown in FIGS. 95-104.

The cable managers 2100 are designed and positioned for guiding and providing bend radius protection for optical cables extending between different layers of elements 1810.

As illustrated, each cable manager 2100 defines a large spool portion 2102 that guides the cables and a flange portion 2104 that provides a retaining surface for the cables.

In the illustrated example, each cable manager 2100 is large enough to span across two layers of elements 1810 in the vertical direction. The cable managers 2100 may be configured to be mounted to the elements 1810 via a variety of methods such as with snap-fit interlocks, slide-interlocks (e.g., with dovetail structures), etc.

The cable managers 2100 are mounted toward the back of the stack of elements 1810 so that sufficient length of cabling is provided from the exit/entrance point adjacent the front of an element 1810 to the cable manager 2100 so as to minimize the signal degradation when bending the cables in leading them to other layers. As shown, with the use of the cable managers 2100, cables can be lead to vertically adjacent layers or layers of elements 1810 that are spaced farther apart. The spool portions 2102 are large enough to accommodate multiple cable bundles.

Referring now to FIGS. 105-117, as noted above, various hingedly mountable frame members may be used within the trays of the optical fiber distribution elements to provide for various routing/distribution configurations.

FIGS. 105-117 illustrate a system 2200 for hingedly connecting frame members, for example, similar to those shown in FIGS. 68-79, to trays of elements, for example, similar to those shown in FIGS. 80-82 and 89-94. As will be discussed in further detail below, the connection system 2200 between the trays of the elements and the frame members is formed by a hinge structure 2202 that includes features that are examples of inventive aspects in accordance with the present disclosure.

Figure 105:
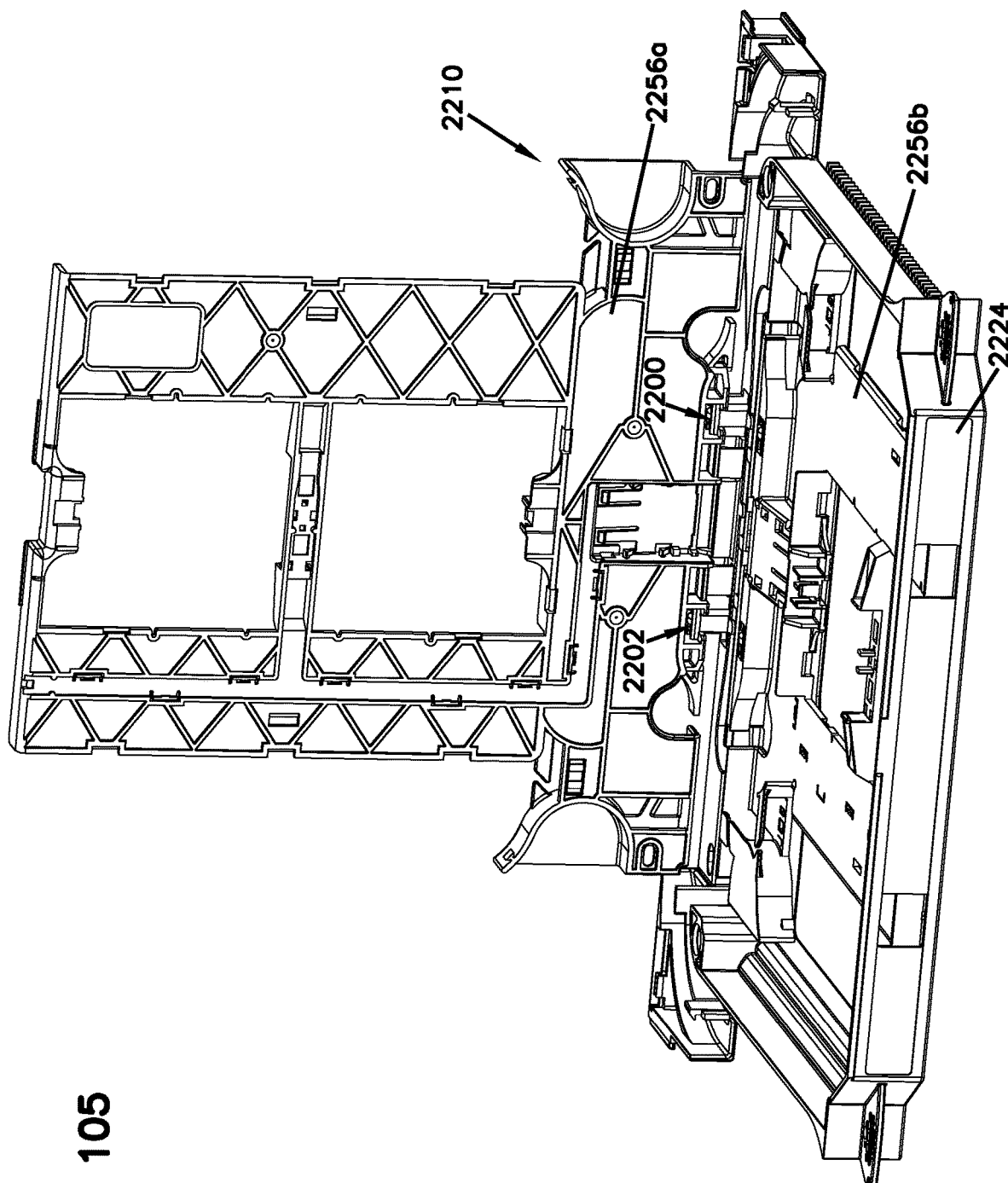
FIG. 105 illustrates a front perspective view of an example embodiment of an optical fiber distribution element similar to those shown in FIGS. 80-82 and 89-94 that utilizes a connection system for hingedly connecting frame members similar to those shown in FIGS. 68-79 to the tray of the distribution element, the hinge structure forming the system including features that are examples of inventive aspects in accordance with the present disclosure.
Figure 106:
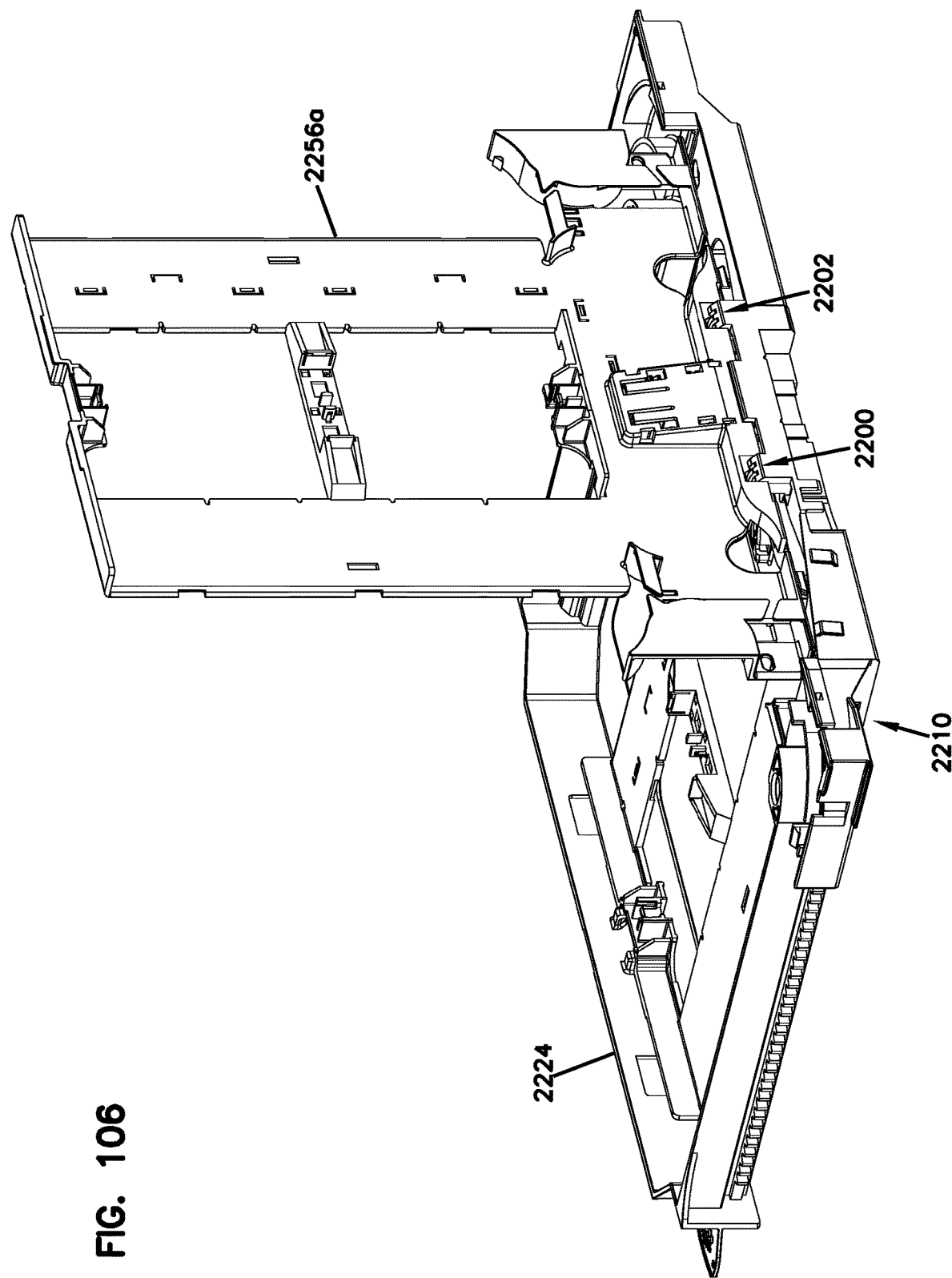
FIG. 106 illustrates a rear perspective view of the element of FIG. 105.
Figure 107:
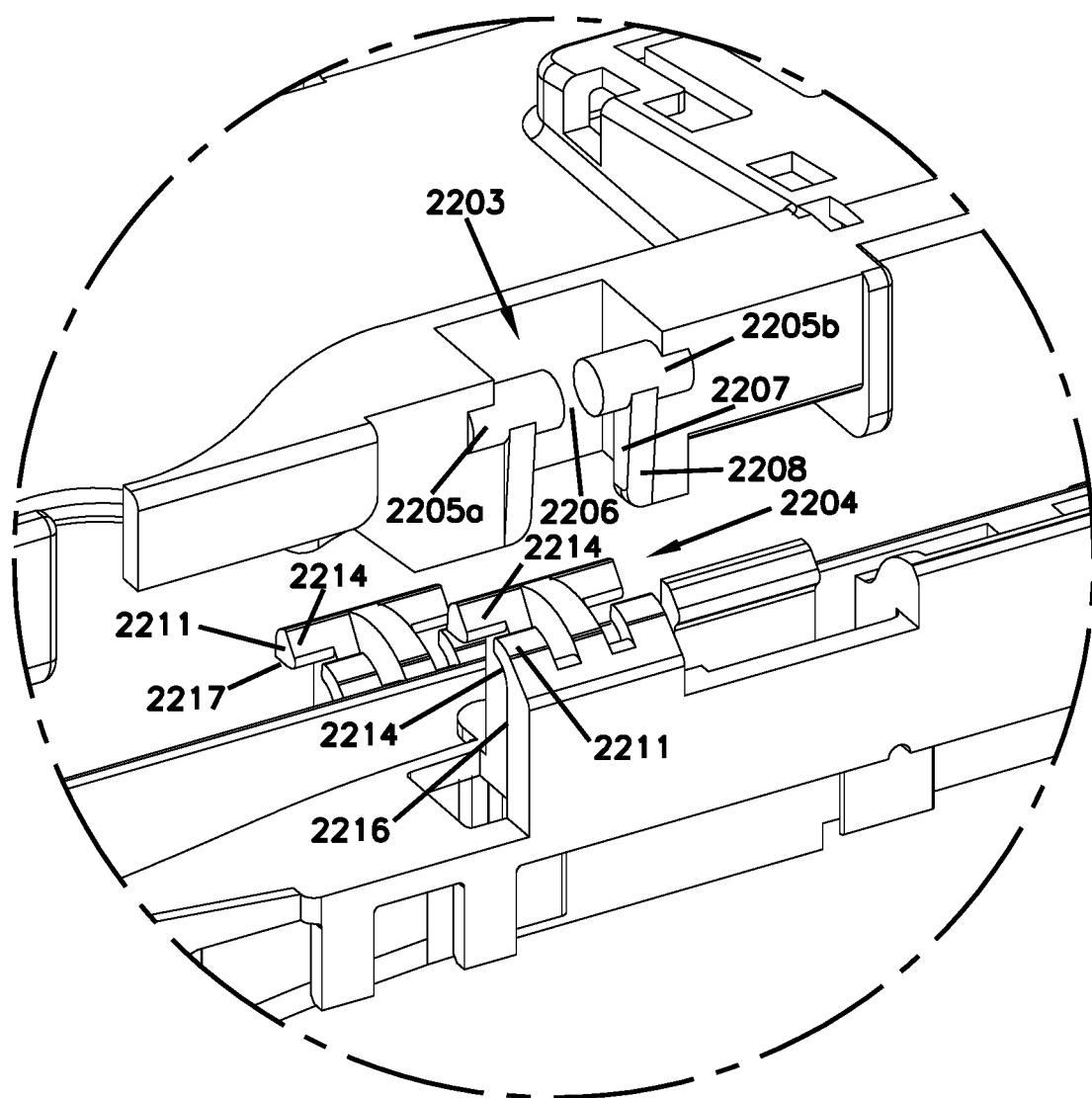
FIG. 107 illustrates a close-up rear perspective view of the hinge structure for the upper frame member of FIGS. 105-106 in an unattached configuration.
Figure 108:
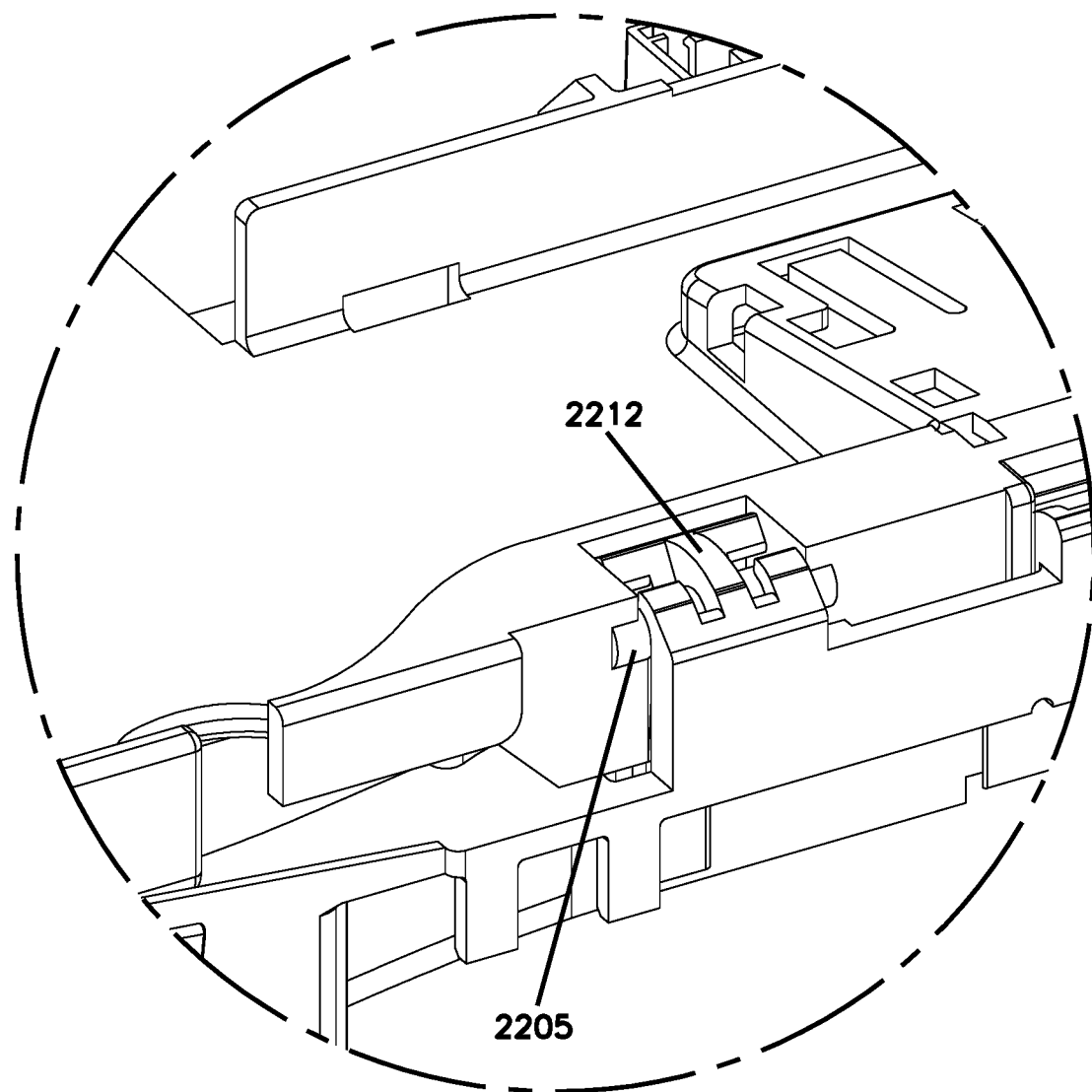
FIG. 108 illustrates the upper frame member of FIG. 107 in an attached configuration.
Figure 109:
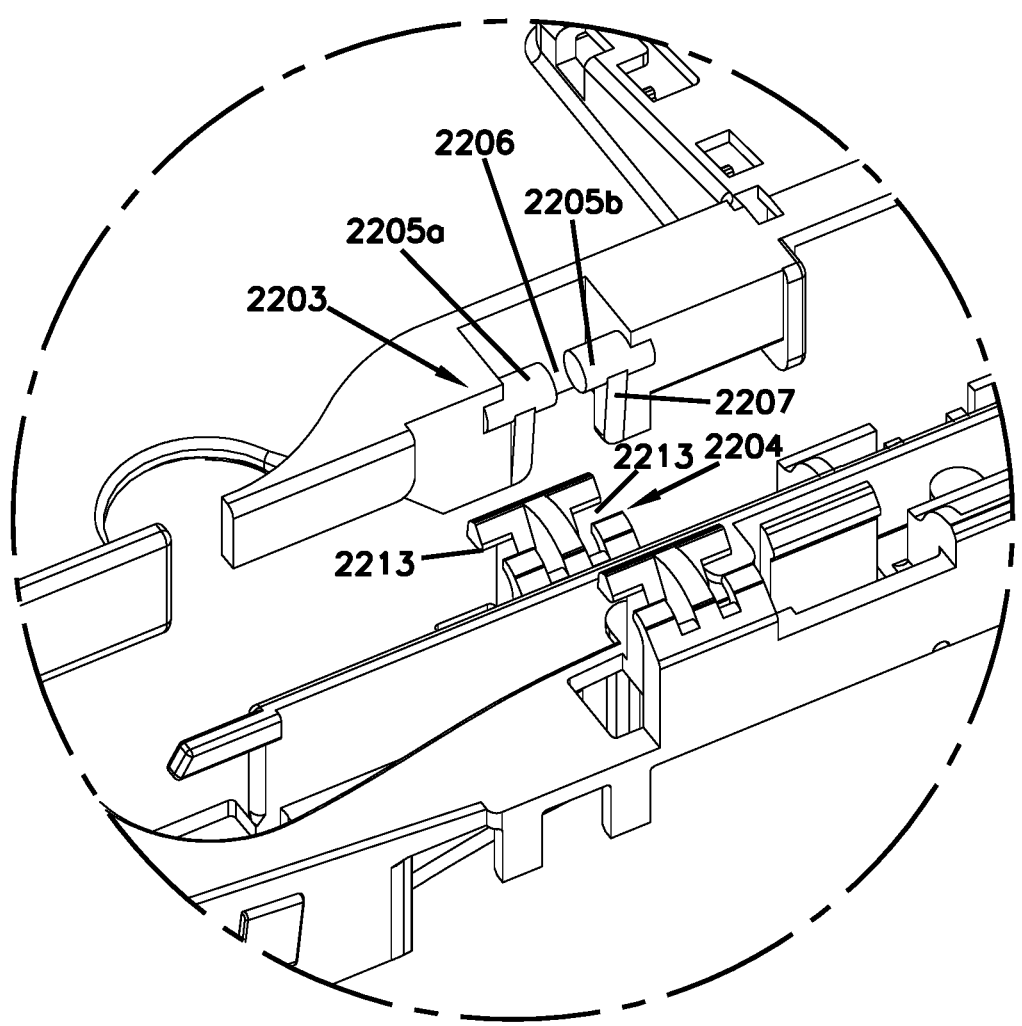
FIG. 109 illustrates a close-up rear perspective view of the hinge structure for the lower frame member of FIGS. 105-106 in an unattached configuration.

FIGS. 105-106 illustrate an example embodiment of an optical fiber distribution element 2210 (similar to those of FIGS. 80-82 and 89-94) and frame members 2256 (similar to those of FIGS. 68-79) attached thereto utilizing the hinge structure 2202.

It should be noted that the element 2210 and the frame members 2256 attached to the tray 2224 thereof, illustrated in FIGS. 105-106, are exemplary structures that may utilize and are used to illustrate the features of the hinge structure 2202 of the present disclosure, and the inventive aspects relating to the hinge structure 2202 should not be limited to those elements/fixtures shown.

Still referring to FIGS. 105-106, similar to the earlier embodiments of the elements, each tray 2224 of element 2210 may include two frame members 2256 in a stacked arrangement, wherein the frame members 2256 are pivotally mounted at hinge structures 2202. A top frame member 2256a is normally positioned above a bottom frame member 2256b. As discussed previously, the S-shaped pathways within each element 2210 includes an upper level and a lower level in the interior. The upper level is generally configured to supply the upper frame member 2256a, and the lower level is generally configured to supply the lower frame member 2256b that is positioned below the upper frame member 2256a. The trays 2224 cooperate with the frame members 2256 in defining openings for guiding the cables to the specified frame members 2256.

As in previous examples, a portion of the S-shaped pathway may be positioned adjacent to hinge structures 2202 to avoid potentially damaging cable pull during pivoting movement of frame members 2256.

Referring specifically to FIGS. 107-117, the hinge structure 2202 is illustrated in closer detail. The hinge structure 2202 is generally defined by a pair of hinge pins 2203 located at the rear of each of the frame members 2256. The pair of hinge pins 2203 is configured to be received by a pair of hinge pin receivers 2204 located toward the rear of the tray 2224. For ease of description, only one of the hinge pins 2203 of the pair and only one of the pin receivers 2204 of the pair will be described in detail with the understanding that the features are fully applicable to the other.

As shown, each hinge pin 2203 is divided into two halves 2205 (a right/first half 2205a and a left/second half 2205b) by a notch 2206. As will be discussed in further detail below, the notch 2206 forms a part of the system 2200 associated with the hinge structure 2202. Each pin half 2205 defines a rib 2207 extending downwardly. As will be described in further detail, each rib 2207 defines abutting surfaces (i.e., a rear abutting surface 2208 and a front abutting surface 2209) on opposing sides to form parts of positive stops for limiting the pivotal movement of the frame members 2256.

Each pin receiver 2204 that is positioned on the tray 2224 defines two sets of opposing fingers 2211 separated by a divider 2212. The opposing fingers 2211 define slots 2213 on each side of the divider 2212 for receiving each of the pin halves 2205. When the hinge pin 2203 is received by the pin receiver 2204, the notch 2206 accommodates the divider 2212 to form the system 2200. The divider 2212, in addition to forming a part of the system 2200, also provides strength and rigidity to the pin receiver portion 2204 of the hinge structure 2202 to limit flexing of the pin receiver 2204.

Figure 110:
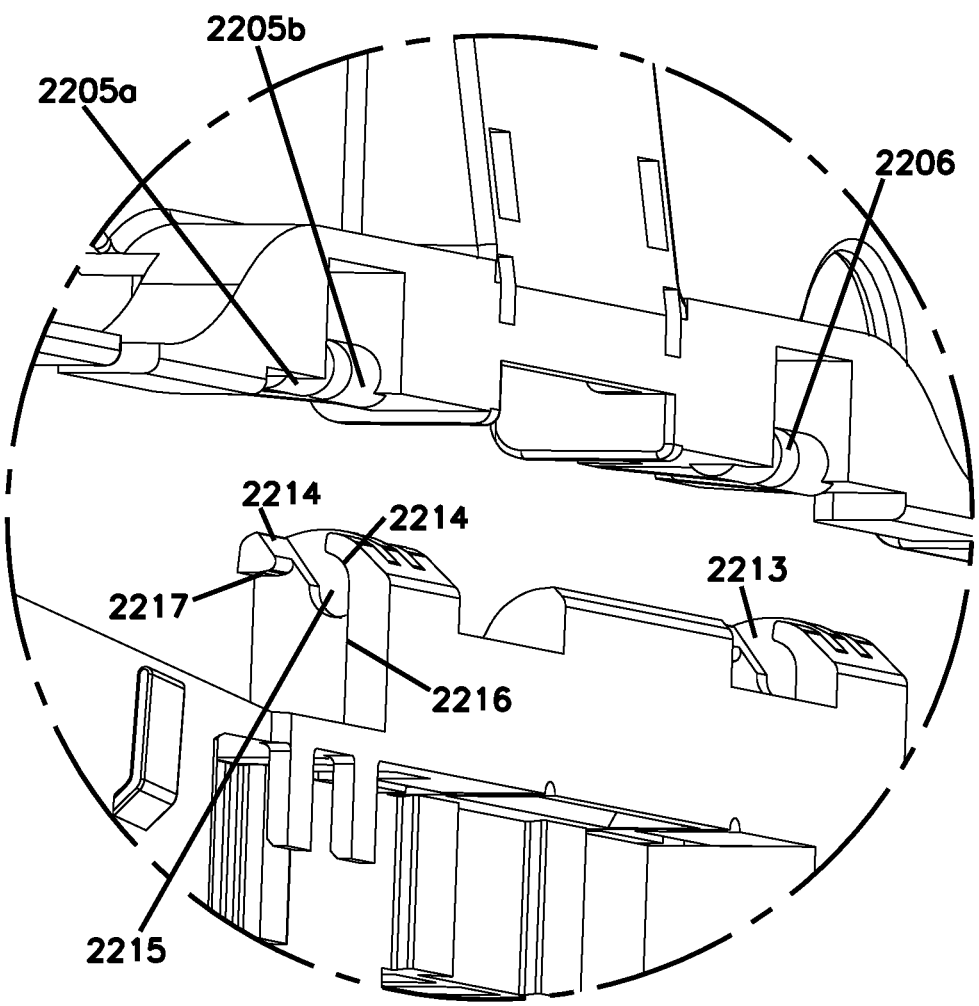
FIG. 110 is another close-up rear perspective view of the hinge structure of FIG. 109.
Figure 111:
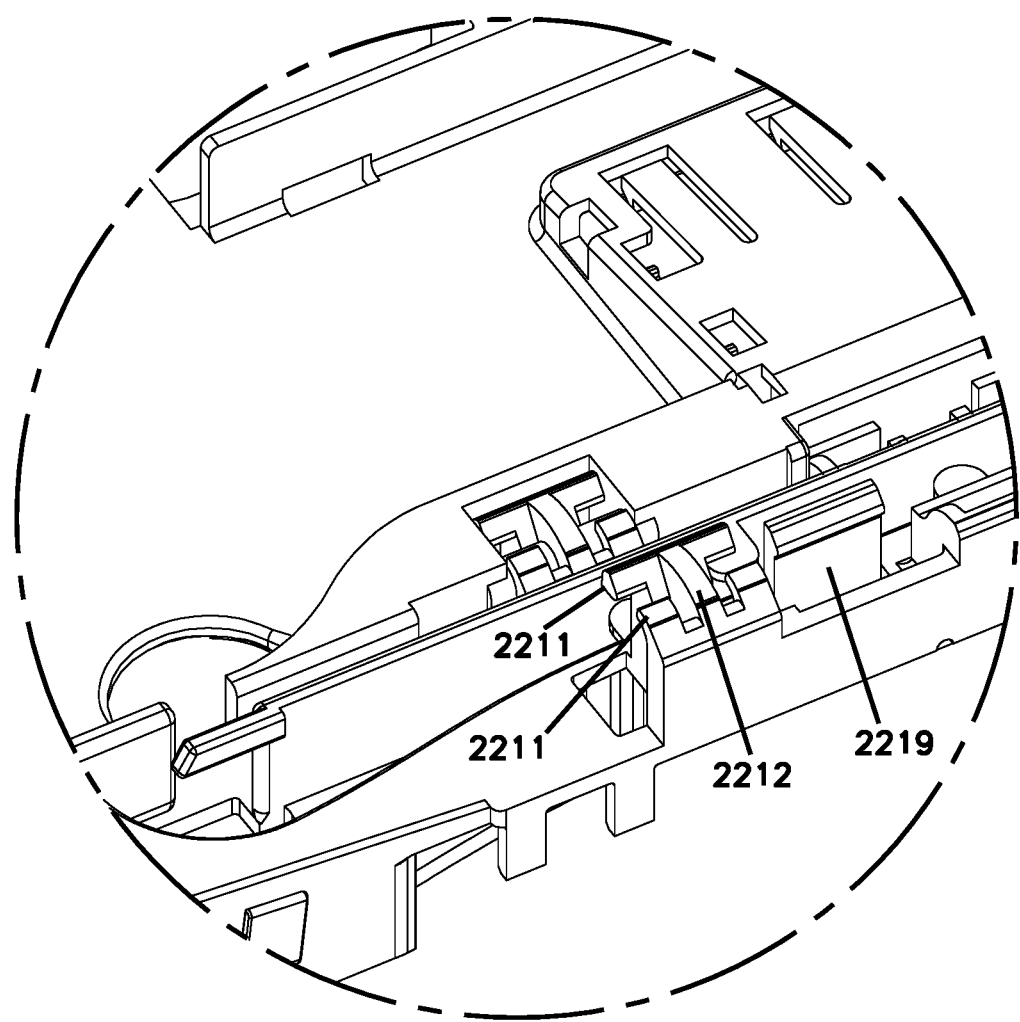
FIG. 111 illustrates the lower frame member of FIGS. 109-110 in an attached configuration.
Figure 112:
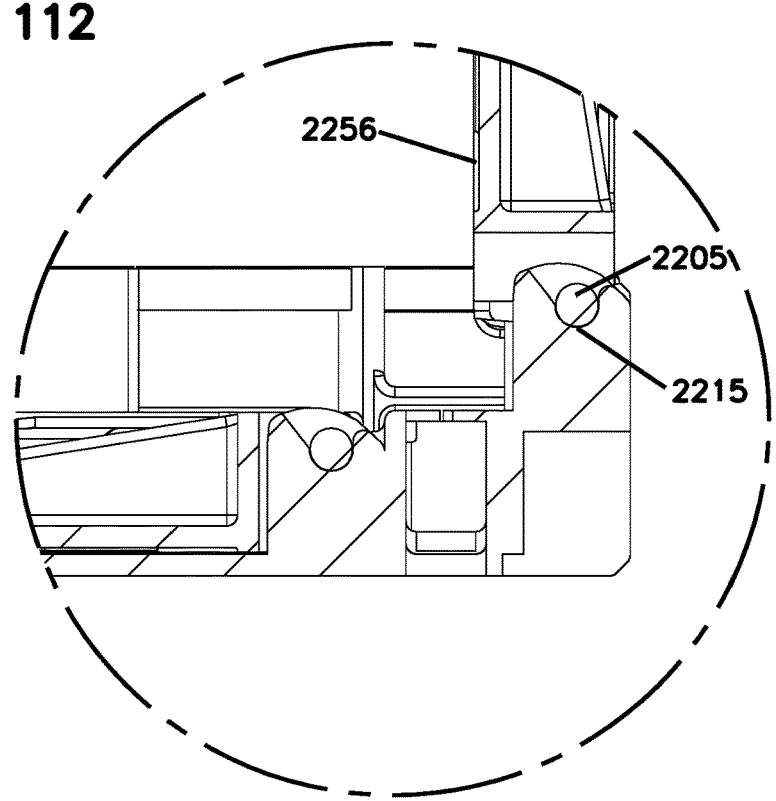
FIG. 112 is a cross-sectional view taken along a section transverse to the hinge pins illustrating the pin halves within the pin pockets of the hinge pin receivers, the upper frame member shown in an open position.
Figure 113:
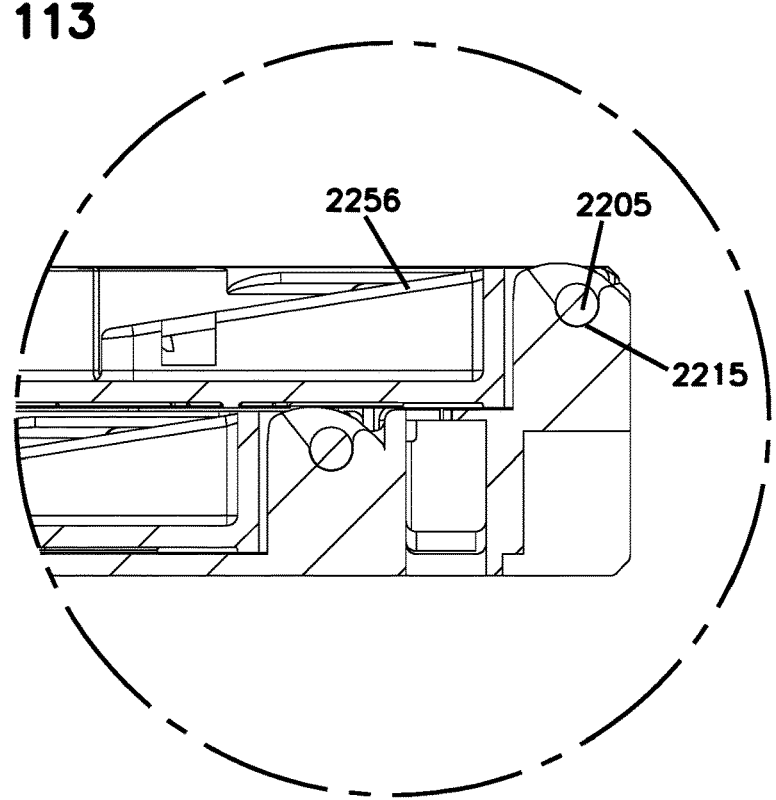
FIG. 113 illustrates the upper frame member of FIG. 112 in a closed position.
Figure 114:
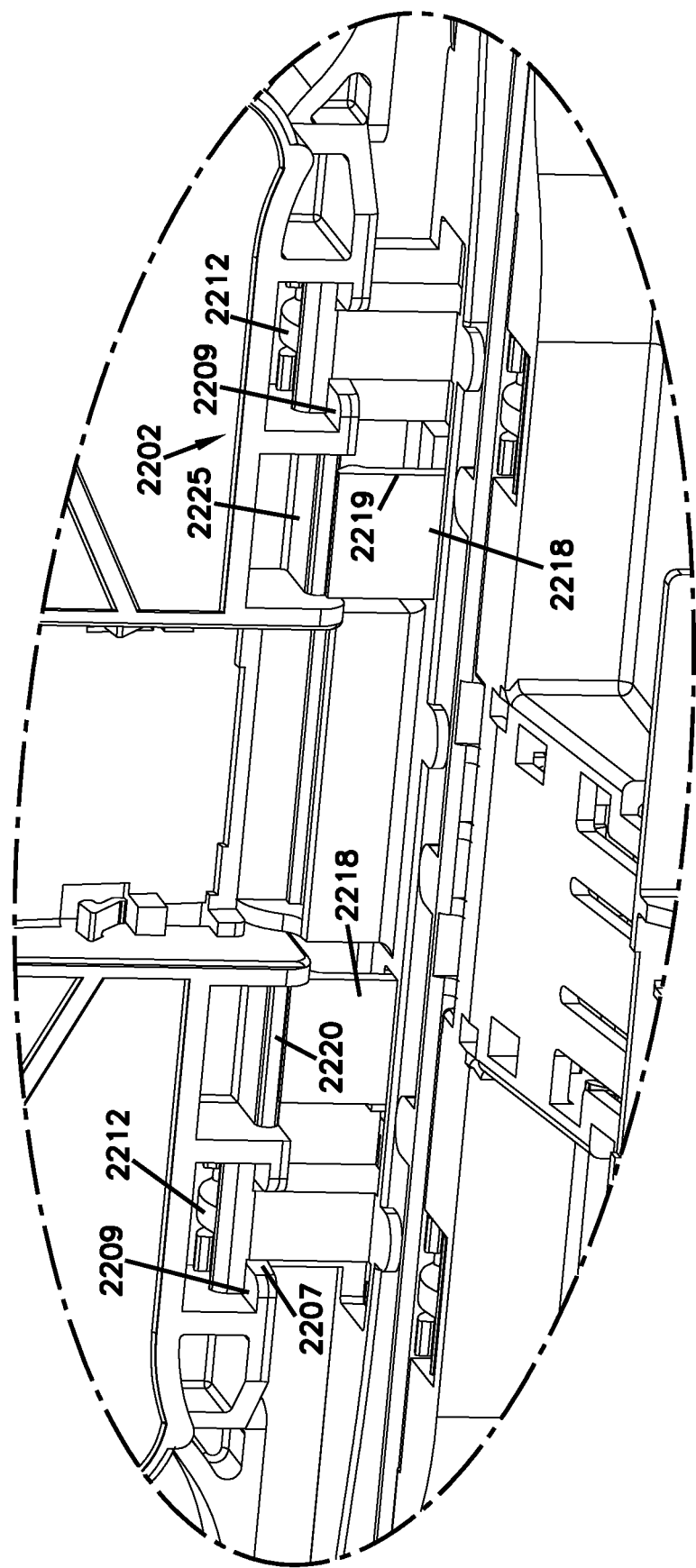
FIG. 114 is another close-up front perspective view of the hinge structures for the upper and lower frame members of FIGS. 105-106, the lower frame member shown in a closed position and the upper frame member shown in an open position.
Figure 115:
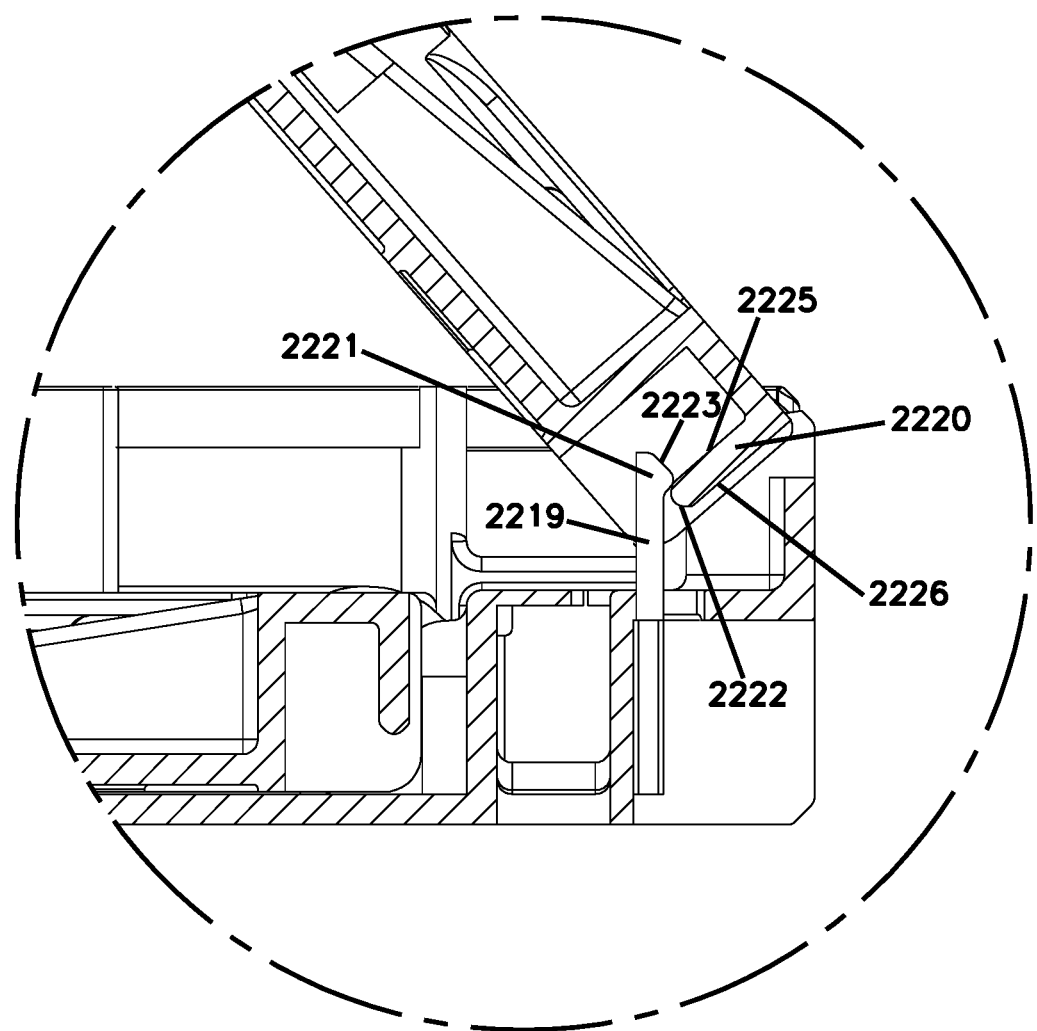
FIG. 115 is a cross-sectional view illustrating the position of the retention element of the hinge structure when a frame member is being moved from the closed position toward the open position.
Figure 116:
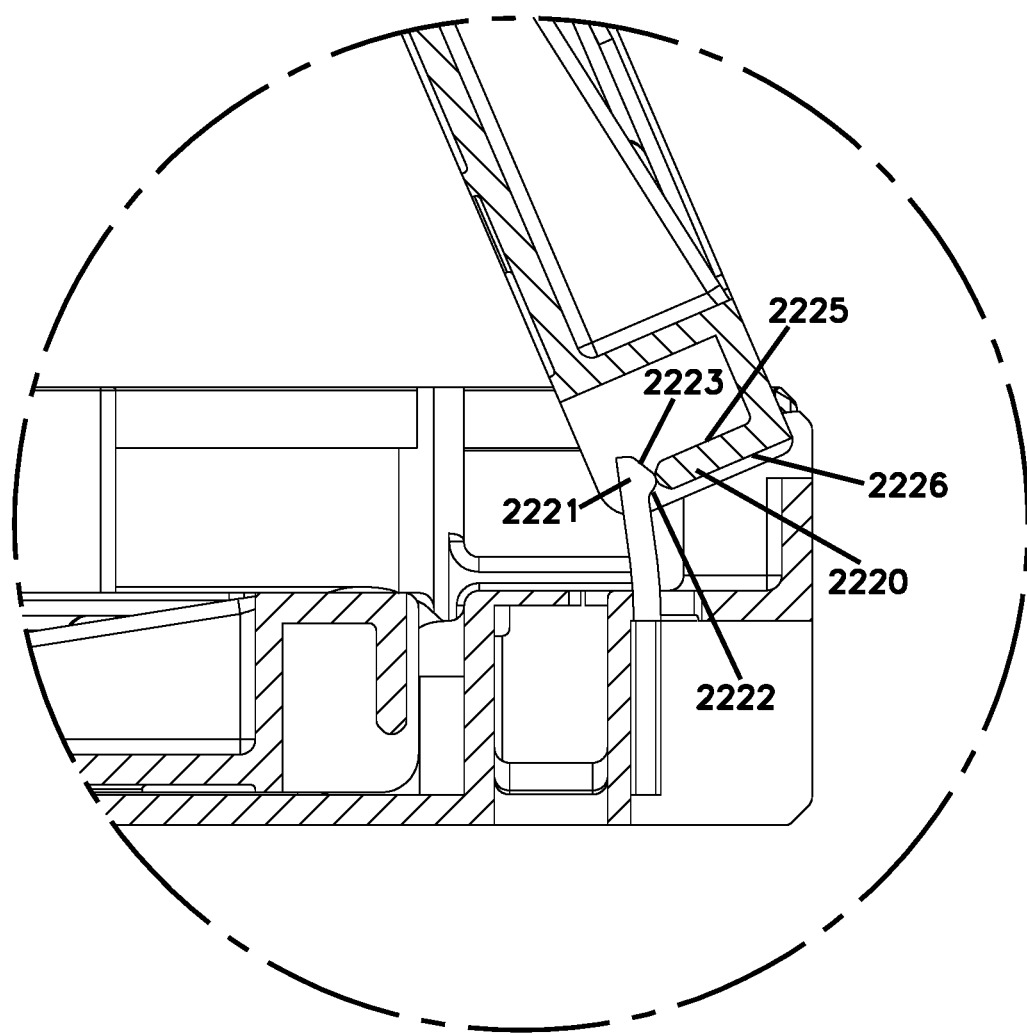
FIG. 116 illustrates the position of the retention element of FIG. 115 just prior to locking the frame member in an open position.

When the pin halves 2205 are inserted into the slots 2213 formed by the opposing fingers 2211, the pin halves 2205 are guided into the slots 2213 via angled receiving surfaces 2214 defined by the fingers 2211. The angled surfaces 2214 lead to generally circular pin pockets 2215 that guide pivotal motion of the pin halves 2205 as shown in FIGS. 110, 112, and 113.

As noted previously, each rib 2207 associated with a pin half 2205 defines rear and front abutting surfaces 2208, 2209 on opposing sides. As shown in FIG. 110, the rear abutting surface 2208 is configured to abut a first stop surface 2216 defined on the pin receiver 2204 when the frame member 2256 has been brought to a closed position. And, the front abutting surface 2209 is configured to abut a second stop surface 2217 (defined by one of the fingers 2211) when the frame member 2256 has been brought to an open position. The front and rear abutting surfaces 2209, 2208 and the first and second stop surfaces 2216, 2217 cooperatively form positive stops to limit the pivotal motion of the frame members 2256 to a 90-degree travel path.

As shown in FIGS. 107-109, 111, and 114-117, at least one of the hinge structures 2202 (upper level or lower level) may include a retention element 2218 configured to keep an open frame member 2256 at the open position. The retention element 2218 is provided in the form of an elastically flexible cantilever arm 2219. The elastically flexible cantilever arm 2219 is configured to abut a wall structure 2220 formed adjacent each hinge pin 2203 for retaining the frame member 2256 in an open position.

As shown in FIGS. 107-109, 111, and 114-117, the cantilever arm 2219 defines a tab 2221 at a free end thereof. The tab 2221 defines an upward, rearward extending ramp 2222 that meets an upward, forward extending ramp 2223. As shown in the cross-sectional views of FIGS. 115-117, an inner surface 2225 of the wall 2220 abuts the upward, rearward extending ramp 2222 during the opening of the frame member 2256 to deflect the cantilever arm 2219. Once the frame member 2256 is about to be brought to a fully open position, the wall 2220 clears the upward, rearward extending ramp 2222 and starts abutting the upward, forward extending ramp 2223, which allows the cantilever arm 2219 to flex back. The interaction of an outer surface 2226 of the wall with the upward, forward extending ramp 2223 of the tab 2221 keeps the frame member 2256 in an open position.

The flexible cantilever arm 2219 provides a biased retaining force in keeping the frame member 2256 in an open position. If the frame member 2256 needs to be pivoted to a closed position, the bias of the cantilever arm 2219 has to be overcome by a "break-away" force to start flexing the cantilever arm 2219 and to clear the upward, forward extending ramp 2223.

It should be noted that although only the upper hinge structure 2202 of the tray 2224 has been shown with such a retention feature 2218, the lower hinge structure 2202 may also utilize such a retention feature 2218 for keeping the frame members 2256 at an upright, open position.

Figure 117:
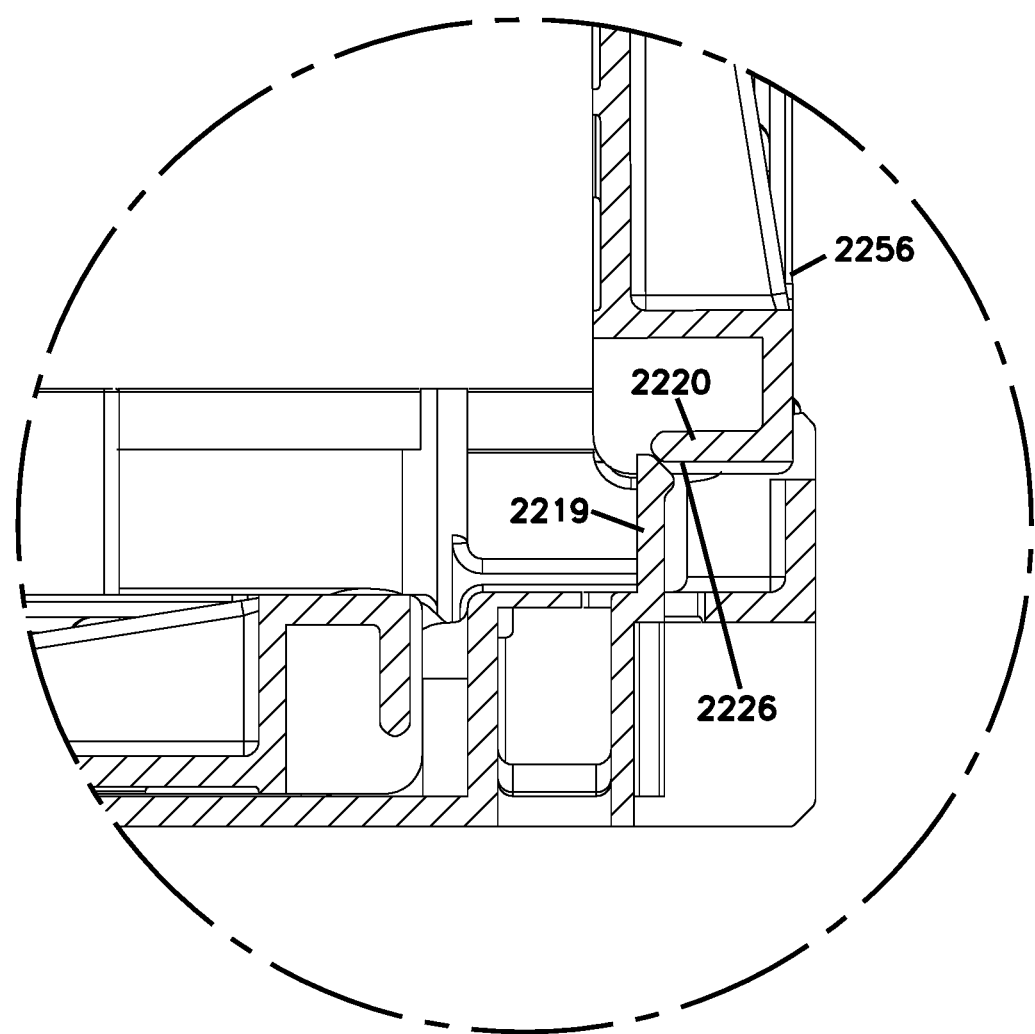
FIG. 117 illustrates the position of the retention element of FIGS. 115-116 when the frame member is in a fully open position.

Now referring to FIGS. 118-125, another embodiment of an element 2310 that includes features similar to a number of the optical fiber distribution elements shown in FIGS. 1-117 is illustrated. Referring to FIGS. 118-125, the element 2310 provides a mechanism 2360 for limiting or preventing closure of the tray 2324 of the element 2310 with respect to the chassis 2320 of the element 2310 when the second pivotable snap-fit cover 2313 is still in the open position. As will be discussed in further detail below, the mechanism 2360 is provided in part by a tab 2362 extending transversely from the snap-fit cover 2313 itself and in part by a cantilever arm 2364 defining a latch finger 2366 positioned on the portion of the element 2310 that defines the U-shaped radius limiter 2338. As will be discussed, when the cover 2313 is brought to a closed position, the interaction of the tab 2362 with the latch finger 2366 forces the latch finger 2366 to move transversely and out of a notch 2368 positioned on the tray 2324 to allow the slide mechanism 2330 of the element 2310 to operate to move the tray 2324 with respect to the chassis 2320 (please see FIGS. 124-125).

As discussed previously above, the element 2310 is similar to other versions of the elements shown in FIGS. 1-117 and includes a first pivotable snap-fit cover 2311 that pivotally opens and closes to cover the U-shaped radius limiter 2338 that is on the slide mechanism 2330 of the element 2310. The element 2310 further includes the second pivotable snap-fit cover 2313 that is configured to be positioned over a rear portion 2315 of the S-shaped cable pathway 2376 defined within the tray 2324 of the element 2310. The covers 2311, 2313 help retain cables within the S-shaped pathway 2376 defined within the tray 2324 as the cables lead to and from the radius limiter 2338 to the tray 2324 within element 2310. The pivotability aspect of the covers 2311, 2313 facilitates initial placement of the cables within the S-shaped pathway 2376 and provides access to the cables for removal.

Referring now to FIGS. 66-67 and to the element 810 shown therein, that element 810 is provided with a second snap-fit cover 813 similar to cover 2313 of element 2310. However, one concern regarding the second snap-fit cover 813 of element 810 is that the tray 824 can still be moved to a closed position even if the cover 813 has been inadvertently left in the open position. Since there is some space or room between two or more stacked elements (such as elements 810), the cover 813 may be inadvertently left open and not completely snap-fit to the element without affecting the slidable movement of the tray 824. Leaving the snap-fit cover 813 slightly open can lead to a number of issues.

For example, if a cover 813 of a lower element 810 is left open when the lower tray 824 has been pushed into the chassis 820, sliding the tray 824 of an upper element 810 may contact and break the cover 813 of the lower element 810.

Also, in certain circumstances, if the cover 813 of a lower element 810 has been left slightly open when the tray 824 has been pushed into the chassis 820, the tray 824 of an upper element 810, when being slid to a closed position, may contact and further open the cover 813 of the lower element 810. This, in turn, may lead to the cover 813 of the lower element 810 being caught against the upper element 810 when the lower element 810 is attempted to be pulled out. Thus, the tray 824 of the lower element 810 may become trapped in the chassis 820 under the upper element 810 and prevented from being opened all the way without breaking the cover 813.

Thus, it is advantageous to have a mechanism such as mechanism 2360 that provides a sequential operation for pivotally closing the cover 2313 before the tray 2324 can be slid back to a closed position. Such a mechanism 2360 is configured to prevent inadvertent closing of the tray 2324 before the cover 2313 has been fully snapped closed.

Referring back to FIGS. 118-125, details of the mechanism 2360 are shown. As noted above, the mechanism 2360 is generally provided by a tab 2362 projecting from the snap-fit cover 2313 itself that is configured to contact and move a biased latch finger 2366 out of a notch 2368 provided on the tray 2324 to allow the slide mechanism 2330 to move the tray 2324 with respect to the chassis 2320.

Figure 122:
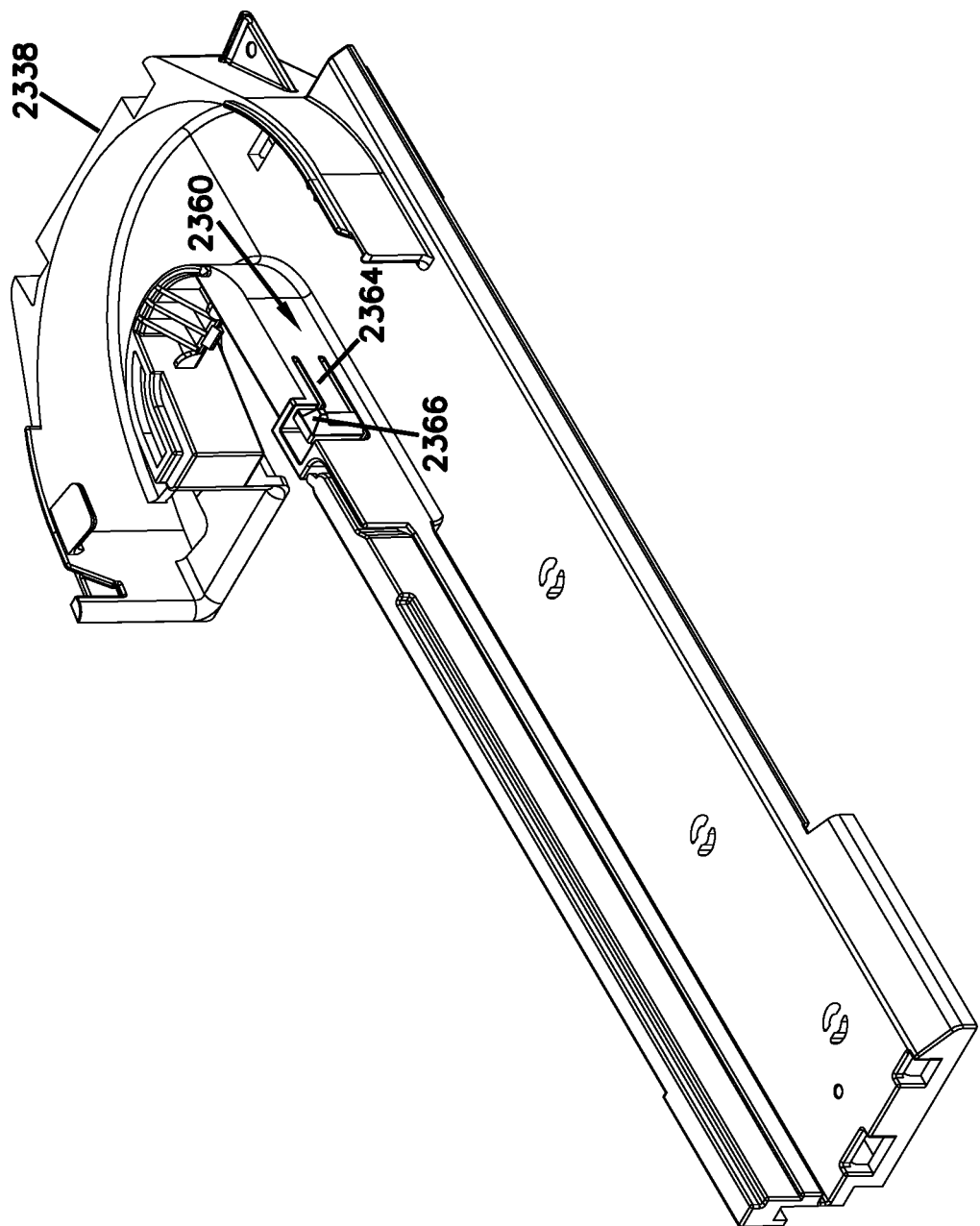
FIG. 122 illustrates in isolation the part of the optical fiber distribution element of FIGS. 118-121 that includes the U-shaped radius limiter.
Figure 123:
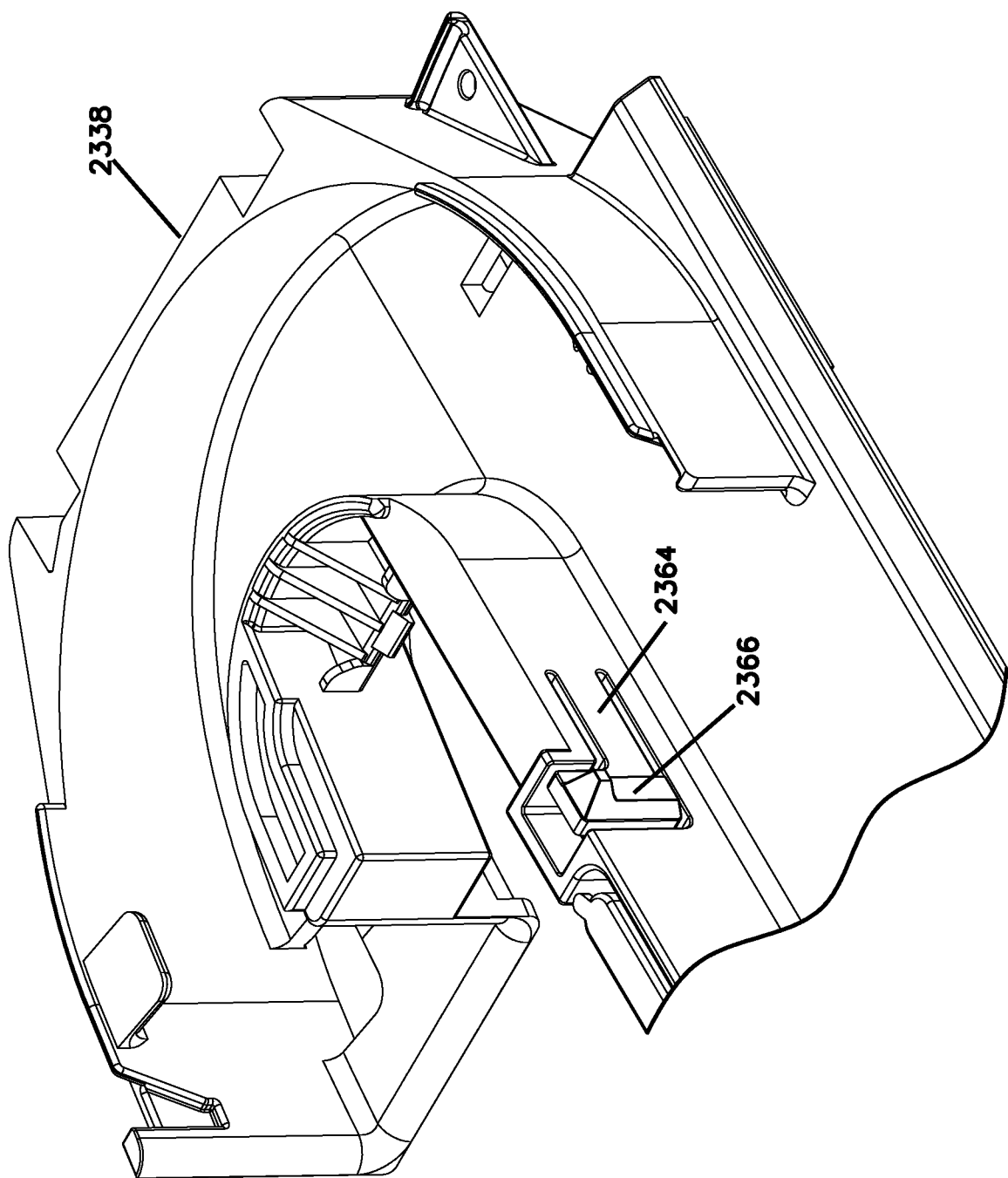
FIG. 123 illustrates a close-up view of the cantilever arm and the ramped latch finger of the part of the optical fiber distribution element that includes the U-shaped radius limiter of FIG. 122.
Figure 124:
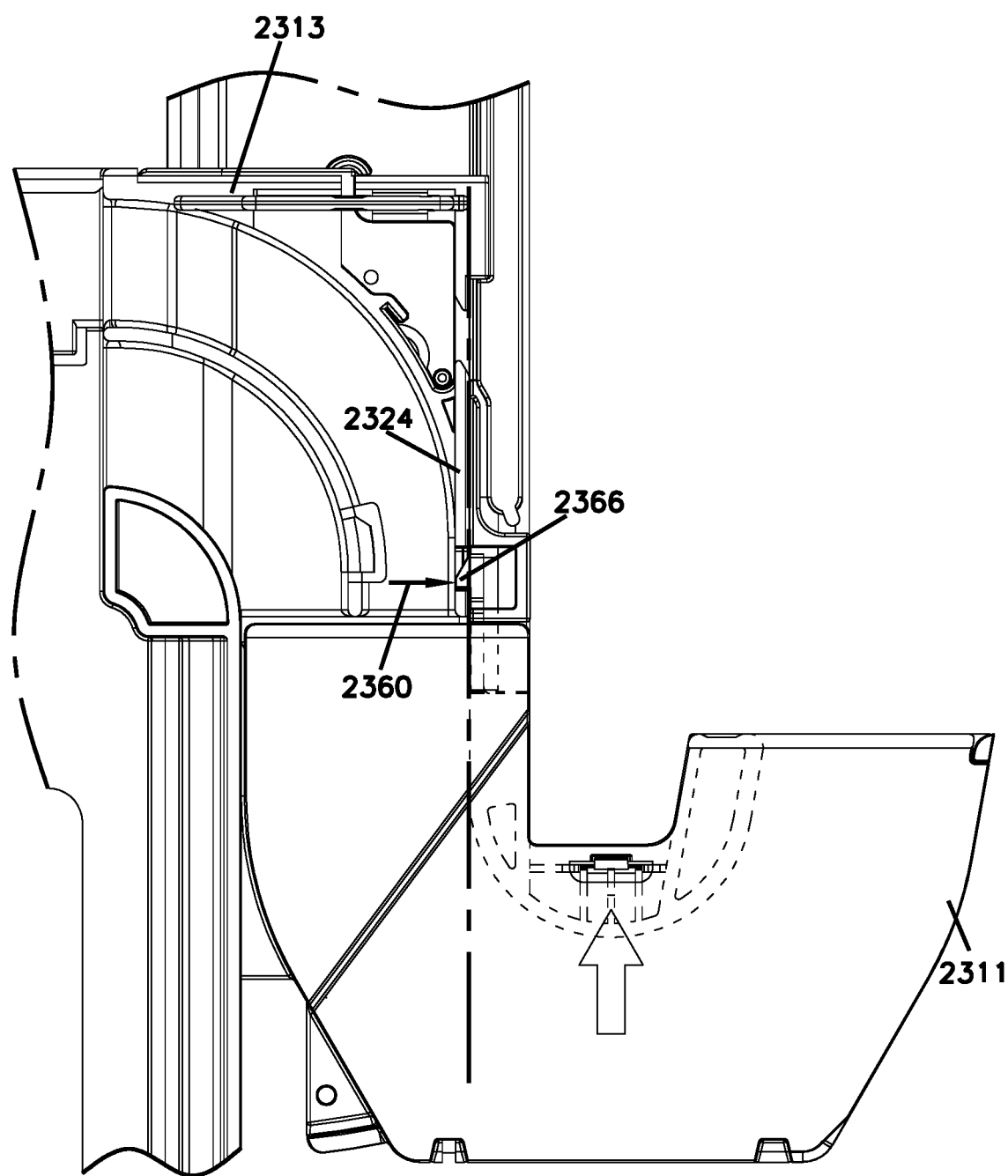
FIG. 124 illustrates a top view of a portion of the optical fiber distribution element of FIGS. 118-123 when the second pivotable snap-fit cover thereof is in an open position.

As shown in FIGS. 122-123, the cantilever arm 2364 is provided as part of the portion of the element 2310 that defines the U-shaped radius limiter 2338. At the end of the cantilever arm 2364 is the ramped latch finger 2366. The latch finger 2366, when the tray 2324 is in the completely open position, is biased by the cantilever arm 2364 to align with and fit within the notch 2368 defined on the tray 2324 (please see FIGS. 120, 121, and 124). When the latch finger 2366 is in the notch 2368, it acts as a catch to limit or prevent movement of the tray 2324 rearwardly with respect to the portion of the element 2310 that defines the U-shaped radius limiter 2338. And, since the tray 2324 and the U-shaped radius 2338 are two parts of the element 2310 that have to move in a synchronized fashion with respect to the chassis 2320 in order for the slide mechanism 2330 to work, the tray 2324 is latched in place. The latch finger 2366, by abutting the tray 2324, essentially prevents separation of the tray 2324 and the portion of the element 2310 that defines the U-shaped radius limiter 2338 to keep the tray 2324 in a locked state with respect to the chassis 2320.

Figure 118:
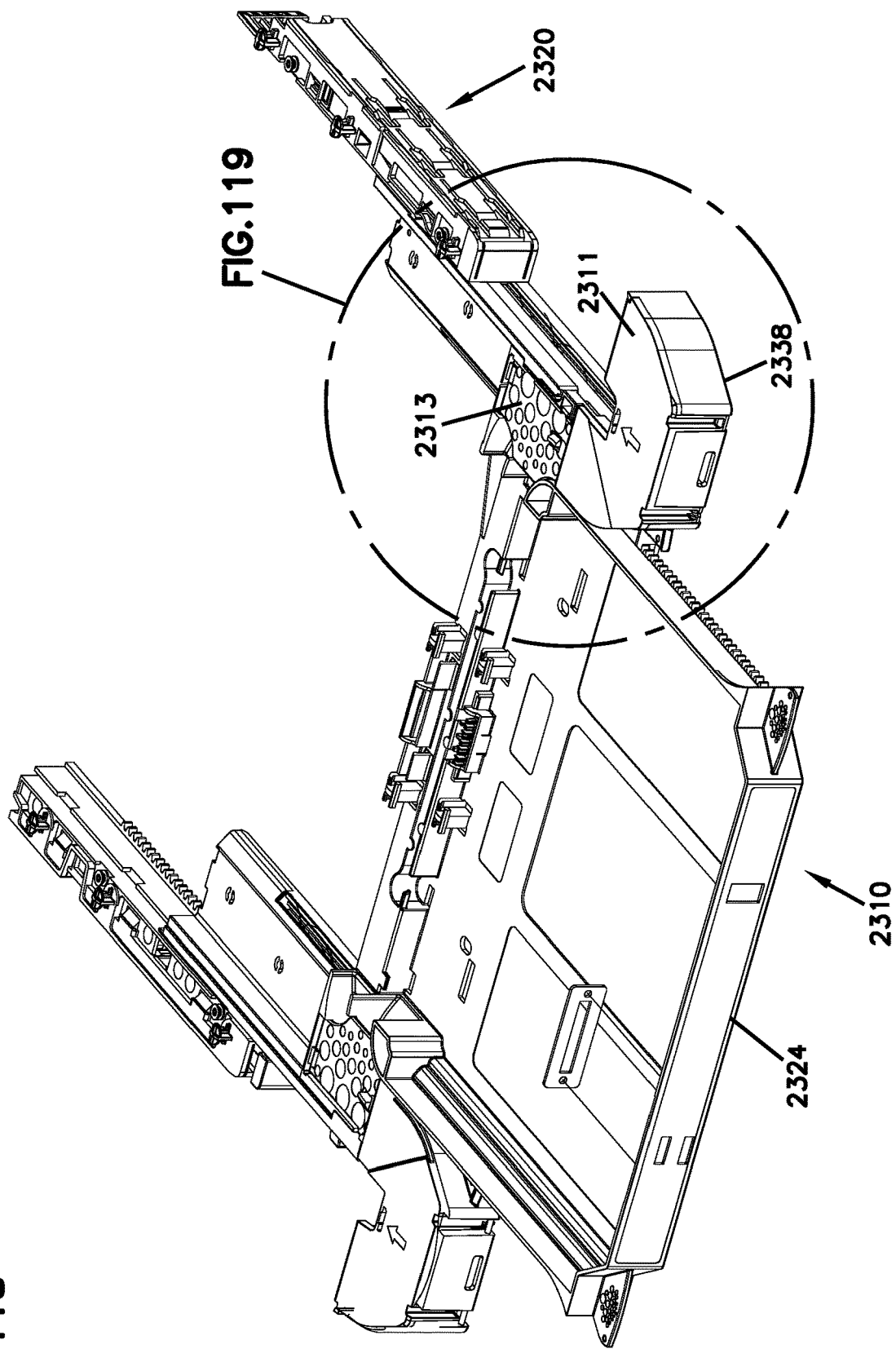
FIG. 118 illustrates a front perspective view of another embodiment of an optical fiber distribution element similar to those shown in FIGS. 80-82, 89-94, and 105-117 that includes features that are examples of inventive aspects in accordance with the present disclosure, the tray of the element shown in a fully open position.
Figure 119:
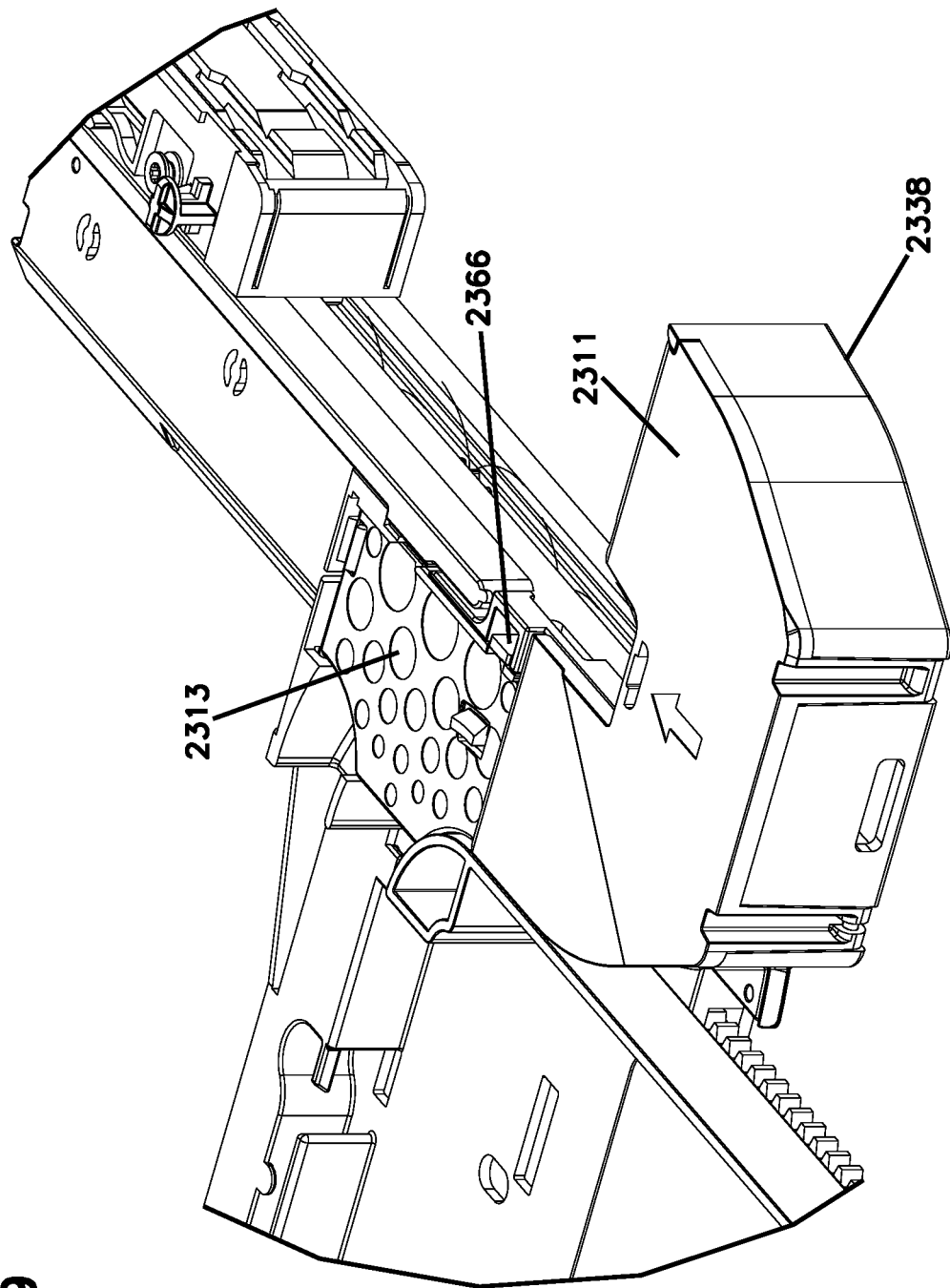
FIG. 119 is a close-up view of the slide mechanism including the U-shaped radius limiter of the element of FIG. 118, the second pivotable snap-fit cover of the element shown in a closed position.
Figure 120:
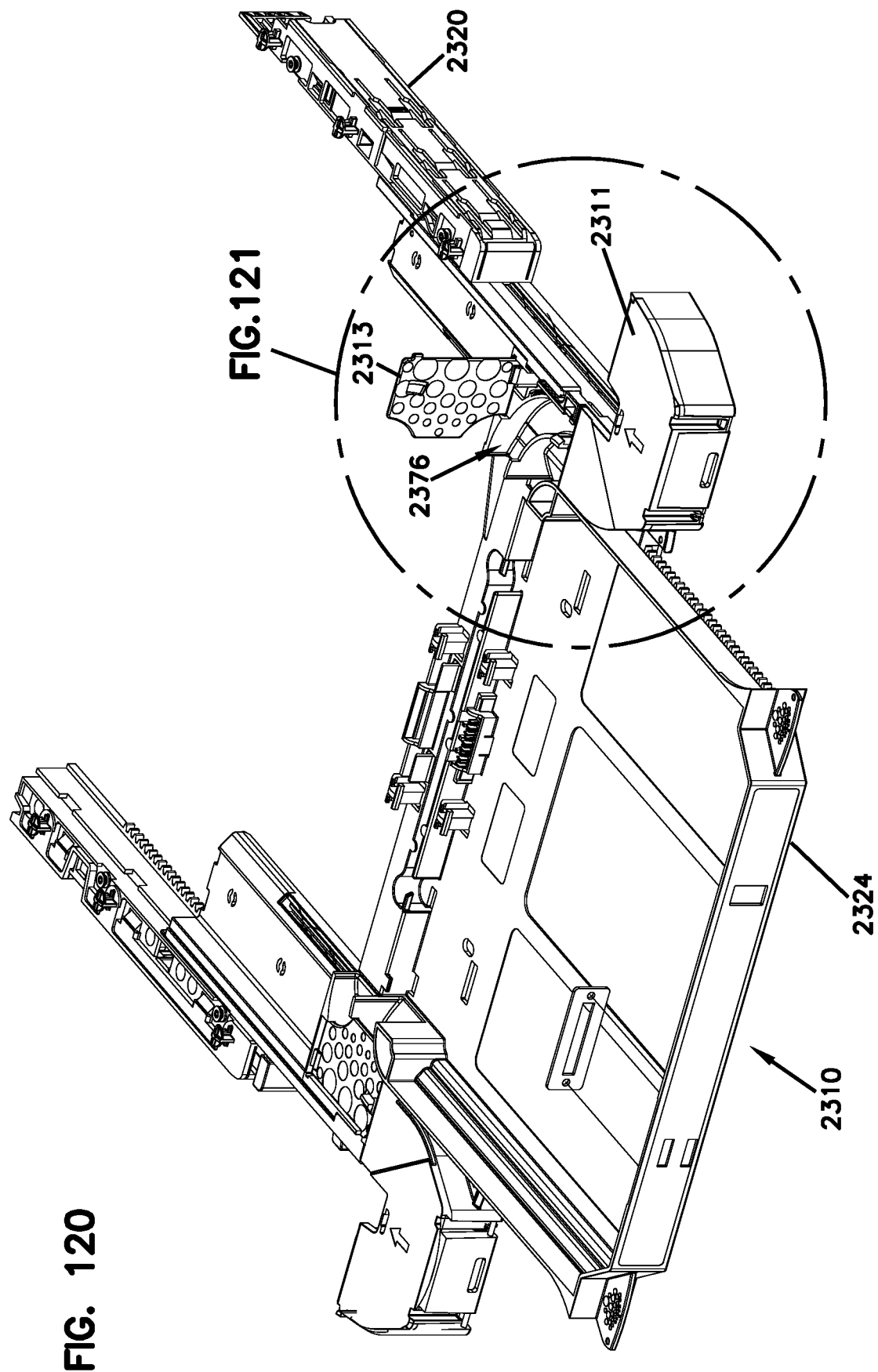
FIG. 120 illustrates the optical fiber distribution element of FIG. 118 with the second pivotable snap-fit cover thereof in an open position.
Figure 121:
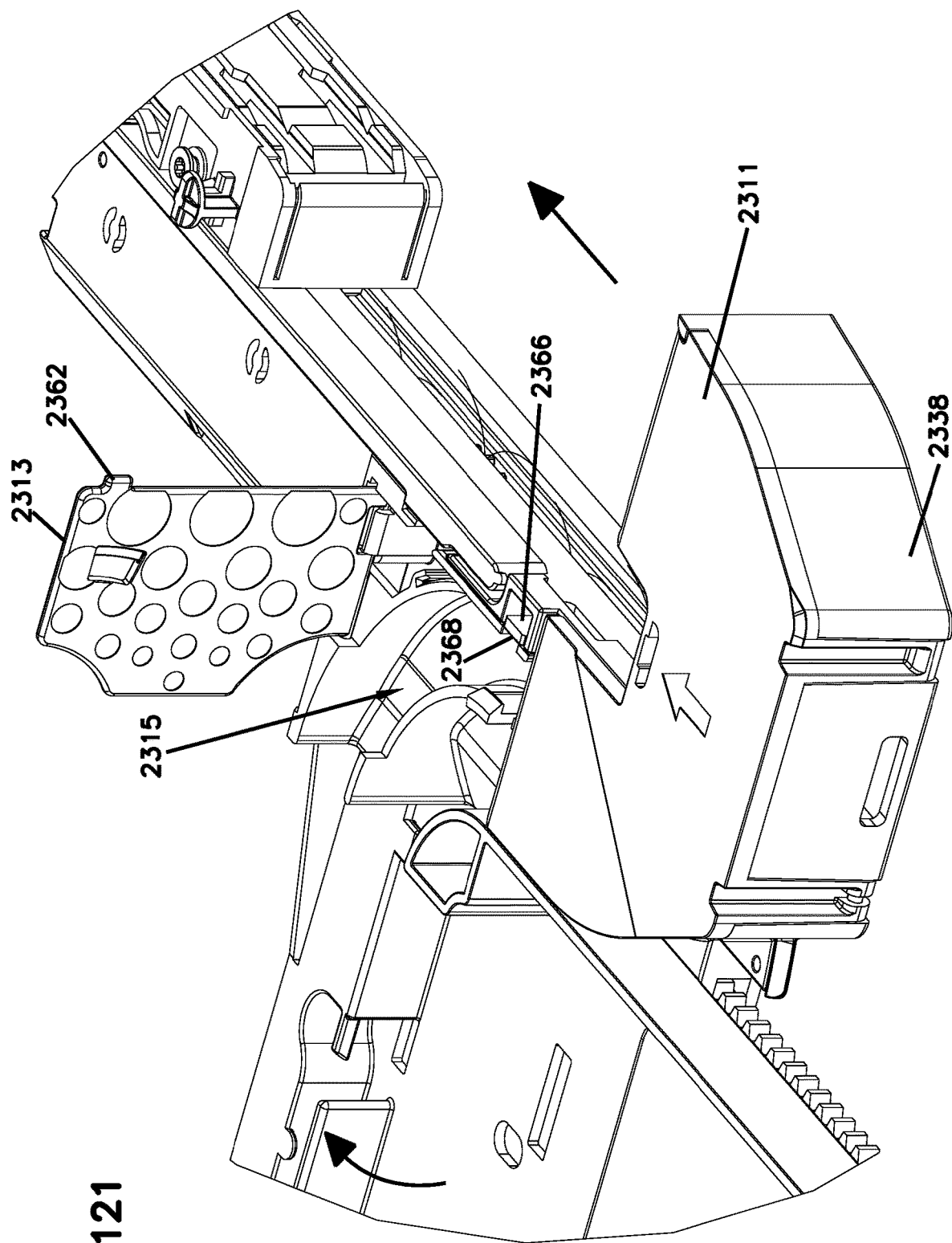
FIG. 121 is a close-up view of the second pivotable snap-fit cover of the element of FIG. 120.
Figure 125:
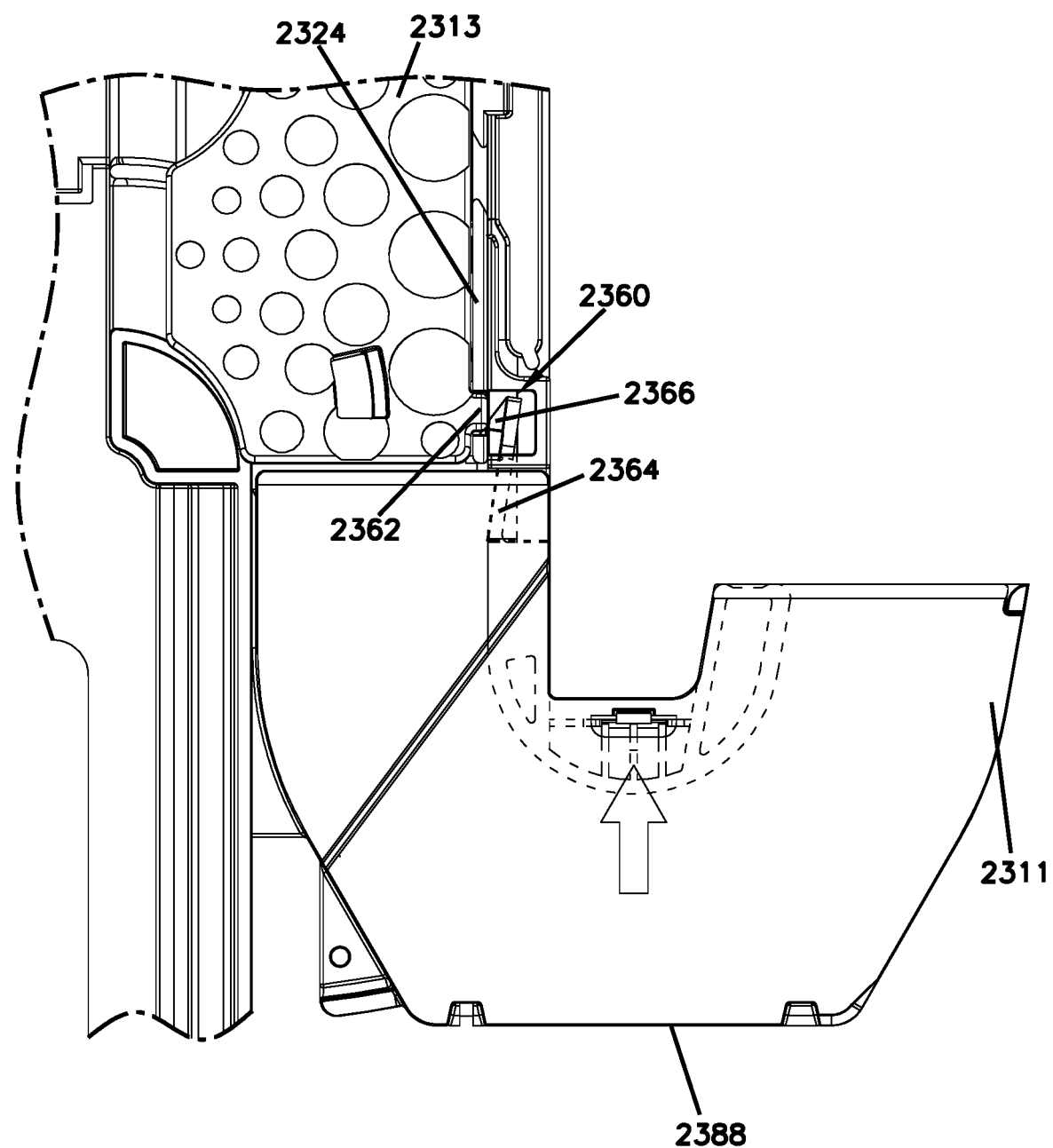
FIG. 125 illustrates a top view of the portion of the optical fiber distribution element of FIG. 124 when the second pivotable snap-fit cover thereof is in a closed position.

Referring now to FIGS. 118, 119, and 125, when the pivotable cover 2313 is pivoted to a closed position and snapped into place, the tab 2362 of the cover 2313 contacts the ramped latch finger 2366 and moves it out of the notch 2368 against the bias provided by the cantilever arm 2364. The cover 2313, which itself is positioned on the tray 2324, then fills the notch 2368 instead of the finger 2366 of the U-shaped radius limiter 2338, and the entire tray 2324 is free to move with respect to the radius limiter 2338.

When the tray 2324 is fully pulled out and the cover 2313 is pivoted to an open position, the latch finger 2366 moves into the notch 2368 under the bias of the cantilever arm 2364 and once again limits/prevents slidable closure of the tray 2324 before the cover 2313 is snapped close.

In this manner, a sequential process is provided by the mechanism 2360 of the element 2310 to limit the issues discussed previously with respect to the damage to the cover 2313.

PARTS LIST 10 element
12 block
20 chassis
24 tray
30 slide mechanism
32 gears
34 rack
36 entry points
38 radius limiters
50 mounting structure
52 adapters
56 T-shaped frame member
58 hinge
62 top frame member
64 bottom frame member
70 adapter blocks
72 connectors
74 cables
76 pathway
78 upper level
80 lower level
84 portion
86 flanges
90 radius limiters
96 openings
100 cable mount
102 cable wrap
106 radius limiters
210 element
220 chassis
224 tray
230 slide mechanism
238 radius limiters
256 frame members
258 hinges
260 middle portion
262 openings
264 side portions
266 cover
268 latches
270 radius limiters
276 pathway
278 upper level
280 lower level
284 radius limiters
286 cable mounts
288 dovetail
290 opening
292 block
294 bar
296 fasteners
310 element
330 slide mechanism
332 wheels
334 wire
336 wire
340 first part
342 second part
344 third part
410 element
420 radius limiter
430 friction members
500 universal mounting mechanism
502 universal mounting bracket
504 locking spring
506 release handle
508 cover
510 element
512 latch openings
514 front portion of the mounting bracket
516 mounting tabs
518 rear portion of the mounting bracket
520 bracket channel
522 deflection ramp
524 end portion of the locking spring
526 perpendicular locking face
528 angular insertion face
530 front end
532 inner front face
534 grip portion
535 frangible/breakable portion of release handle
536 deflection tab
538 rear end of the release handle
540 positive stop
542 stop face
544 slide mechanism
545 fasteners
550 blocking structure
552 spring fastener
554 handle fastener
610 element
620 chassis
621 inner end of radius limiter
623 outer end of radius limiter
624 tray 625 divider
627 trough
629 trough
631 cable management tab
633 cable management tab
635 cable management finger
638 radius limiter
676 pathway
678 upper level
680 lower level
684 cable guide
690 top surface of an element
692 bottom surface of an element
694 right side
696 left side
700 mounting system
701 first locking feature
702 stud
703 second locking feature
704 slot
705 third locking feature
706 slide lock
708 stem portion
710 flange portion
712 receiver portion
714 retention portion
716 end
718 lower cutout
720 lower side edge
722 upper cutout
724 upper side edge
726 bottom notch of lower cutout
728 side notch of lower cutout
730 top botch of upper cutout
732 side notch of upper cutout
734 opening
736 flexible cantilever tab
810 element
811 cover
813 cover
815 rear portion
821 aperture
824 tray
825 divider
827 trough
829 trough
838 U-shaped radius limiter
858 hinge
876 S-shaped pathway
878 upper level
880 lower level
884 portion of S-shaped pathway
890 top surface of element
892 bottom surface of element
894 right side of element
896 left side of element
897 opening
900 mounting system
901 first locking feature
902 stud
903 second locking feature
904 slot
905 third locking feature
906 slide lock
908 stem portion
910 flange portion
912 receiver portion
914 retention portion
916 end surface
918 cantilever arm
920 stop surface
922 flex surface
924 lower front edge
956 frame member
957 opening
960 middle portion
962 opening
964 side portion
970 radius limiter
1056 frame member
1156 frame member
1160 middle portion
1256 frame member
1260 center portion
1261 front portion
1263 splice region
1265 cover
1356 frame member
1357 flip-tray
1359 radius limiter
1361 right side
1363 left side
1387 splitter
1456 frame member
1457 flip-tray
1458 splice region
1459 radius limiter
1460 center portion
1556 base portion
1560 middle portion
1562 opening
1564 side portion
1569 modular element
1570 radius limiter
1590 hook
1591 first side
1592 first edge
1593 catch
1594 second side
1595 second edge
1656 frame member
1669 modular element
1671 splice region
1756 frame member
1810 element
1811 opening
1812 side wall
1814 front face
1824 tray
1838 U-shaped radius limiter
1839 entrance of U-shaped radius limiter
1862 locking feature
1864 slide lock
1866 cover
1867 receiving portion
1868 dovetail receiver
1869 retention portion
1899 cable fixation device/clamp/mount
1900 fiber optic splitter
1901 base portion
1903 fiber routing portion
1905 cantilever finger
1907 tab
1909 slot 1911 cantilever arm
1913 ramped tab
1915 catch
1917 opening
1919 fastener mount
1920 jacket channel
1921 pocket
1924 strength member pocket
1927 spool
1929 flange
1931 upper transverse wall
1933 lower transverse wall
1935 divider wall
1936 strength member clamp
1937 opening
1938 clamping surface
1940 fixation plate
1941 fastener mount
1942 fastener
1943 opening
1945 clamping surface
1959 fiber channel
1963 throughhole
1968 latch
1970 spring-loaded ball
1971 notch/hole
1987 ramp
1997 wall
1999 cable fixation device/clamp/mount
2000 cable mount
2002 body
2003 cable wrap
2004 entrance trough
2006 exit trough
2008 fastener
2010 fastener mount
2012 tab
2013 fiber routing portion
2020 latch
2022 rib
2024 handle
2026 opening
2028 opening
2100 cable manager
2102 spool portion
2104 flange portion
2200 Connection system
2202 Hinge structure
2203 Hinge pin
2204 Hinge pin receiver
2205 Pin half
2205a Right/first pin half
2205b Left/second pin half
2206 Notch
2207 Rib
2208 Rear abutting surface
2209 Front abutting surface
2210 Optical fiber distribution element
2211 Finger
2212 Divider
2213 Slot
2214 Angled receiving surface
2215 Pin pocket
2216 First stop surface
2217 Second stop surface
2218 Retention element
2219 Cantilever arm
2220 Wall structure
2221 Tab
2222 Upward, rearward extending ramp
2223 Upward, forward extending ramp
2224 Tray
2225 Inner surface of wall
2226 Outer surface of wall
2256 Frame member
2256a Top/upper frame member
2256b Bottom/lower frame member
2310 Element
2311 First pivotable snap-fit cover
2313 Second pivotable snap-fit cover
2315 Rear portion of S-shaped pathway
2320 Chassis
2324 Tray
2330 Slide mechanism
2338 U-shaped radius limiter
2360 Mechanism
2362 Tab
2364 Cantilever arm
2366 Latch finger
2368 Notch
2376 S-shaped pathway

What is claimed is:

1. An optical fiber distribution element comprising:
a chassis defining an interior;
a movable tray portion slidably movable from within the chassis to a position at least partially outside the chassis;
a slide mechanism which connects the movable tray portion to the chassis, the slide mechanism including a radius limiter portion which moves with synchronized movement relative to the chassis and the tray portion during slidable movement of the tray portion, wherein a cable entering and/or exiting the movable tray portion follows an S-shaped pathway;
a pivotable snap-fit cover provided on the tray portion, the cover movable between an open position and a closed position for closing at least a portion of the S-shaped pathway to retain the cable therein; and
a mechanism for preventing slidable closure of the tray portion with respect to the chassis when the pivotable snap-fit cover is in the open position, wherein the mechanism is configured to allow slidable closure of the tray portion with respect to the chassis via abutment of the cover with the radius limiter portion to disengage the radius limiter portion from the tray portion to allow movement of the tray portion with respect to the chassis.

2. An optical fiber distribution element according to claim 1, wherein the tray portion includes at least one hingedly mounted frame member which hinges about an axis perpendicular to the direction of movement of the movable tray portion that defines fiber optic connection locations.

3. An optical fiber distribution element according to claim 2, wherein the fiber optic connection locations are defined by fiber optic adapters.

4. An optical fiber distribution element according to claim 1, wherein the mechanism for preventing slidable closure of the tray portion with respect to the chassis when the pivotable snap-fit cover is in the open position is defined at least partially by a latch finger positioned on a flexible cantilever arm of the radius limiter portion that abuts the tray portion of the element when the tray portion is in a fully open position.

5. An optical fiber distribution element according to claim 4, wherein the pivotable snap-fit cover defines a tab that is configured to abut the latch finger and disengage the latch finger from the tray portion of the element when the cover is pivoted to the closed position to allow movement of the tray portion with respect to the chassis.

6. An optical fiber distribution element according to claim 1, wherein the slide mechanism is configured such that the tray portion moves at twice the speed of the radius limiter portion.

* * * * *